US008983832B2

(12) United States Patent
Allen et al.

(10) Patent No.: US 8,983,832 B2
(45) Date of Patent: Mar. 17, 2015

(54) SYSTEMS AND METHODS FOR IDENTIFYING SPEECH SOUND FEATURES

(75) Inventors: Jont B. Allen, Mahomet, IL (US); Feipeng Li, Baltimore, MD (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 146 days.

(21) Appl. No.: 13/001,856

(22) PCT Filed: Jul. 2, 2009

(86) PCT No.: PCT/US2009/049533
§ 371 (c)(1),
(2), (4) Date: Mar. 8, 2011

(87) PCT Pub. No.: WO2010/003068
PCT Pub. Date: Jan. 7, 2010

(65) Prior Publication Data

US 2011/0153321 A1 Jun. 23, 2011

Related U.S. Application Data

(60) Provisional application No. 61/078,268, filed on Jul. 3, 2008, provisional application No. 61/083,635, filed on Jul. 25, 2008, provisional application No. 61/151,621, filed on Feb. 11, 2009.

(51) Int. Cl.
*G10L 19/00* (2013.01)
*G10L 21/00* (2013.01)
(Continued)

(52) U.S. Cl.
CPC ......... *G10L 21/0205* (2013.01); *G10L 21/0264* (2013.01)
USPC ......................... 704/225; 704/200.1; 704/233

(58) Field of Classification Search
CPC ....... G10L 21/02; G10L 21/04; G10L 21/003; G10L 21/043; G10L 21/057; G10L 21/0316; G10L 21/0364
USPC ...................................... 704/200.1, 233, 225
See application file for complete search history.

(56) References Cited

U.S. PATENT DOCUMENTS 4,896,359 A * 1/1990 Yamamoto et al. ........... 704/260
5,208,897 A * 5/1993 Hutchins ....................... 704/200
(Continued)

FOREIGN PATENT DOCUMENTS

EP 1901286 A2 3/2008
WO WO 2008/036768 A2 3/2008

OTHER PUBLICATIONS

Serajul Hague, Roberto Togneri, Anthony Zaknich, Perceptual features for automatic speech recognition in noisy environments, Speech Communication, vol. 51, Issue 1, Jan. 2009, pp. 58-75, ISSN 0167-6393, 10.1016/j.specom.2008.06.002. (http://www.sciencedirect.com/science/article/pii/S0167639308000915) Keywords: Auditory system; Automatic spee.*
(Continued)

*Primary Examiner* — Eric Yen
(74) *Attorney, Agent, or Firm* — Kilpatrick Townsend & Stockton LLP

(57) ABSTRACT

Systems and methods for detecting features in spoken speech and processing speech sounds based on the features are provided. One or more features may be identified in a speech sound. The speech sound may be modified to enhance or reduce the degree to which the feature affects the sound ultimately heard by a listener. Systems and methods according to embodiments of the invention may allow for automatic speech recognition devices that enhance detection and recognition of spoken sounds, such as by a user of a hearing aid or other device.

25 Claims, 84 Drawing Sheets

(51) Int. Cl.
*G10L 15/00* (2013.01)
*G10L 15/20* (2006.01)
*G10L 21/02* (2013.01)
*G10L 21/0264* (2013.01)

(56) References Cited

U.S. PATENT DOCUMENTS

| | | | | |
|---|---|---|---|---|
| 5,408,581 | A * | 4/1995 | Suzuki et al. | 704/226 |
| 5,487,671 | A * | 1/1996 | Shpiro et al. | 434/185 |
| 5,583,969 | A * | 12/1996 | Yoshizumi et al. | 704/254 |
| 5,621,857 | A * | 4/1997 | Cole et al. | 704/232 |
| 5,692,097 | A * | 11/1997 | Yamada et al. | 704/241 |
| 5,721,807 | A * | 2/1998 | Tschirk | 704/255 |
| 5,745,073 | A | 4/1998 | Tomita | |
| 5,749,073 | A * | 5/1998 | Slaney | 704/278 |
| 5,813,862 | A * | 9/1998 | Merzenich et al. | 434/185 |
| 5,884,260 | A | 3/1999 | Leonhard | 704/254 |
| 5,963,035 | A * | 10/1999 | Won | 324/329 |
| 6,014,447 | A * | 1/2000 | Kohnen et al. | 381/86 |
| 6,161,091 | A * | 12/2000 | Akamine et al. | 704/258 |
| 6,263,306 | B1 * | 7/2001 | Fee et al. | 704/203 |
| 6,308,155 | B1 | 10/2001 | Kingsbury et al. | 704/256.1 |
| 6,570,991 | B1 * | 5/2003 | Scheirer et al. | 381/110 |
| 6,675,140 | B1 * | 1/2004 | Irino et al. | 704/203 |
| 6,735,317 | B2 * | 5/2004 | Paludan-Mueller | 381/317 |
| 7,065,485 | B1 * | 6/2006 | Chong-White et al. | 704/208 |
| 7,206,416 | B2 * | 4/2007 | Krause et al. | 381/60 |
| 7,292,974 | B2 | 11/2007 | Kemp | 704/234 |
| 7,444,280 | B2 | 10/2008 | Vandali et al. | 704/200.1 |
| 8,139,787 | B2 * | 3/2012 | Haykin et al. | 381/94.1 |
| 2002/0077817 | A1 * | 6/2002 | Atal | 704/254 |
| 2004/0252850 | A1 | 12/2004 | Turicchia et al. | |
| 2005/0114127 | A1 * | 5/2005 | Rankovic | 704/233 |
| 2005/0281359 | A1 | 12/2005 | Echols, Jr. | |
| 2006/0105307 | A1 * | 5/2006 | Goldman et al. | 434/236 |
| 2006/0241938 | A1 * | 10/2006 | Hetherington et al. | 704/208 |
| 2007/0088541 | A1 | 4/2007 | Vos et al. | 704/219 |
| 2008/0071539 | A1 * | 3/2008 | Allen et al. | 704/251 |
| 2008/0294429 | A1 * | 11/2008 | Su et al. | 704/222 |
| 2009/0304203 | A1 * | 12/2009 | Haykin et al. | 381/94.1 |
| 2010/0211388 | A1 * | 8/2010 | Yu et al. | 704/233 |
| 2012/0116755 | A1 * | 5/2012 | Park | 704/205 |

OTHER PUBLICATIONS

Marion S. Regnier and Jont B. Allen: "A method to identify noise-robust perceptual features: Application for consonant It/" J. Acoust. SOc. Am., vol. 123, No. 5, May 2008, pp. 2801-2814, XP002554701.*

M Regnier, Perceptual Features of Some Consonants Studied in Noise, 2007, University of Illinoise at Urbana-Champaign, pp. 161.*

Hu, G. et al. "Separation of Stop Consonants," Acoustics, Speech, and Signal Processing, 2003, Proceedings, (ICASSP '03), 2003 IEEE International Conference, pp. II-749-II-752 vol. 2.

Allen, J. B. (2001). "Nonlinear cochlear signal processing," in Jahn, A. and Santos-Sacchi. J., editors, *Physiology of the Ear, Second Edition*, chapter 19, pp. 393-442. Singular Thomson Learning, 401 West A Street, Suite 325 San Diego, CA 92101.

Allen, J. B. (2004). "The articulation Index is a Shannon channel capacity," in Pressnitzer, D., de Cheveigné, A., McAdams, S., and Collet, L., editors, *Auditory signal processing: physiology, psychoacoustics, and models*, chapter Speech, pp. 314-320. Springer Verlag, New York, NY.

Allen, J. B. and Neely, S. T. (1997). "Modeling the relation between the intensity JND and loudness for pure tones and wide-band noise," *J. Acoust. Soc. Am.* 102(6):3628-3646.

Bilger, R. and Wang, M. (1976). "Consonant confusions in patients with sense-oryneural loss," J. of Speech and hearing research 19(4):718-748. MDS Groups of HI Subject, by Hearing Loss. Measured Confusions.

Boothroyd, A. (1968). "Statistical theory of the speech discrimination score," *J. Acoust Soc. Am.* 43(2):362-367.

Boothroyd, A. (1978). "Speech preception and sensorineural hearing loss," in Studebaker, G. A. and Hochberg, I., editors, Auditory Management of hearing-impaired children Principles and prerequisites for intervention, pp. 117-144. University Park Press, Baltimore.

Boothroyd, A. and Nittrouer, S. (1988). "Mathematical treatment of context effects in phoneme and word recognition," *J. Acoust. Soc. Am.* 84(1):101-114.

Bronkhorst, A. W., Bosman, A. J., and Smoorenburg, G. F. (1993). A model for context effects in speech recognition, *J. Acoust. Soc. Am.* 93(1)A99-509.

Carlyon, R. P. and Shamma, S. (2003). "A account of monaural phase sensitivity" *J. Acoust. Soc. Am.* 114(1):333-348.

Dau, Verhey, and Kohlrausch(1999). "Intrinsic envelope fluctuations and modulation-detection thresholds for narrow-band noise carriers," J. Acoust. Soc. Am. 106(5):2752-2760.

Delattre, P., Liberman, A., and Cooper, F. (1955). "Acoustic loci and translational cues for consonants," *J. of the Acoust. Soc. of Am.* 24(4):769-773. Haskins Work on Painted Speech.

Drullman, R., Festen, J. M., and Plomp, R. (1994). "Effect of temporal envelope smearing on speech reception," *J. Acoust. Soc. Am.* 95(2): 1053-1064.

Dunn, H. K. and White, S. D. (1940). "Statistical measurements on conversational speech," *J. of the Acoust Soc. of Am.* 11:278-288.

Dusan and Rabiner, L. (2005). "Can automatic speech recognition learn more from human speech perception?," in Bunleanu, editor, *Trends in Speech Technology*, pp. 21-36. Romanian Academic Publisher.

Flanagan, J. (1965). *Speech analysis synthesis and perception.* Academic Press Inc., New York; NY.

Hall, J., Haggard, M., and Fernandes, M. (1984). "Detection in noise by spectrotemporal pattern analysis" *J. Acoust Soc. Am.* 76:50-56.

Houtgast, T. (1989). "Frequency selectivity in amplitude-modulation detection," *J. Acoust. Soc. Am.* 85(4):1676-1680.

Lobdell, B. and Allen, J. (2005). Modeling and using the vu meter with comparisions to rms speech levels; *J. Acoust. Soc. Am.* Submitted on Sep. 20, 2005; Second Submission Following First Reviews Mar. 13, 2006.

Mathes, R. and Miller, R. (1947). "Phase effects in monaural perception," *J. Acoust. Soc.* Am. 19:780.

Miller, G. A. (1962). "Decision units in the perception of speech." *IRE Transactions on Information Theory* 82(2):81-83.

Miller, G. A. and Isard, S. (1963). "Some perceptual consequences of linguistic rules," *Jol. of Verbal Learning and Verbal Behavior* 2:217-228.

Rabiner, L. (2003). "The power of speech," *Science* 301:1494-1495.

Rayleigh, L. (1908). "Acoustical notes—viii," *Philosophical Magazine* 16(6):235-246.

Riesz, R. R. (1928). "Differential intensity sensitivity of the ear for pure tones," *Phy. Rev.* 31(2):867-875.

Zwicker, E., Flottorp, G., and Stevens, S. (1957). "Critical bandwidth in loudness summation," *J. Acoust. Soc. Am.* 29(5):548-557.

Shepard, R. "Psychological representation of speech sounds" in David, E. & Denies, P. (eds.) *Human Communication: A unified View*, chap. 4, 67-113 (McGraw-Hill, New York, 1972).

Wang, M. D. & Bilger, R. C. "Consonant confusions in noise: A study of perceptual features" *J. Acoust. Soc. Am.* 54, 1248-1266 (1973).

Allen, J. B. "Consonant recognition and the articulation index" *J. Acoust. Soc. Am.* 117, 2212-2223 (2005).

Allen, J. B. *Articulation and Intelligibility* (Morgan and Claypool, 3401 Buck-skin Trail, LaPorte, CO 80535, 2005). ISBN: 1598290088.

Soli, S. D., Arable, P. & Carroll, J. D. "Discrete representation of perceptual structure underlying consonant confusions" *J. Acoust. Soc. Am.* 79, 826-837.

Miller, G. A. & Nicely, P. E. "An analysis of perceptual confusions among some English consonants" *J Acoust. Soc. Am.* 27,338-352 (1955).

Dubno, J. R. & Levitt, H. "Predicting consonant confusions from acoustic Analysis" *J Acoust. Soc. Am.* 69, 249-261 (1981).

Gordon-Salant, S. "Consonant recognition and confusion patterns among elderly hearing-impaired subjects" *Ear and Hearing* 8, 270-276 (1987).

(56) References Cited

OTHER PUBLICATIONS

Cooper, F., Delattre, P., Liberman, A., Borst, J. & Gerstman, L. "Some experiments on the perception of synthetic speech sounds" *J. Acoust. Soc. Am.* 24, 579-606 (1952).
Furui, S. "On the role of spectral transition for speech perception" *J. Acoust. Soc. Am.* 80, 1016-1025 (1986).
Lobdell, B. & Allen, J. B. "An information theoretic tool for investigating speech perception" Interspeech 2006, p. 1-4.
Allen, J. B. "Short time spectral analysis, synthesis, and modification by discrete Fourier transform" *IEEE Trans. Acoust. Speech and Sig. Processing*, 25, 235-238(1977).
Allen, J. B. & Rabiner, L. R. "A unified approach to short-time Fourier analysis and synthesis" *Proc. IEEE* 65, 1558-1564 (1977).
Shannon, R. V., Zeng, F. G., Kamath, V., Wygonski, J. & Ekelid, M. "Speech recognition with primarily temporal cues" *Science* 270, 303-304 (1995).
Loizou, P., Dorman, M. & Zhemin, T. "On the number of channels needed to understand speech" *J. Acoust. Soc. Am.* 106,2097-2103 (1999).
French, N. R. & Steinberg, J. C. "Factors governing the intelligibility of speech sounds" *J. Acoust. Soc. Am.* 19,90-119 (1947).
Hermansky, H. & Fousek, P. "Multi-resolution Rasta filtering for TANDEM-based ASR" *in Proceedings of Interspeech* 2005. IDIAP-RR 2005-18.
Lovitt, A & Allen, J. "50 Years Late: Repeating Miller-Nicely 1955" Interspeech 2006, p. 1-4.
Allen, J. B. "How do humans process and recognize speech?" *IEEE Transactions on speech and audio processing* 2,567-577 (1994).
Allen, J. B. "Harvey Fletcher's role in the creation of communication acoustics" *J. Acoust. Soc. Am.* 99, 1825-1839 (1996).
Fletcher, H. and Galt, R. (1950), "The Perception of Speech and Its Relation to Telephony," *J. Acoust. Soc. Am.* 22, 89-151.
Phatak, S. and Allen, J. B. (Apr. 2007a), "Consonant and vowel confusions in speech-weighted noise," *J. Acoust. Soc. Am.* 121(4),2312-26.
Phatak, S. and Allen, J. B. (Mar. 2007b), "Consonant profiles for individual Hearing-Impaired listeners," in *AAS Annual Meeting* (American Auditory Society).
Repp, B., Liberman, A, Eccardt, T., and Pesetsky, D. (Nov. 1978), "Perceptual integration of acoustic cues for stop, fricative, and affricate manner," J. Exp. Psychol 4(4), 621-637.
Shannon, C. E. (1948), "A mathematical theory of communication" Bell System Tech. Jol. 27, 379-423 (parts I, II), 623-656 (part III).
Peter Heil, "Coding of temporal onset envelope in the auditory system" Speech Communication 41 (2003) 123-134.
Regnier, M. and Allen, J.B. (2007b), "Perceptual cues of some CV sounds studied in noise" in Abstracts (AAS, Scottsdale).
Phatak et al. "Consonant-Vowel interaction in context-free syllables" University of Ilinois at Urbana-Champaign, Sep. 30, 2005.
Phatak et al. "Measuring nonsense CV confusions under speech-weighted noise", University of Illinois at Urbana-Champaign.
Search Report and Written Opinion for PCT/US2007/78940 application.
Search Report and Written Opinion for PCT/US2009/051747 application.
The International Preliminary Report and Written Opinion corresponding to the PCT application PCT/US2009/049533 filed Jul. 2, 2009.
Marion S. Regnier and Jont B. Allen: "A method to identify noise-robust perceptual features: Application for consonant /t/" J. Acoust. Soc. Am., vol. 123, No. 5, May 2008, pp. 2801-2814, XP002554701.

* cited by examiner (a)

(b)

(a)

(a) Truncation of m102ta at 12 (top) and 0 dB SNR (bottom).

(b) Truncation of f109ta at 12 (top) and 0 dB SNR (bottom).

(c) Truncation of f119ta at 12 (top) and 0 dB SNR (bottom).

(d) Truncation of m111ta at 12 (top) and 0 dB SNR (bottom).

(a) Truncation of m102ta at 12 (top) and 0 dB SNR (bottom).

(b) Truncation of m104ta at 12 (top) and 0 dB SNR (bottom).

(c) Truncation of m107ta at 12 (top) and 0 dB SNR (bottom).

(d) Truncation of m117ta at 12 (top) and 0 dB SNR (bottom).

FIG. 22B
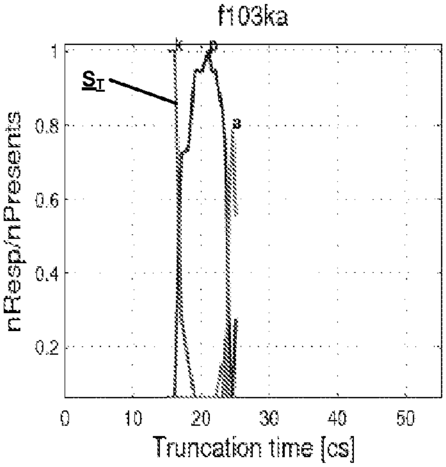
FIG. 22C
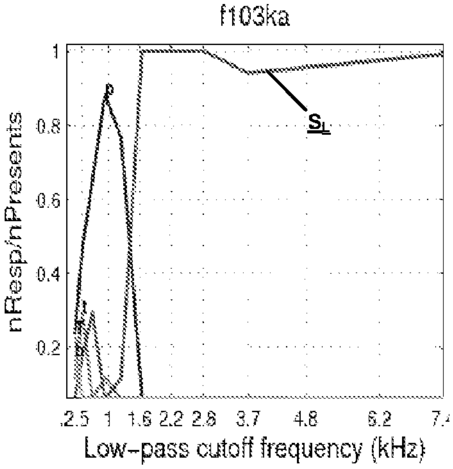
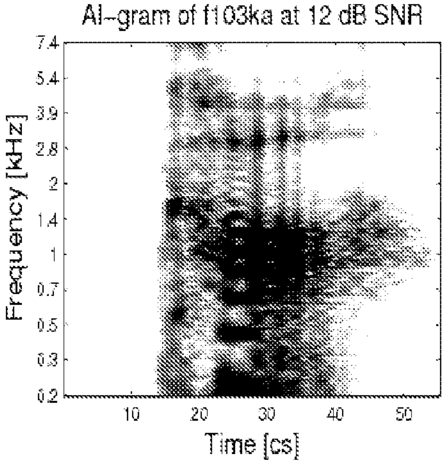
FIG. 22A
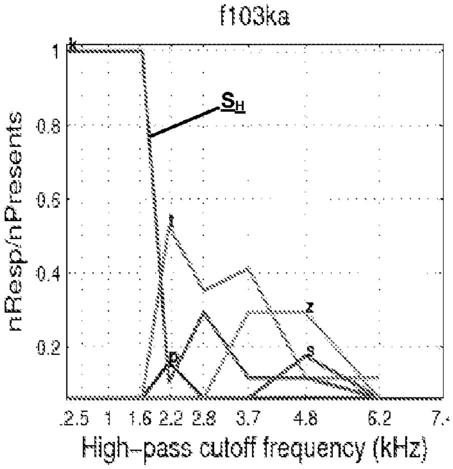
FIG. 22D

Finding Feature for /pa/

Finding Feature for /ba/

Finding Feature for /da/

Finding Feature for /ga/

FIG. 37A

CM of AS-L at 100dB SNR

| | pa | ta | ka | ba | da | ga |
|---|---|---|---|---|---|---|
| pa | 29 | | | 1 | | |
| ta | | 30 | | | | |
| ka | 8 | 20 | 2 | | | |
| ka-t+1 | 16 | 8 | 1 | | 1 | |
| ka-t+2 | 16 | 11 | 3 | | | |
| ka-t+4 | 18 | 6 | 5 | 1 | | |
| ba | | | | 19 | 1 | 2 |
| da | | | | 6 | 21 | 2 |
| ga | | 3 | | | 7 | 16 |
| ga-d+1 | | 4 | | 2 | 4 | 14 |
| ga-d+2 | | 4 | | | 6 | 16 |
| ga-d+4 | 1 | 5 | | | 4 | 20 |

FIG. 37B

CM of AS-L at 12dB SNR

| | pa | ta | ka | ba | da | ga |
|---|---|---|---|---|---|---|
| pa | 6 | 8 | | | | |
| ta | | 26 | | | | |
| ka | 5 | 23 | 1 | | 1 | |
| ka-t+1 | 1 | 20 | 2 | | 1 | 1 |
| ka-t+2 | 3 | 17 | 6 | | 1 | 3 |
| ka-t+4 | 6 | 19 | 4 | | | |
| ba | | | | 7 | 14 | |
| da | | | | | 26 | 2 |
| ga | | 5 | | | 10 | 13 |
| ga-d+1 | | | | 1 | 8 | 18 |
| ga-d+2 | | 3 | | | 14 | 10 |
| ga-d+4 | | 7 | | | 16 | 7 |

FIG. 37C

CM of AS-R at 100dB SNR

| | pa | ta | ka | ba | da | ga |
|---|---|---|---|---|---|---|
| pa | 30 | | | | | |
| ta | | 30 | | | | |
| ka | 3 | 7 | 17 | | 1 | 1 |
| ka-t+1 | 1 | 4 | 19 | 1 | 3 | |
| ka-t+2 | | 10 | 18 | | | 2 |
| ka-t+4 | | 5 | 25 | | | |
| ba | | | | 19 | 3 | 1 |
| da | | | | | 30 | |
| ga | | 1 | | | 26 | 3 |
| ga-d+1 | | 1 | | | 21 | 8 |
| ga-d+2 | | 2 | | | 19 | 9 |
| ga-d+4 | | 3 | 1 | | 21 | 5 |

FIG. 37D

CM of AS-R at 12dB SNR

| | pa | ta | ka | ba | da | ga |
|---|---|---|---|---|---|---|
| pa | 14 | 2 | | | 1 | |
| ta | | 29 | 1 | | | |
| ka | | 21 | 6 | | 1 | |
| ka-t+1 | 1 | 10 | 12 | | 5 | |
| ka-t+2 | | 16 | 11 | 1 | 1 | 1 |
| ka-t+4 | 3 | 19 | 8 | | | |
| ba | 1 | | | 13 | 8 | |
| da | | | | | 30 | |
| ga | | 1 | | | 28 | 1 |
| ga-d+1 | | | | | 27 | 1 |
| ga-d+2 | | | | | 23 | 7 |
| ga-d+4 | | 2 | | | 25 | 3 |

FIG. 38A

Table 1: Confusion Matrix of AS-L (SNR = 12dB, without NAL-R)

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 9 | 4 | 2 | 0 | 0 | 0 | 0 | 1 | 12 | 0 | 0 | 0 | 0 | 2 | 0 | 0 | 0 |
| ta | 0 | 28 | 0 | 0 | 0 | 0 | 0 | 0 | 0 | 0 | 0 | 0 | 2 | 0 | 0 | 0 | 0 |
| ka | 2 | 17 | 6 | 0 | 0 | 0 | 0 | 0 | 5 | 0 | 0 | 0 | 0 | 0 | 0 | 0 | 0 |
| ka+0 | 3 | 14 | 0 | 0 | 0 | 0 | 0 | 0 | 8 | 1 | 0 | 0 | 4 | 0 | 0 | 0 | 0 |
| ka+10 | 2 | 24 | 0 | 0 | 0 | 0 | 0 | 0 | 0 | 0 | 0 | 0 | 4 | 0 | 0 | 0 | 0 |
| ka+50 | 1 | 20 | 1 | 0 | 0 | 0 | 0 | 0 | 0 | 0 | 0 | 0 | 4 | 1 | 0 | 0 | 3 |
| ba | 0 | 0 | 0 | 0 | 0 | 0 | 0 | 7 | 23 | 0 | 0 | 0 | 0 | 0 | 0 | 0 | 0 |
| da | 0 | 0 | 0 | 0 | 0 | 0 | 0 | 0 | 30 | 0 | 0 | 0 | 0 | 0 | 0 | 0 | 0 |
| ga | 0 | 0 | 0 | 0 | 0 | 0 | 0 | 0 | 26 | 4 | 0 | 0 | 0 | 0 | 0 | 0 | 0 |
| ga+0 | 0 | 0 | 0 | 0 | 0 | 0 | 0 | 0 | 27 | 1 | 0 | 0 | 1 | 1 | 0 | 0 | 0 |
| ga+10 | 0 | 6 | 1 | 1 | 1 | 0 | 0 | 0 | 21 | 0 | 0 | 0 | 0 | 0 | 0 | 0 | 0 |
| ga+50 | 1 | 20 | 3 | 0 | 0 | 0 | 0 | 0 | 3 | 1 | 0 | 0 | 0 | 1 | 1 | 0 | 0 |

Table 2: Confusion Matrix of AS-L (SNR = 100dB, without NAL-R)

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 28 | 1 | 0 | 0 | 0 | 0 | 0 | 0 | 1 | 0 | 0 | 0 | 0 | 0 | 0 | 0 | 0 |
| ta | 4 | 25 | 1 | 0 | 0 | 0 | 0 | 0 | 0 | 0 | 0 | 0 | 0 | 0 | 0 | 0 | 0 |
| ka | 8 | 14 | 8 | 0 | 0 | 0 | 0 | 0 | 0 | 0 | 0 | 0 | 0 | 0 | 0 | 0 | 0 |
| ka+0 | 13 | 7 | 5 | 0 | 0 | 0 | 0 | 1 | 3 | 0 | 0 | 0 | 0 | 0 | 1 | 0 | 0 |
| ka+10 | 16 | 9 | 5 | 0 | 0 | 0 | 0 | 0 | 0 | 0 | 0 | 0 | 0 | 0 | 0 | 0 | 0 |
| ka+50 | 14 | 5 | 3 | 0 | 0 | 0 | 0 | 0 | 0 | 0 | 0 | 0 | 5 | 0 | 0 | 0 | 3 |
| ba | 0 | 0 | 0 | 0 | 0 | 0 | 0 | 16 | 9 | 0 | 1 | 0 | 0 | 1 | 3 | 0 | 0 |
| da | 0 | 0 | 0 | 1 | 0 | 0 | 0 | 5 | 24 | 0 | 0 | 0 | 0 | 0 | 0 | 0 | 0 |
| ga | 1 | 0 | 1 | 0 | 0 | 0 | 1 | 2 | 15 | 6 | 0 | 0 | 1 | 1 | 2 | 0 | 0 |
| ga+0 | 0 | 0 | 0 | 1 | 1 | 0 | 0 | 1 | 8 | 6 | 3 | 0 | 2 | 4 | 2 | 2 | 0 |
| ga+10 | 1 | 2 | 0 | 0 | 0 | 0 | 0 | 0 | 20 | 7 | 0 | 0 | 0 | 0 | 0 | 0 | 0 |
| ga+50 | 7 | 13 | 1 | 0 | 0 | 0 | 0 | 0 | 7 | 0 | 0 | 0 | 0 | 0 | 0 | 0 | 2 |

FIG. 38B

Table 3: Confusion Matrix of AS-L (SNR = 12dB, with NAL-R)

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 4 | 6 | 1 | 1 | 0 | 0 | 0 | 2 | 3 | 1 | 5 | 0 | 3 | 3 | 1 | 0 | 0 |
| ta | 0 | 25 | 0 | 0 | 0 | 0 | 0 | 0 | 0 | 0 | 0 | 0 | 3 | 2 | 0 | 0 | 0 |
| ka | 0 | 22 | 4 | 0 | 0 | 0 | 0 | 0 | 0 | 0 | 1 | 0 | 2 | 1 | 0 | 0 | 0 |
| ka+0 | 0 | 5 | 1 | 0 | 0 | 1 | 0 | 3 | 0 | 0 | 0 | 0 | 14 | 5 | 0 | 1 | 0 |
| ka+10 | 5 | 20 | 0 | 0 | 0 | 0 | 0 | 0 | 0 | 0 | 0 | 0 | 5 | 0 | 0 | 0 | 0 |
| ka+10 | 5 | 19 | 0 | 1 | 0 | 0 | 0 | 0 | 0 | 0 | 0 | 0 | 5 | 0 | 0 | 0 | 0 |
| ba | 0 | 0 | 0 | 2 | 0 | 0 | 0 | 5 | 15 | 0 | 3 | 0 | 1 | 2 | 1 | 1 | 0 |
| da | 0 | 0 | 0 | 0 | 0 | 0 | 0 | 0 | 29 | 1 | 0 | 0 | 0 | 0 | 0 | 0 | 0 |
| ga | 0 | 2 | 1 | 0 | 0 | 0 | 1 | 0 | 20 | 3 | 0 | 0 | 1 | 2 | 0 | 0 | 0 |
| ga+0 | 0 | 0 | 0 | 0 | 0 | 0 | 0 | 0 | 14 | 0 | 3 | 0 | 3 | 10 | 0 | 0 | 0 |
| ga+10 | 0 | 15 | 0 | 1 | 0 | 0 | 0 | 1 | 9 | 4 | 0 | 0 | 0 | 0 | 0 | 0 | 0 |
| ga+50 | 1 | 20 | 0 | 0 | 0 | 1 | 1 | 0 | 2 | 0 | 1 | 0 | 1 | 3 | 0 | 0 | 0 |

Table 4: Confusion Matrix of AS-L (SNR = 100dB, with NAL-R)

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 27 | 0 | 0 | 0 | 0 | 0 | 0 | 1 | 0 | 0 | 0 | 0 | 0 | 0 | 2 | 0 | 0 |
| ta | 2 | 27 | 1 | 0 | 0 | 0 | 0 | 0 | 0 | 0 | 0 | 0 | 0 | 0 | 0 | 0 | 0 |
| ka | 9 | 19 | 2 | 0 | 0 | 0 | 0 | 0 | 0 | 0 | 0 | 0 | 0 | 0 | 0 | 0 | 0 |
| ka+0 | 9 | 8 | 7 | 0 | 0 | 0 | 0 | 1 | 0 | 0 | 1 | 0 | 2 | 0 | 2 | 0 | 0 |
| ka+10 | 18 | 7 | 0 | 0 | 0 | 1 | 0 | 0 | 0 | 2 | 0 | 0 | 2 | 0 | 0 | 0 | 0 |
| ka+50 | 21 | 4 | 0 | 0 | 0 | 0 | 0 | 0 | 0 | 0 | 0 | 0 | 5 | 0 | 0 | 0 | 0 |
| ba | 0 | 0 | 0 | 0 | 0 | 0 | 0 | 15 | 4 | 4 | 5 | 0 | 0 | 1 | 0 | 1 | 0 |
| da | 0 | 0 | 0 | 0 | 0 | 0 | 0 | 6 | 23 | 0 | 0 | 0 | 0 | 1 | 0 | 0 | 0 |
| ga | 0 | 2 | 0 | 0 | 0 | 0 | 0 | 1 | 12 | 9 | 2 | 1 | 0 | 3 | 0 | 0 | 0 |
| ga+0 | 0 | 0 | 0 | 1 | 0 | 0 | 0 | 1 | 5 | 5 | 7 | 0 | 1 | 7 | 1 | 2 | 0 |
| ga+10 | 1 | 11 | 0 | 0 | 0 | 0 | 0 | 0 | 7 | 10 | 0 | 0 | 1 | 0 | 0 | 0 | 0 |
| ga+50 | 9 | 12 | 1 | 0 | 0 | 0 | 0 | 0 | 6 | 2 | 0 | 0 | 0 | 0 | 0 | 0 | 0 |

FIG. 39

Table 5: Confusion Matrix of AS-L (SNR = 12dB, with NAL-R)

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 8 | 5 | 0 | 3 | 1 | 0 | 0 | 0 | 3 | 0 | 1 | 1 | 5 | 3 | 0 | 0 | 0 |
| ta | 0 | 29 | 0 | 0 | 0 | 1 | 0 | 0 | 0 | 0 | 0 | 0 | 0 | 0 | 0 | 0 | 0 |
| ka | 1 | 23 | 6 | 0 | 0 | 0 | 0 | 0 | 0 | 0 | 0 | 0 | 0 | 0 | 0 | 0 | 0 |
| ka+2 | 3 | 21 | 6 | 0 | 0 | 0 | 0 | 0 | 0 | 0 | 0 | 0 | 0 | 0 | 0 | 0 | 0 |
| ka+4 | 4 | 25 | 1 | 0 | 0 | 0 | 0 | 0 | 0 | 0 | 0 | 0 | 0 | 0 | 0 | 0 | 0 |
| ka+6 | 5 | 24 | 1 | 0 | 0 | 0 | 0 | 0 | 0 | 0 | 0 | 0 | 0 | 0 | 0 | 0 | 0 |
| ba | 0 | 0 | 0 | 1 | 0 | 0 | 0 | 11 | 12 | 2 | 1 | 0 | 1 | 2 | 0 | 0 | 0 |
| da | 0 | 0 | 0 | 0 | 0 | 0 | 0 | 0 | 30 | 0 | 0 | 0 | 0 | 0 | 0 | 0 | 0 |
| ga | 0 | 2 | 0 | 0 | 0 | 0 | 0 | 0 | 18 | 8 | 0 | 0 | 0 | 2 | 0 | 0 | 0 |
| ga+2 | 0 | 6 | 0 | 0 | 0 | 0 | 0 | 0 | 17 | 6 | 0 | 0 | 0 | 1 | 0 | 0 | 0 |
| ga+4 | 0 | 7 | 0 | 0 | 0 | 0 | 0 | 0 | 16 | 6 | 0 | 0 | 0 | 1 | 0 | 0 | 0 |
| ga+6 | 0 | 8 | 0 | 0 | 0 | 0 | 0 | 0 | 16 | 6 | 0 | 0 | 0 | 0 | 0 | 0 | 0 |

Table 6: Confusion Matrix of AS-L (SNR = 100dB, with NAL-R)

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 30 | 0 | 0 | 0 | 0 | 0 | 0 | 0 | 0 | 0 | 0 | 0 | 0 | 0 | 0 | 0 | 0 |
| ta | 0 | 30 | 0 | 0 | 0 | 0 | 0 | 0 | 0 | 0 | 0 | 0 | 0 | 0 | 0 | 0 | 0 |
| ka | 7 | 21 | 2 | 0 | 0 | 0 | 0 | 0 | 0 | 0 | 0 | 0 | 0 | 0 | 0 | 0 | 0 |
| ka+2 | 12 | 12 | 6 | 0 | 0 | 0 | 0 | 0 | 0 | 0 | 0 | 0 | 0 | 0 | 0 | 0 | 0 |
| ka+4 | 14 | 14 | 2 | 0 | 0 | 0 | 0 | 0 | 0 | 0 | 0 | 0 | 0 | 0 | 0 | 0 | 0 |
| ka+6 | 19 | 7 | 4 | 0 | 0 | 0 | 0 | 0 | 0 | 0 | 0 | 0 | 0 | 0 | 0 | 0 | 0 |
| ba | 0 | 0 | 0 | 1 | 0 | 0 | 0 | 18 | 6 | 0 | 3 | 0 | 0 | 1 | 1 | 0 | 0 |
| da | 0 | 0 | 0 | 0 | 0 | 0 | 0 | 3 | 24 | 2 | 1 | 0 | 0 | 0 | 0 | 0 | 0 |
| ga | 0 | 3 | 0 | 0 | 0 | 0 | 0 | 1 | 12 | 11 | 1 | 0 | 0 | 2 | 0 | 0 | 0 |
| ga+2 | 0 | 1 | 0 | 0 | 0 | 0 | 0 | 0 | 14 | 14 | 0 | 0 | 0 | 1 | 0 | 0 | 0 |
| ga+4 | 0 | 4 | 0 | 0 | 0 | 0 | 0 | 1 | 11 | 12 | 1 | 0 | 0 | 1 | 0 | 0 | 0 |
| ga+6 | 0 | 5 | 1 | 0 | 0 | 0 | 0 | 0 | 8 | 16 | 0 | 0 | 0 | 0 | 0 | 0 | 0 |

FIG. 40

Table 7: Confusion Matrix of AS-L at 12dB with NAL-R

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 7 | 6 | 0 | 0 | 1 | 0 | 0 | 2 | 7 | 0 | 0 | 0 | 5 | 2 | 0 | 0 | 0 |
| ta | 0 | 28 | 0 | 0 | 0 | 0 | 0 | 0 | 0 | 0 | 0 | 0 | 2 | 0 | 0 | 0 | 0 |
| ka | 2 | 27 | 1 | 0 | 0 | 0 | 0 | 0 | 0 | 0 | 0 | 0 | 0 | 0 | 0 | 0 | 0 |
| ka-t | 1 | 21 | 4 | 0 | 0 | 0 | 0 | 0 | 1 | 1 | 0 | 0 | 1 | 1 | 0 | 0 | 0 |
| ba | 0 | 2 | 0 | 0 | 0 | 0 | 0 | 5 | 21 | 1 | 0 | 0 | 0 | 0 | 1 | 0 | 0 |
| da | 0 | 3 | 0 | 0 | 0 | 0 | 0 | 1 | 25 | 0 | 0 | 0 | 1 | 0 | 0 | 0 | 0 |
| ga | 0 | 5 | 0 | 0 | 0 | 0 | 0 | 0 | 21 | 4 | 0 | 0 | 0 | 0 | 0 | 0 | 0 |
| ga-d | 0 | 9 | 0 | 0 | 0 | 0 | 0 | 1 | 12 | 7 | 0 | 0 | 0 | 1 | 0 | 0 | 0 |

Table 8: Confusion Matrix of AS-L at 100dB with NAL-R

| | pa | ta | ka | fa | θa | sa | ʃa | ba | da | ga | va | ða | za | ʒa | ma | na | ? |
|---|---|---|---|---|---|---|---|---|---|---|---|---|---|---|---|---|---|
| pa | 26 | 3 | 0 | 0 | 0 | 0 | 0 | 0 | 1 | 0 | 0 | 0 | 0 | 0 | 0 | 0 | 0 |
| ta | 0 | 30 | 0 | 0 | 0 | 0 | 0 | 0 | 0 | 0 | 0 | 0 | 0 | 0 | 0 | 0 | 0 |
| ka | 4 | 23 | 3 | 0 | 0 | 0 | 0 | 0 | 0 | 0 | 0 | 0 | 0 | 0 | 0 | 0 | 0 |
| ka-t | 6 | 17 | 1 | 0 | 0 | 0 | 0 | 2 | 1 | 0 | 2 | 0 | 0 | 0 | 0 | 0 | 1 |
| ba | 0 | 3 | 0 | 0 | 0 | 0 | 0 | 17 | 4 | 1 | 2 | 0 | 1 | 0 | 2 | 0 | 0 |
| da | 0 | 5 | 0 | 0 | 0 | 0 | 0 | 3 | 19 | 0 | 0 | 0 | 1 | 1 | 1 | 0 | 0 |
| ga | 0 | 6 | 0 | 0 | 0 | 1 | 0 | 2 | 9 | 7 | 0 | 0 | 1 | 4 | 0 | 0 | 0 |
| ga-d | 0 | 5 | 1 | 0 | 0 | 0 | 0 | 4 | 7 | 9 | 2 | 0 | 2 | 0 | 0 | 0 | 0 |

FIG. 41A

Table 9: CM of AS-L at 12dB SNR

| | pa | ta | ka | ba | da | ga |
|---|---|---|---|---|---|---|
| pa | 6 | 8 | | | | |
| ta | | 26 | | | | |
| ka | 5 | 23 | 1 | | 1 | |
| ka-t+1 | 1 | 20 | 2 | | 1 | 1 |
| ka-t+2 | 3 | 17 | 6 | | 1 | 3 |
| ka-t+4 | 6 | 19 | 4 | | | |
| ba | | | | 7 | 14 | |
| da | | | | | 26 | 2 |
| ga | | 5 | | | 10 | 13 |
| ga-d+1 | | | | 1 | 8 | 18 |
| ga-d+2 | | 3 | | | 14 | 10 |
| ga-d+4 | | 7 | | | 16 | 7 |

Table 10: CM of AS-R at 12dB SNR

| | pa | ta | ka | ba | da | ga |
|---|---|---|---|---|---|---|
| pa | 14 | 2 | | | 1 | |
| ta | | 29 | 1 | | | |
| ka | | 21 | 6 | | 1 | |
| ka-t+1 | 1 | 10 | 12 | | 5 | |
| ka-t+2 | | 16 | 11 | 1 | 1 | 1 |
| ka-t+4 | 3 | 19 | 8 | | | |
| ba | 1 | | | 13 | 8 | |
| da | | | | | 30 | |
| ga | | 1 | | | 28 | 1 |
| ga-d+1 | | | | | 27 | 1 |
| ga-d+2 | | | | | 23 | 7 |
| ga-d+4 | | 2 | | | 25 | 3 |

FIG. 41B

Table 11: CM of AS-L at 100dB SNR

| | pa | ta | ka | ba | da | ga |
|---|---|---|---|---|---|---|
| pa | 29 | | | 1 | | |
| ta | | 30 | | | | |
| ka | 8 | 20 | 2 | | | |
| ka-t+1 | 16 | 8 | 1 | | 1 | |
| ka-t+2 | 16 | 11 | 3 | | | |
| ka-t+4 | 18 | 6 | 5 | 1 | | |
| ba | | | | 19 | 1 | 2 |
| da | | | | 6 | 21 | 2 |
| ga | | 3 | | | 7 | 16 |
| ga-d+1 | | 4 | | 2 | 4 | 14 |
| ga-d+2 | | 4 | | | 6 | 16 |
| ga-d+4 | 1 | 5 | | | 4 | 20 |

Table 12: CM of AS-R at 100dB SNR

| | pa | ta | ka | ba | da | ga |
|---|---|---|---|---|---|---|
| pa | 30 | | | | | |
| ta | | 30 | | | | |
| ka | 3 | 7 | 17 | | 1 | 1 |
| ka-t+1 | 1 | 4 | 19 | 1 | 3 | |
| ka-t+2 | | 10 | 18 | | | 2 |
| ka-t+4 | | 5 | 25 | | | |
| ba | | | | 19 | 3 | 1 |
| da | | | | | 30 | |
| ga | | 1 | | | 26 | 3 |
| ga-d+1 | | 1 | | | 21 | 8 |
| ga-d+2 | | 2 | | | 19 | 9 |
| ga-d+4 | | 3 | 1 | | 21 | 5 |

Pc of /ka/s and /ga/s from 18 talkers for AS-L at 100dB SNR (a) ka (b) ga

Pc of /ka/s and /ga/s from 18 talkers for AS-L at 12dB SNR (a) ka (b) ga

Pc of /ka/s and /ga/s from 18 talkers for AS-R at 100dB SNR (a) ka (b) ga

Pc of /ka/s and /ga/s from 18 talkers for AS-R at 12dB SNR (a) ka (b) ga

Pc of /fa/s and /va/s from 18 talkers for DC-L at 100dB SNR (a) ka (b) ga

Pc of /fa/s and /va/s from 18 talkers for DC-R at 100dB SNR (a) ka (b) ga

SYSTEMS AND METHODS FOR IDENTIFYING SPEECH SOUND FEATURES

CROSS-REFERENCES TO RELATED APPLICATIONS

This application claims priority to U.S. Provisional Application No. 61/078,268, filed Jul. 3, 2008, U.S. Provisional Application No. 61/083,635, filed Jul. 25, 2008, and U.S. Provisional Application No. 61/151,621, filed Feb. 11, 2009, the disclosure of each of which is incorporated by reference in its entirety for all purposes.

BACKGROUND OF THE INVENTION

The present invention is directed to identification of perceptual features. More particularly, the invention provides a system and method, for such identification, using one or more events related to coincidence between various frequency channels. Merely by way of example, the invention has been applied to phone detection. But it would be recognized that the invention has a much broader range of applicability.

After many years of work, a basic understanding of speech robustness to masking noise often remains a mystery. Specifically, it is usually unclear how to correlate the confusion patterns with the audible speech information in order to explain normal hearing listeners confusions and identify the spectro-temporal nature of the perceptual features. For example, the confusion patterns are speech sounds (such as Consonant-Vowel, CV) confusions vs. signal-to-noise ratio (SNR). Certain conventional technology can characterize invariant cues by reducing the amount of information available to the ear by synthesizing simplified CVs based only on a short noise burst followed by artificial formant transitions. However, often, no information can be provided about the robustness of the speech samples to masking noise, nor the importance of the synthesized features relative to other cues present in natural speech. But a reliable theory of speech perception is important in order to identify perceptual features. Such identification can be used for developing new hearing aids and cochlear implants and new techniques of speech recognition.

Hence it is highly desirable to improve techniques for identifying perceptual features.

BRIEF SUMMARY OF THE INVENTION

The present invention is directed to identification of perceptual features. More particularly, the invention provides a system and method, for such identification, using one or more events related to coincidence between various frequency channels. Merely by way of example, the invention has been applied to phone detection. But it would be recognized that the invention has a much broader range of applicability.

According to an embodiment of the present invention, a method for enhancing a speech sound may include identifying one or more features in the speech sound that encode the speech sound, and modifying the contribution of the features to the speech sound. In an embodiment, the method may include increasing the contribution of a first feature to the speech sound and decreasing the contribution of a second feature to the speech sound. The method also may include generating a time and/or frequency importance function for the speech sound, and using the importance function to identify the location of the features in the speech sound. In an embodiment, a speech sound may be identified by isolating a section of a reference speech sound corresponding to the speech sound to be enhanced within at least one of a certain time range and a certain frequency range, based on the degree of recognition among a plurality of listeners to the isolated section, constructing an importance function describing the contribution of the isolated section to the recognition of the speech sound; and using the importance function to identify the first feature as encoding the speech sound.

According to an embodiment of the present invention, a system for enhancing a speech sound may include a feature detector configured to identify a first feature that encodes a speech sound in a speech signal, a speech enhancer configured to enhance said speech signal by modifying the contribution of the first feature to the speech sound, and an output to provide the enhanced speech signal to a listener. The system may modify the contribution of the speech sound by increasing or decreasing the contribution of one or more features to the speech sound. In an embodiment, the system may increase the contribution of a first feature to the speech sound and decrease the contribution of a second feature to the speech sound. The system may use the hearing profile of a listener to identify a feature and/or to enhance the speech signal. The system may be implemented in, for example, a hearing aid, cochlear implant, automatic speech recognition device, and other portable or non-portable electronic devices.

According to an embodiment of the invention, a method for modifying a speech sound may include isolating a section of a speech sound within a certain frequency range, measuring the recognition of a plurality of listeners of the isolated section of the speech sound, based on the degree of recognition among the plurality of listeners, constructing an importance function that describes the contribution of the isolated section to the recognition of the speech sound, and using the importance function to identify a first feature that encodes the speech sound The importance function may be a time and/or frequency importance function. The method also may include the steps of modifying the speech sound to increase and/or decrease the contribution of one or more features to the speech sound.

According to an embodiment of the invention, a system for phone detection may include a microphone configured to receive a speech signal generated in an acoustic domain, a feature detector configured to receive the speech signal and generate a feature signal indicating a location in the speech sound at which a speech sound feature occurs, and a phone detector configured to receive the feature signal and, based on the feature signal, identify a speech sound included in the speech signal in the acoustic domain. The system also may include a speech enhancer configured to receive the feature signal and, based on the location of the speech sound feature, modify the contribution of the speech sound feature to the speech signal received by said feature detector. The speech enhancer may modify the contribution of one or more speech sound features by increasing or decreasing the contribution of each feature to the speech sound. The system may be implemented in, for example, a hearing aid, cochlear implant, automatic speech recognition device, and other portable or non-portable electronic devices.

Depending upon the embodiment, one or more of benefits may be achieved. These benefits will be described in more detail throughout the present specification and more particularly below. Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification; illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 22A shows an AI-gram of an example speech sound according to an embodiment of the present invention;

FIGS. 22B-22D show various recognition scores of an example speech sound according to an embodiment of the present invention;

FIGS. 37A-37D show confusion matrices for an example listener for un-enhanced and enhanced speech sounds according to an embodiment of the present invention;

FIGS. 38A-38B show experimental results after boosting /ka/s and /ga/s according to an embodiment of the present invention;

FIG. 39 shows experimental results after boosting /ka/s and /ga/s according to an embodiment of the present invention;

FIG. 40 shows experimental results after removing high-frequency regions associated with morphing of /ta/ and /da/ according to an embodiment of the present invention;

FIGS. 41A-41B show experimental results after removing /ta/ or /da/ cues and boosting /ka/ and /ga/ features according to an embodiment of the present invention;

IG. 69 shows an example analysis of /ka/ according to an embodiment of the invention.

Figure 70:
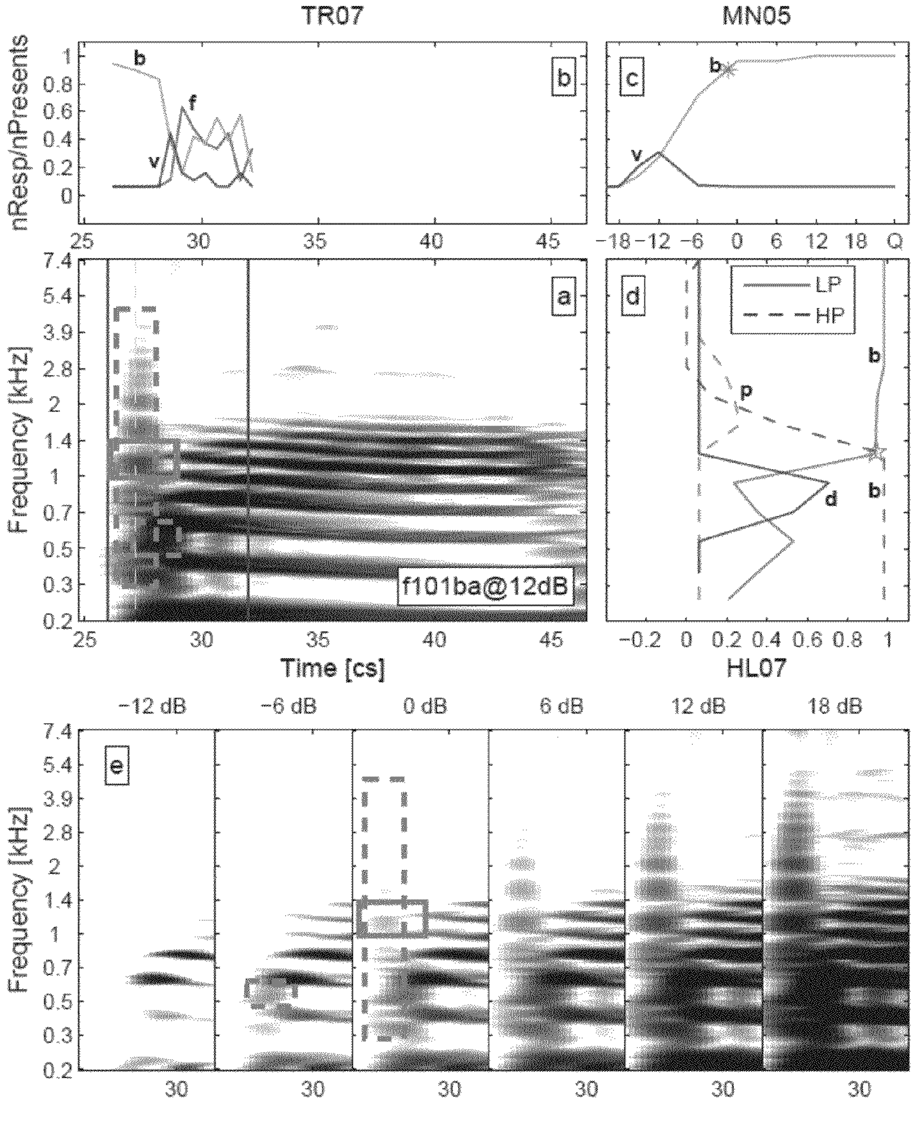

FIG. 70 shows an example analysis of /ba/ according to an embodiment of the invention.

Figure 71:
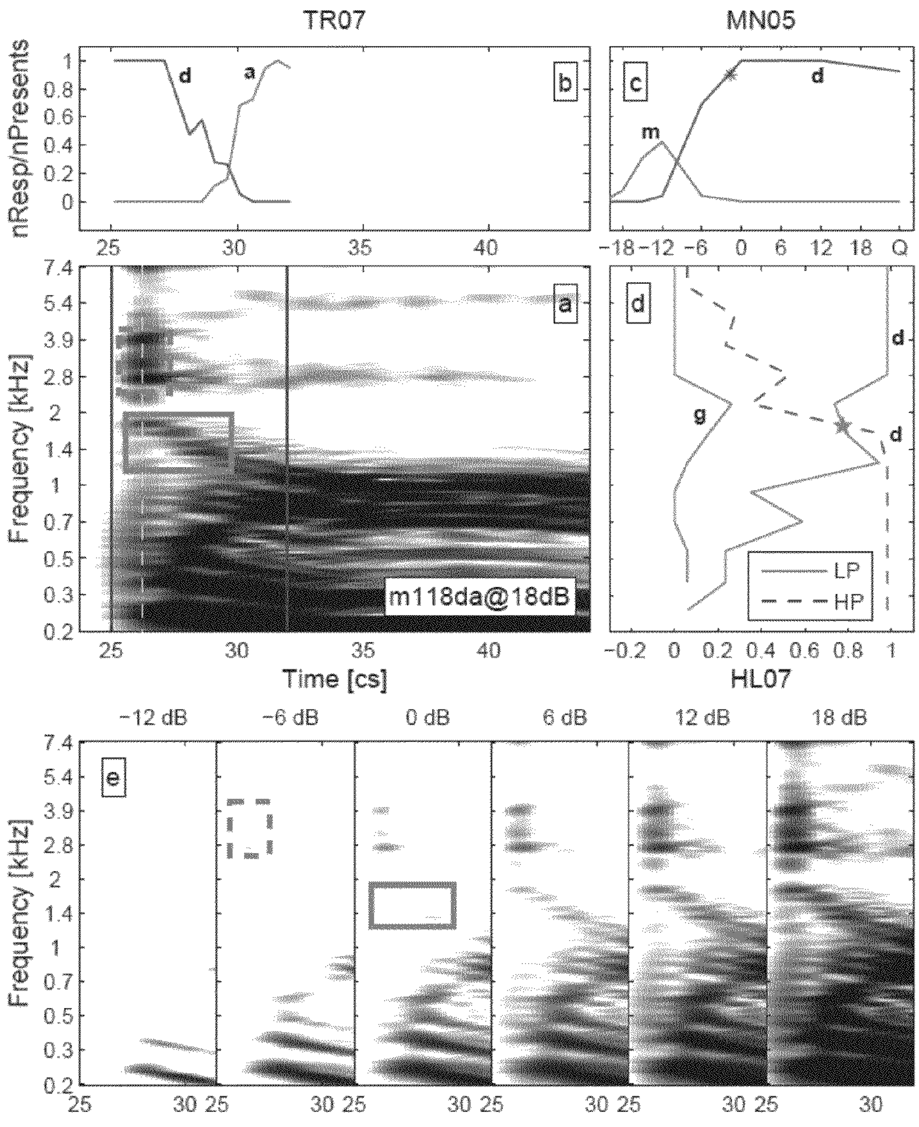

FIG. 71 shows an example analysis of /da/ according to an embodiment of the invention.

Figure 72:
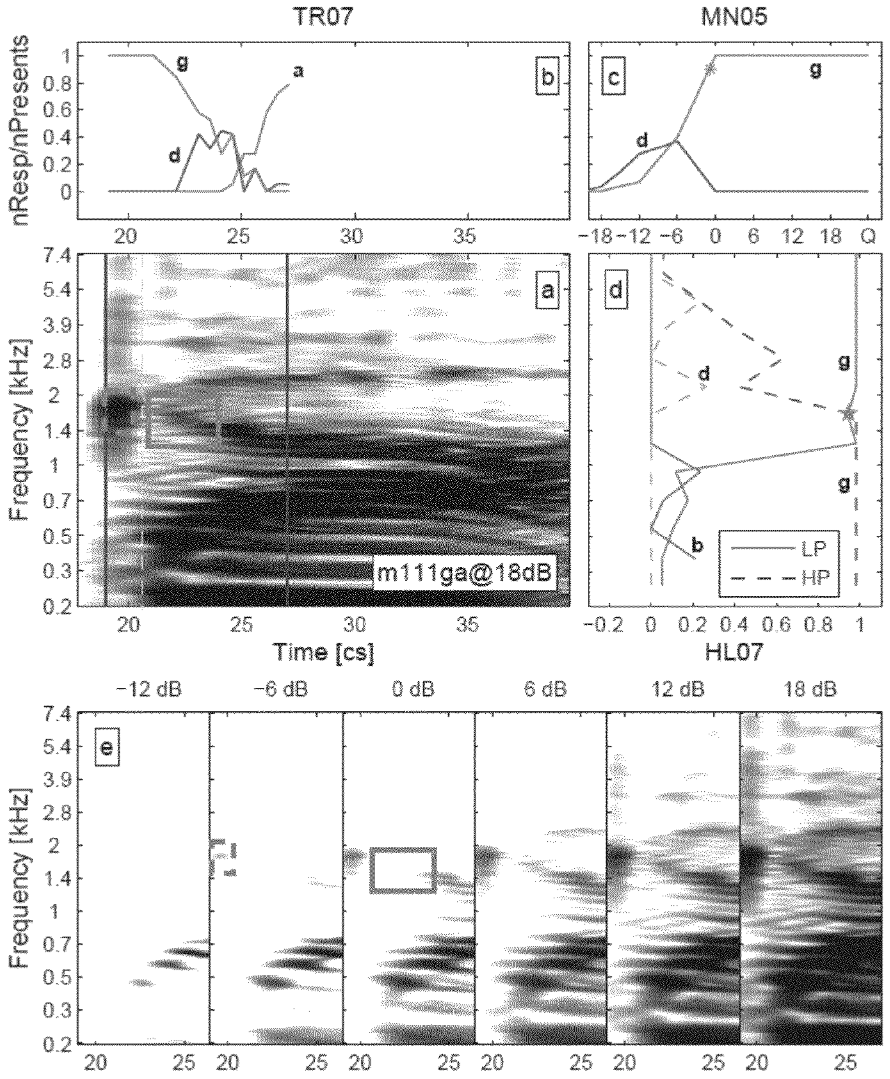

FIG. 72 shows an example analysis of /ga/ according to an embodiment of the invention.

Figure 73:
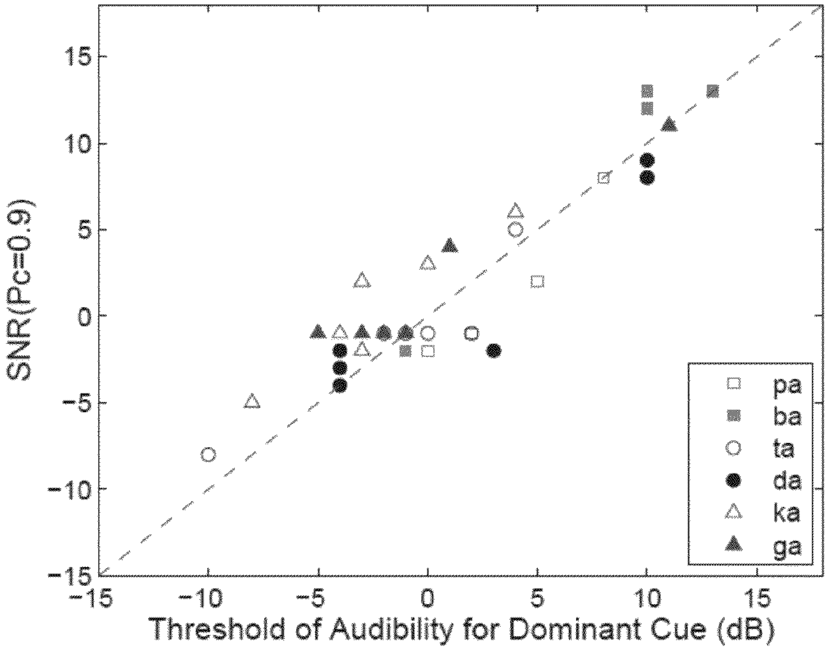

FIG. 73 depicts a scatter-plot of signal-to-noise values versus the threshold of audibility for the dominant cue according to embodiments of the invention.

Figure 74:
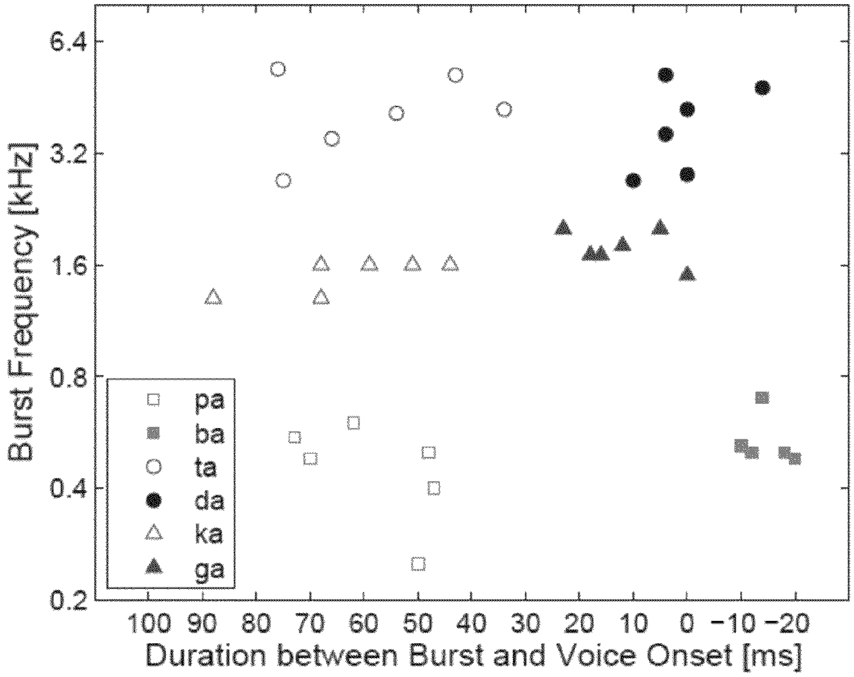

FIG. 74 shows a scatter plot of burst frequency versus the time between the burst and the associated voice onset for a set of sounds as analyzed by embodiments of the invention.

Figure 75:
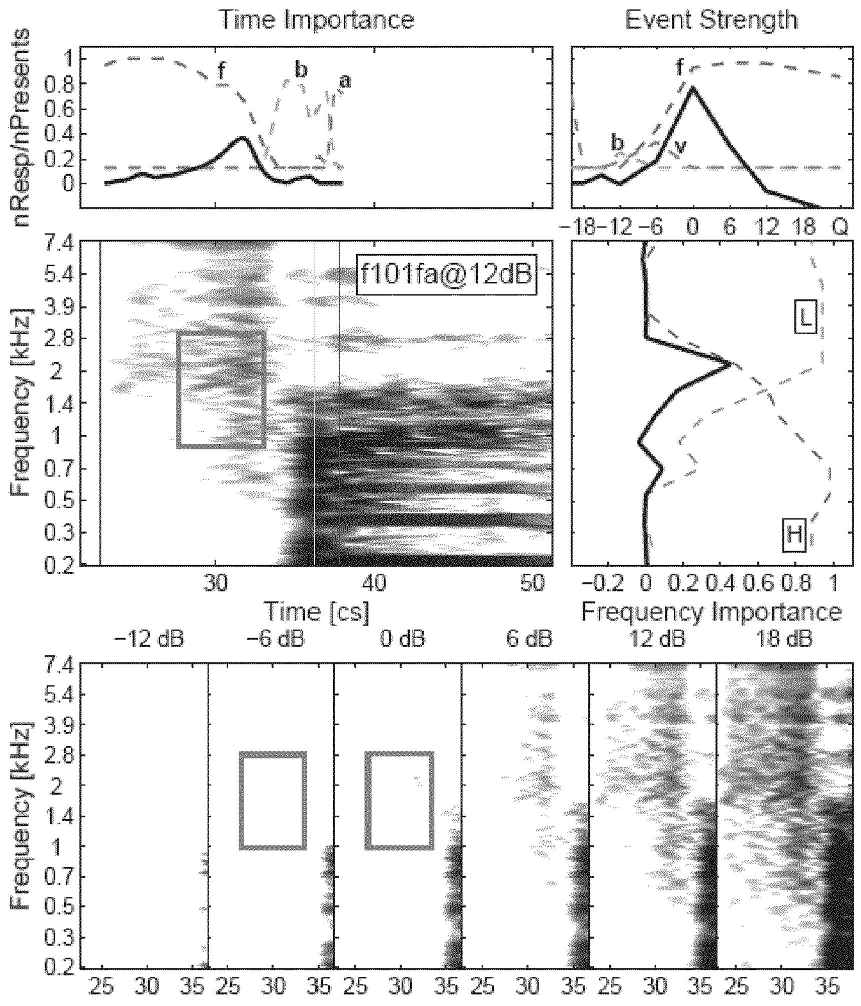

FIG. 75 shows an example analysis of /fa/ according to an embodiment of the invention.

Figure 76:
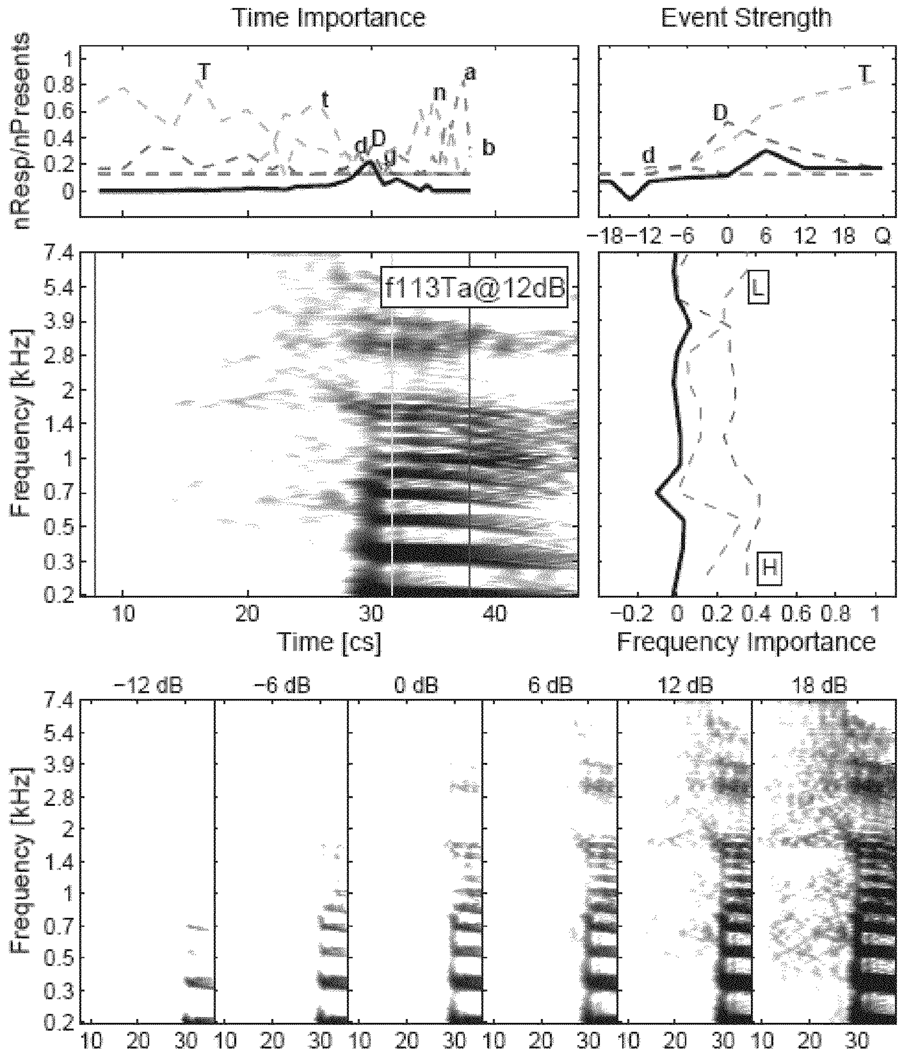

FIG. 76 shows an example analysis of /θa/ according to an embodiment of the invention.

Figure 77:
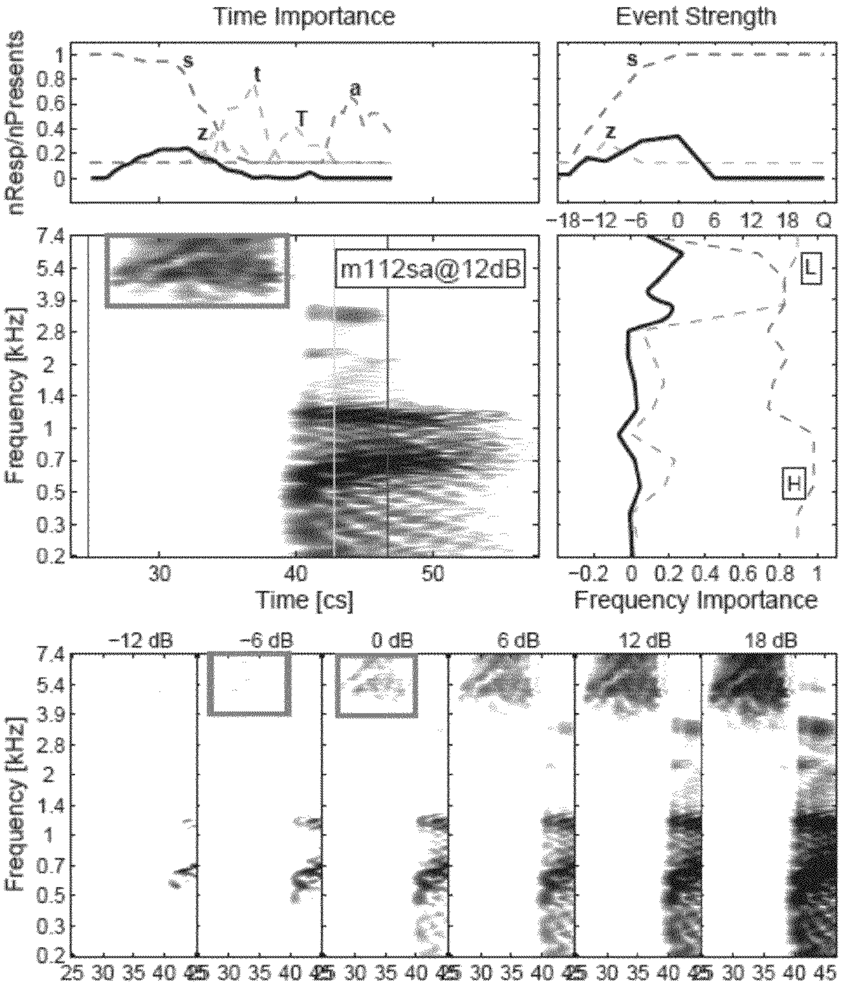

FIG. 77 shows an example analysis of /s a/ according to an embodiment of the invention.

Figure 78:
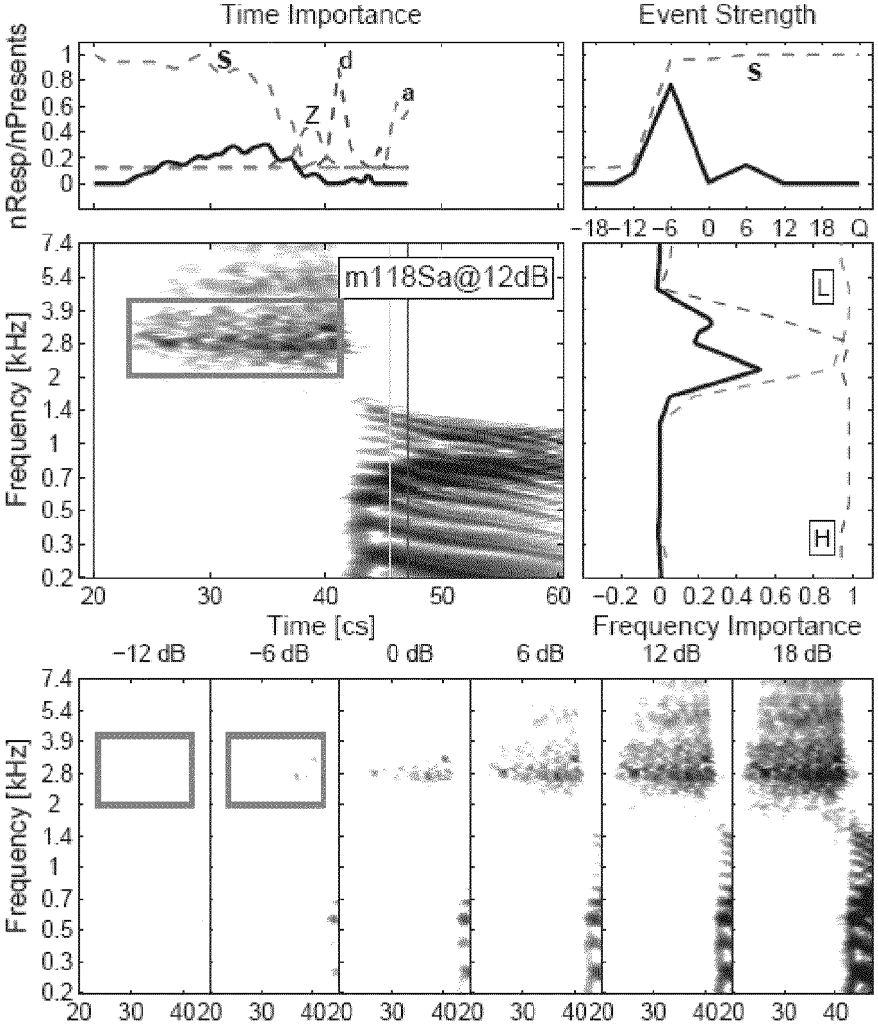

FIG. 78 shows an example analysis of /ʃa/ according to an embodiment of the invention.

Figure 79:
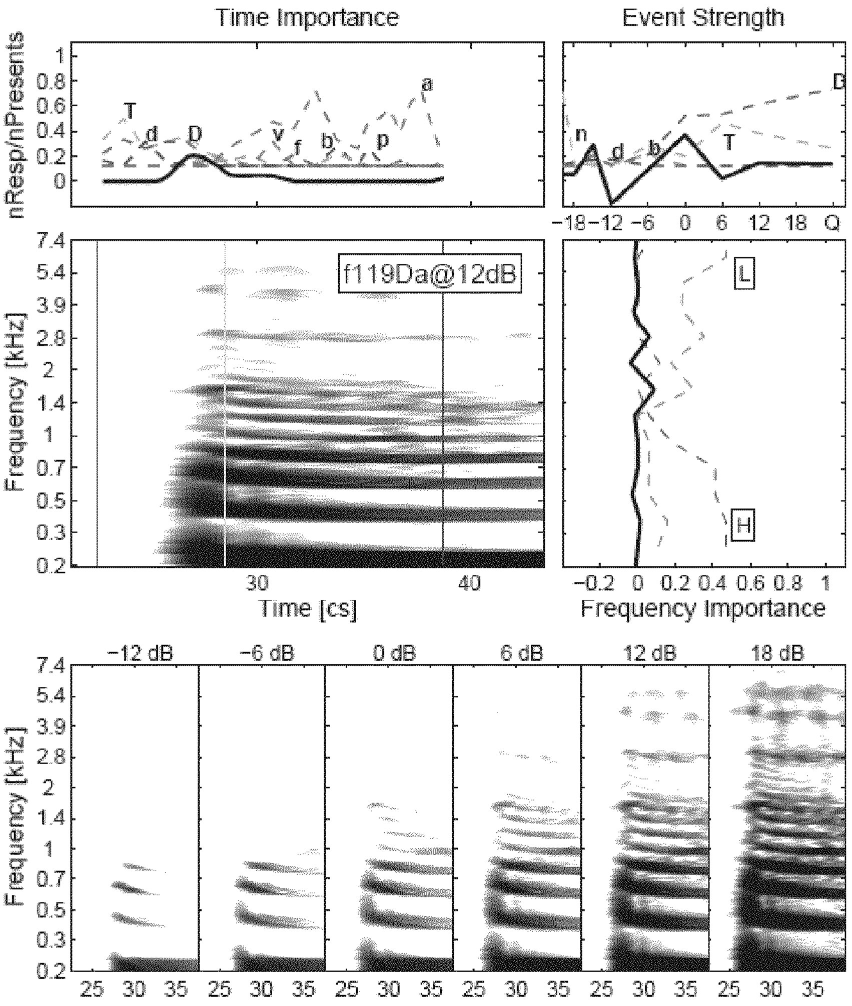

FIG. 79 shows an example analysis of /δa/ according to an embodiment of the invention.

Figure 80:
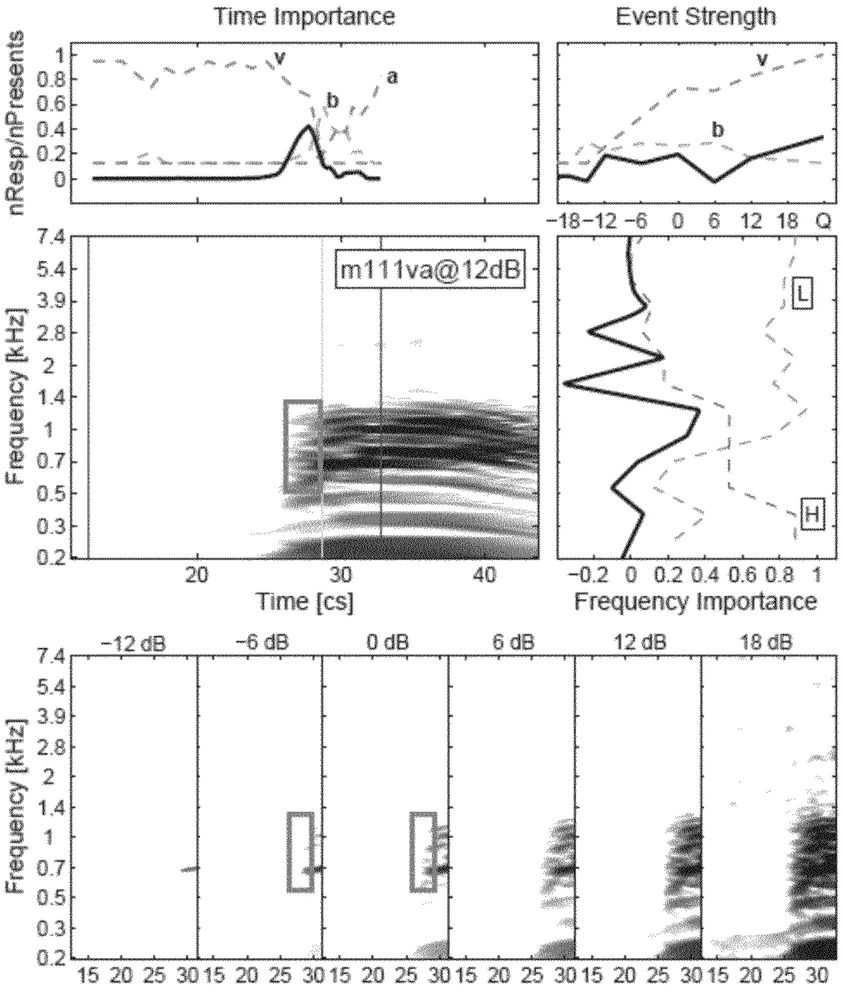

FIG. 80 shows an example analysis of /va/ according to an embodiment of the invention.

Figure 81:
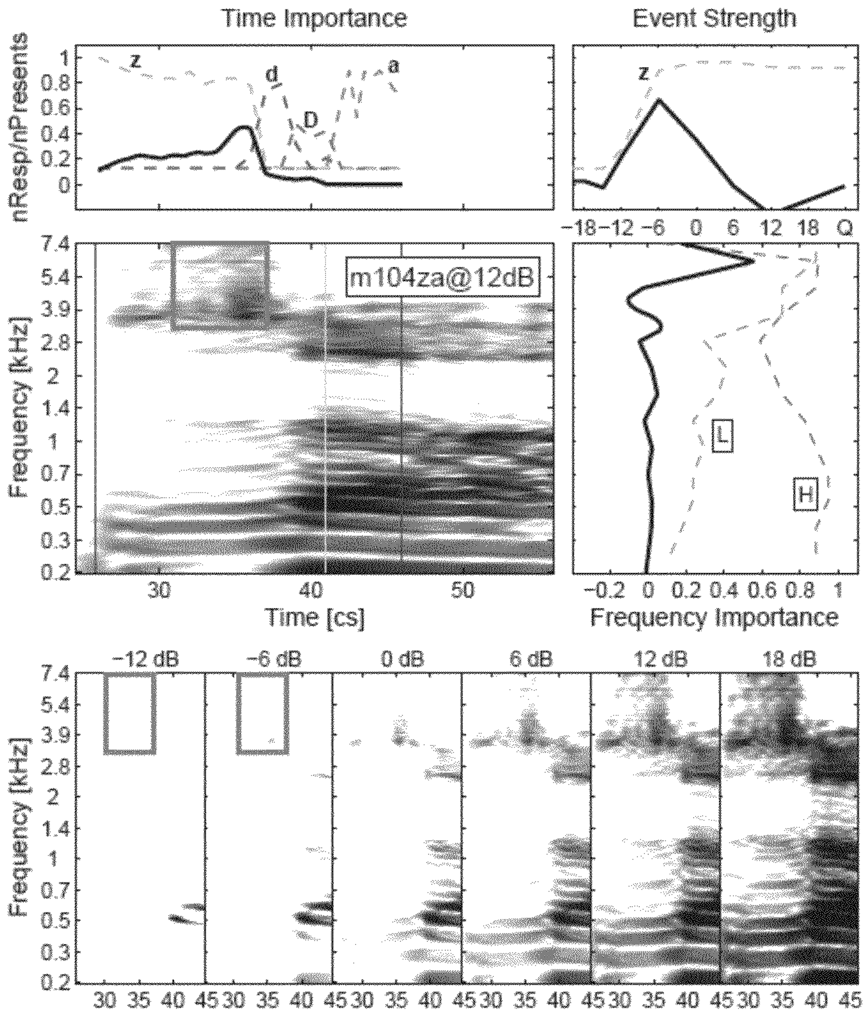

FIG. 81 shows an example analysis of /za/ according to an embodiment of the invention.

Figure 82:
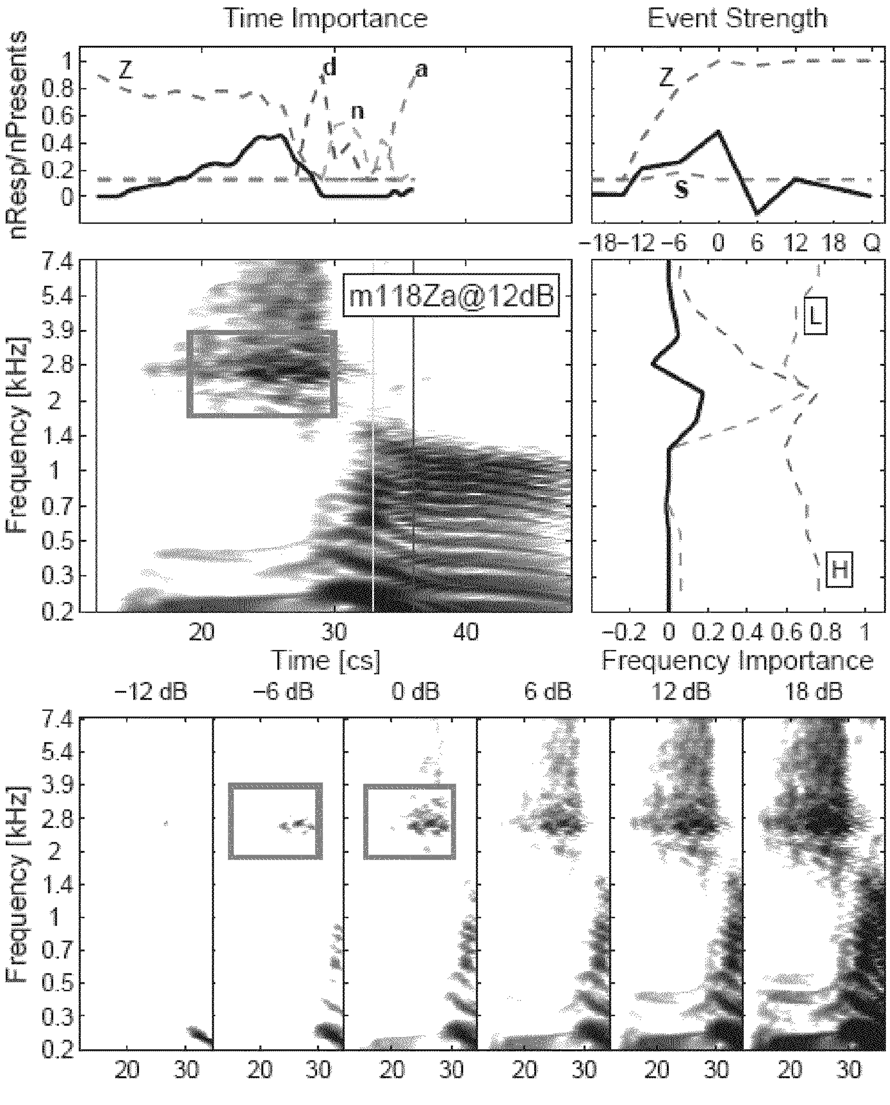

FIG. 82 shows an example analysis of /ζa/ according to an embodiment of the invention.

Figure 83:
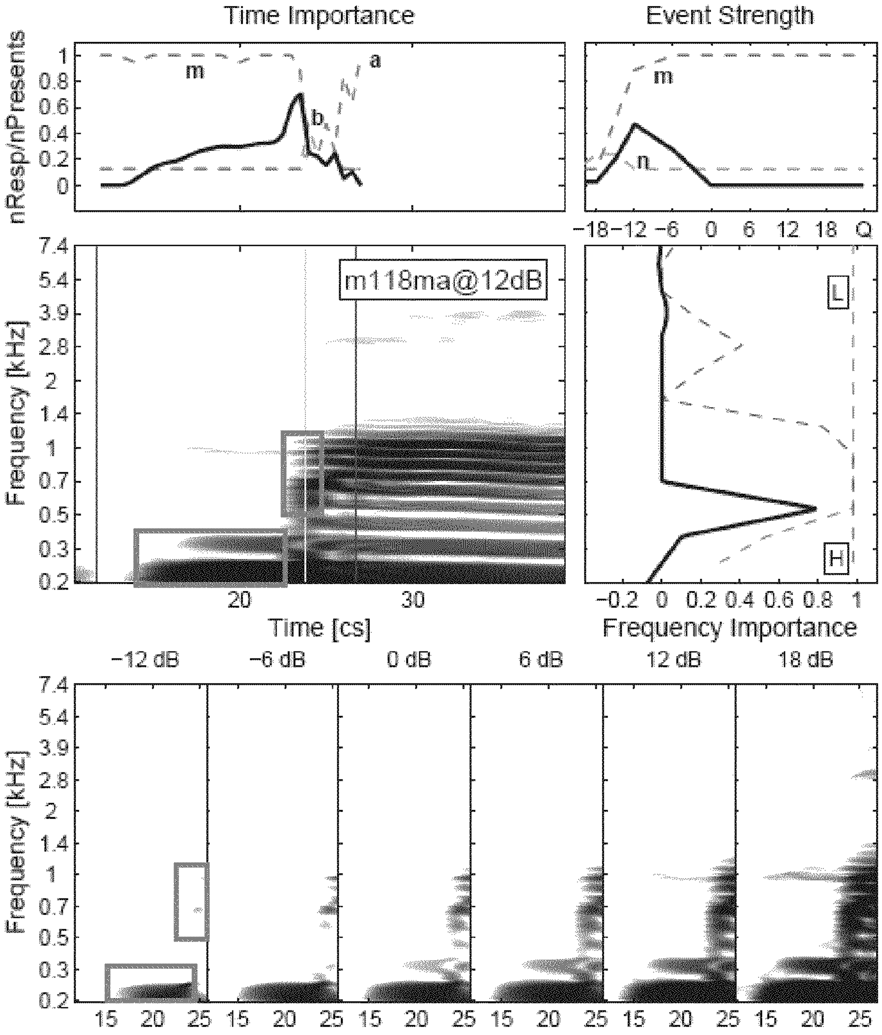

FIG. 83 shows an example analysis of /ma/ according to an embodiment of the invention.

Figure 84:
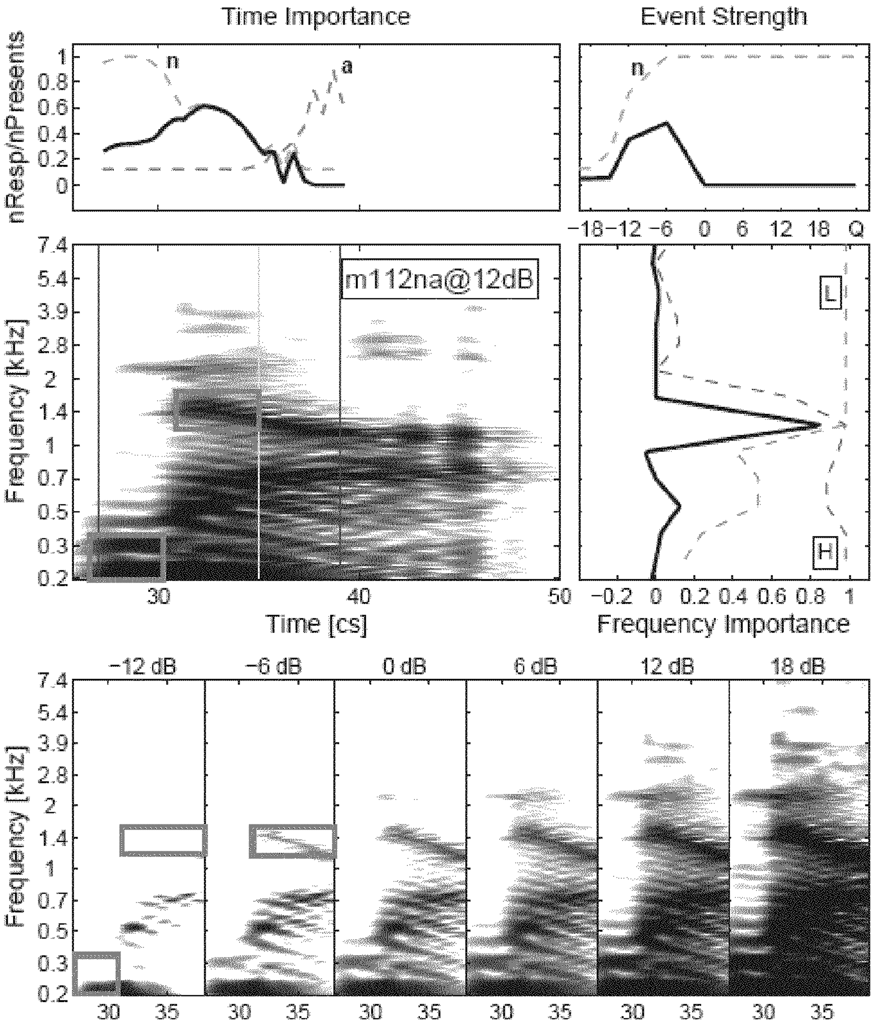

FIG. 84 shows an example analysis of /na/ according to an embodiment of the invention.

Figure 85:
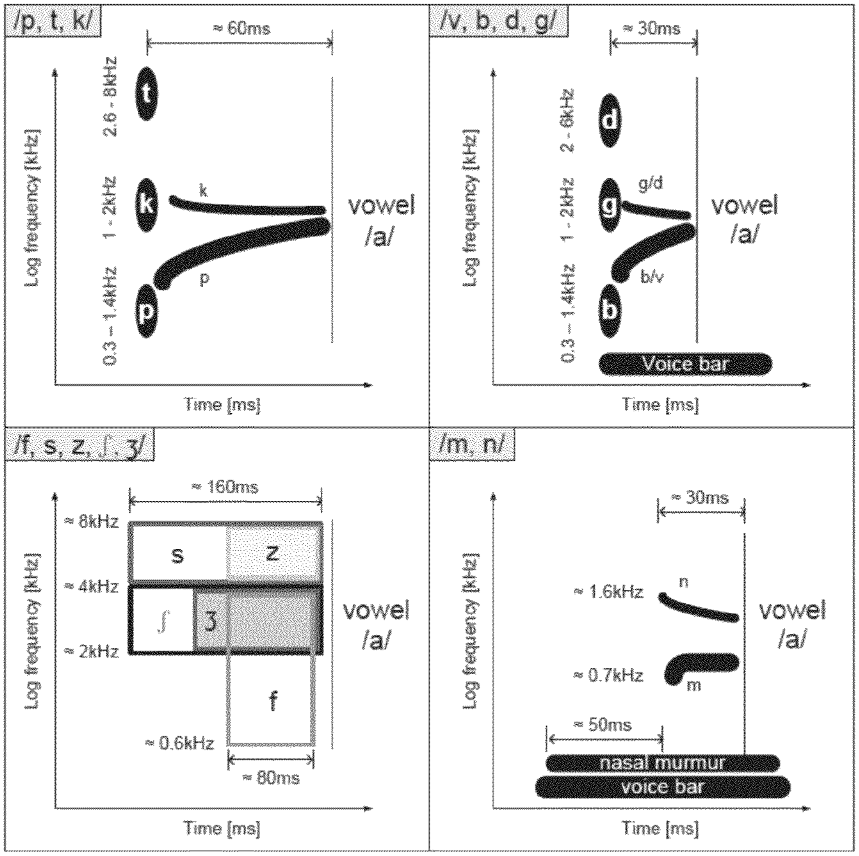

FIG. 85 shows a summary of events relating to initial consonants preceding /a/ as identified by analysis procedures according to embodiments of the invention.

DETAILED DESCRIPTION OF THE INVENTION

It is understood that the invention is not limited to the particular methodology, protocols, topologies, etc., as described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Any numerical values recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32 etc., are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Particular methods, devices, and materials are described, although any methods and materials similar or equivalent to those described herein can be used in the practice or testing of the invention. All references referred to herein are incorporated by reference herein in their entirety.

The present invention is directed to identification of perceptual features. More particularly, the invention provides a system and method, for such identification, using one or more events related to coincidence between various frequency channels. Merely by way of example, the invention has been applied to phone detection. But it would be recognized that the invention has a much broader range of applicability.

1. Introduction

To understand speech robustness to masking noise, our approach includes collecting listeners' responses to syllables in noise and correlating their confusions with the utterances acoustic cues according to certain embodiments of the present invention. For example, by identifying the spectro-temporal features used by listeners to discriminate consonants in noise, we can prove the existence of these perceptual cues, or events. In other examples, modifying events and/or features in speech sounds using signal processing techniques can lead to a new family of hearing aids, cochlear implants, and robust automatic speech recognition. The design of an automatic speech recognition (ASR) device based on human speech recognition would be a tremendous breakthrough to make speech recognizers robust to noise.

Our approach, according to certain embodiments of the present invention, aims at correlating the acoustic information, present in the noisy speech, to human listeners responses to the sounds. For example, human communication can be interpreted as an "information channel, " where we are studying the receiver side, and trying to identify the ear's most robust to noise speech cues in noisy environments.

One might wonder why we study phonology (consonant-vowel sounds, noted CV) rather than language (context) according to certain embodiments of the present invention. While context effects are important when decoding natural language, human listeners are able to discriminate nonsense speech sounds in noise at SNRs below −16 dB SNR. This evidence is clear from an analysis of the confusion matrices (CM) of CV sounds. Such noise robustness appears to have been a major area of misunderstanding and heated debate.

For example, despite the importance of confusion matrices analysis in terms of production features such as voicing, place, or manner, little is known about the spectro-temporal information present in each waveform correlated to specific confusions. To gain access to the missing utterance waveforms for subsequent analysis and further explore the unknown effects of the noise spectrum, we have performed extensive analysis by correlating the audible speech information with the scores from two listening experiments denoted MN05 and UIUCs04.

According to certain embodiments, our goal is to find the common robust-to-noise features in the spectro-temporal domain. Certain previous studies pioneered the analysis of spectro-temporal cues discriminating consonants. Their goal was to study the acoustic properties of consonants /p/, /t/ and /k/ in different vowel contexts. One of their main results is the empirical establishment of a physical to perceptual map, derived from the presentation of synthetic CVs to human listeners. Their stimuli were based on a short noise burst (10 ms, 400 Hz bandwidth), representing the consonant, followed by artificial formant transitions composed of tones, simulating the vowel. They discovered that for each of these voiceless stops, the spectral position of the noise burst was vowel dependent. For example, this coarticulation was mostly visible for /p/ and /k/, with bursts above 3 kHz giving the percept of /t/ for all vowels contexts. A burst located at the second formant frequency or slightly above would create a percept of /k/, and below /p/. Consonant /t/ could therefore be considered less sensitive to coarticulation. But no information was provided about the robustness of their synthetic speech samples to masking noise, nor the importance of the presumed features relative to other cues present in natural speech. It has been shown by several studies that a sound can be perceptually characterized by finding the source of its robustness and confusions, by varying the SNR, to find, for example, the most necessary parts of the speech for identification.

According to certain embodiments of the present invention, we would like to find common perceptual robust-to-noise features across vowel contexts, the events, that may be instantiated and lead to different acoustic representations in the physical domain. For example, the research reported here focuses on correlating the confusion patterns (CP), defined as speech sounds CV confusions versus SNR, with the speech audibility information using an articulation index (AI) model described next. By collecting a lot of responses from many talkers and listeners, we have been able to build a large database of CP. We would like to explain normal hearing listeners confusions and identify the spectro-temporal nature of the perceptual features characterizing those sounds and thus relate the perceptual and physical domains according to some embodiments of the present invention. For example, we have taken the example of consonant /t/, and showed how we can reliably identify its primary robust-to-noise feature. In order to identify and label events, we would, for example, extract the necessary information from the listeners' confusions. In another example, we have shown that the main spectro-temporal cue defining the /t/ event is composed of across-frequency temporal coincidence, in the perceptual domain, represented by different acoustic properties in the physical domain, on an individual utterance basis, according to some embodiments of the present invention. According to some embodiments of the present invention, our observations support these coincidences as a basic element of the auditory object formation, the event being the main perceptual feature used across consonants and vowel contexts.

2. The Articulation Index: An Audibility Model

The articulation often is the score for nonsense sound. The articulation index (AI) usually is the foundation stone of speech perception and is the sufficient statistic of the articulation. Its basic concept is to quantify maximum entropy average phone scores based on the average critical band signal to noise ratio (SNR), in decibels re sensation level [dB-SL], scaled by the dynamic range of speech (30 dB).

It has been shown that the average phone score $P_c(AI)$ can be modeled as a function of the AI, the recognition error $e_{min}$ at AI=1, and the error $e_{chance}=1-1/16$ at chance performance (AI=0). This relationship is:

$$P_c(AI)=1-P_e=1-e_{chance_{min}}^{AI} \tag{1}$$

The AI formula has been extended to account for the peak-to-RMS ratio for the speech $r_k$ in each band, yielding Eq. (2). For example, parameter K=20 bands, referred to as articulation bands, has traditionally been used and determined empirically to have equal contribution to the score for consonant-vowel materials. The AI in each band (the specific AI) is noted $AI_k$:

$$AI_k = \min\left(\frac{1}{3}\log_{10}\left(1 + r_k^2\, snr_k^2\right), 1\right) \tag{2}$$

where $snr_k$ is the SNR (i.e. the ratio of the RMS of the speech to the RMS of the noise) in the $k^{th}$ articulation band.

The total AI is therefore given by:

$$AI = \frac{1}{k}\sum_{k=1}^{k} AI_k \tag{3}$$

The Articulation Index has been the basis of many standards, and its long history and utility has been discussed in length.

The AI-gram, AI (t, f, SNR), is defined as the AI density as a function of time and frequency (or place, defined as the distance X along the basilar membrane), computed from a cochlear model, which is a linear filter bank with bandwidths equal to human critical bands, followed by a simple model of the auditory nerve.

Figure 1:
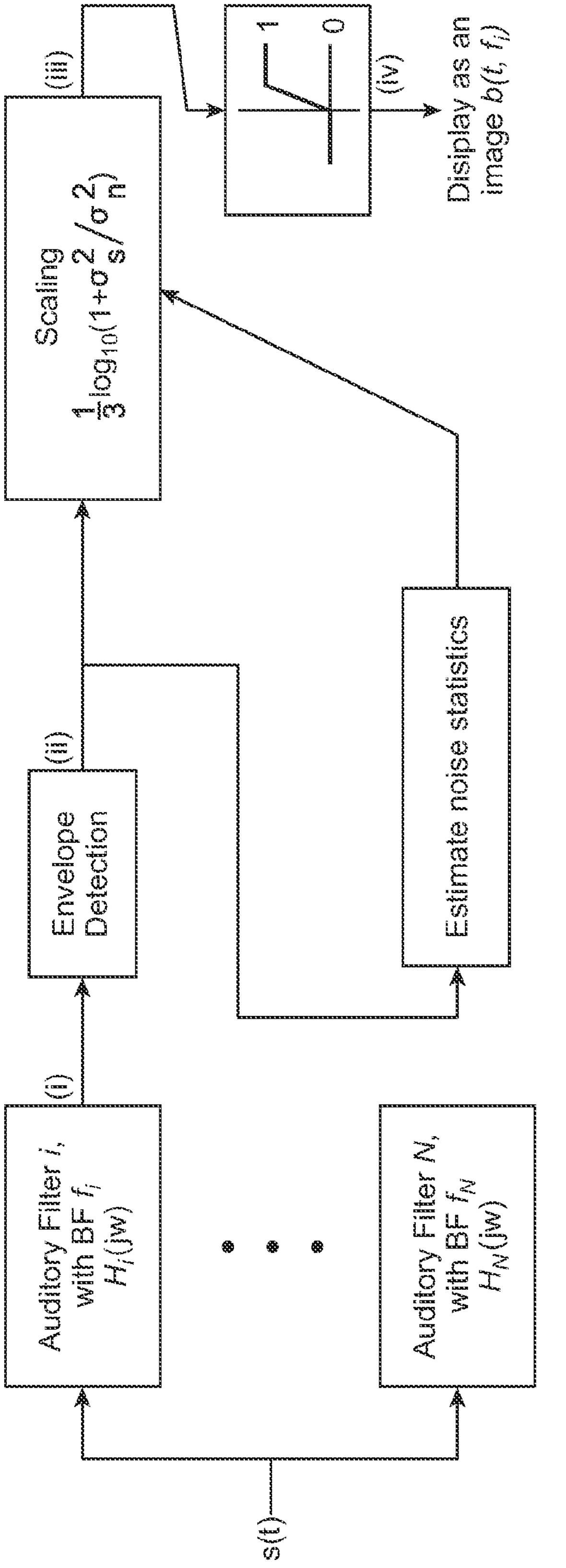
FIG. 1 is a simplified conventional diagram showing how the AI-gram is computed from a masked speech signal s(t)

FIG. 1 is a simplified conventional diagram showing how the AI-gram is computed from a masked speech signal s(t). The AI-gram, before the calculation of the AT, includes a conversion of the basilar membrane vibration to a neural firing rate, via an envelope detector.

As shown in FIG. 1, starting from a critical band filter bank, the envelope is determined, representing the mean rate of the neural firing pattern across the cochlear output. The speech+noise signal is scaled by the long-term average noise level in a manner equivalent to $1+\sigma_s^2/\sigma_n^2$. The scaled logarithm of that quantity yields the AI density AI(t, f, SNR). The audible speech modulations across frequency are stacked vertically to get a spectro-temporal representation in the form of the AI-gram as shown in FIG. 1. The AI-gram represents a simple perceptual model, and its output is assumed to be correlated with psychophysical experiments. When a speech signal is audible, its information is visible in different degrees of black on the AI-gram. If follows that all noise and inaudible sounds appear in white, due to the band normalization by the noise.

Figure 2:
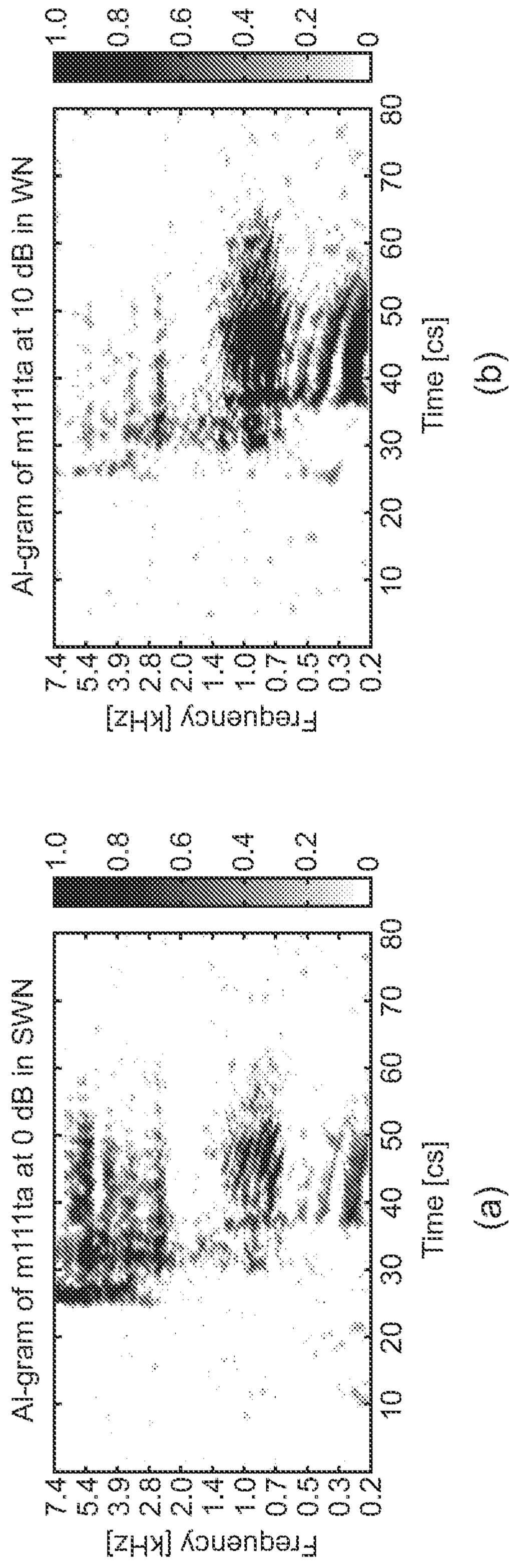
FIG. 2 shows simplified conventional AI-grams of the same utterance of /tα/ in speech-weighted noise (SWN) and white noise (WN) respectively.

FIG. 2 shows simplified conventional AI-grams of the same utterance of /tα/ in speech-weighted noise (SWN) and white noise (WN) respectively. Specifically, FIGS. 2(*a*) and (b) shows AI-grams of male speaker 111 speaking /ta/ in speech-weighted noise (SWN) at 0 dB SNR and white noise at 10 dB SNR respectively. The audible speech information is dark, the different levels representing the degree o f audibility. The two different noises mask speech differently since they have different spectra. Speech-weighted noise mask low frequencies less than high frequencies, whereas one may clearly see the strong masking of white noise at high frequencies. The AI-gram is an important tool used to explain the differences in CP observed in many studies, and to connect the physical and perceptual domains.

3. Experiments

According to certain embodiments of the present invention, the purpose of the studies is to describe and draw results from previous experiments, and explain the obtained human CP responses $P_{h/s}$ (SNR) the AI audibility model, previously described. For example, we carry out an analysis of the robustness of consonant /t/, using a novel analysis tool, denoted the four-step method. In another example, we would like to give a global understanding of our methodology and point out observations that are important when analyzing phone confusions.

3.1 PA07 and MN05

This section describes the methods and results of two Miller-Nicely type experiments, denoted PA07 and MN05.

3.1.1 Methods

Here we define the global methodology used for these experiments. Experiment PA07 measured normal hearing listeners responses to 64 CV sounds (16C×4V, spoken by 18 talkers), whereas MN05 included the subset of these CVs containing vowel /a/. For PA07, the masking noise was speech-weighted (SNR=[Q, 12, −2, −10, −16, −20, −22], Q for quiet), and white for MN05 (SNR=[Q, 12, 6, 0, −6, −12, −15, −18, −21]). All conditions, presented only once to our listeners, were randomized. The experiments were implemented with Matlab©, and the presentation program was run from a PC (Linux kernel 2.4, Mandrake 9) located outside an acoustic booth (Acoustic Systems model number 27930). Only the keyboard, monitor, headphones, and mouse were inside the booth. Subjects seating in the booth are presented with the speech files through the headphones (Sennheiser HD280 phones), and click on the corresponding file they heard on the user interface (GUI). To prevent any loud sound, the maximum pressure produced was limited to 80 dB sound pressure level (SPL) by an attenuator box located between the soundcard and the headphones. None of the subjects complained about the presentation level, and none asked for any adjustment when suggested. Subjects were young volunteers from the University of Illinois student and staff population. They had normal hearing (self-reported), and were native English speakers.

3.1.2 Confusion Patterns

Figure 3:
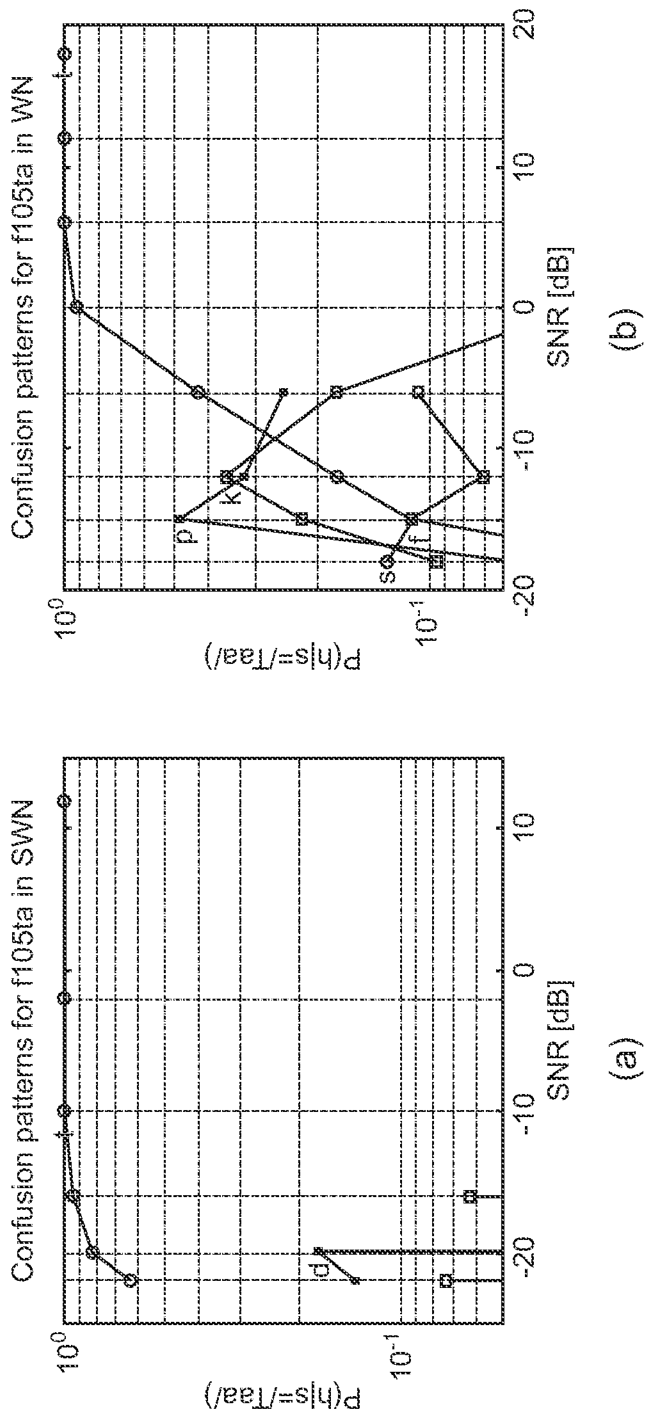
FIG. 3 shows simplified conventional CP plots for an individual utterance from UIUC-S04 and MN05.

Confusion patterns (a row of the CM vs. SNR), corresponding to a specific spoken utterance, provide the representation of the scores as a function of SNR. The scores can also be averaged on a CV basis, for all utterances of a same CV. FIG. 3 shows simplified conventional CP plots for an individual utterance from UIUC-S04 and MN05. Data for 14 listeners for PA07 and 24 for MN05 have been averaged.

Specifically, FIGS. 3(*a*) and (*b*) show confusion patterns for /tα/ spoken by female talker 105 in speech-weighted noise and white noise respectively. Note the significant robustness difference depending on the noise spectrum. In speech-weighted noise, /t/ is correctly identified down to 46 dB SNR whereas it starts decreasing at −2 dB in white noise. The confusions are also more significant in white noise, with the scores for /p/ and /k/ overcoming that of /t/ below −6 dB. We call this observation morphing. The maximum confusion score is denoted $SNR_g$. The reasons for this robustness difference depends on the audibility of the /t/ event, which will be analyzed in the next section.

Specifically, many observations can be noted from these plots according to certain embodiments of the present invention. First, as SNR is reduced, the target consonant error just starts to increase at the saturation threshold, denoted $SNR_s$. This robustness threshold, defined as the SNR at which the error drops below chance performance (93.75% point). For example, it is located at 2 dB SNR in white noise as shown in FIG. 3(*b*). This decrease happens much earlier for WN than in SWN, where the saturation threshold for this utterance is at −16 dB SNR.

Second, it is clear from FIG. 3 that the noise spectrum influences the confusions occurring below the confusion threshold. The confusion group of this /tα/ utterance in white noise (FIG. 3(*b*)) is /p/-/t/-/k/. The maximum confusion scores, denoted $SNR_g$, is located at −18 dB SNR for /p/, and −15 dB for /k/, with respective scores of 50 and 35%. In the case of speech weighted noise (FIG. 3(*a*)), /d/ is the only significant competitor, due to the extreme robustness ($SNR_s$=−16 dB) to this noise spectrum, with a low $SNR_g$=−20 dB. Therefore, the same utterance presents different robustness and confusion thresholds depending on the masking noise, due to the spectral support of what characterizes /t/. We shall further analyze this in the next section. The spectral emphasis of the masking noise will determine which confusions are likely to occur according to some embodiments of the present invention.

Third, as white noise is mixed with this /tα/, /t/ morphs to /p/, meaning that the probability of recognizing /t/ drops, while that of /p/ increases above the /t/ score. At an SNR of −9 dB, the /p/ confusion overcomes the target /t/ score. We call that morphing. As shown on the right CP plot of FIG. 3, the recognition of /p/ is maximum ($P_{/p/}$=50%) at $SNR_g$=−16 dB, that of /k/ peaks at 35% at −12 dB, where the score for /t/ is about 10%.

Fourth, listening experiments show that when the scores for consonants of a confusion group are similar, listeners can prime between these phones. For example, priming is defined as the ability to mentally select the consonant heard, by making a conscious choice between several possibilities having neighboring scores. As a result of pruning, a listener will randomly chose one of the three consonants. Listeners may have an individual bias toward one or the other sound, causing scores differences. For example, the average listener randomly primes between /t/ and /p/ and /k/ at around −10 dB SNR, whereas they typically have a bias for /p/ at −16 dB SNR, and for /t/ above —5 dB. The SNR range for which priming takes place is listener dependent; the CP presented here are averaged across listeners and, therefore, are representative of an average priming range.

Based on our studies, priming occurs when invariant features, shared by consonants of a confusion group, are at the threshold of being audible, and when one distinguishing feature is masked.

In summary, four major observations may be drawn from an analysis of many CP such as those of FIG. 3, which apply for our consonant studies: (i) robustness variability and (ii) confusion group variability across noise spectra, (iii) morphing, and (iv) priming according to certain embodiments of the present invention. For example, we conclude that each utterance presents different saturation thresholds, different confusion groups, morphs or not, and may be subject to priming in some SNR range, depending on the masking noise and the consonant according to certain embodiments of the present invention. In another example, across utterances, we quantitatively relate the confusions patterns and robustness to the audible cues at a given SNR, as exampled in the above discussion. Finding this relation leads us to identify the acoustic features that map to the "perceptual space." Using the four-step method, described in the next section, we will demonstrate that events are common across utterances of a particular consonant, whereas the acoustic correlates of the events, meaning the spectro-temporal and energetic properties, depend on the SNR, the noise spectrum, and the utterance according to some embodiments.

3.2 Four-step Method to Identify Events

According to certain embodiments of the present invention, our four-step method is an analysis that uses the perceptual models described above and correlates them to the CP. It lead to the development of an event-gram, an extension of the AI-gram, and uses human confusion responses to identify the relevant parts of speech. For example, we used the four-step method to draw conclusions about the /t/ event, but this technique may be extended to other consonants. Here, as an example, we identify and analyze the spectral support of the primary /t/ perceptual feature, for two /tɛ/ utterances in speech-weighted noise, spoken by different talkers.

Figure 4:
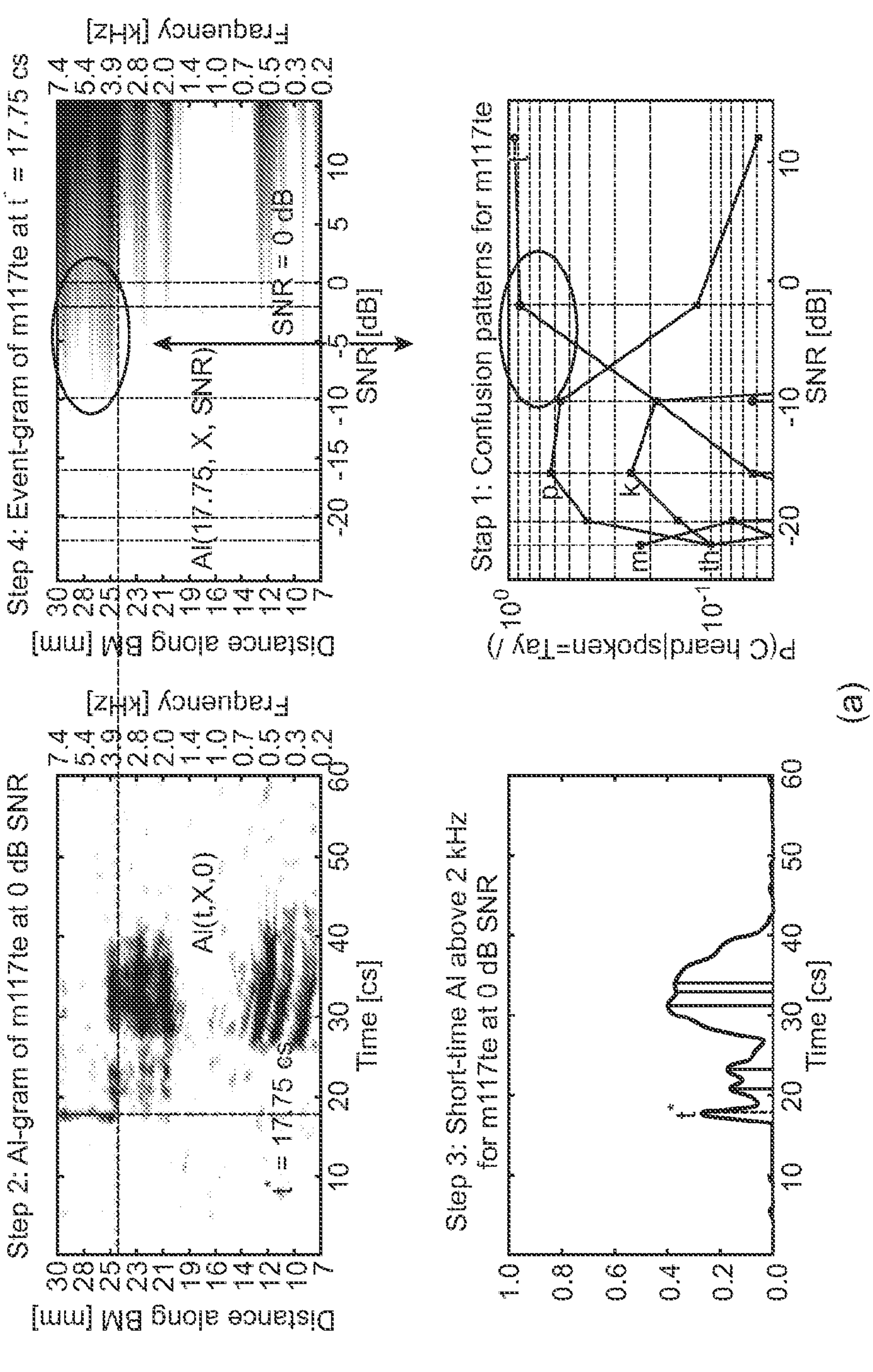
FIG. 4 shows simplified comparisons between a "weak" and a "robust" /tɛ/ according to an embodiment of the present invention.
Figure 4:
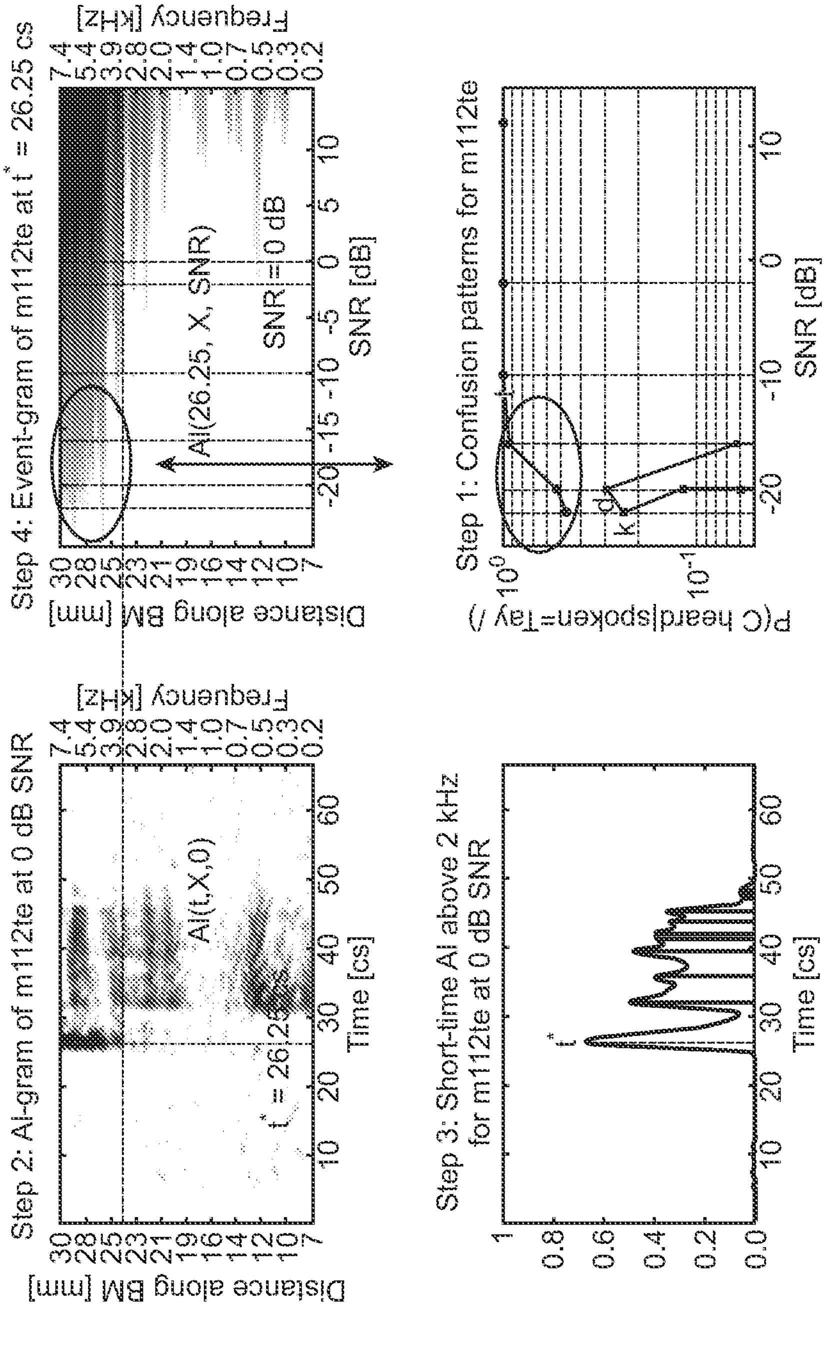

FIG. 4 shows simplified comparisons between a "weak" and a "robust" /tɛ/ according to an embodiment of the present invention. These diagrams are merely examples, which should not unduly limit the scope of the claims. One of ordinary skill in the art would recognize many variations, alternatives, and modifications.

According to certain embodiments, step 1 corresponds to the CP (bottom right), step 2 to the AI-gram at 0 dB SNR in speech-weighted noise, step 3 to the mean AI above 2 kHz where the local maximum t* in the burst is identified, leading to step 4, the event gram (vertical slice through AI-grams at t*). Note that in the same masking noise, these utterances behave differently and present different competitors. Utterance m117_te_ morphs to /pɛ/. Many of these differences can be explained by the AI-gram (the audibility model), and more specifically by the event-gram, showing in each case the audible /t/ burst information as a function of SNR. The strength of the /t/ burst, and therefore its robustness to noise, is precisely correlated with the human responses (encircled). This leads to the conclusion that this across-frequency onset transient, above 2 kHz, is the primary /t/ event according to certain embodiments.

Specifically, FIG. 4(_a_) shows simplified analysis of sound /tɛ/ spoken by male talker 117 in speech-weighted noise. This utterance is not very robust to noise, since the /t/ recognition starts to decrease at −2 dB SNR. Identifying t*, time of the burst maximum at 0 dB SNR in the AI-gram (top left), and its mean in the 2-8 kHz range (bottom left), leads to the event-gram (top right). For example, this representation of the audible phone /t/ burst information at time t* is highly correlated with the CP: when the burst information becomes inaudible (white on the AI-gram), /t/ score decreases, as indicated by the ellipses.

FIG. 4(_b_) shows simplified analysis of sound /tɛ/ spoken by male talker 112 in speech-weighted noise. Unlike the case of m117_te_, this utterance is robust to speech-weighted nose and identified down to −16 dB SNR. Again, the burst information displayed on the event-gram (top right) is related to the CP, accounting for the robustness of consonant /t/ according to some embodiments of the present invention.

3.2.1 Step 1: CP and Robustness

In one embodiment, step 1 of our four-step analysis includes the collection of confusion patterns, as described in the previous section. Similar observations can be made when examining the bottom right panels of FIGS. 4(_a_) and 4(_b_).

For male talker 117 speaking /tɛ/ (FIG. 4(_a_), bottom right panel), the saturation threshold is ≈−6 dB SNR forming a /p/, /t/, /k/ confusion group, whereas $SNR_g$ is at ≈−20 dB SNR for talker 112 (FIG. 4(_b_), bottom right panel). This weaker /t/ morphs to /p/ (FIG. 4(_a_)), the recognition of /p/ is maximum ($P_{/p/}$=60%) at an SNR of −16 dB, where the score for /t/ is 6%, after the start of decrease (ellipsed). Morphing not only occurs in white noise (FIG. 3) but also in speech-weighted noise for this weaker /tɛ/ sound. Confusion patterns and robustness vary dramatically across utterances of a given CV masked by the same noise: unlike for talker m117, /te/ spoken by talker m112 does not morph to /p/ or /k/, and its score is higher (FIG. 4(_b_), bottom right panel). For this utterance, /t/ (solid line) was accurately identified down to −18 dB SNR (encircled), and was still well above chance performance (1/16) at −22 dB. Its main competitors /d/ and /k/ have lower score, and only appear at −18 dB SNR.

It is clear that these two /tɛ/ sounds are dramatically different. Such utterance differences may be determined by the addition of masking noise. There is confusion pattern variability not only across noise spectra, but also within a masking noise category (e.g., WN vs. SWN). These two /tɛ/s are an example of utterance variability, as shown by the analysis of Step 1: two sounds are heard as the same in quiet, but they are heard differently as the noise intensity is increased. The next section will detail the physical properties of consonant /t/ in order to relate spectro-temporal features to the score using our audibility model.

3.2.2 Step 2 and 3: Utilization of a Perceptual Model

For talker 117, FIG. 4(_a_) (top left panel) at 0 dB SNR, we observe that the high-frequency burst, having a sharp energy onset, stretches from 2.8 kHz to 7.4 kHz, and runs in time from 16-18 cs (a duration of 20 ms). According to the CP previously discussed (FIG. 4(_a_), bottom right panel), at 0 dB SNR consonant /t/ is recognized 88% of the time. The burst for talker 112 has higher intensity and spreads from 3 kHz up, as shown of the AI-gram for this utterance (FIG. 4(_b_), top left panel), which results in a 100% recognition at and above about −10 dB SNR.

These observations lead us to Step 3, the integration of the AI-gram over frequency (bottom right panels of FIGS. 4(_a_) and (_b_)) according to certain embodiments of the present invention. For example, one obtains a representation of the average audible speech information over a particular frequency range Δf as a function of time, denoted the short-time AI, ai(t). The traditional AI is the area under the overall frequency range curve at time t. In this particular case, ai(t) is computed in the 2-8 kHz bands, corresponding to the high-frequency /t/ burst of noise. The first maximum, ai(t*) (vertical dashed line on the top and bottom left panels of FIGS. 4(_a_) and 4(_b_)), is an indicator of the audibility of the consonant. The frequency content has been collapsed, and t* indicates the time of the relevant perceptual information for /t/.

3.2.3 Step 4: The Event-gram

The identification of t* allows Step 4 of our correlation analysis according to some embodiments of the present invention. For example, the top right panels of FIGS. 4(*a*) and (*b*) represent the event-grams for the two utterances. The event-gram, AI (t*, X, SNR), is defined as a cochlear place (or frequency, via Greenwood's cochlear map) versus SNR slice at one instant of time. The event-gram is, for example, the link between the CP and the AI-gram. The event-gram represents the AI density as a function of SNR, at a given time t* (here previously determined in Step 3) according to an embodiment of the present invention. For example, if several AI-grams were stacked on top of each other, at different SNRs, the event-gram can be viewed as a vertical slice through such a stack. Namely, the event-grams displayed in the top right panels of FIGS. 4(*a*) and (*b*) are plotted at t*, characteristic of the /t/ burst. A horizontal dashed line, from the bottom of the burst on the AI-gram, to the bottom of the burst on the event-gram at SNR=0 dB, establishes, for example, a visual link between the two plots.

According to an embodiment of the present invention, the significant result visible on the event-gram is that for the two utterances, the event-gram is correlated with the average normal listener score, as seen in the circles linked by a double arrow. Indeed, for utterance 117_te_, the recognition of consonant /t/ starts to drop, at −2 dB SNR, when the burst above 3 kHz is completely masked by the noise (top right panel of FIG. 4(*a*)). On the event-gram, below −2 dB SNR (circle), one can note that the energy of the burst at t* decreases, and the burst becomes inaudible (white). A similar relation is seen for utterance 112, but since the energy of the burst is much higher, the /t/ recognition only starts to fall at −15 dB SNR, at which point the energy above 3 kHz become sparse and decreases, as seen in the top right panel of FIG. 4(*b*) and highlighted by the circles. A systematic quantification of this correlation for a large numbers of consonants will be described in the next section.

According to an embodiment of the present invention, there is a correlation in this example between the variable /t/ confusions and the score for /t/ (step 1, bottom right panel of FIGS. 4(*a*) and (*b*)), the strength of the /t/ burst in the AI-gram (step 2, top left panels), the short-time AI value (step 3, bottom left panels), all quantifying the event-gram (step 4, top right panels). This relation generalizes to numerous other /t/ examples and has been here demonstrated for two /tɛ/ sounds. Because these panels are correlated with the human score, the burst constitutes our model of the perceptual cue, the event, upon which listeners rely to identify consonant /t/ in noise according to some embodiments of the present invention.

In the next section, we analyze the effect of the noise spectrum on the perceptual relevance of the /t/ burst in noise, to account for the differences previously observed across noise spectra.

3.3 Discussion 3.3.1. Effect of the Noise Samples

Figure 5:
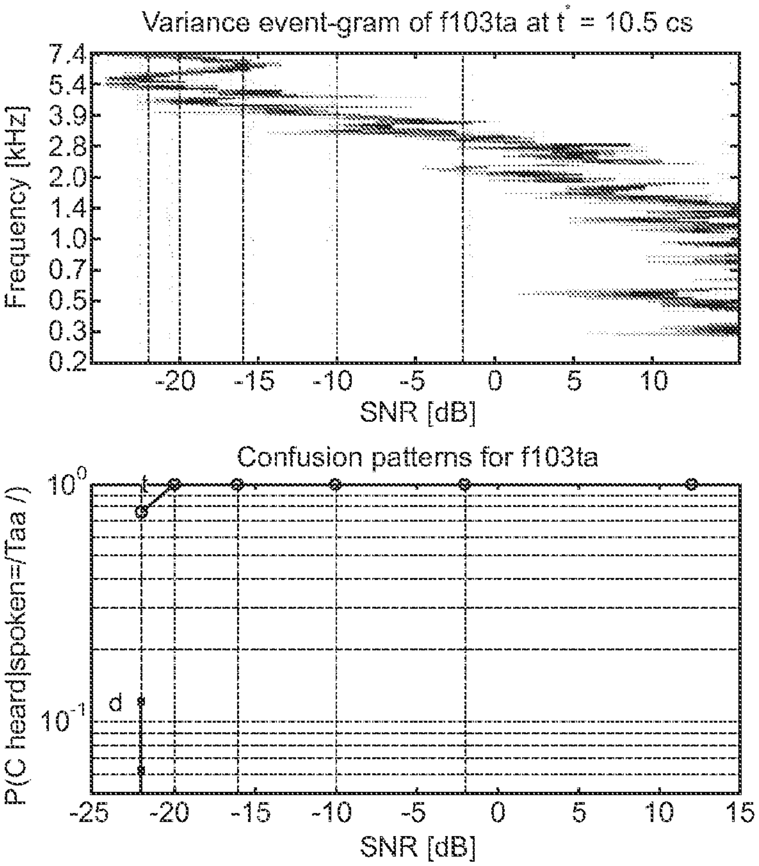
FIG. 5 shows simplified diagrams for variance event-gram computed by taking event-grams of a /tα/ utterance for 10 different noise samples according to an embodiment of the present invention.

FIG. 5 shows simplified diagrams for variance event-gram computed by taking event-grams of a /tɑ/ utterance for 10 different noise samples in SWN (PA07) according to an embodiment of the present invention. These diagrams are merely examples, which should not unduly limit the scope of the claims. One of ordinary skill in the art would recognize many variations, alternatives, and modifications. We can see that all the variance is, for example, located on the edges of the audible speech energy, located between regions of high audibility and regions of noise. However, the spread is thin, showing that the use of different noise samples should not significantly impact perceptual scores according to some embodiments of the present invention.

Specifically, one could wonder about the effect of the variability of the noise for each presentation on the event-gram. At least one of our experiments has been designed such that a new noise sample was used for each presentation, so that listeners would not hear the same sound mixed with a different noise, even if presented at the same SNR. We have analyzed the variance when using different noise samples having the same spectrum. Therefore, we have computed event-grams for 10 different noise samples, and calculated the variance as shown on FIG. 5 for utterance f103_ta_ in SWN. We can observe that, for certain embodiments of the present invention, regions of high audibility are white (high SNRs), as well as regions where the noise has a strong masking effect (low SNRs). The noticeable variance is seen at the limit of audibility. The thickness of the line is a measure of the trial variance. Such a small spread of the line indicates that using a new noise on every trial is likely not to impact the scores of our psychophysical experiment, and the correlation between noise and speech is unlikely to add features improving the scores.

3.3.2 Relating CP and Audibility for /t/

We have collected normal hearing listeners responses to nonsense CV sounds in noise and related them to the audible speech spectro-temporal information to find the robust-to-noise features. Several features of CP are defined, such as morphing, priming, and utterance heterogeneity in robustness according to some embodiments of the present invention. For example, the identification of a saturation threshold $SNR_g$, located at the 93.75% point is a quantitative measure of an utterance robustness in a specific noise spectrum. The natural utterance variability, causing utterances of a same phone category to behave differently when mixed with noise, could now be quantified by this robustness threshold. The existence of morphing clearly demonstrates that noise can mask an essential feature for the recognition of a sound, leading to consistent confusions among our subjects. However such morphing is not ubiquitous, as it depends on the type of masking noise. Different morphs are observed in various noise spectra. Morphing demonstrates that consonants are not uniquely characterized by independent features, but that they share common cues that are weighted differently in perceptual space according to some embodiments of the present invention. This conclusion is also supported by CP plots for /k/ and /p/ utterances, showing a well defined /p/-/t/-/k/ confusion group structure in white noise. Therefore, it appears that /t/, /p/ and /k/ share common perceptual features. The /t/ event is more easily masked by WN than SWN, and the usual /k/-/p/ confusion for /t/ in WN demonstrates that when the /t/ burst is masked the remaining features are shared by all three voiceless stop consonants. When the primary /t/ event is masked at high SNRs in SWN (as exampled in FIG. 4(*a*)), we do not see such strong /p/-/t/-/k/ confusion group. It is likely that the common features shared by this group are masked by speech weighted noise, due to their localization in frequency, whereas the /t/ burst itself is usually robust in SWN. For hearing impaired subjects with an increased sensitivity to noise (called an SNR-loss, when an ear needs a larger SNR for the same speech score), their score for utterance m112_te_ should typically be higher than that of utterance m117_te_, at a given SNR. We shall show in section 4 that this common feature hypothesis is also supported by temporal truncation experiments. It is shown that confusions take place when the acoustic features for the primary /t/ event are inaudible, due to noise or truncation, and that the remaining cues are part of what perceptually characterizes competitors /p/ and /k/, according to certain embodiments of the present invention.

Using a four-step method analysis, we have found that the discrimination of /t/ from its competitors is due to the robustness of /t/ event, the sharp onset burst being its physical representation. For example, robustness and CP are not utterance dependant. Each instance of the /t/ event presents different characteristics. In one embodiment, the event itself is invariant for each consonant, as seen on FIG. 4. For example, we have found a single relation between the masking of the burst on the event-gram and human responses, independent of noise spectrum. White noise more actively masks high frequencies, accounting for the decrease of the /t/ at high SNRs recognition as compared to speech-weighted noise. Once the burst is masked, the /t/ score drops below 100%. This supports that the acoustic representations in the physical domain of the perceptual features are not invariant, but that the perceptual features themselves (events) remain invariant, since they characterize the robustness of a given consonant in the perceptual domain according to certain embodiments. For example, we want to verify here that the burst accounts for the robustness of /t/, therefore being the physical representation of what perceptually characterizes /t/ (the event), and having various physical properties across utterances. The unknown mapping from acoustics to event space is at least part of what we have demonstrated in our research.

Figure 6:
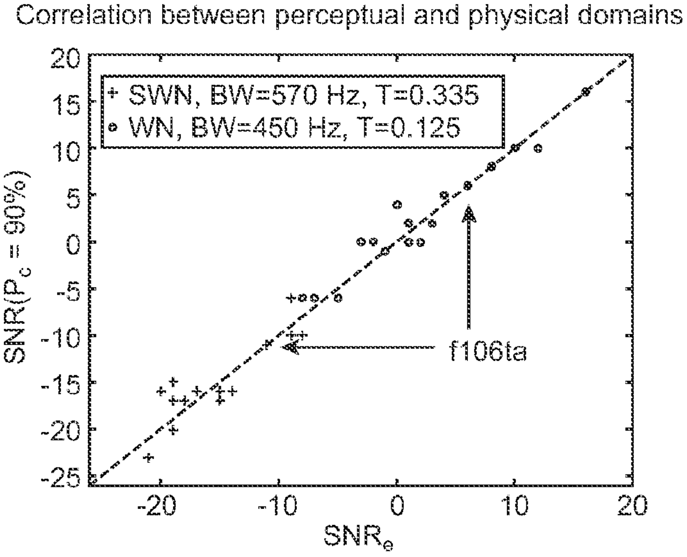
FIG. 6 shows simplified diagrams for correlation between perceptual and physical domains according to an embodiment of the present invention.
Figure 6:
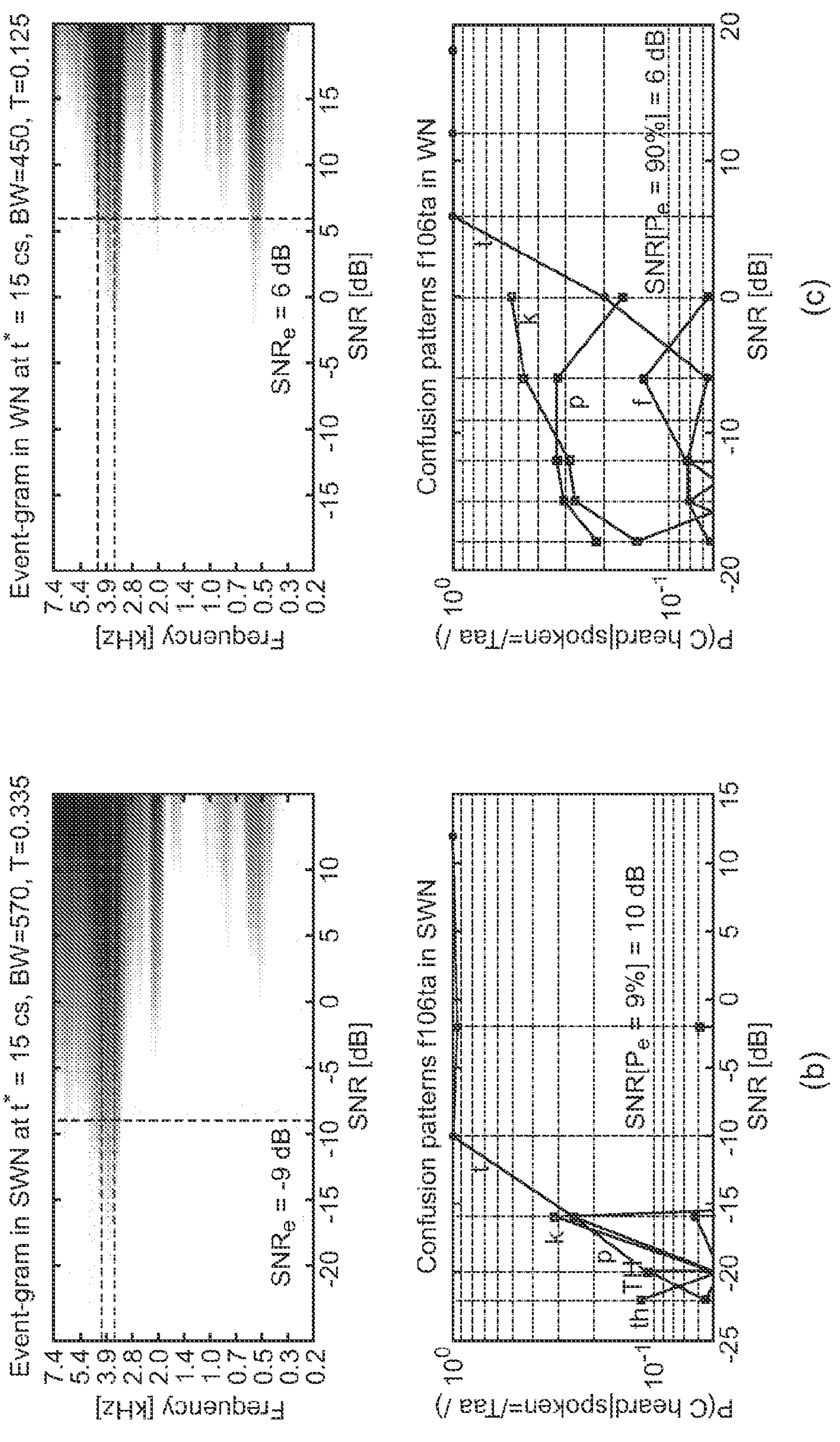

FIG. 6 shows simplified diagrams for correlation between perceptual and physical domains according to an embodiment of the present invention. These diagrams are merely examples, which should not unduly limit the scope of the claims. One of ordinary skill in the art would recognize many variations, alternatives, and modifications.

FIG. 6(*a*) is a scatter plot of the event-gram thresholds $SNR_e$ above 2 kHz, computed for the optimal burst bandwidth B, having an AI density greater than the optimal threshold T, compared to the SNR of 90% score. Utterances in SWN (+) are more robust than in WN (o), accounting for the large spread in SNR. We can see that most utterances are close from the 45-degree line, showing the high correlation between the AI-gram audibility model (middle pane), and the event-gram (right pane) according an embodiment. The detection of the event-gram threshold, SNR, is shown on the event gram in SWN (top pane of FIG. 6(*b*)) and WN (top pane of FIG. 6(*c*)), between the two horizontal lines, for f106*ta*, and placed above their corresponding CP. $SNR_e$ is located at the lowest SNR where there is continuous energy above 2 kHz, spread in frequency with a width of B above AI threshold T. We can notice the effect of the noise spectrum on the event-gram, accounting for the difference in robustness between WN and SWN.

Specifically, in order to further quantify the correlation between the audible speech information as displayed on the event-gram, and the perceptual information given by our listeners in a quantitative manner, we have correlated event-gram thresholds, denoted $SNR_e$, with the 90% score SNR, denoted $SNR(P_e=90\%)$. The event-gram thresholds are computed above 2 kHz, for a given set of parameters: the bandwidth, B, and AI density threshold T. For example, the threshold correspond to the lowest SNR at which there is continuous speech information above threshold T, and spread out in frequency with bandwidth B, assumed to be relevant for the /t/ recognition as observed using the four-step method. Such correlations are shown in FIG. 6(*a*), and have been obtained for a different set of optimal parameters (computing by minimizing the mean square error) in the two experiments, showing that the optimized parameters depend on the noise spectrum. Optimized parameters are B 570 Hz in SWN, for T 0.335, and B=450 Hz for T 0.125 in WN. Bandwidths have been tested as low as 5 Hz steps when close to the minimum mean square error, and thresholds in steps of 0.005. The 14 /α/ utterances in PA07 are present in MN05, therefore each sound common to both experiments appears twice on the scatter plot. Scatters for MN05 (in WN), are at higher SNRs than for PA07 (in SWN), due to the strong masking of the /t/ burst in white noise, leading to higher $SNR_e$ and $SNR(P_c=90\%)$. We can see that most utterances are close from the 45-degree line, proving that our AI-gram audibility model, and the event-gram are a good predictor of the average normal listener score, demonstrated at least here in the case of /t/. The 120 Hz difference between optimal bandwidths for WN and SWN does not seem to be significant. Additionally, an intermediate value for both noise spectra can be identified.

For example, the difference in optimal AI thresholds T is likely due to the spectral emphasis of the each noise. The lower value obtained in WN could also be the result of other cues at lower frequencies, contributing to the score when the burst get weak. However, it is likely that applying T for WN in the SWN case would only lead to a decrease in $SNR_e$ of a few dB. Additionally, the optimal parameters may be identified to fully characterize the correlation between the scores and the event-gram model.

As an example, FIG. 6(*b*) shows an event-gram in SWN, for utterance f106*ta*, with the optimal bandwidth between the two horizontal lines leading to the identification of $SNR_c$. Below are the CP, where SNR $(P_c=90\%)=-10$ dB is noted (thresholds are chosen in 1 dB steps, and the closest SNR integer above 90% is chosen). FIG. 6 (c) shows event-gram and CP for the same utterance in WN. The points corresponding to utterance f106*ta* are noted by arrows. Regardless of the noise type, we can see on the event-grams the relation between the audibility of the 2-8 kHz range at t* (in dark) and the correct recognition of /t/, even if thresholds are lower in SWN than WN. More specifically, the strong masking of white noise at high frequencies accounts for the early loss of the /t/ audibility as compared to speech-weighted noise, having a weaker masking effect in this range. We can conclude that the burst, as an high-frequency coinciding onset, is the main event accounting for the robustness of consonant /t/ independently of the noise spectrum according to an embodiment of the present invention. For example, it presents different physical properties depending on the masker spectrum, but its audibility is strongly related to human responses in both cases.

To further verify the conclusions of the four-step method regarding the /t/ burst event, we have run a psychophysical experiment where the /t/ burst would be truncated, and study the resulting responses, under less noisy conditions. We hypothesize that since the /t/ burst is the most robust-to-noise event, it is the strongest feature cueing the /t/ percept, even at higher SNRs. The truncation experiment will therefore remove this crucial /t/ information.

4. Truncation Experiment

We have strengthened our conclusions drawn from FIG. 4 based on a confusion patterns and the event-gram analysis. We have truncated CV sounds in 5 ms steps and studied the resulting morphs. At least one of our goals is to answer a fundamental research question raised by the four-step analysis of /t/: can the truncation of /t/ cause a morph to /p/, implying that the /t/ event is prefixed to consonant /p/, and therefore that they share common features? This conclusion would be in agreement with our observation that some /t/ strongly morph to /p/ when the energy at high frequencies around t* is masked by the noise.

4.1 Methods

Two SNR conditions, 0 and 12 dB SNR, were used in SWN. The noise spectrum was the same as used in PA07. The listeners could choose among 22 possible consonants responses. The subjects did not express a need to add more response choices. Ten subjects participated in the experiment.

4.1.1 Stimuli

The tested CVs were, for example, /tɑ/, /pɑ/, /sɑ/, /zɑ/, and /ʃɑ/ from different talkers for a total of 60 utterances. The beginning of the consonant and the beginning of the vowel were hand labeled. The truncations were generated every 5 ms, including a no-truncation condition and a total truncation condition. One half second of noise was prepended to the truncated CVs. The truncation was ramped with a Hamming window of 5 ms, to avoid artifacts due an abrupt onset. We report /t/ results here as an example.

4.2 Results

An important conclusion of the /tɑ/ truncation experiment is the strong morph obtained for all of our stimuli, when less than 30 ms of the burst are truncated. Truncation times are relative to the onset of the consonant. When presented with our truncated /tɑ/ sounds, listeners reported hearing mostly /p/. Some other competitors, such as /k/ or /h/ were occasionally reported, but with much lower average scores than /p/.

Two main trends can be observed. Four out of ten utterances followed a hierarchical /t/ /p/ /b/ morphing pattern, denoted group 1. The consonant was first identified as /t/ for truncation times less than 30 ms, then /p/ was reported over a period spreading from 30 ms to 11.0 ms (an extreme case), to finally being reported as /b/. Results for group 1 are shown in FIG. 7.

Figure 7:
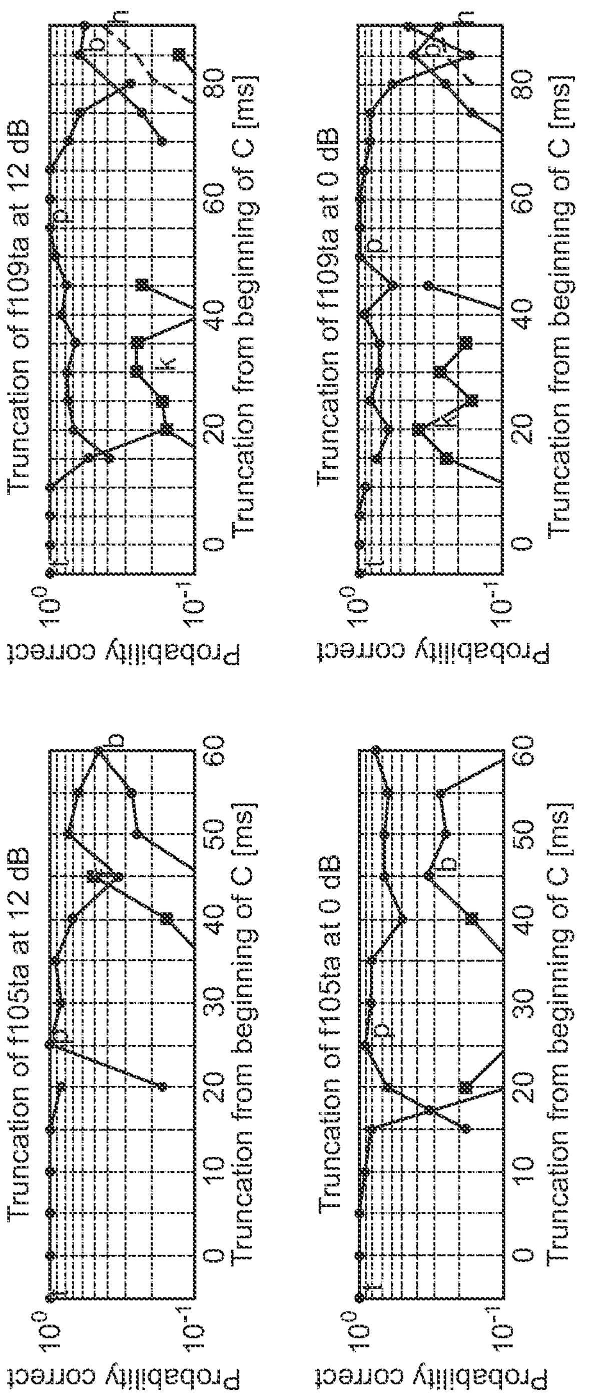
FIG. 7 shows simplified typical utterances from one group, which morph from /t/-/p/-/b/ according to an embodiment of the present invention.
Figure 7:
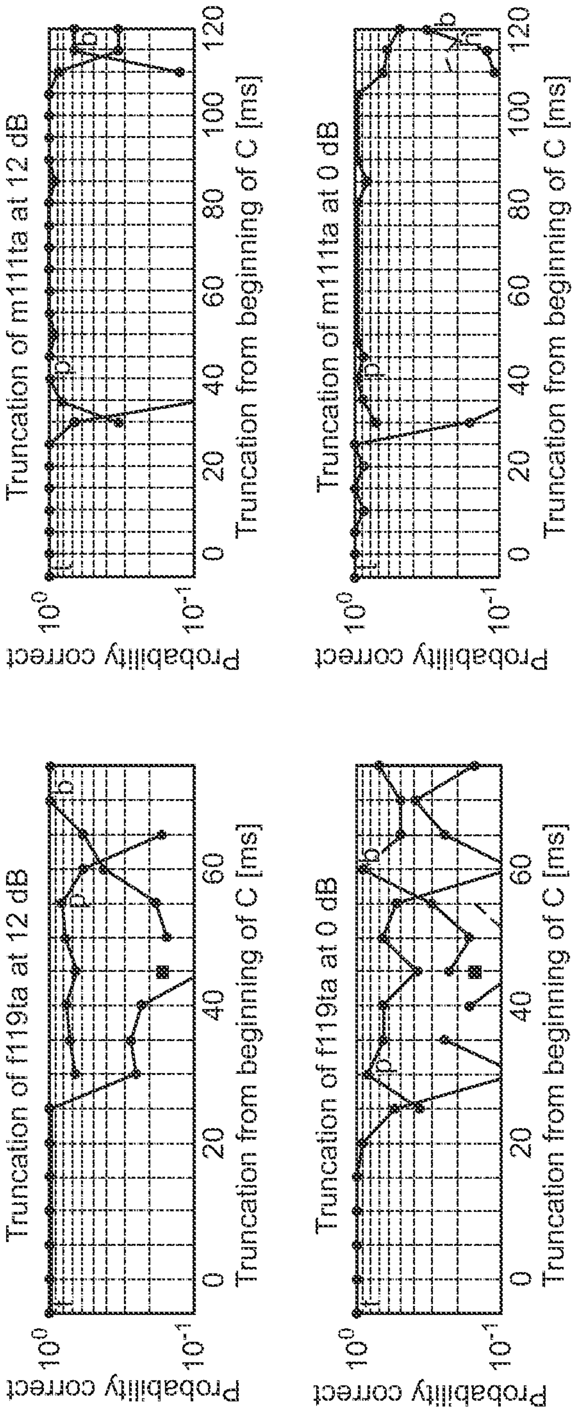

FIG. 7 shows simplified typical utterances from group 1, which morph from /t/-/p/-/b/ according to an embodiment of the present invention. These diagrams are merely examples, which should not unduly limit the scope of the claims. One of ordinary skill in the art would recognize many variations, alternatives, and modifications. For each panel, the top plot represents responses at 12 dB, and the lower at 0 dB SNR. There is no significant SNR effect for sounds of group 1.

According to one embodiment, FIG. 7 shows the nature of the confusions when the utterances, described in the titles of the panels, are truncated from the start of the sounds. This confirms the nature of the events locations in time, and confirms the event-gram analysis of FIG. 6. According to another embodiment, as shown in FIG. 7, there is significant variability in the cross-over truncation times, corresponding to the time at which the target and the morph scores overlap. For example, this is due to the natural variability in the /t/ burst duration. The change in SNR from 12 to 0 dB had little impact on the scores, as discussed below. In another example, the second trend can be defined as utterances that morph to /p/, but are also confused with /h/ or /k/. Five out of ten utterances are in this group, denoted Group 2, and are shown in FIGS. 8 and 9.

Figure 8:
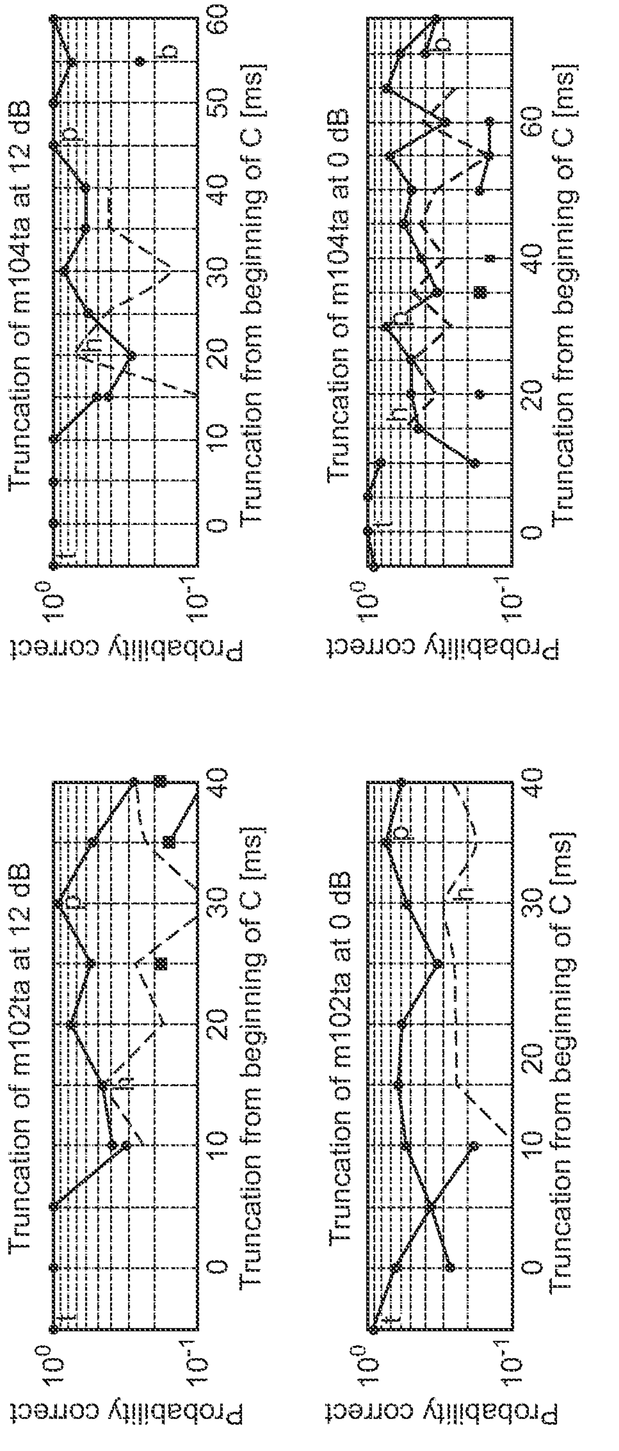
FIG. 8 shows simplified typical utterances from another group according to an embodiment of the present invention.
Figure 8:
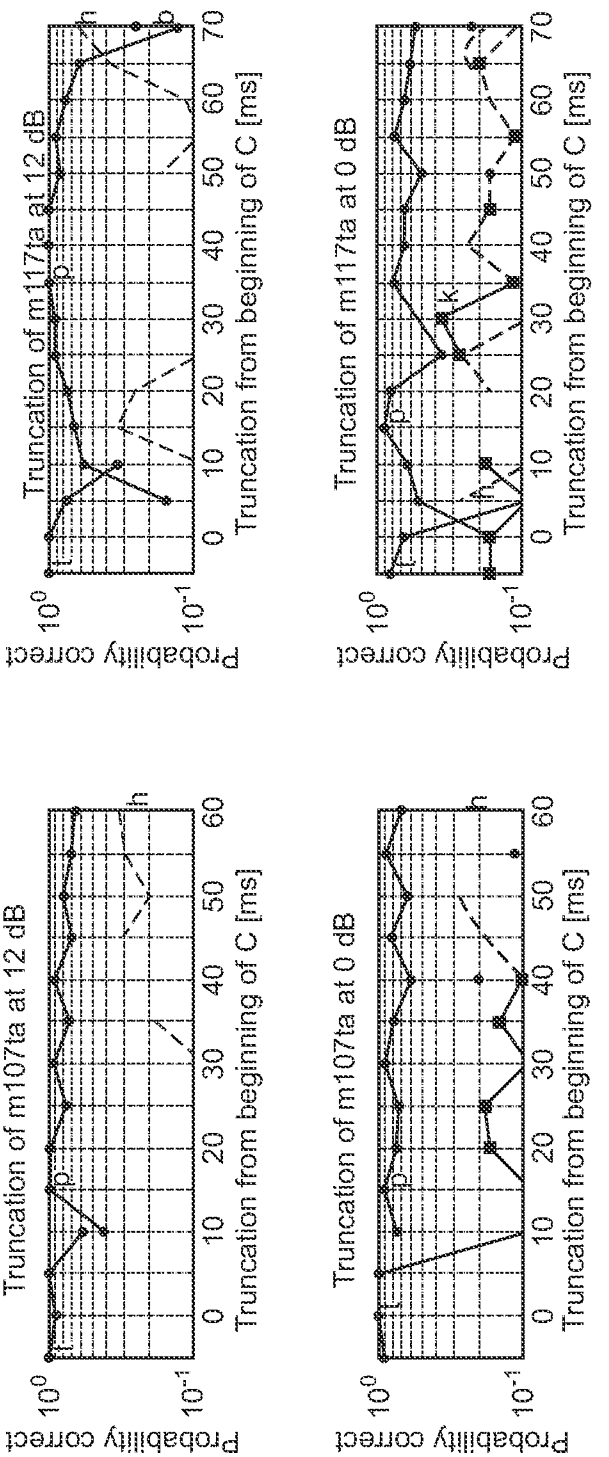

FIG. 8 shows simplified typical utterances from group 2 according to an embodiment of the present invention. These diagrams are merely examples, which should not unduly limit the scope of the claims. One of ordinary skill in the art would recognize many variations, alternatives, and modifications. Consonant /h/ strongly competes with /p/ (top), along with /k/ (bottom). For the top right and left panels, increasing the noise to 0 dB SNR causes an increase in the /h/ confusion in the /p/ morph range. For the two bottom utterances, decreasing the SNR causes a /k/ confusion that was nonexistent at 12 dB, equating the scores for competitors /k/ and /h/.

Figure 9:
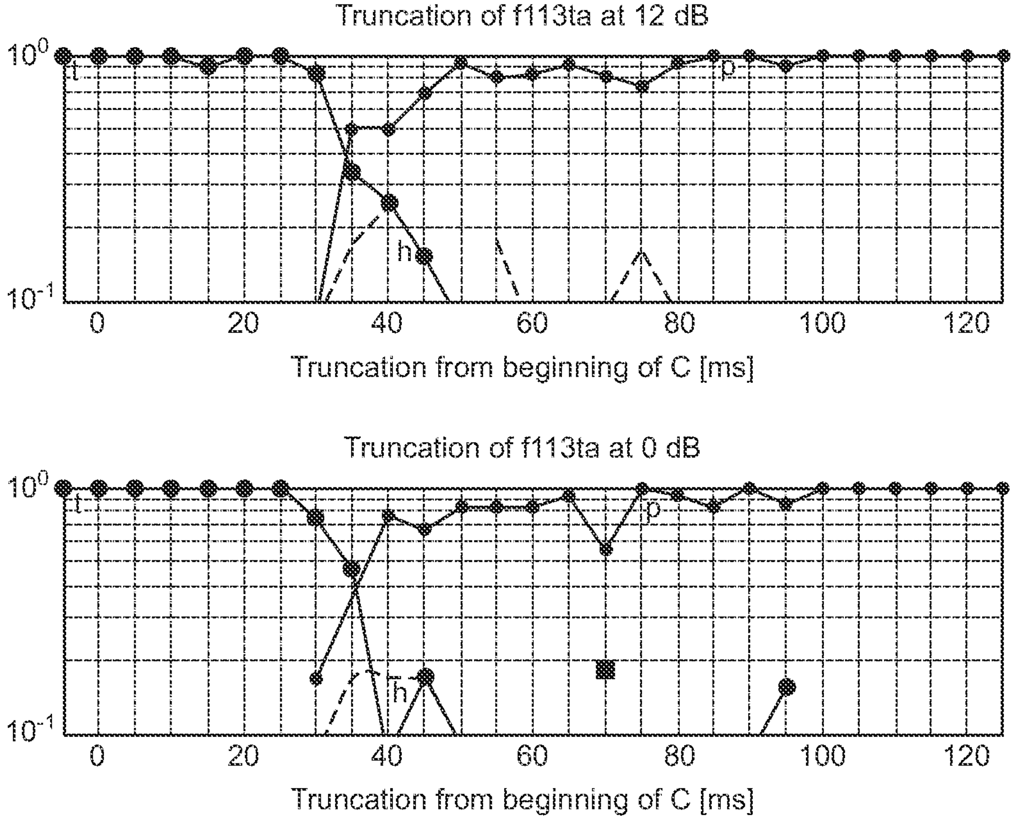
FIG. 9 shows simplified truncation according to an embodiment of the present invention.

FIG. 9 shows simplified truncation of f113*ta* at 12 (top) and 0 dB SNR (bottom) according to an embodiment of the present invention. These diagrams are merely examples, which should not unduly limit the scope of the claims. One of ordinary skill in the art would recognize many variations, alternatives, and modifications. Consonant /t/ morphs to /p/, which is slightly confused with /h/. There is no significant SNR effect.

As shown in FIGS. 8 and 9, the /h/ confusion is represented by a dashed line, and is stronger for the two top utterances, m102*ta* and m104*ta* (FIGS. 8(*a*) and (*b*)). A decrease in SNR from 12 to 0 dB caused a small increase in the /h/ score, almost bringing scores to chance performance (e.g. 50%) between those two consonants for the top two utterances. The two lower panels show results for talkers m107 and m117, a decrease in SNR causes a /k/ confusion as strong as the /h/ confusion, which differs from the 12 dB case where competitor /k/ was not reported. Finally, the truncation of utterance f113*ta* (FIG. 9) shows a weak /h/ confusion to the /p/ morph, not significantly affected by an SNR change.

A noticeable difference between group 2 and group 1 is the absence of /b/ as a strong competitor. According to certain embodiment, this discrepancy can be due to a lack of greater truncation conditions. Utterances m104*ta*, m117*ta* (FIGS. 8(*b*) and (*d*)) show weak /b/ confusions at the last truncation time tested.

We notice that both for group 1 and 2 the onset of the decrease of the /t/ recognition varies with increased SNR. In the 0 dB case, the score for /t/ drops 5 ms earlier than in the 12 dB case in most cases. This can be attributed to, for example, the masking of each side of the burst energy, making them inaudible, and impossible to be used as a strong onset cue. This energy is weaker than around t*, where the /t/ burst energy has its maximum. One dramatic example of this SNR effect is shown in FIG. 7(*d*).

The pattern for the truncation of utterance m120*ta* was different from the other 9 utterances included in the experiment. First, the score for /t/ did not decrease significantly after 30 ms of truncation. Second, /k/ confusions were present at 12 but not at 0 dB SNR, causing the /p/ score to reach 100% only at 0 dB. Third, the effect of SNR was stronger.

Figure 10:
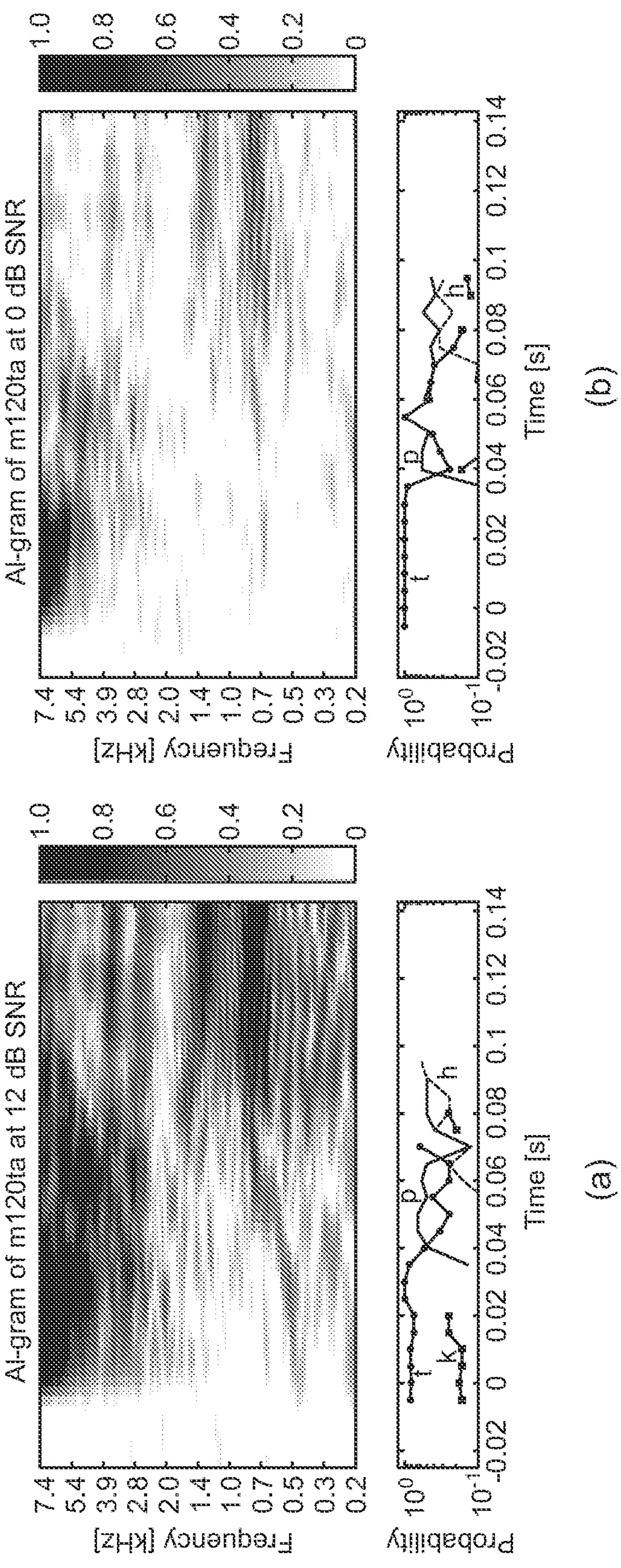
FIG. 10 shows simplified comparisons of the AI-gram and the truncation scores in order to illustrate correlation between physical AI-gram and perceptual scores according to an embodiment of the present invention.

FIGS. 10(*a*) and (*b*) show simplified AI-grams of m120*ta*, zoomed on the consonant and transition part, at 12 dB SNR and 0 dB SNR respectively according to an embodiment of the present invention. These diagrams are merely examples, which should not unduly limit the scope of the claims. One of ordinary skill in the art would recognize many variations, alternatives, and modifications. Below each AI-gram and time aligned are plotted the responses of our listeners to the truncation of /t/. Unlike other utterances, the /t/ identification is still high after 30 ms of truncation due to remaining high frequency energy. The target probability even overcomes the score for /p/ at 0 dB SNR at a truncation time of 55 ms, most likely because of a strong relative /p/ event present at 12 dB, but weaker at 0 dB.

From FIG. 10, we can see that the burst is very strong for about 35 ms, for both SNRs, which accounts for the high /t/ recognition in this range. For truncation times greater than 35 ms, /t/ is still identified with an average probability of 30%. According to one embodiment, this effect, contrary to other utterances, is due to the high levels of high frequency energy following the burst, which by truncation is cued as a coinciding onset of energy in the frequency range corresponding to that of the /t/ event, and which duration is close to the natural /t/ burst duration. It is weaker than the original strong onset burst, explaining the lower /t/ score. A score inversion takes place at 55 ms at 0 dB SNR, but does not occur at 12 dB SNR, where the score for /p/ overcomes that of /t/. This /t/ peak is also weakly visible at 12 dB (left). One explanation is that a /p/ event is overcoming the /t/ weak burst event. In one embodiment, there is some mid frequency energy, most likely around 0.7 kHz, cueing /p/ at 12 dB, but being masked at 0 dB SNR, enabling the relative /t/ recognition to rise again. This utterance therefore has a behavior similar to that of the other utterances, at least for the first 30 ms of truncation. According to one embodiment, the different pattern observed for later truncation times is an additional demonstration of utterance heterogeneity, but can nonetheless be explained without violating our across-frequency onset burst event principle.

We have concluded from the CV-truncation data that the consonant duration is a timing cue used by listeners to distinguish /t/ from /p/, depending on the natural duration of the /t/ burst according to certain embodiments of the present invention. Moreover, additional results from the truncation experiment show that natural /pa/ utterances morph into /bɑ/, which is consistent with the idea of a hierarchy of speech sounds, clearly present in our /tɑ/ example, especially for group 1, according to some embodiments of the present invention. Using such a truncation procedure we have independently verified that the high frequency burst accounts for the noise robust event corresponding to the discrimination between /t/ and /p/, even in moderate noisy conditions.

Thus, we confirm that our approach of adding noise to identify the most robust and therefore crucial perceptual information, enables us to identify the primary feature responsible for the correct recognition of /t/ according to certain embodiments of the present invention.

4.3 Analysis

The results of our truncation experiment found that the /t/ recognition drops in 90% of our stimuli after 30 ms. This is in strong agreement with the analysis of the AI-gram and event-gram emphasized by our four-step analysis. Additionally, this also reinforce that across-frequency coincidence, across a specific frequency range, plays a major role in the /t/ recognition, according to an embodiment of the present invention. For example, it seems assured that the leading-edge of the /t/ burst is used across SNR by our listeners to identify /t/ even in small amounts of noise.

Moreover, the /p/ morph that consistently occurs when the /t/ burst is truncated shows that consonants are not independent in the perceptual domain, but that they share common cues according to some embodiments of the present invention. The additional results that truncated /p/ utterances morph to /b/ (not shown) strengthen this hierarchical view, and leads to the possibility of the existence of “root” consonants. Consonant /p/ could be thought as a voiceless stop consonant root containing raw but important spectro-temporal information, to which primary robust-to-noise cues can be added to form consonant of a same confusion group. We have demonstrated here that /t/ may share common cues with /p/, revealed by both masking and truncation of the primary /t/ event, according to some embodiments of the present invention. When CVs are mixed with masking noise, morphing, and also priming, are strong empirical observations that support this conclusion, showing this natural event overlap between consonants of a same category, often belonging to the same confusion group.

The important relevance of the /t/ burst in the consonant identification can be further verified by an experiment controlling the spectro-temporal region of truncation, instead of exclusively focusing on the temporal aspect. Indeed, in this experiment, all frequency components of the burst are removed, which is therefore in agreement with our analysis but does not exclude this existence of low frequency cues, especially at high SNRs. Additionally work can verify that the /t/ recognition significantly drops when about 30 ms of the above 2 kHz burst region is removed. Such an experiment would further prove that this high frequency /t/ event is not only sufficient, but also necessary, to identify /t/ in noise.

5. Extension to other Sounds

The overall approach has taken aims at directly relating the AI-gram, a generalization of the AI and our model of speech audibility in noise, to the confusion pattern discrimination measure for several consonants. This approach represents a significant contribution toward solving the speech robustness problem, as it has successfully led to the identification of several consonant events. The /t/ event is common across CVs starting with /t/, even if its physical properties vary across utterances, leading to different levels of robustness to noise. The correlation we have observed between event-gram thresholds and 90% scores fully confirms this hypothesis in a systematic manner across utterances of our database, without however ruling out the existence of other cues (such as formants), that would be more easily masked by SWN than WN.

The truncation experiment, described above, leads to the concept of a possible hierarchy of consonants. It confirms the hypothesis that consonants from a confusion group share common events, and that the /t/ burst is the primary feature for the identification of /t/ even in small amounts of noise. Primary events, along with a shared base of perceptual features, are used to discriminate consonants, and characterize the consonant’s degree of robustness.

A verification experiment naturally follows from this analysis to more completely study the impact of a specific truncation, combined with band pass filtering, removing specifically the high frequency /t/ burst. Our strategy would be to further investigate the responses of modified CV syllables from many talkers that have been modified using the Short-Time Fourier transform analysis synthesis, to demonstrate further the impact of modifying the acoustic correlates of events. The implications of such event characterization are multiple. The identification of SNP loss consonant profiles, quantifying hearing impaired losses on a consonant basis, could be an application of event identification; a specifically tuned hearing aid could extract these cues and amplify them on a listener basis resulting in a great improvement of speech identification in noisy environments.

According to certain embodiments, normal hearing listeners’ responses is related to nonsense CV sounds (confusion patterns) presented in speech-weighted noise and white noise, with the audible speech information using an articulation-index spectro-temporal model (AI-gram). Several observations, such as the existence of morphing, or natural robustness utterance variability are derived from the analysis of confusion patterns. Then, the studies emphasize a strong correlation between the noise robustness of consonant /t/ and the its 2-8 kHz noise burst, which characterizes the /t/ primary event (noise-robust feature). Finally, a truncation experiment, removing the burst in low noise conditions, confirms the loss of /t/ recognition when as low as 30 ms of burst are removed. Relating confusion patterns with the audible speech information visible on the AI-gram seems to be a valuable approach to under-stand speech robustness and confusions. The method can be extended to other sounds.

Figure 15:
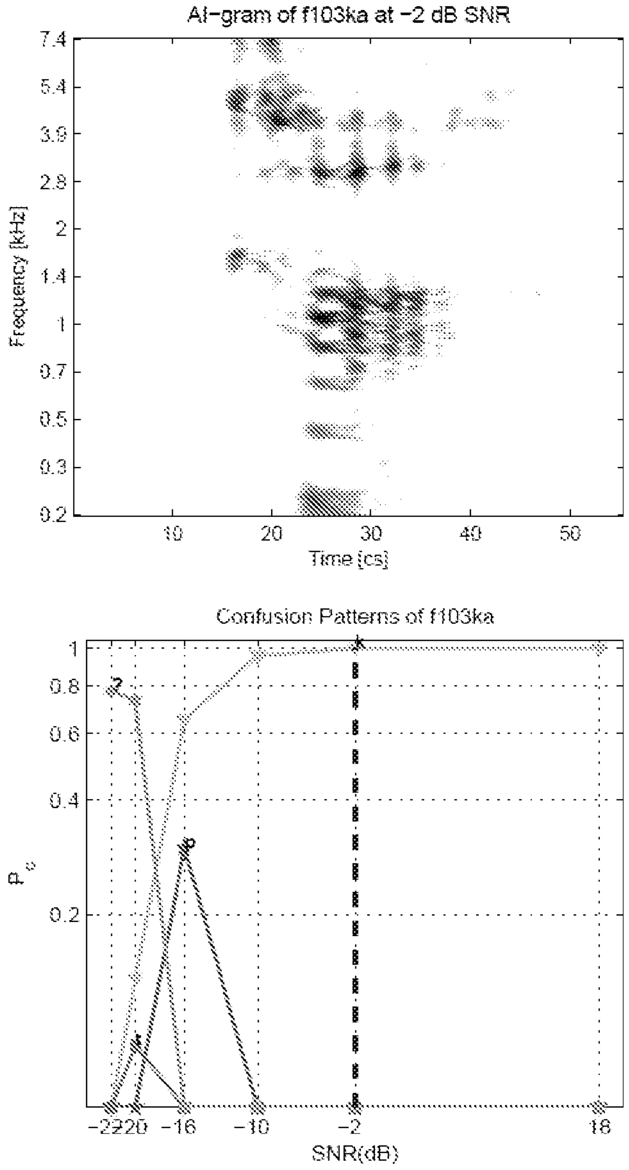
FIG. 15 shows an AI-gram response an associated confusion pattern according to an embodiment of the present invention.
Figure 16:
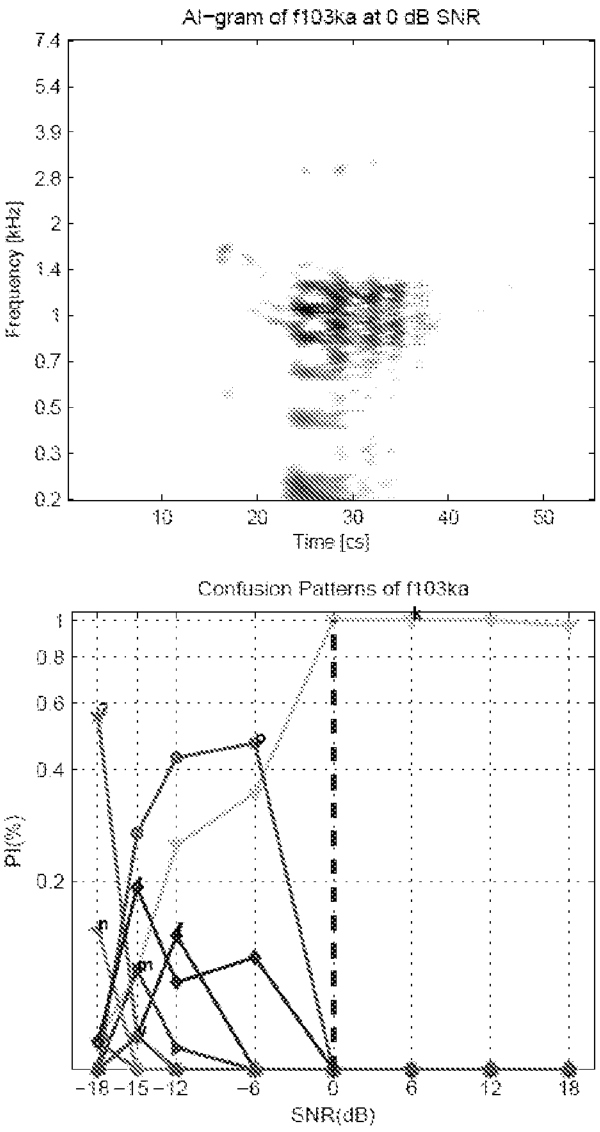
FIG. 16 shows an AI-gram response an associated confusion pattern according to an embodiment of the present invention.

For example, the method may be extended to an analysis of the /k/ event. FIG. 15 shows the AIgram response for a female talker f103 speaking /ka/ presented at 0 dB SNR in speech weighted noise (SWN) and having an added noise level of −2 dB SNR, and the associated confusion pattern (lower panel) according to an embodiment of the invention. FIG. 16 shows an AIgram for the same sound at 0 db SNR and the associated confusion pattern according to an embodiment of the invention. It can be seen that the human recognition score for the two sounds for these conditions is the score is nearly perfect at 0 dB SNR. The sound in FIG. 15 starts being confused with /pa/ at −10 dB SNR while the sound in FIG. 16 is also heard as /pa/ at and below −6 dB SNR. In each drawing, the dashed vertical line shows the SNR threshold, called the confusion threshold, where the scores begin to drop. This threshold is just below −2 dB for SWN, and 0 dB in white noise (WN). When adding white noise, almost all the information above 2 kHz is masked once the SNR reaches 0 dB, as seen in the AIgram in FIG. 16 compared to that shown in FIG. 15. Speech weighted noise does not mask the speech at −2 dB SNR even at the highest shown frequency of 7.4 kHz.

Each of the confusion patterns in FIGS. 15-16 shows a plot of a row of the confusion matrix for /ka/, as a function of the SNR. Because of the large difference in the masking noise above 1 kHz, the perception is very different. In FIG. 15, /k/ is the most likely reported sound, even at −16 dB SNR, where it is reported 65% of the time, with /p/ reported 35% of the time.

When /k/ is masked by white noise, a very different story is found. At and above the confusion threshold at 0 dB SNR, the subjects reported hearing /k/. However starting at −6 dB SNR the subjects reported hearing /p/ 45% of the time, /ka/ 35% of the time, and /ta/ about 15% of the time. At −12 dB the sound is reported as /p/, /k/ /f/ and /t/, as shown on the CP chart. At lower SNRs other sounds are even reported such as /m/, /n/ and /v/. Starting at 15 dB SNR, the sound is frequently not identified, as shown by the symbol "★-?".

As previously described, when a non-target sound is reported with greater probability than the target sound, the reported sound may be referred to as a morph. Frequently, depending on the probabilities, a listener may prime near the crossover point where the two probabilities are similar. When presented with a random presentation, as is done in an experiment, subjects will hear the sounds with probabilities that define the strength of the prime.

Figure 17A:
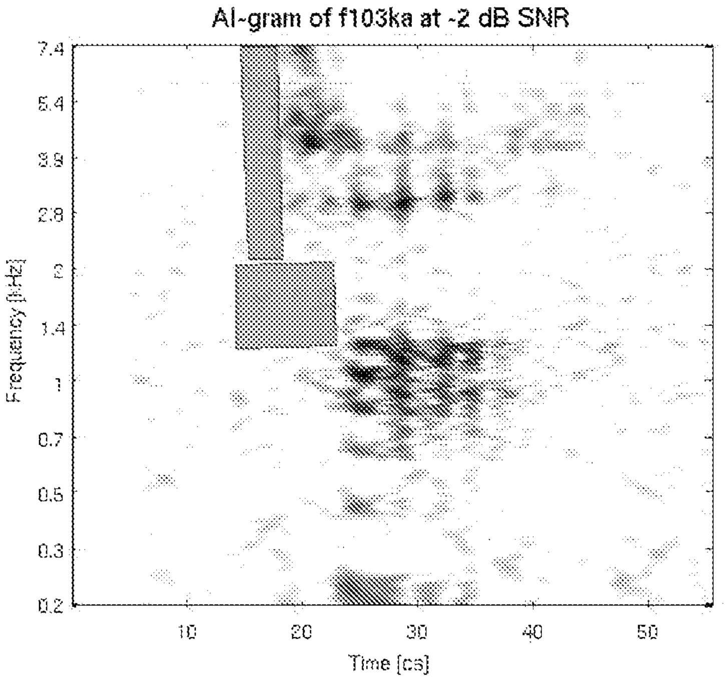
FIGS. 17A-17C show AI-grams illustrating an example of feature identification and modification according to an embodiment of the present invention.
Figure 17B:
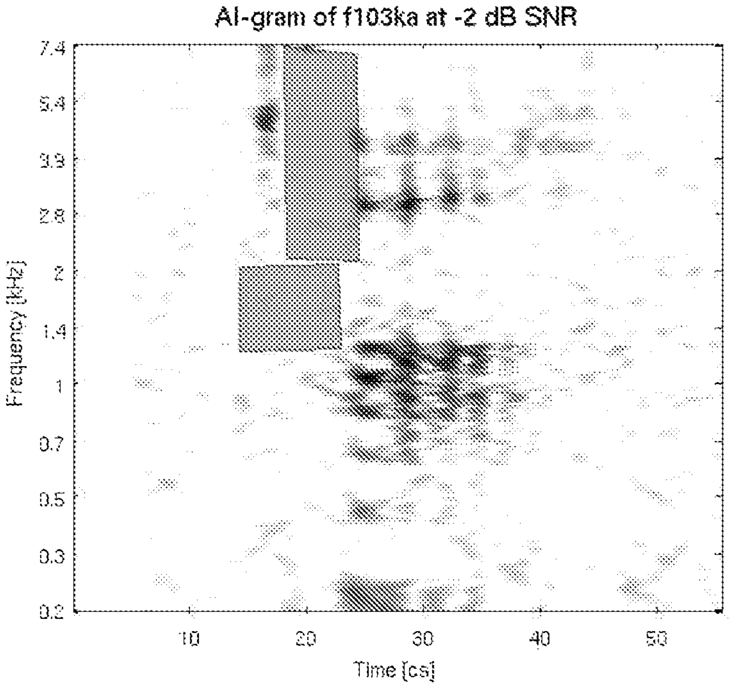
Figure 17C:
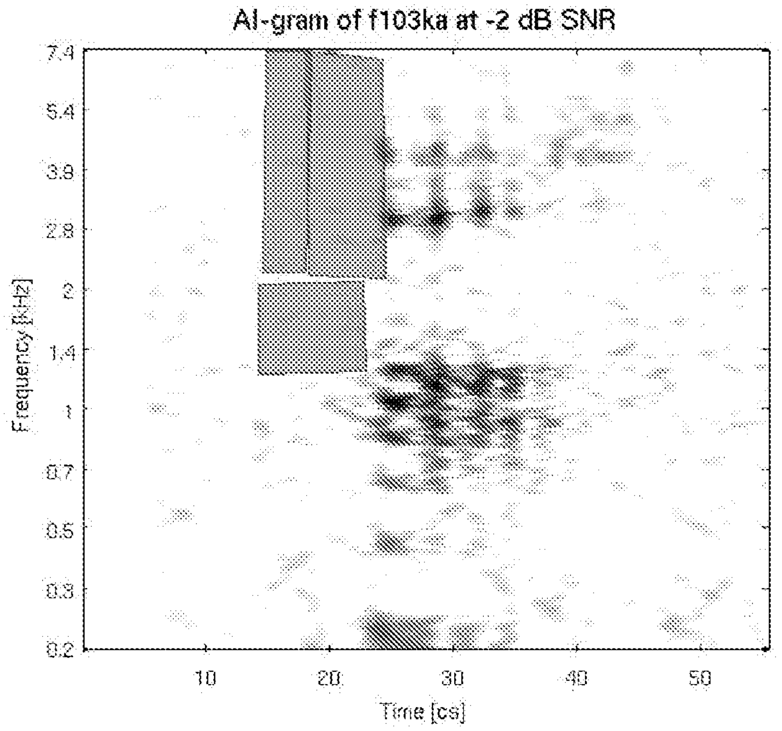

FIGS. 17A-17C show AI-grams for speech modified by removing three patches in the time-frequency spectrum, as shown by the shaded rectangular regions. There are eight possible configurations for three patches. When just the lower square is removed in the region of 1.4 kHz, the percept of /ka/ is removed, and people report (i.e., prime) /pa/ or /ta/, similar to the case of white masking noise of FIGS. 15-16 at −6 dB SNR.

As previously described, such ambiguous conditions may be referred to as primes since a listener may simply "think" of one of these three sounds, and that is the one they will "hear." Under this condition, many people are able to prime. The conditions of priming can be complex, and can depend on the state of the listener's cochlea and auditory system.

When the mid-frequency and the first high frequency patch is removed, as shown in FIG. 17A, the sound /pa/ is robustly reported. When the short duration residual /t/ burst above 2 kHz is removed, the sound no longer primes and /p/ is robustly heard. When the second high frequency longer duration patch shown in the middle panel is removed, the high frequency short duration /t/ burst remains, and the sound is reported as /ta/. Finally when both high frequency patches are removed, as shown in FIG. 17C, /fa/ is reported. If the low frequency /k/ burst is left on, and either or both of the high frequency patches is either on or off, /ka/ is heard.

Thus we conclude that the presence of the 1.4 kHz burst both triggers the /k/ report, and renders the /t/ and /p/ bursts either inaudible, via the upward spread of masking ("USM," defined as the effect of a low frequency sound reducing the magnitude of a higher frequency sound), or irrelevant, via some neural signal processing mechanism. It is believed that the existence of a USM effect may make high frequency sounds unreliable when present with certain low frequency sounds. The auditory system, knowing this, would thus learn to ignore these higher frequency sounds under these certain conditions.

Figure 18A:
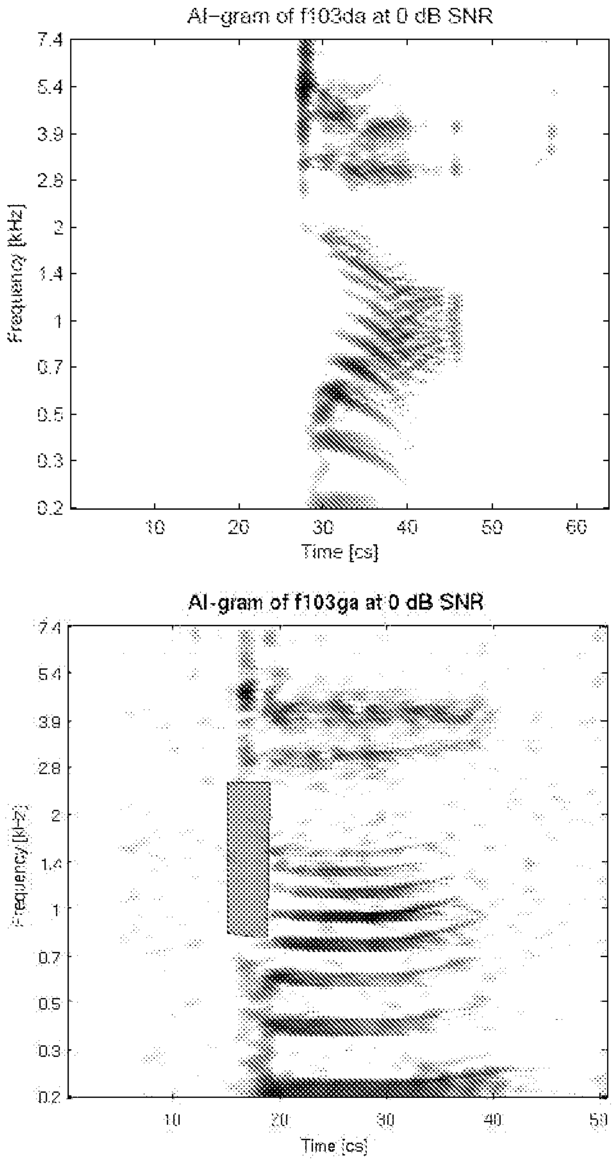
FIGS. 18A-18B show AI-grams illustrating an example of feature identification and modification according to an embodiment of the present invention.
Figure 18B:
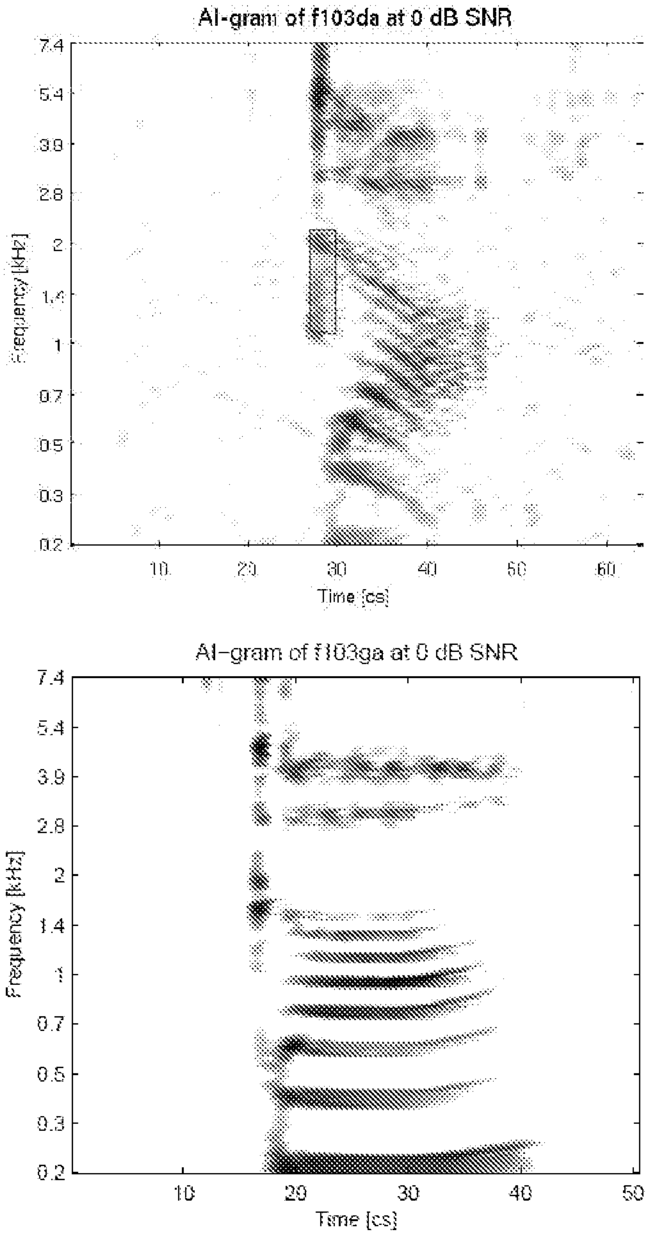

It has also been found that the consonants /ba/, /da/ and /ga/ are very close to /pa/, /ta/, /ka/. The main difference is the delay between the burst release and the start of the sonerate portion of the speech sound. For example, FIG. 18B shows a /da/ sound in top panel. The high frequency burst is similar to the /t/ burst of FIG. 17B, and as more fully described by Regnier and Allen (2007), just as a /t/ may be converted to a /k/ by adding a mid-frequency burst, the /d/ sound may be converted to /g/ using the same method. This is shown in FIG. 18B (top panel). By scaling up the low-level noise to become an audible mid-frequency burst, the natural /da/ is heard as /ga/. In the lower two panels of FIGS. 18A-B, a progression from a natural /ga/ (FIG. 18B, lower panel) to a /da/ (FIG. 18A, lower panel) is shown. As with /ka/, when a low frequency burst is added to the speech, the high frequency burst can become masked. This is easily shown by comparisons of the real or synthetic /ka/ or /ga/, with and with the 2-8 kHz /ta/ or /da/ burst removed.

Figure 19A:
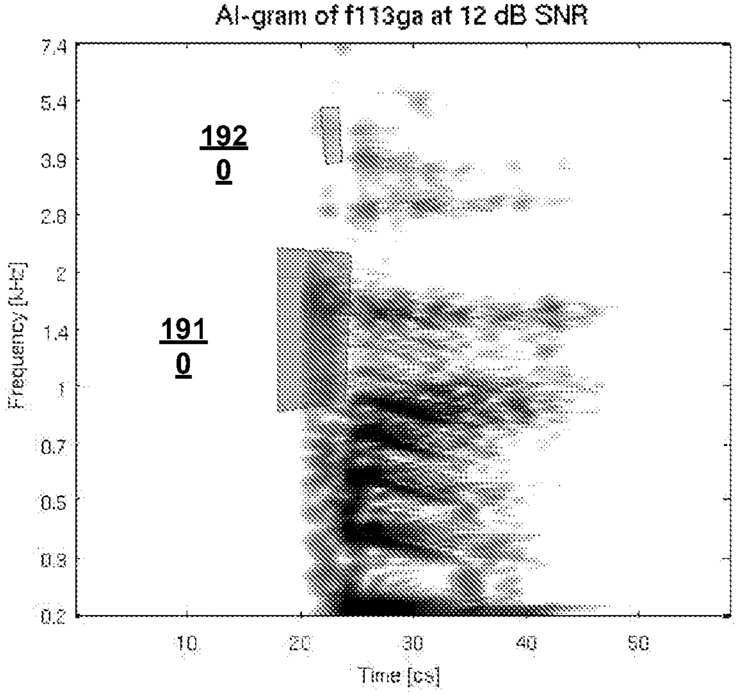
FIGS. 19A-19B show AI-grams illustrating an example of feature identification and modification according to an embodiment of the present invention.
Figure 19B:
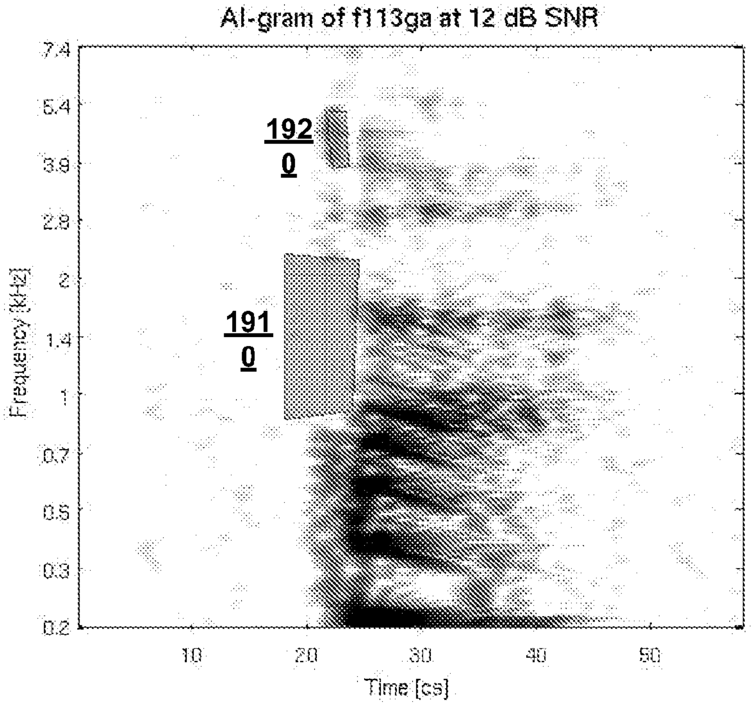

Under some conditions when the mid-frequency boost is removed there is insufficient high-frequency energy for the labeling of a /d/. FIGS. 19A-B show such a case, where the mid-frequency burst was removed from the natural /ga/ and /Tha/ or /Da/ was heard. A 12 dB boost of the 4 kHz region was sufficient to convert this sound to the desired /da/. FIG. 19A shows the unmodified AI-gram. FIG. 19B shows the modified sound with the removed mid-frequency burst 1910 in the 1 kHz region, and the added expected high-frequency burst 1920 at 4 kHz, which comes on at the same time as the vocalic part of the speech. FIG. 19A includes the same regions as identified in FIG. 19B for reference.

Figure 20:
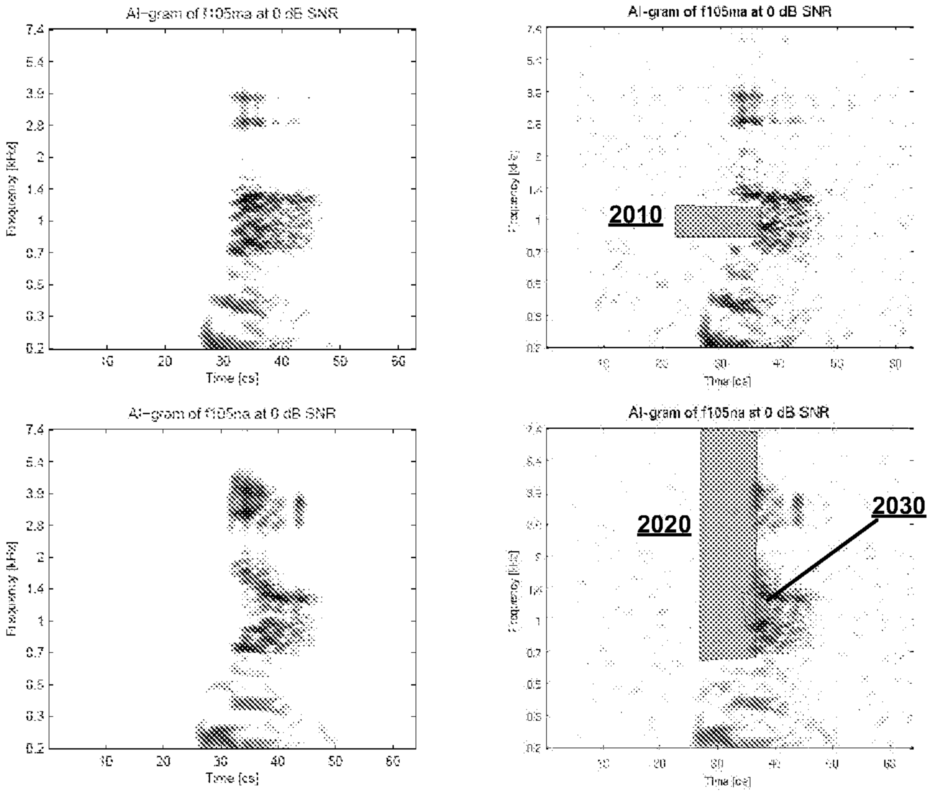
FIG. 20 shows AI-grams illustrating an example of feature identification and modification according to an embodiment of the present invention.

A similar relationship has been identified for the high confusions between /m/ and /n/. In this case the distinction is related to a mid-frequency timing distinction. This is best described using an example, as shown in FIG. 20. The top left panel shows the AIgram of /ma/ spoken by female talker 105, at 0 dB SNR. The lower left panel shows the AIgram of the same talker for /na/, again at 0 dB SNR. In both cases the masker is SWN. For the case of /m/ as the lips open, the sound is abruptly released, whereas for the case of /n/, as the tongue leaves the soft pallet (velum), the length of the vocal tract changes over a time-span of some 10 ms, causing the resonant vocal tract frequencies (formants) to change with time. This induces a time delay in the mid frequency range, at 1 kHz in this example. It has been found that that a major noise-robust cue for the distinction between /m/ and /n/ is this mid-frequency timing difference. When a delay is artificially introduced at 1 kHz, the /m/ is heard as /n/, and when the delay is removed either by truncation or by filling in the onset, the /n/ is heard as /m/. The introduction of the 1 kHz delay is created by zeroing the shaded region 2010 in the upper-right panel. To remove the delay, the sound was zeroed as shown by the shaded region 2020 in the lower right. In this case it was necessary to give a 14 dB boost in the small patch 2030 at 1 kHz. Without this boost, the onset was not well defined and the sound was not widely heard as /m/. With the boost, a natural /m/ is robustly heard.

Figure 21:
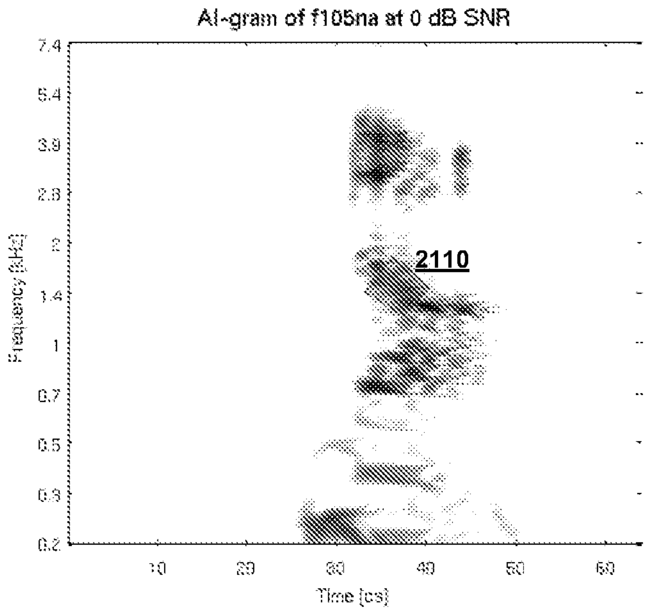
FIG. 21 shows AI-grams illustrating an example of feature identification and modification according to an embodiment of the present invention.
Figure 21:
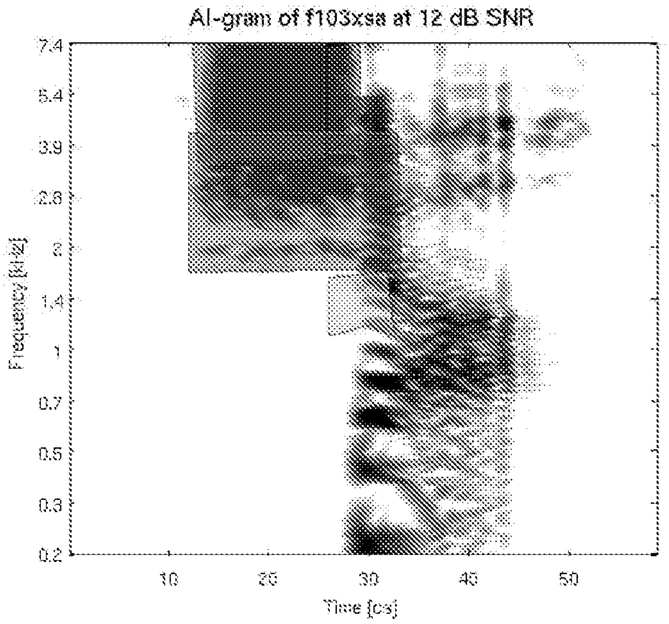

Other relationships may be identified. For example, FIG. 21 shows modified and unmodified AI-grams for a /sha/ utterance. In top panel, the F2 forman transition was removed, as indicated by the shaded region 2110. In direct comparisons, subjects were unable to identify which has the removed formant region relative to the natural sound. In the lower panel, the utterance is /sha/. There are four shaded regions corresponding to regions that were removed. When a first region from 10-35 cs and 2.5-4 kHz is removed, the sound is universally reported as /sa/. When this bandlimed region is shortened from its natural duration of 15-25 cs, down to 26-28 cs, the sound is reported as either /za/ or /tha/. Finally when the three regions are all remove, leaving only a very short burst from 30-32 cs and 4-5.4 kHz, the sound is heard as /da/. When the region around 30 cs, between 1.2-1.5 kHz, is amplified by 14 dB (a gain of 5 times), the sound is usually heard as /ga/.

6. Feature Detection Using Time and Frequency Measures

As previously described, speech sounds may be modeled as encoded by discrete time-frequency onsets called features, based on analysis of human speech perception data. For example, one speech sound may be more robust than another because it has stronger acoustic features. Hearing-impaired people may have problems understanding speech because they cannot hear the weak sounds whose features are missing due to their hearing loss or a masking effect introduced by non-speech noise. Thus the corrupted speech may be enhanced by selectively boosting the acoustic features. According to embodiments of the invention, one or more features encoding a speech sound may be detected, described, and manipulated to alter the speech sound heard by a listener. To manipulate speech a quantitative method may be used to accurately describe a feature in terms of time and frequency According to embodiments of the invention, a systematic psychoacoustic method may be utilized to locate features in speech sounds. To measure the contribution of multiple frequency bands and different time intervals to the correct recognition of a certain sound, the speech stimulus is filtered in frequency or truncated in time before being presented to normal hearing listeners. Typically, if the feature is removed, the recognition score will drop dramatically.

Two experiments, designated HL07 and TR07, were performed to determine the frequency importance function and time importance function. The two experiments are the same in all aspects except for the conditions.

HL07 is designed to measure the importance of each frequency band on the perception of consonant sound. Experimental conditions include 9 low-pass filtering, 9 high-pass filtering and 1 full-band used as control condition. The cutoff frequencies are chosen such that the middle 6 frequencies for both high-pass and low-pass filtering overlap each other with the width of each band corresponds to an equal distance on the basilar membrane.

TR07 is designed to measure the start time and end time of the feature of initial consonants. Depending on the duration of the consonant sound, the speech stimuli are divided into multiple non-overlapping frames from the beginning of the sound to the end of the consonant, with the minimum frame width being 5 ms. The speech sounds are frontal truncated before being presented to the listeners.

FIGS. 22A-22D show an example of identifying the /ka/ feature by using the afore-mentioned method of measuring recognition scores of time-truncated or high/low-pass filtered speech. It is found that the recognition score of /ka/ changes dramatically when t=18 cs and f=1.6 kHz, thus indicating the position of the /ka/ feature.

FIG. 22A shows an AI-gram of /ka/ (by talker f103) at 12 dB SNR; FIGS. 22B, 22C, and 22D show recognition scores of /ka/, denoted by $S_T$, $S_L$, and $S_H$, as functions of truncation time and low/high-pass cutoff frequency, respectively. These values are explained in further detail below.

Let $S_T$, $S_L$, and $S_H$ denote the recognition scores of /ka/ as a function of truncation time and low/high-pass cutoff frequency respectively. The time importance function is defined as $$IT(t)=s_T. \tag{1}$$

The frequency importance function is defined as $$IF_H(f)=\log_{e0}(1-s_H^{(k+1)})-\log_{e0}(1-s_H^{(k)}) \text{ for high-pass data} \tag{2}$$

and $$IF_L(f)=\log_{e0}(1-s_L^{(k)})-\log_{e0}(1-s_L^{(k+1)}) \text{ for low-pass data} \tag{3}$$

where $s_L^{(k)}$ and $s_H^{(k)}$ denotes the recognition score at the kth cutoff frequency. The total frequency importance function is the average of $IF_H$ and $IF_L$.

Figure 23:
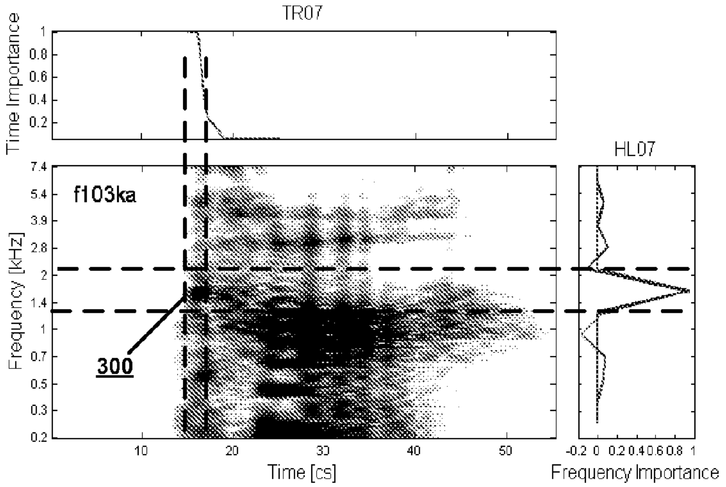
FIG. 23 shows the time and frequency importance functions of an example speech sound according to an embodiment of the present invention.

Based on the time and frequency importance function, the feature of the sound can be detected by setting a threshold for the two functions. As an example, FIG. 23 shows the time and frequency importance functions of /ka/ by talker f103. These functions can be used to locate the /ka/ feature in the corresponding AI-gram, as shown by the identified region 300. Similar analyses may be performed for other utterances and corresponding AI-grams.

According to an embodiment of the invention, the time and frequency importance functions for an arbitrary utterance may be used to locate the corresponding feature.

7. Experiments

A. Subjects

HL07

Nineteen normal hearing subjects were enrolled in the experiment, of which 6 male and 12 female listeners finished. Except for one subject in her 40s, all the subjects were college students in their 20s. The subjects were born in the U.S. with their first language being English. All students were paid for their participation. IRB approval was attained for the experiment.

TR07

Nineteen normal hearing subjects were enrolled in the experiment, of which 4 male and 15 female listeners finished. Except for one subject in her 40s, all the subjects were college students in their 20s. The subjects were born in the U.S. with their first language being English. All students were paid for their participation. IRB approval was attained for the experiment.

B. Speech Stimuli

HL07 & TR07

In this experiment, we used the 16 nonsense CVs /p, t, k, f, T, s, S, b, d, g, v, D, z, Z, m, n/+ vowel /a/. A subset of wide-band syllables sampled at 16,000 Hz were chosen from the LDC-2005S22 corpus. Each CV has 18 talkers. Among which only 6 utterances, half male and half female, were chosen for the test in order to reduce the total length of the experiment. The 6 utterances were selected such that they were representative of the speech material in terms of confusion patterns and articulation score based on the results of similiar speech perception experiment. The speech sounds were presented to both ears of the subjects at the listener's Most Comfortable Level (MCL), within 75-80 dB SPL.

C. Conditions

HL07

The subjects were tested under 19 filtering conditions, including one full-band (250-8000 Hz), nine high-pass and nine low-pass conditions. The cut-off frequencies were calculated by using Greenwood inverse function so that the full-band frequency range was divided into 12 bands, each has an equal length on the basilar membrane. The cut-off frequencies of the high-pass filtering were 6185, 4775, 3678, 2826, 2164, 1649, 1250, 939, and 697 Hz, with the upper-limit being fixed at 8000 Hz. The cut-off frequencies of the low-pass filtering were 3678, 2826, 2164, 1649, 1250, 939, 697, 509, and 363 Hz, with the lower-limit being fixed at 250 Hz. The high-pass and low-pass filtering shared the same cut-off frequencies over the middle frequency range that contains most of the speech information. The filters were 6th order elliptical filter with skirts at −60 dB. To make the filtered speech sound more natural, white noise was used to mask the stimuli at the signal-to-noise ratio of 12 dB.

TR07

The speech stimuli were frontal truncated before being presented to the listeners. For each utterance, the truncation starts from the beginning of the consonant and stops at the end of the consonant. The truncation times were selected such that the duration of the consonant was divided into non-overlapping intervals of 5 or 10 ms, depending on the length of the sound.

D. Procedure

HL07 & TR07

The speech perception experiment was conducted in a sound-proof booth. Matlab was used for the collection of the data. Speech stimuli were presented to the listeners through Sennheisser HD 280-pro headphones. Subjects responded by clicking on the button labeled with the CV that they thought they heard. In case the speech was completely masked by the noise, or the processed token didn't sound like any of the 16 consonants, the subjects were instructed to click on the "Noise Only" button. The 2208 tokens were randomized and divided into 16 sessions, each lasts for about 15 mins. A mandatory practice session of 60 tokens was given at the beginning of the experiment. To prevent fatigue the subjects were instructed to take frequent breaks. The subjects were allowed to play each token for up to 3 times. At the end of each session, the subject's test score, together with the average score of all listeners, were shown to the listener for feedback of their relative progress.

Figure 24:
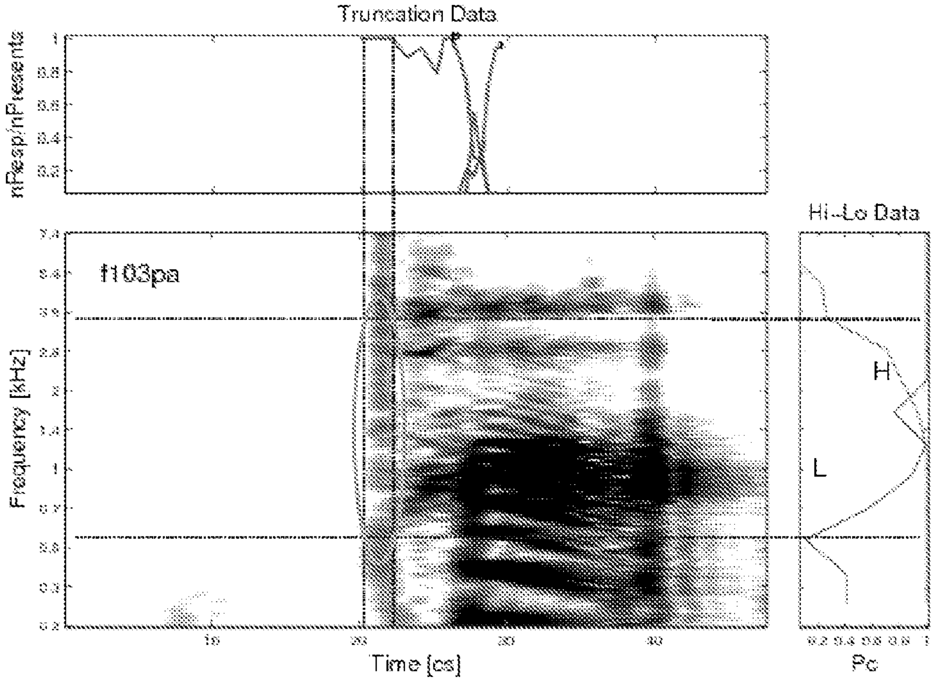
FIG. 24 shows an example of feature identification of the /pa/ speech sound according to embodiments of the present invention.
Figure 25:
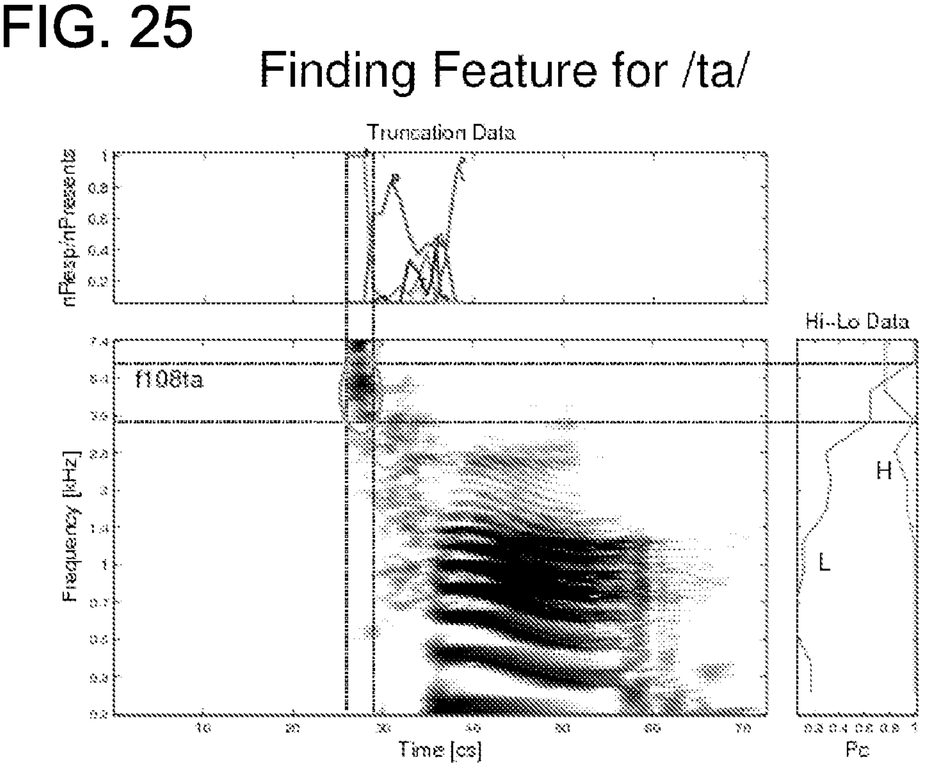
FIG. 25 shows an example of feature identification of the /ta/ speech sound according to embodiments of the present invention.
Figure 26:
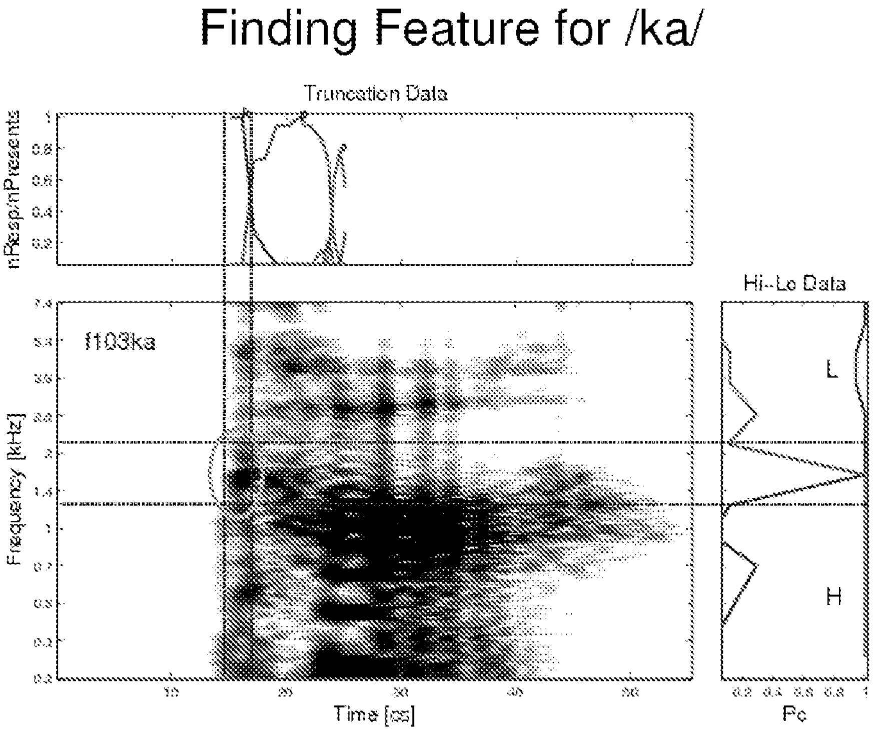
FIG. 26 shows an example of feature identification of the /ka/ speech sound according to embodiments of the present invention.
Figure 27:
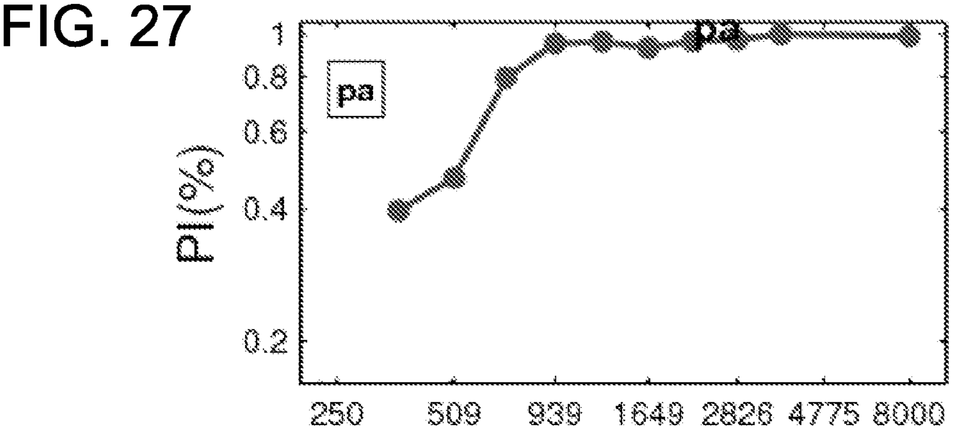
FIG. 27 shows the confusion patterns related to the speech sound in FIG. 24 according to embodiments of the present invention.
Figure 28:
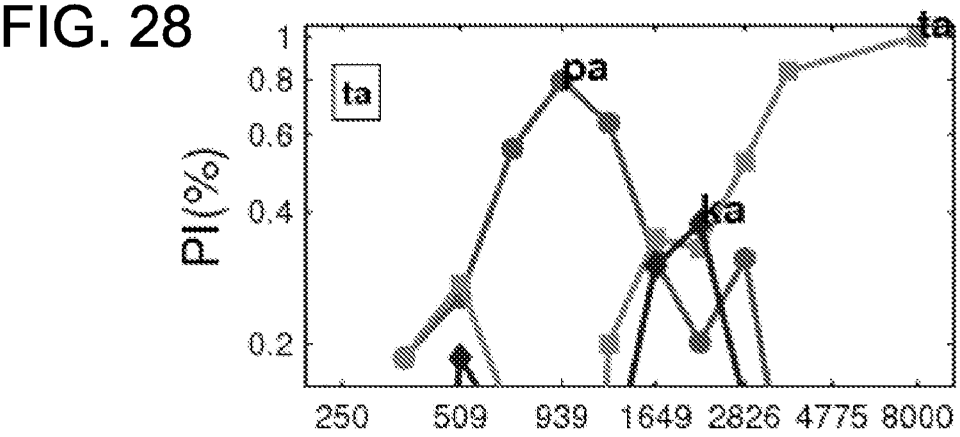
FIG. 28 shows the confusion patterns related to the speech sound in FIG. 25 according to embodiments of the present invention.
Figure 29:
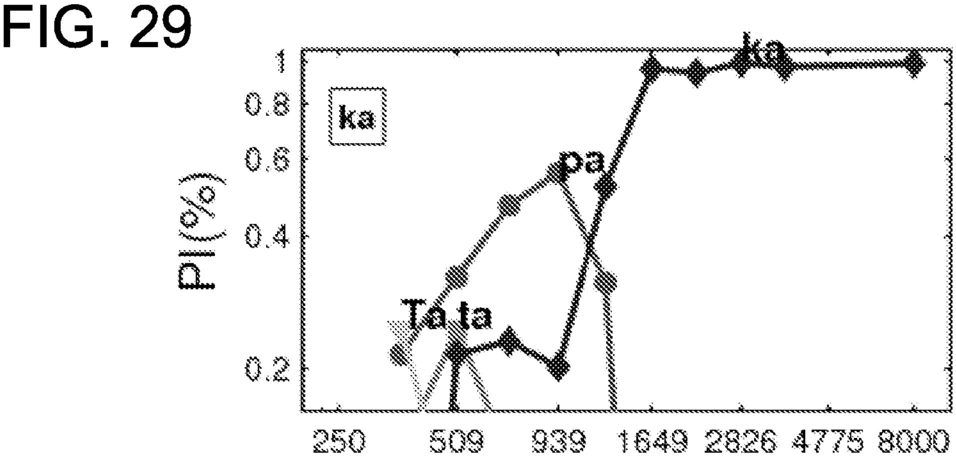
FIG. 29 shows the confusion patterns related to the speech sound in FIG. 26 according to embodiments of the present invention.

Examples of feature identification according to an embodiment of the invention are shown in FIGS. 24-26, which illustrate feature identification of /pa/, /ta/, and /ka/, respectively. FIGS. 27-29 show the confusion patterns for the three sounds. As shown, the /pa/ feature ([0.6 kHz, 3.8 kHz]) is in the middle-low frequency, the /ta/ feature ([3.8 kHz, 6.2 kHz]) is in the high frequency, and the /ka/ feature ([1.3 kHz, 2.2 kHz]) is in the middle frequency. Further, when the /ta/ feature is destroyed by LPF, it morphs to /ka, pa/ and when the /ka/ feature is destroyed by LPF, it morphs to /pa/.

Figure 30:
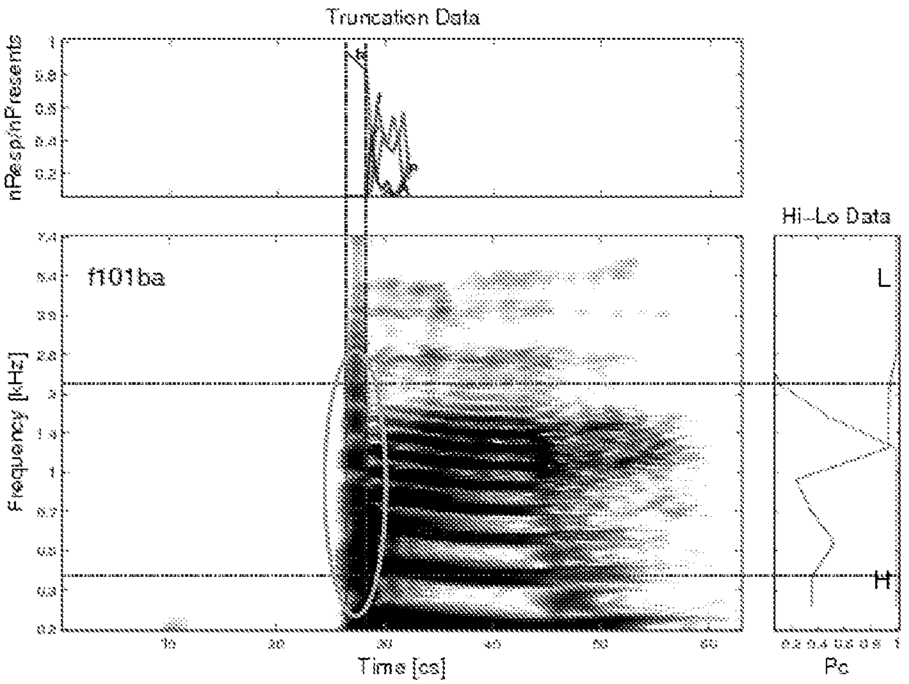
FIG. 30 shows an example of feature identification of the /ba/ speech sound according to embodiments of the present invention.
Figure 31:
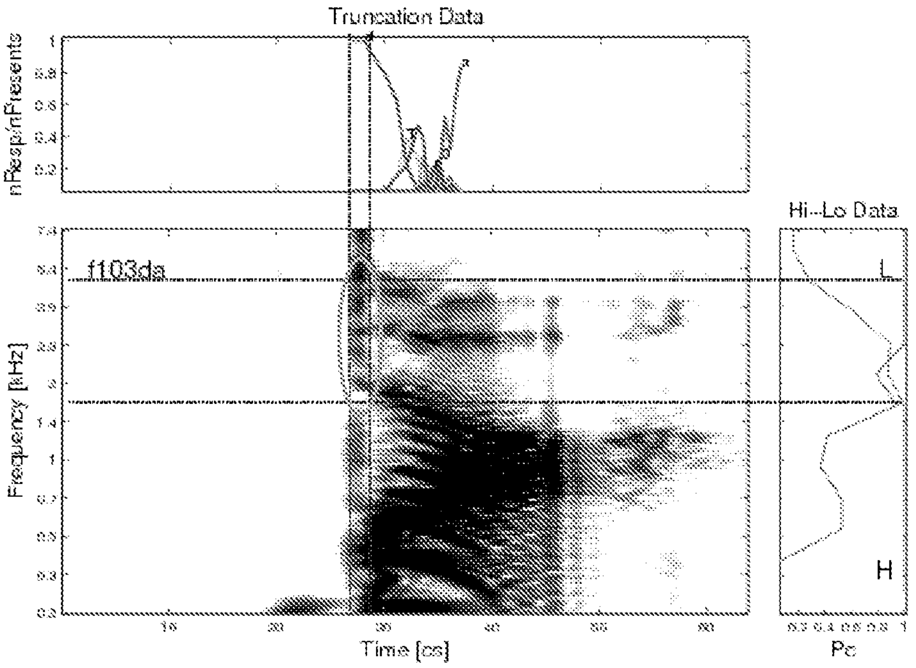
FIG. 31 shows an example of feature identification of the /da/ speech sound according to embodiments of the present invention.
Figure 32:
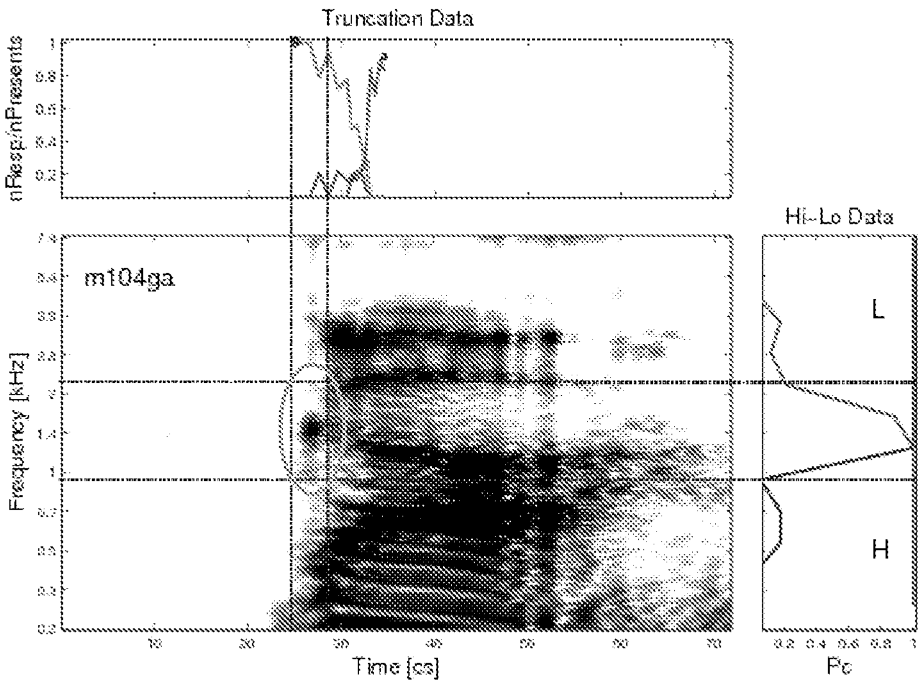
FIG. 32 shows an example of feature identification of the /ga/ speech sound according to embodiments of the present invention.
Figure 33:
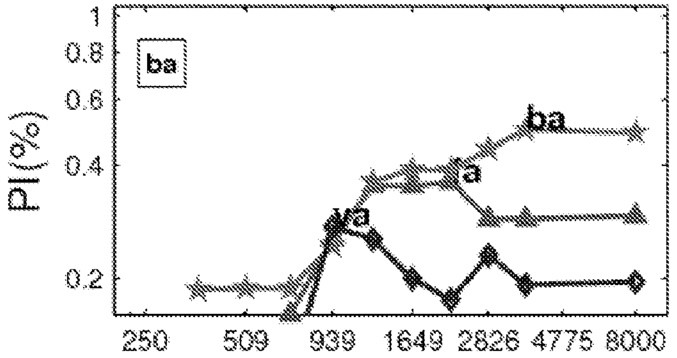
FIG. 33 shows the confusion patterns related to the speech sound in FIG. 30 according to embodiments of the present invention.
Figure 34:
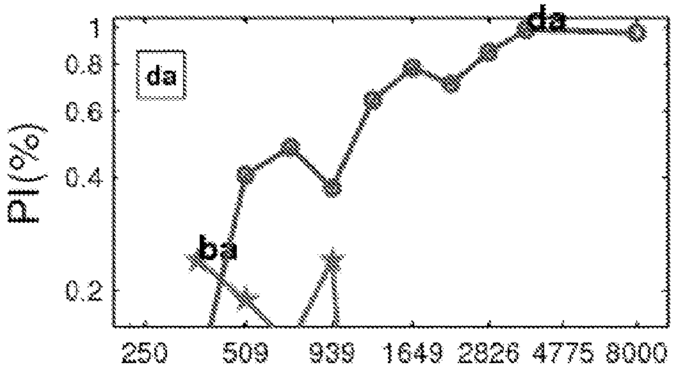
FIG. 34 shows the confusion patterns related to the speech sound in FIG. 31 according to embodiments of the present invention.
Figure 35:
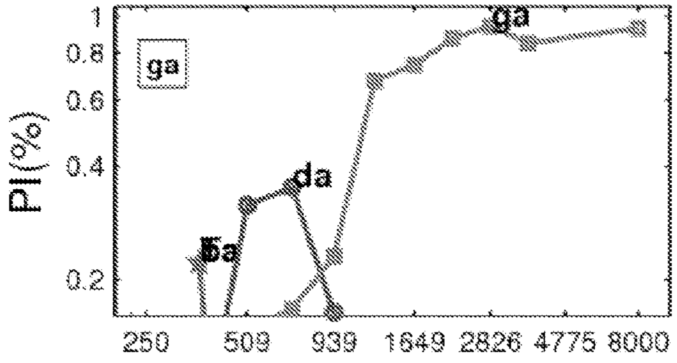
FIG. 35 shows the confusion patterns related to the speech sound in FIG. 32 according to embodiments of the present invention.

Additional examples of feature identification according to an embodiment of the invention are shown in FIGS. 30-32, which illustrate feature identification of /ba/, /da/, and /ga/, respectively. FIGS. 33-35 show the associated confusion patterns. The /ba/ feature ([0.4 kHz, 2.2 kHz]) is in the middle-low frequency, the /da/ feature ([2.0 kHz, 5.0 kHz]) is in the high frequency, and the /ga/ feature ([1.2 kHz, 1.8 kHz]) is in the middle frequency. When the /ga/ feature is destroyed by LPF, it morphs to /da/, and when /da/ feature is destroyed by LPF, it morphs to /ba/.

Additional examples of AI-grams and the corresponding truncation and hi-lo data are shown in FIGS. 49-64, which show AI-grams for /pa/, /ta/, /ka/, /fa/, /Ta/, /sa/, /Sa/, /ba/, /da!, /ga/, /va/, /Da/, /za/, /Za/, /ma/, and /na/ for several speakers. Results and techniques such as those illustrated in FIGS. 24-35 and 49-64 can be used to identify and isolate features in speech sounds. According to embodiments of the invention, the features can then be further manipulated, such as by removing, altering, or amplifying the features to adjust a speech sound.

The data and conclusions described above may be used to modify detected or recorded sounds, and such modification may be matched to specific requirements of a listener or group of listeners. As an example, experiments were conducted in conjunction with a hearing impaired (HI) listener who has a bilateral moderate-to-severe hearing loss and a cochlear dead region around 2-3 kHz in the left ear. A speech study indicated that the listener has difficulty hearing /ka/ and /ga/, two sounds characterized by a small mid-frequency onset, in both ears. Notably, NAL-R techniques have no effect for these two consonants.

Figure 36A:
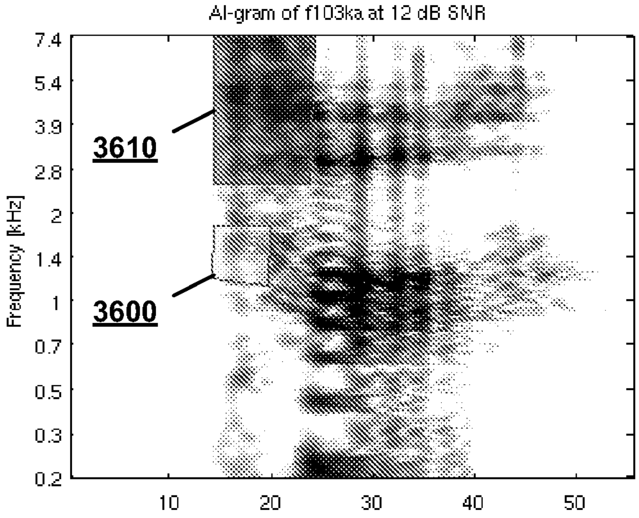
FIGS. 36A-36B show AI-grams of various generated super features according to an embodiment of the present invention.
Figure 36B:
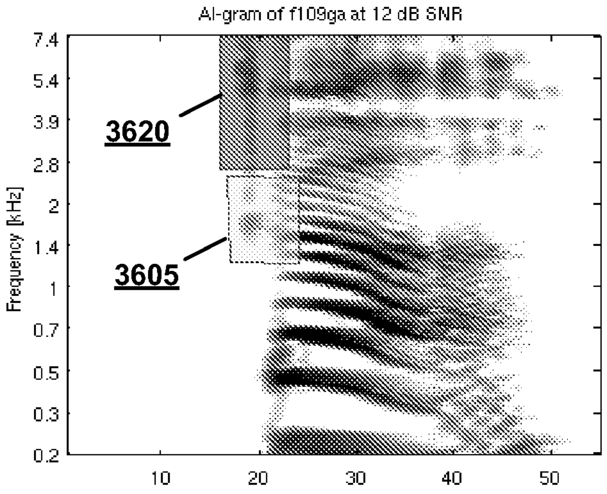
Figure 42:
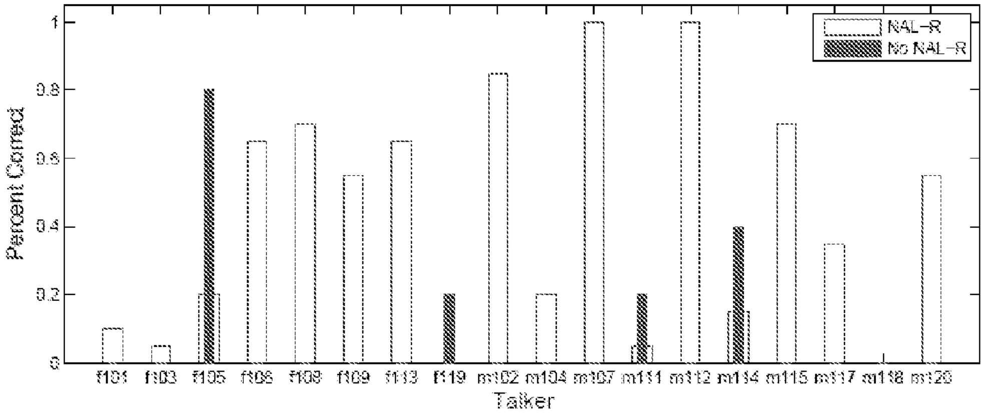
FIGS. 42-47 show experimental results used to identify natural strong /ka/s and /ga/s according to an embodiment of the present invention.
Figure 42:
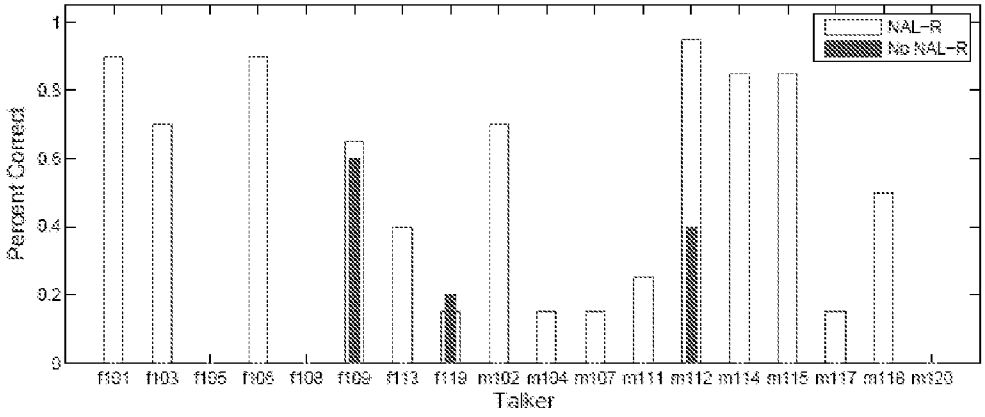
Figure 43:
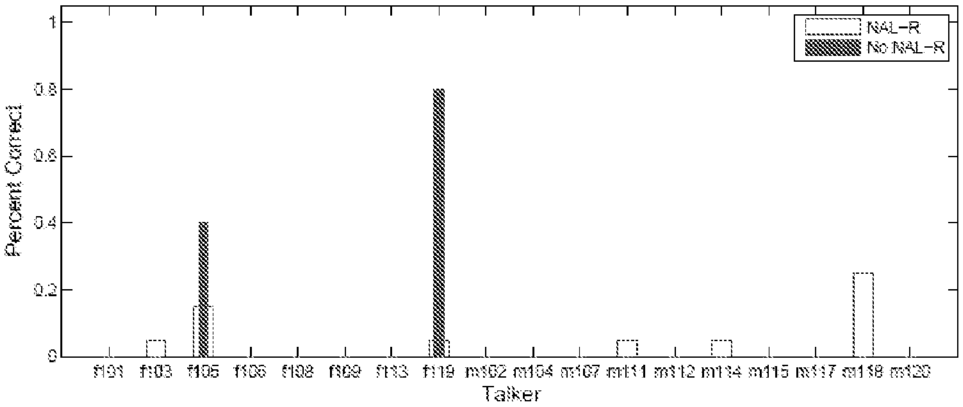
Figure 43:
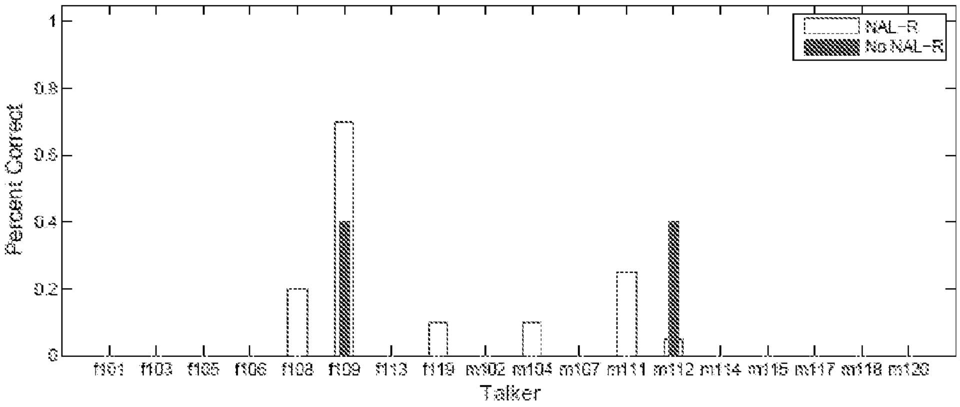
Figure 44:
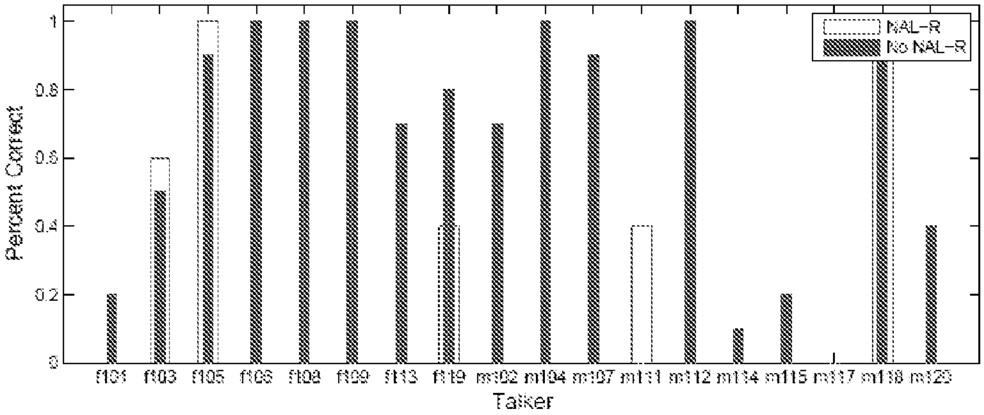
Figure 44:
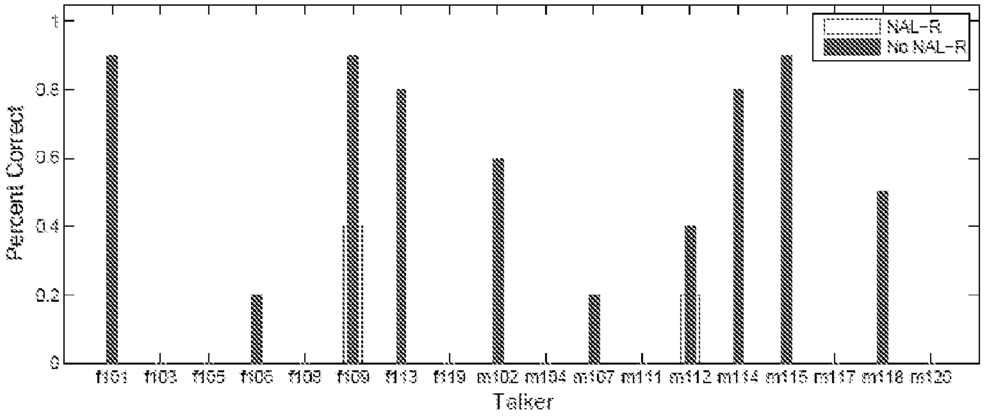
Figure 45:
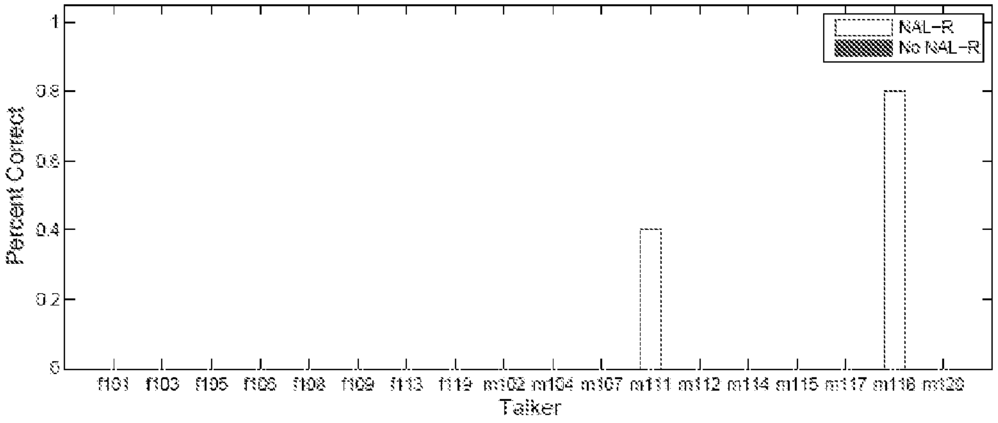
Figure 45:
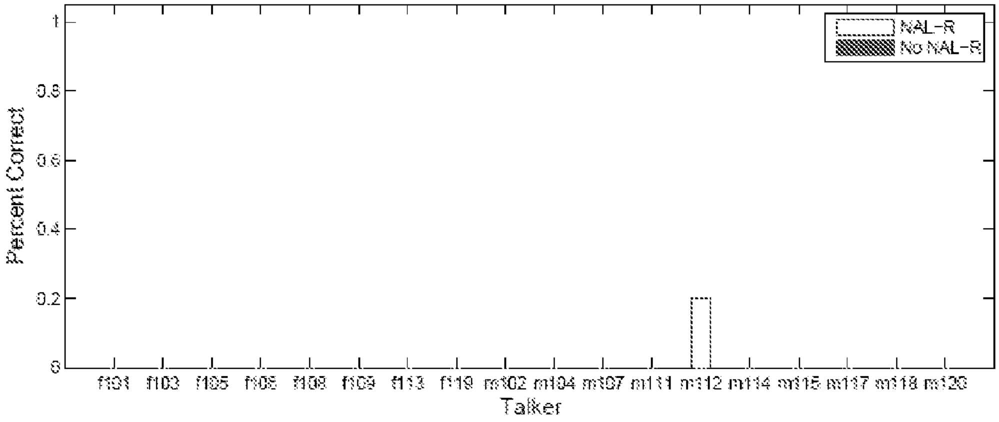
Figure 46:
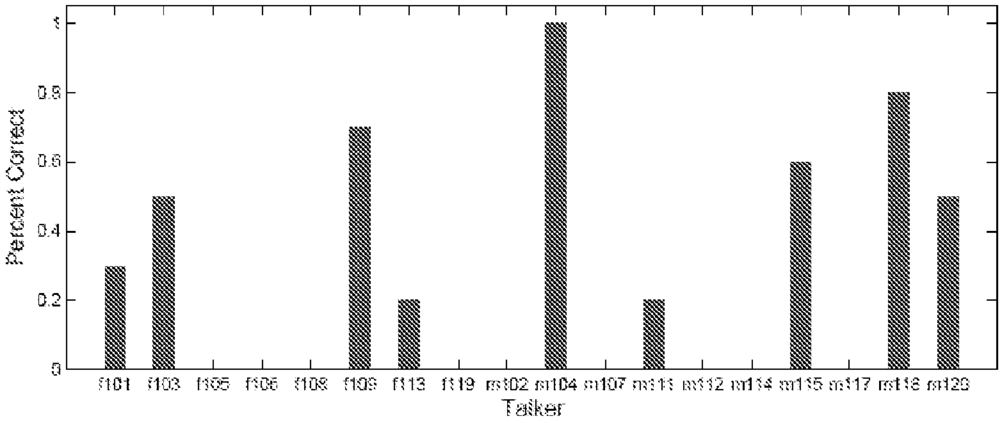
Figure 46:
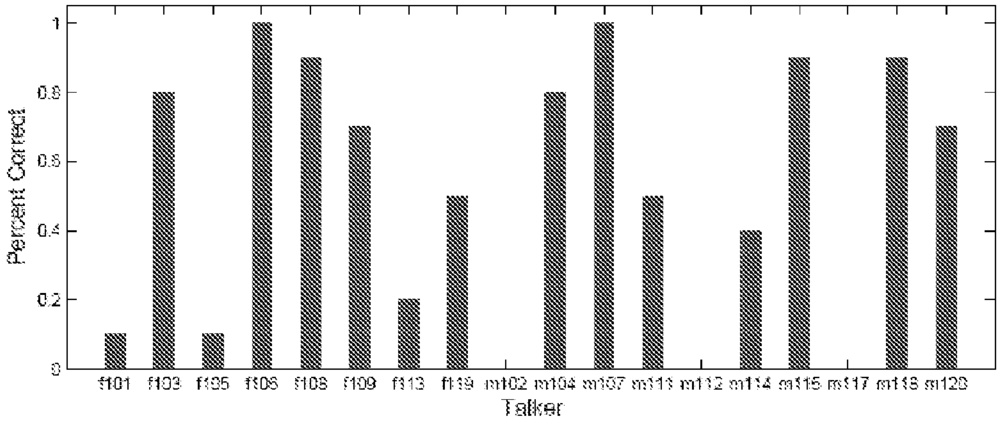
Figure 47:
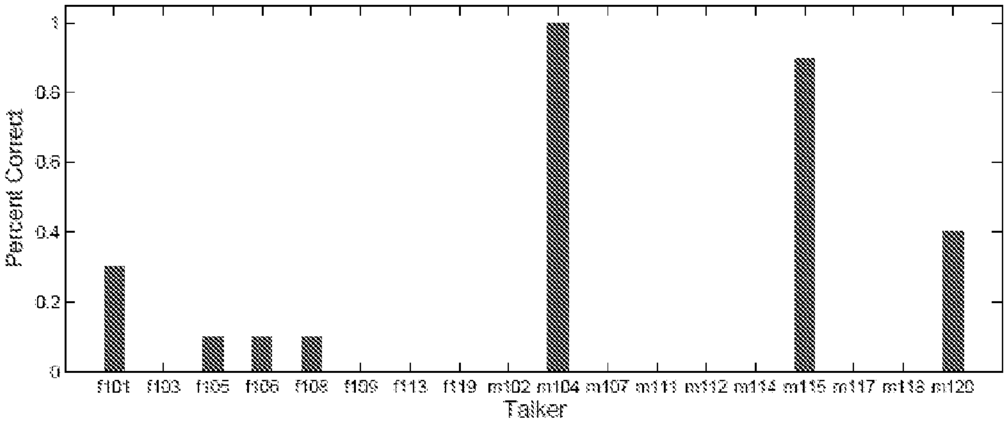
Figure 47:
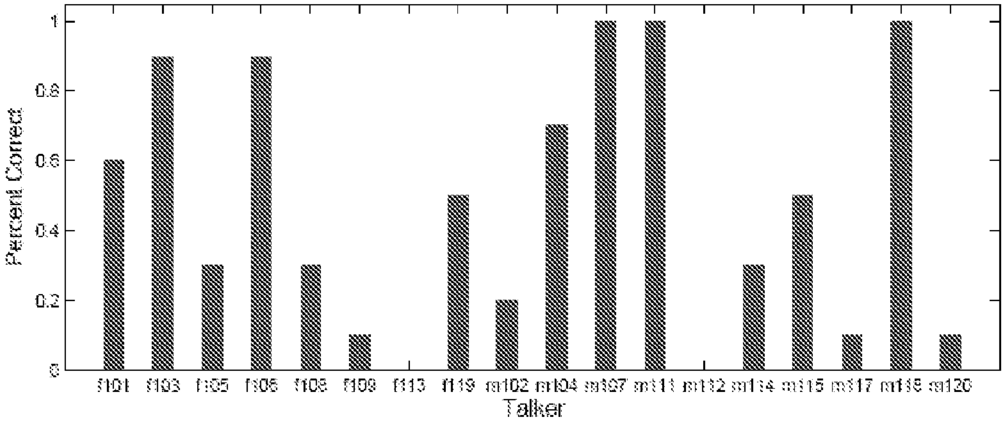

Using the knowledge obtained by the above feature analysis method, "super" /ka/s and /ga/s were created in which a critical feature of the sound is boosted while an interfering feature is removed or reduced. FIGS. 36A-B show AI-grams of the generated /ka/s and /ga/s. The critical features for /ka/ 3600 and /ga/ 3605, interfering /ta/ feature 3610, and interfering /da/ feature 3620 are shown.

It was found that that for the subject's right ear removing the interfering /t/ or /d/ feature reduces the /k-t/ and /g-d/ confusion considerably under both conditions, and feature boosting increased /k/ and /g/ scores by about 20% (6/30) under both quiet and 12 dB SNR conditions. It was found that the same technique may not work as well for her left ear due to a cochlear dead region from 2-3 kHz in the left ear, which counteracts the feature boosting. FIGS. 37A-37B show confusion matrices for the left ear, and FIGS. 37C-37D show confusion matrices for the right ear. In FIGS. 37A-D, "ka−t+x" refers to a sound with the interfering /t/ feature removed and the desired feature /k/ boosted by a factor of x.

According to an embodiment of the invention, a super feature may be generated using a two-step process. Interfering cues of other features in a certain frequency region may be removed, and the desired features may be amplified in the signal. The steps may be performed in either order. As a specific example, for the sounds in the example above, the interfering cues of /ta/ 3710 and /da/ 3720 may be removed from or reduced in the original /ka/ and /ga/ sounds. Also, the desired features /ka/ 3700 and /ga/ 3705 may be amplified.

Another set of experiments was performed with regard to two subjects, AS and DC. It was determined that subject AS experiences difficulty in hearing and/or distinguishing /ka/ and /ga/, and subject DC has difficulty in hearing and/or distinguishing /fa/ and /va/. An experiment was performed to determine whether the recognition scores for the subjects may be improved by manipulation of the features. Multiple rounds were conducted:

Round-1 (EN-1): The /ka/s and /ga/s are boosted in the feature area by factors of [0, 1, 10, 50] with and without NAL-R; It turns out that the speech are distorted too much due to the too-big boost factors. As a consequence, the subject had a score significantly lower for the enhanced speech than the original speech sounds. The results for Round 1 are shown in FIGS. 38A-B.

Round-2 (EN-2): The /ka/s and /ga/s are boosted in the feature area by factors of [1, 2, 4, 6] with NAL-R. The subject show slight improvement under quiet condition, no difference at 12 dB SNR. Round 2 results are shown in FIG. 39.

Round-3 (RM-1): Previous results show that the subject has some strong patterns of confusions, such as /ka/ to /ta/ and /ga/ to /da/. To compensate, in this experiment the high-frequency region in /ka/s and /ga/s that cause the afore-mentioned morphing of /ta/ and /da/were removed. FIG. 40 shows the results obtained for Round 3.

Round-4 (RE-1): This experiment combines the round-2 and round-3 techniques, i.e, removing /ta/ or /da/ cues in /ka/ and /ga/ and boosting the /ka/, /ga/ features. Round 4 results are shown in FIGS. 41A-B.

Round-5 (SW-1): In the previous experiment, we found that the HI listener's PI functions for a single consonant sound varies a lot for different talkers. This experiment was intended to identify the natural strong /ka/s and /ga/s. FIGS. 42-47 show results obtained for Round 5.

As shown by these experiments, the removal, reduction, enhancement, and/or addition of various features may improve the ability of a listener to hear and/or distinguish the associated sounds.

Figure 11:
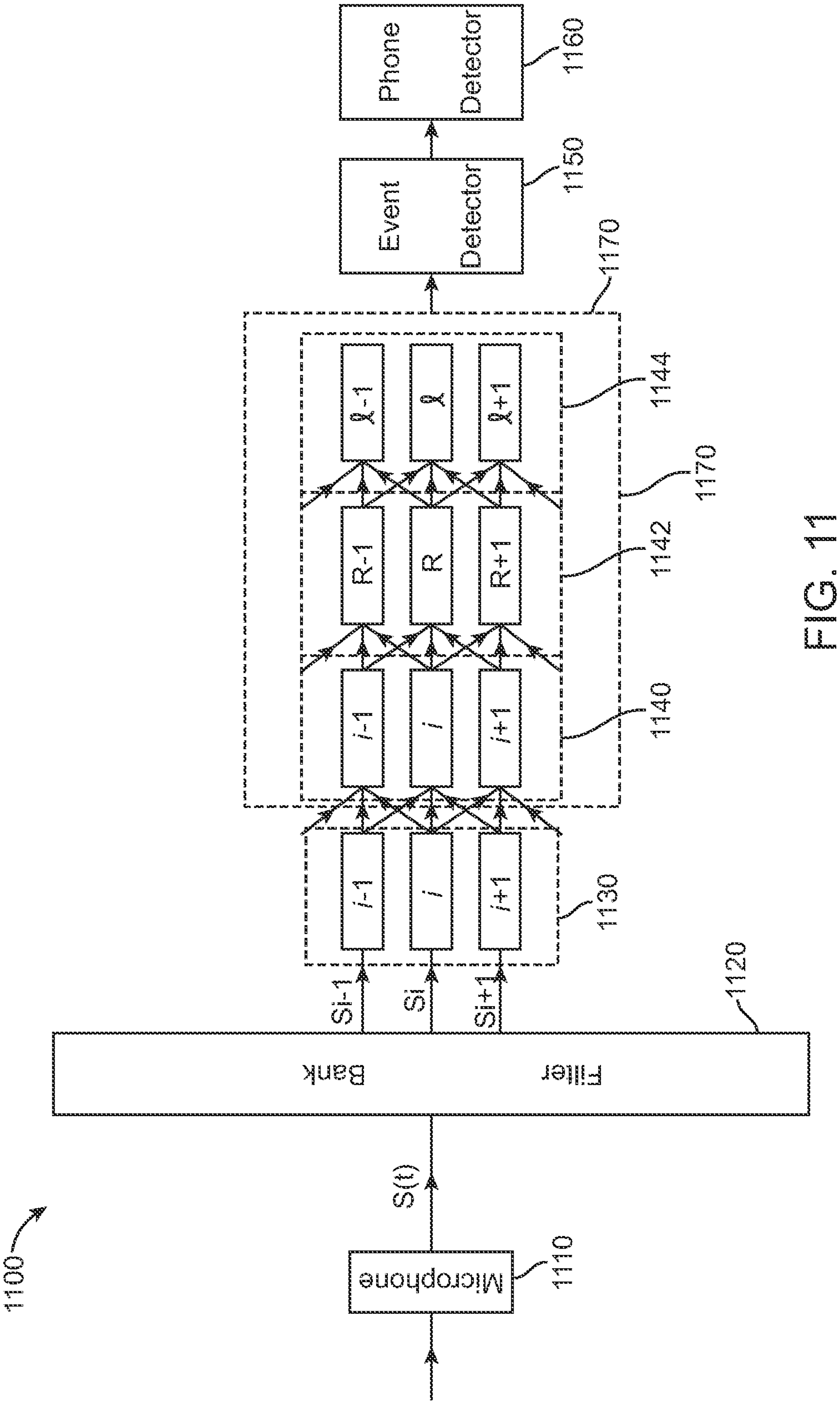
FIG. 11 is a simplified system for phone detection according to an embodiment of the present invention.

Various systems and devices may be used to implement the feature and phone detection and/or modification techniques described herein. FIG. 11 is a simplified system for phone detection according to an embodiment of the present invention. This diagram is merely an example, which should not unduly limit the scope of the claims. One of ordinary skill in the art would recognize many variations, alternatives, and modifications. The system 1100 includes a microphone 1110, a filter bank 1120, onset enhancement devices 1130, a cascade 1170 of across-frequency coincidence detectors, event detector 1150, and a phone detector 1160. For example, the cascade of across-frequency coincidence detectors 1170 include across-frequency coincidence detectors 1140, 1142, and 1144. Although the above has been shown using a selected group of components for the system 1100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

The microphone 1110 is configured to receive a speech signal in acoustic domain and convert the speech signal from acoustic domain to electrical domain. The converted speech signal in electrical domain is represented by s(t). As shown in FIG. 11, the converted speech signal is received by the filter bank 1120, which can process the converted speech signal and, based on the converted speech signal, generate channel speech signals in different frequency channels or bands. For example, the channel speech signals are represented by $s_1, \ldots, s_j, \ldots s_N$. N is an integer larger than 1, and j is an integer equal to or larger than 1, and equal to or smaller than N.

Additionally, these channel speech signals $s_1, \ldots, s_j, \ldots s_N$ each fall within a different frequency channel or band. For example, the channel speech signals $s_1, \ldots, s_j, \ldots s_N$ fall within, respectively, the frequency channels or bands 1, . . . j, . . . , N. In one embodiment, the frequency channels or bands 1, . . . , j, . . . , N correspond to central frequencies $f_1, \ldots, f_j, \ldots, f_N$, which are different from each other in magnitude. In another embodiment, different frequency channels or bands may partially overlap, even though their central frequencies are different.

The channel speech signals generated by the filter bank 1120 are received by the onset enhancement devices 1130. For example, the onset enhancement devices 1130 include onset enhancement devices 1, . . . , j, . . . , N, which receive, respectively, the channel speech signals $s_1, \ldots, s_j, \ldots s_N$, and generate, respectively, the onset enhanced signals $e_1, \ldots, e_j, \ldots e_N$. In another example, the onset enhancement devices, i−1, i, and i, receive, respectively, the channel speech signals $s_{i-1}$, $s_i$, $s_{i+1}$, and generate, respectively, the onset enhanced signals $e_{i-1}$, $e_i$, $e_{i+1}$.

Figure 12:
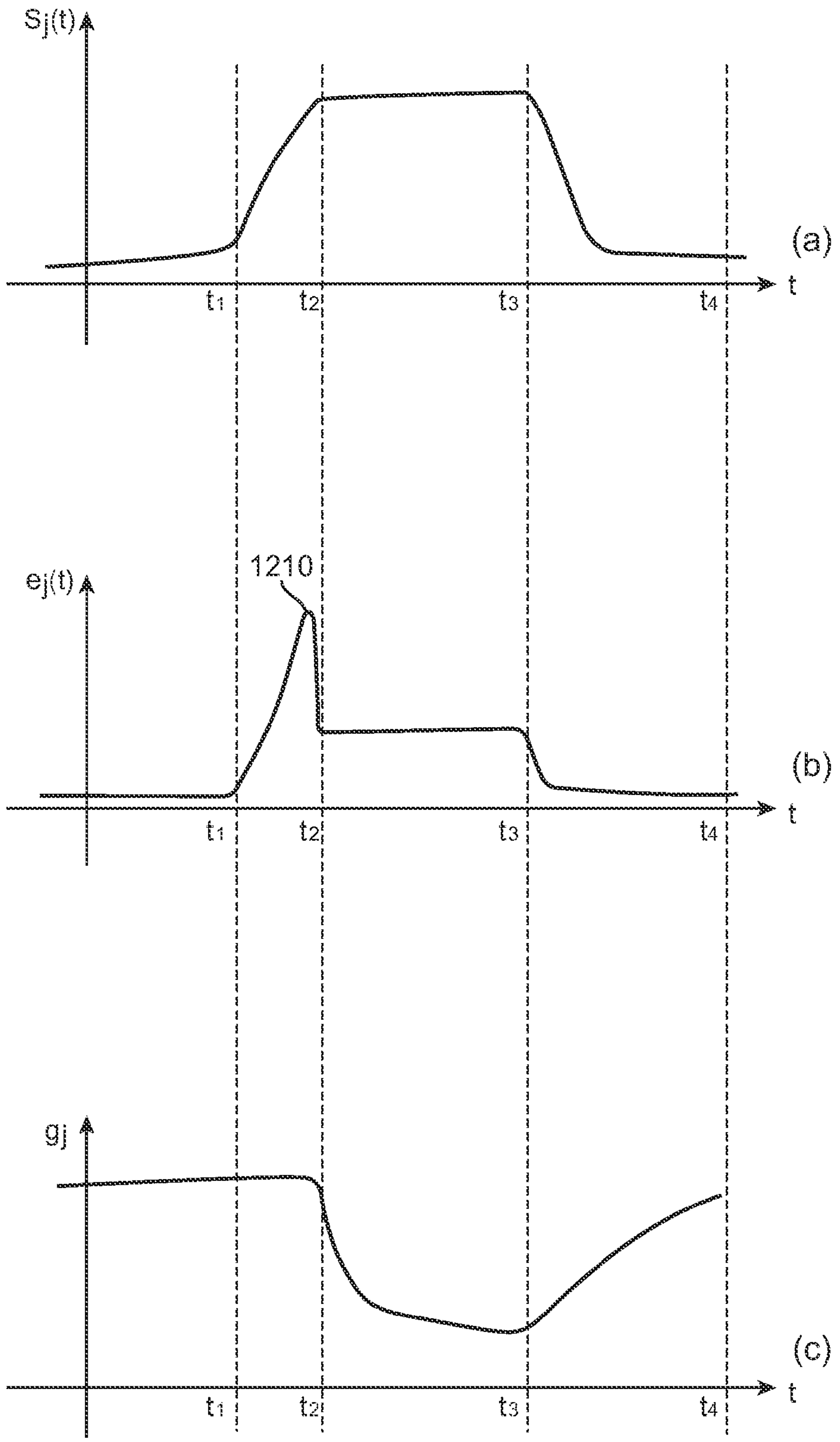
FIG. 12 illustrates onset enhancement for channel speech signal $s_j$ used by system for phone detection according to an embodiment of the present invention.

FIG. 12 illustrates onset enhancement for channel speech signal $s_j$ used by system for phone detection according to an embodiment of the present invention. These diagrams are merely examples, which should not unduly limit the scope of the claims. One of ordinary skill in the art would recognize many variations, alternatives, and modifications.

As shown in FIG. 12(*a*), from $t_1$ to $t_2$, the channel speech signal $s_j$ increases in magnitude from a low level to a high level. From $t_2$ to $t_3$, the channel speech signal $s_j$ maintains a steady state at the high level, and from $t_3$ to $t_4$, the channel speech signal $s_j$ decreases in magnitude from the high level to the low level. Specifically, the rise of channel speech signal $s_j$ from the low level to the high level during $t_1$ to $t_2$ is called onset according to an embodiment of the present invention. The enhancement of such onset is exemplified in FIG. 12(*b*). As shown in FIG. 12(*b*), the onset enhanced signal $e_j$ exhibits a pulse 1210 between $t_1$ and $t_2$. For example, the pulse indicates the occurrence of onset for the channel speech signal $s_j$.

Such onset enhancement is realized by the onset enhancement devices 1130 on a channel by channel basis. For example, the onset enhancement device j has a gain $g_j$ that is much higher during the onset than during the steady state of the channel speech signal $s_j$, as shown in FIG. 12(*c*). As discussed in FIG. 13 below, the gain $g_j$ is the gain that has already been delayed by a delay device 1350 according to an embodiment of the present invention.

Figure 13:
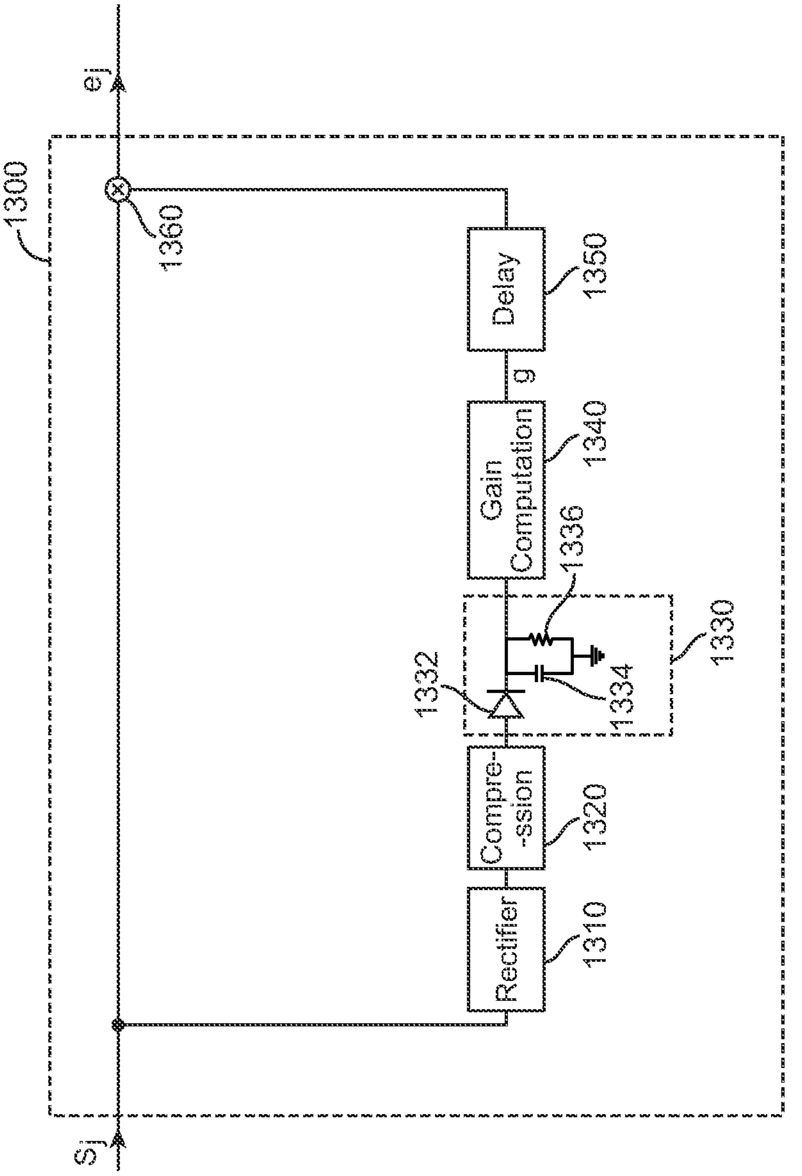
FIG. 13 is a simplified onset enhancement device used for phone detection according to an embodiment of the present invention.

FIG. 13 is a simplified onset enhancement device used for phone detection according to an embodiment of the present invention. This diagram is merely an example, which should not unduly limit the scope of the claims. One of ordinary skill in the art would recognize many variations, alternatives, and modifications. The onset enhancement device 1300 includes a half-wave rectifier 1310, a logarithmic compression device 1320, a smoothing device 1330, a gain computation device 1340, a delay device 1350, and a multiplying device 1360. Although the above has been shown using a selected group of components for the system 1300, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

According to an embodiment, the onset enhancement device 1300 is used as the onset enhancement device j of the onset enhancement devices 1130. The onset enhancement device 1300 is configured to receive the channel speech signal $s_j$, and generate the onset enhanced signal $e_j$. For example, the channel speech signal $s_j$(t) is received by the half-wave rectifier 1310, and the rectified signal is then compressed by the logarithmic compression device 1320. In another example, the compressed signal is smoothed by the smoothing device 1330, and the smoothed signal is received by the gain computation device 1340. In one embodiment, the smoothing device 1330 includes a diode 1332, a capacitor 1334, and a resistor 1336.

As shown in FIG. 13, the gain computation device 1340 is configured to generate a gain signal. For example, the gain is determined based on the envelope of the signal as shown in FIG. 12(*a*). The gain signal from the gain computation device 1340 is delayed by the delay device 1350. For example, the delayed gain is shown in FIG. 12(*c*). In one embodiment, the delayed gain signal is multiplied with the channel speech signal $s_j$ by the multiplying device 1360 and thus generate the onset enhanced signal $e_j$. For example, the onset enhanced signal $e_j$ is shown in FIG. 12(*b*).

Figure 14:
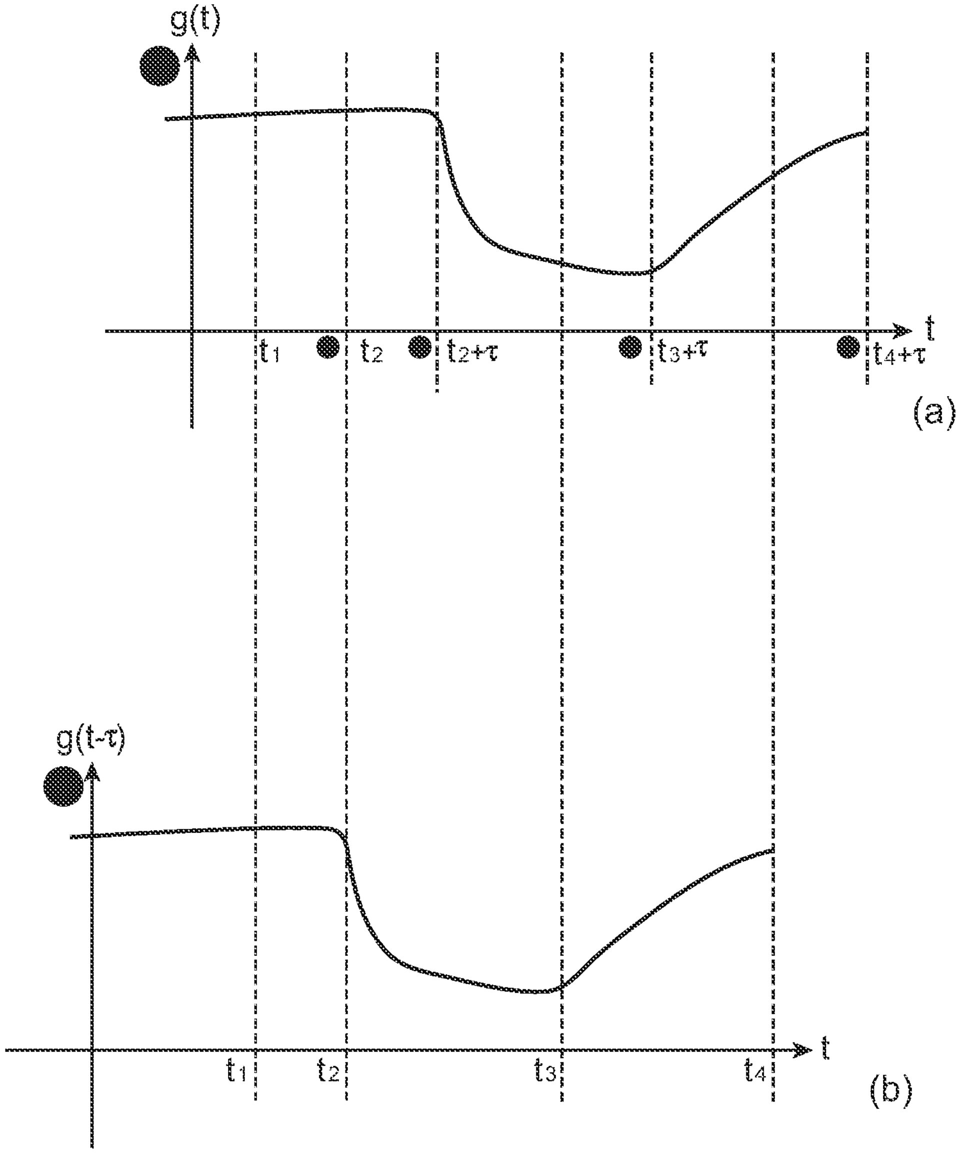
FIG. 14 illustrates pre-delayed gain and delayed gain used for phone detection according to an embodiment of the present invention.

FIG. 14 illustrates pre-delayed gain and delayed gain used for phone detection according to an embodiment of the present invention. These diagrams are merely examples, which should not unduly limit the scope of the claims. One of ordinary skill in the art would recognize many variations, alternatives, and modifications. For example, FIG. 14(*a*) represents the gain g(t) determined by the gain computation device 1340. According to one embodiment, the gain g(t) is delayed by the delay device 1350 by a predetermined period of time $\tau$, and the delayed gain is $g(t-\tau)$ as shown in FIG. 14(*b*). For example, $\tau$ is equal to $t_2$-$t_1$. In another example, the delayed gain as shown in FIG. 14(*b*) is the gain $g_j$ as shown in FIG. 12(*c*).

Returning to FIG. 11, the onset enhancement devices 1130 are configured to receive the channel speech signals, and based on the received channel speech signals, generate onset enhanced signals, such as the onset enhanced signals $e_{i-1}$, $e_i$, $e_{i+1}$. The onset enhanced signals can be received by the across-frequency coincidence detectors 1140.

For example, each of the across-frequency coincidence detectors 1140 is configured to receive a plurality of onset enhanced signals and process the plurality of onset enhanced signals. Additionally, each of the across-frequency coincidence detectors 1140 is also configured to determine whether the plurality of onset enhanced signals include onset pulses that occur within a predetermined period of time. Based on such determination, each of the across-frequency coincidence detectors 1140 outputs a coincidence signal. For example, if the onset pulses are determined to occur within the predetermined period of time, the onset pulses at corresponding channels are considered to be coincident, and the coincidence signal exhibits a pulse representing logic "1". In another example, if the onset pulses are determined not to occur within the predetermined period of time, the onset pulses at corresponding channels are considered not to be coincident, and the coincidence signal does not exhibit any pulse representing logic "1".

According to one embodiment, as shown in FIG. 11, the across-frequency coincidence detector i is configured to receive the onset enhanced signals $e_{i-1}$, $e_i$, $e_{i+1}$. Each of the onset enhanced signals includes an onset pulse. For example, the onset pulse is similar to the pulse 1210. In another example, the across-frequency coincidence detector i is configured to determine whether the onset pulses for the onset enhanced signals $e_{i-1}$, $e_i$, $e_{i+1}$ occur within a predetermined period time.

In one embodiment, the predetermined period of time is 10 ms. For example, if the onset pulses for the onset enhanced signals $e_{i-1}$, $e_i$, $e_{i+1}$ are determined to occur within 10 ms, the across-frequency coincidence detector i outputs a coincidence signal that exhibits a pulse representing logic "1" and showing the onset pulses at channels i−1, i, and i+1 are considered to be coincident. In another example, if the onset pulses for the onset enhanced signals $e_{i-1}$, $e_i$, $e_{i-1}$ are determined not to occur within 10 ms, the across-frequency coincidence detector i outputs a coincidence signal that does not exhibit a pulse representing logic "1", and the coincidence signal shows the onset pulses at channels i−1, i, and i+1 are considered not to be coincident.

As shown in FIG. 11, the coincidence signals generated by the across-frequency coincidence detectors 1140 can be received by the across-frequency coincidence detectors 1142. For example, each of the across-frequency coincidence detectors 1142 is configured to receive and process a plurality of coincidence signals generated by the across-frequency coincidence detectors 1140. Additionally, each of the across-frequency coincidence detectors 1142 is also configured to determine whether the received plurality of coincidence signals include pulses representing logic "1" that occur within a predetermined period of time. Based on such determination, each of the across-frequency coincidence detectors 1142 outputs a coincidence signal. For example, if the pulses are determined to occur within the predetermined period of time, the outputted coincidence signal exhibits a pulse representing logic "1" and showing the onset pulses are considered to be coincident at channels that correspond to the received plurality of coincidence signals. In another example, if the pulses are determined not to occur within the predetermined period of time, the outputted coincidence signal does not exhibit any pulse representing logic "1", and the outputted coincidence signal shows the onset pulses are considered not to be coincident at channels that correspond to the received plurality of coincidence signals. According to one embodiment, the predetermined period of time is zero second. According to another embodiment, the across-frequency coincidence detector k is configured to receive the coincidence signals generated by the across-frequency coincidence detectors i−1, i, and i+1.

Furthermore, according to some embodiments, the coincidence signals generated by the across-frequency coincidence detectors 1142 can be received by the across-frequency coincidence detectors 1144. For example, each of the across-frequency coincidence detectors 1144 is configured to receive and process a plurality of coincidence signals generated by the across-frequency coincidence detectors 1142. Additionally, each of the across-frequency coincidence detectors 1144 is also configured to determine whether the received plurality of coincidence signals include pulses representing logic "1" that occur within a predetermined period of time. Based on such determination, each of the across-frequency coincidence detectors 1144 outputs a coincidence signal. For example, if the pulses are determined to occur within the predetermined period of time, the coincidence signal exhibits a pulse representing logic "1" and showing the onset pulses are considered to be coincident at channels that correspond to the received plurality of coincidence signals. In another example, if the pulses are determined not to occur within the predetermined period of time, the coincidence signal does not exhibit any pulse representing logic "1", and the coincidence signal shows the onset pulses are considered not to be coincident at channels that correspond to the received plurality of coincidence signals. According to one embodiment, the predetermined period of time is zero second. According to another embodiment, the across-frequency coincidence detector 1 is configured to receive the coincidence signals generated by the across-frequency coincidence detectors k−1, k, and k+1.

As shown in FIG. 11, the across-frequency coincidence detectors 1140, the across-frequency coincidence detectors 1142, and the across-frequency coincidence detectors 1144 form the three-stage cascade 1170 of across-frequency coincidence detectors between the onset enhancement devices 1130 and the event detectors 1150 according to an embodiment of the present invention. For example, the across-frequency coincidence detectors 1140 correspond to the first stage, the across-frequency coincidence detectors 1142 correspond to the second stage, and the across-frequency coincidence detectors 1144 correspond to the third stage. In another example, one or more stages can be added to the cascade 1170 of across-frequency coincidence detectors. In one embodiment, each of the one or more stages is similar to the across-frequency coincidence detectors 1142. In yet another example, one or more stages can be removed from the cascade 1170 of across-frequency coincidence detectors.

The plurality of coincidence signals generated by the cascade of across-frequency coincidence detectors can be received by the event detector 1150, which is configured to process the received plurality of coincidence signals, determine whether one or more events have occurred, and generate an event signal. For example, the even signal indicates which one or more events have been determined to have occurred. In another example, a given event represents an coincident occurrence of onset pulses at predetermined channels. In one embodiment, the coincidence is defined as occurrences within a predetermined period of time. In another embodiment, the given event may be represented by Event X, Event Y, or Event Z.

According to one embodiment, the event detector 1150 is configured to receive and process all coincidence signals generated by each of the across-frequency coincidence detectors 1140, 1142, and 1144, and determine the highest stage of the cascade that generates one or more coincidence signals that include one or more pulses respectively. Additionally, the event detector 1150 is further configured to determine, at the highest stage, one or more across-frequency coincidence detectors that generate one or more coincidence signals that include one or more pulses respectively, and based on such determination, also determine channels at which the onset pulses are considered to be coincident. Moreover, the event detector 1150 is yet further configured to determine, based on the channels with coincident onset pulses, which one or more events have occurred, and also configured to generate an event signal that indicates which one or more events have been determined to have occurred.

According to one embodiment, FIG. 4 shows events as indicated by the dashed lines that cross in the upper left panels of FIGS. 4(*a*) and (*b*). Two examples are shown for /te/ signals, one having a weak event and the other having a strong event. This variation in event strength is clearly shown to be correlated to the signal to noise ratio of the threshold for perceiving the /t/ sound, as shown in FIG. 4 and again in more detail in FIG. 6. According to another embodiment, an event is shown in FIGS. 6(*b*) and/or (*c*).

For example, the event detector 1150 determines that, at the third stage (corresponding to the across-frequency coincidence detectors 1144), there is no across-frequency coincidence detectors that generate one or more coincidence signals that include one or more pulses respectively, but among the across-frequency coincidence detectors 1142 there are one or more coincidence signals that include one or more pulses respectively, and among the across-frequency coincidence detectors 1140 there are also one or more coincidence signals that include one or more pulses respectively. Hence the event detector 1150 determines the second stage, not the third stage, is the highest stage of the cascade that generates one or more coincidence signals that include one or more pulses respectively according to an embodiment of the present invention. Additionally, the event detector 1150 further determines, at the second stage, which across-frequency coincidence detector(s) generate coincidence signal(s) that include pulse(s) respectively, and based on such determination, the event detector 1150 also determine channels at which the onset pulses are considered to be coincident. Moreover, the event detector 1150 is yet further configured to determine, based on the channels with coincident onset pulses, which one or more events have occurred, and also configured to generate an event signal that indicates which one or more events have been determined to have occurred.

The event signal can be received by the phone detector 1160. The phone detector is configured to receive and process the event signal, and based on the event signal, determine which phone has been included in the speech signal received by the microphone 1110. For example, the phone can be /t/, /m/, or /n/. In one embodiment, if only Event X has been detected, the phone is determined to be /t/. In another embodiment, if Event X and Event Y have been detected with a delay of about 50 ms between each other, the phone is determined to be /m/.

As discussed above and further emphasized here, FIG. 11 is merely an example, which should not unduly limit the scope of the claims. One of ordinary skill in the art would recognize many variations, alternatives, and modifications. For example, the across-frequency coincidence detectors 1142 are removed, and the across-frequency coincidence detectors 1140 are coupled with the across-frequency coincidence detectors 1144. In another example, the across-frequency coincidence detectors 1142 and 1144 are removed.

According to another embodiment, a system for phone detection includes a microphone configured to receive a speech signal in an acoustic domain and convert the speech signal from the acoustic domain to an electrical domain, and a filter bank coupled to the microphone and configured to receive the converted speech signal and generate a plurality of channel speech signals corresponding to a plurality of channels respectively. Additionally, the system includes a plurality of onset enhancement devices configured to receive the plurality of channel speech signals and generate a plurality of onset enhanced signals. Each of the plurality of onset enhancement devices is configured to receive one of the plurality of channel speech signals, enhance one or more onsets of one or more signal pulses for the received one of the plurality of channel speech signals, and generate one of the plurality of onset enhanced signals. Moreover, the system includes a cascade of across-frequency coincidence detectors configured to receive the plurality of onset enhanced signals and generate a plurality of coincidence signals. Each of the plurality of coincidence signals is capable of indicating a plurality of channels at which a plurality of pulse onsets occur within a predetermined period of time, and the plurality of pulse onsets corresponds to the plurality of channels respectively. Also, the system includes an event detector configured to receive the plurality of coincidence signals, determine whether one or more events have occurred, and generate an event signal, the event signal being capable of indicating which one or more events have been determined to have occurred. Additionally, the system includes a phone detector configured to receive the event signal and determine which phone has been included in the speech signal received by the microphone. For example, the system is implemented according to FIG. 11.

According to yet another embodiment, a system for phone detection includes a plurality of onset enhancement devices configured to receive a plurality of channel speech signals generated from a speech signal in an acoustic domain, process the plurality of channel speech signals, and generate a plurality of onset enhanced signals. Each of the plurality of onset enhancement devices is configured to receive one of the plurality of channel speech signals, enhance one or more onsets of one or more signal pulses for the received one of the plurality of channel speech signals, and generate one of the plurality of onset enhanced signals. Additionally, the system includes a cascade of across-frequency coincidence detectors including a first stage of across-frequency coincidence detectors and a second stage of across-frequency coincidence detectors. The cascade is configured to receive the plurality of onset enhanced signals and generate a plurality of coincidence signals. Each of the plurality of coincidence signals is capable of indicating a plurality of channels at which a plurality of pulse onsets occur within a predetermined period of time, and the plurality of pulse onsets corresponds to the plurality of channels respectively. Moreover, the system includes an event detector configured to receive the plurality of coincidence signals, and determine whether one or more events have occurred based on at least information associated with the plurality of coincidence signals. The event detector is further configured to generate an event signal, and the event signal is capable of indicating which one or more events have been determined to have occurred. Also, the system includes a phone detector configured to receive the event signal and determine, based on at least information associated with the event signal, which phone has been included in the speech signal in the acoustic domain. For example, the system is implemented according to FIG. 11.

According to yet another embodiment, a method for phone detection includes receiving a speech signal in an acoustic domain, converting the speech signal from the acoustic domain to an electrical domain, processing information associated with the converted speech signal, and generating a plurality of channel speech signals corresponding to a plurality of channels respectively based on at least information associated with the converted speech signal. Additionally, the method includes processing information associated with the plurality of channel speech signals, enhancing one or more onsets of one or more signal pulses for the plurality of channel speech signals to generate a plurality of onset enhanced signals, processing information associated with the plurality of onset enhanced signals, and generating a plurality of coincidence signals based on at least information associated with the plurality of onset enhanced signals. Each of the plurality of coincidence signals is capable of indicating a plurality of channels at which a plurality of pulse onsets occur within a predetermined period of time, and the plurality of pulse onsets corresponds to the plurality of channels respectively. Moreover, the method includes processing information associated with the plurality of coincidence signals, determining whether one or more events have occurred based on at least information associated with the plurality of coincidence signals, generating an event signal, the event signal being capable of indicating which one or more events have been determined to have occurred, processing information associated with the event signal, and determining which phone has been included in the speech signal in the acoustic domain. For example, the method is implemented according to FIG. 11.

Figure 48:
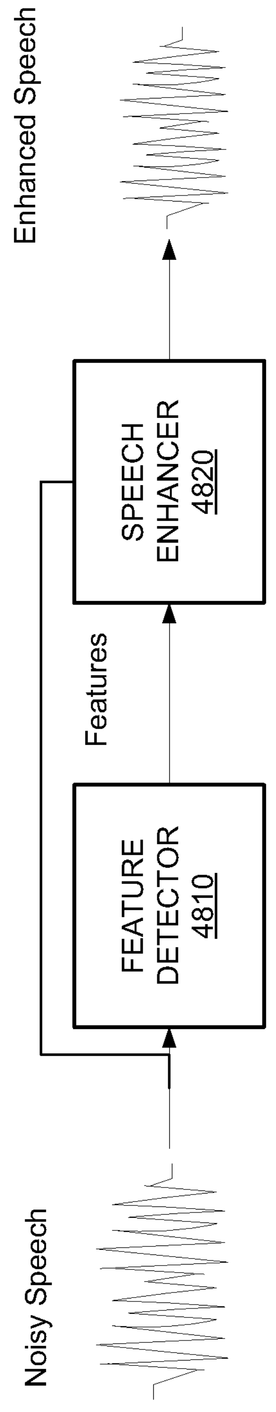
FIG. 48 shows a diagram of an example feature-based speech enhancement system according to an embodiment of the present invention.
Figure 49:
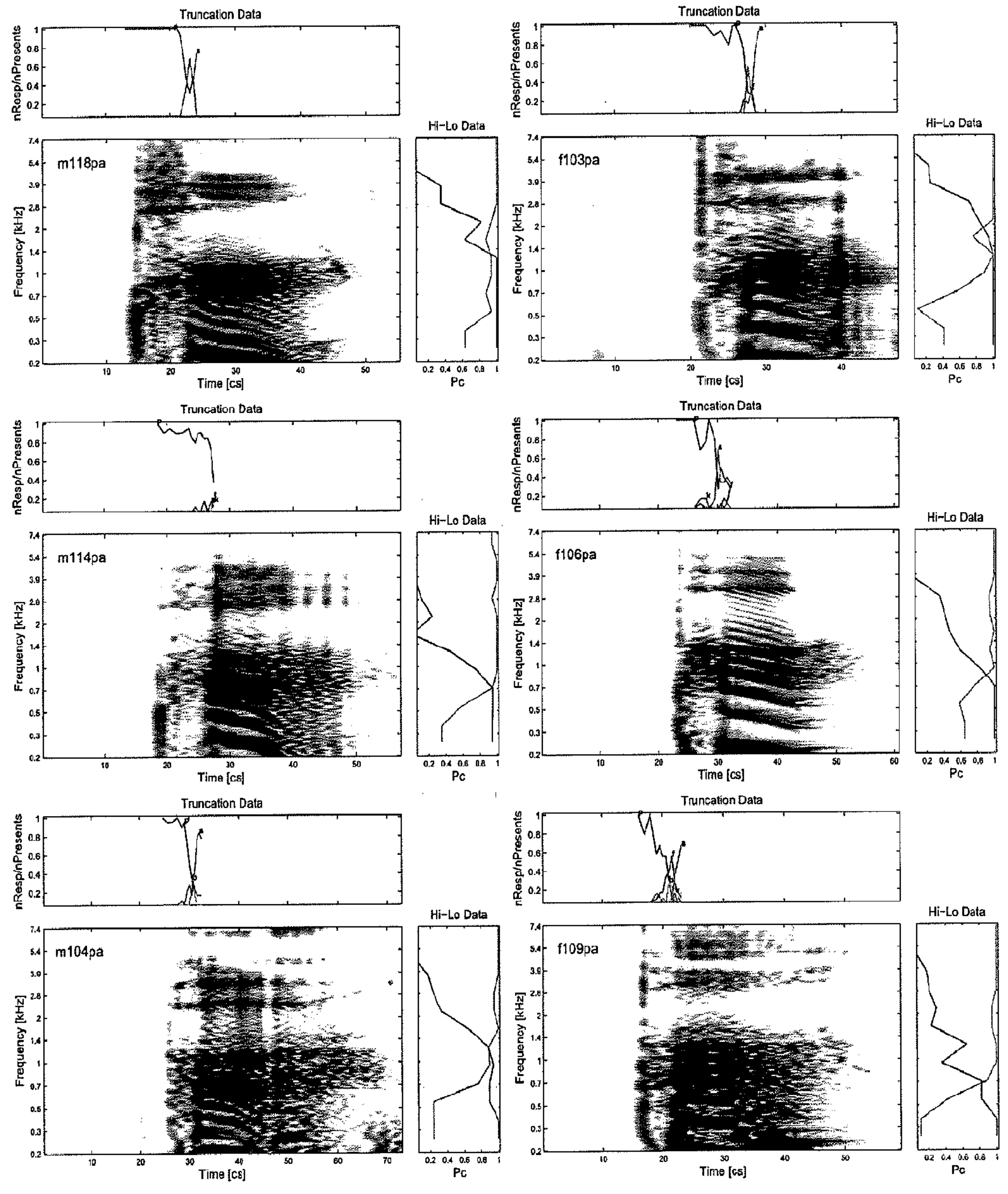
FIGS. 49-64 show example AI-grams and associated truncation data, hi-lo data, and recognition data for a variety of speech sounds according to an embodiment of the present invention.
Figure 50:
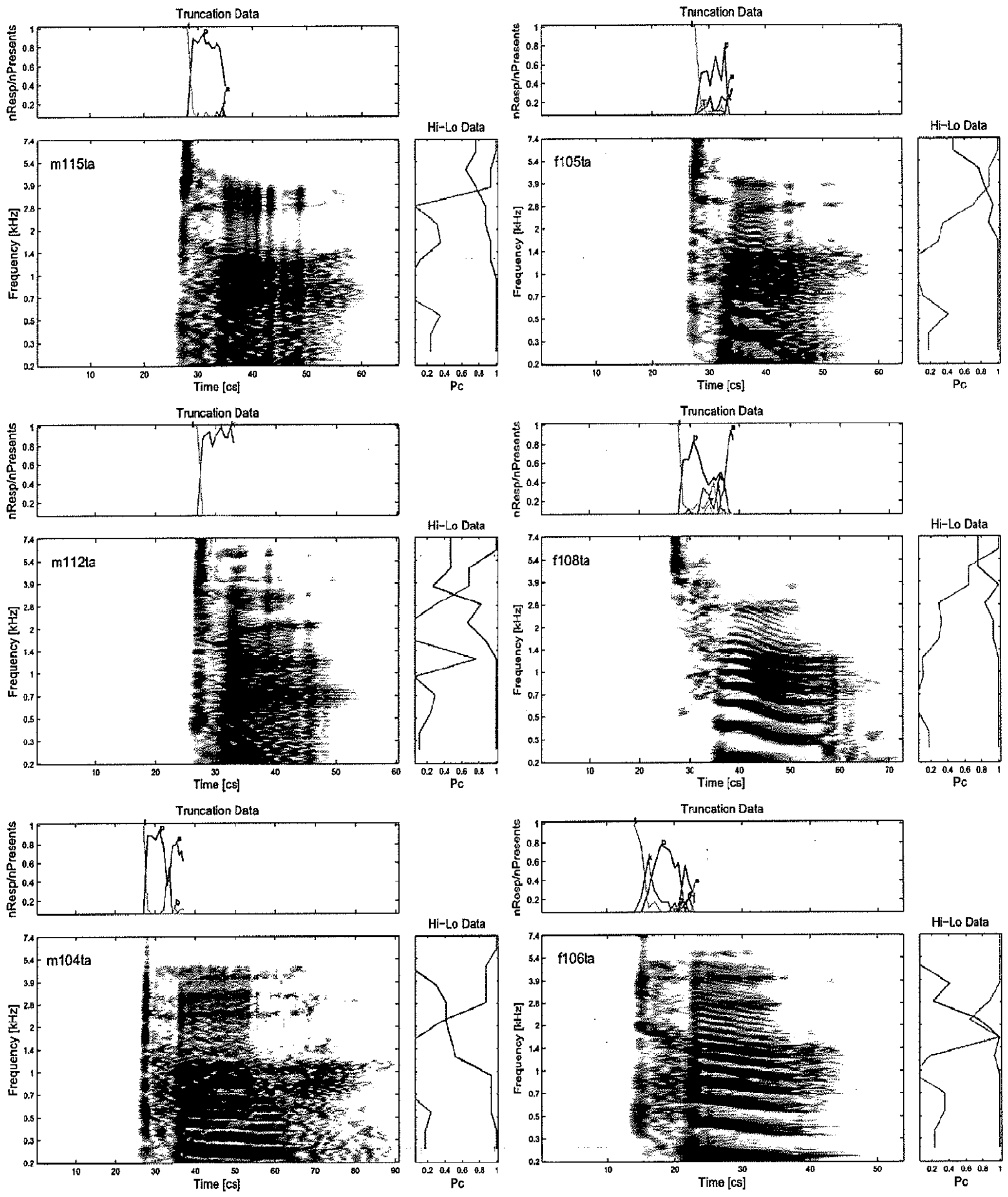
Figure 51:
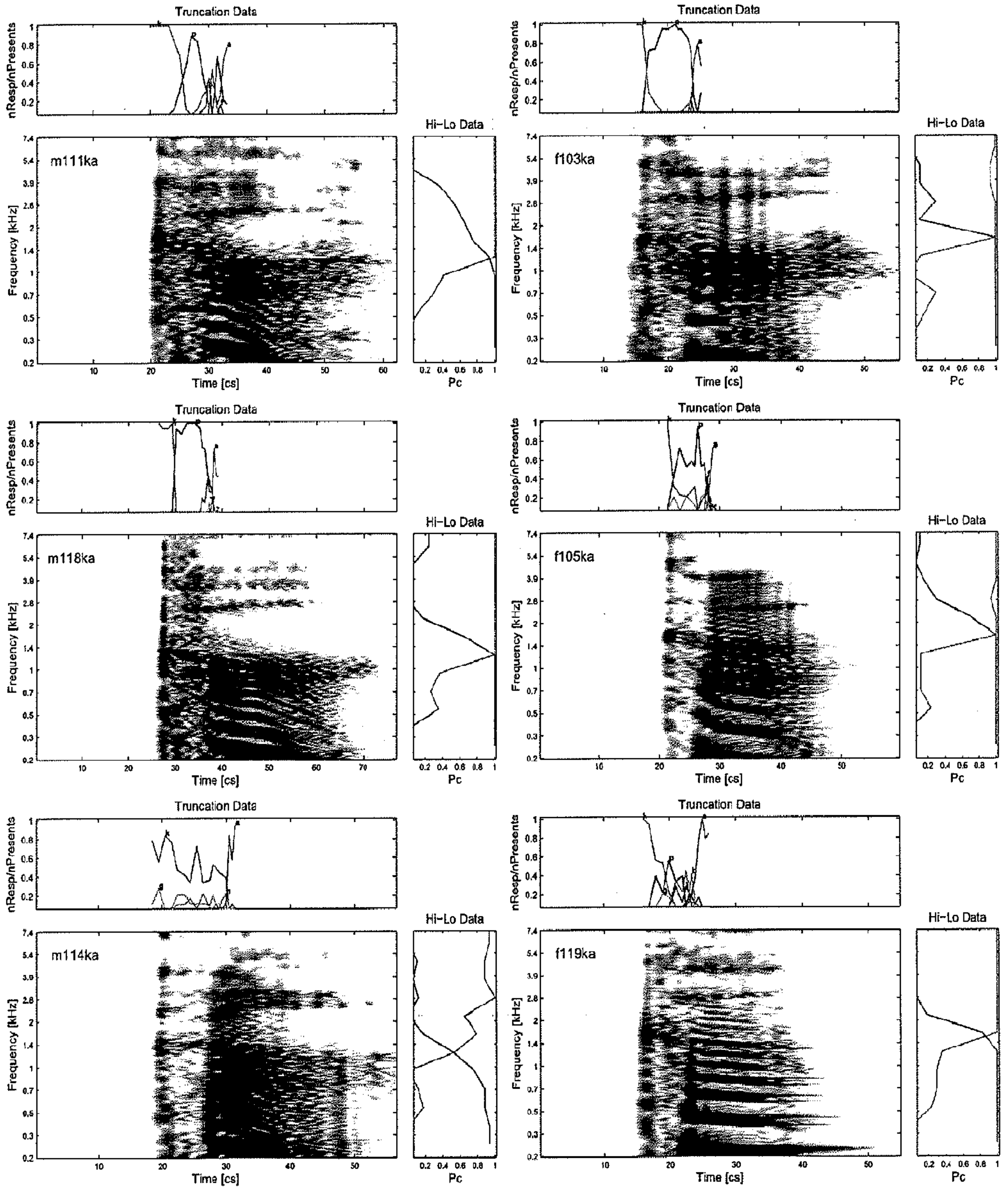
Figure 52:
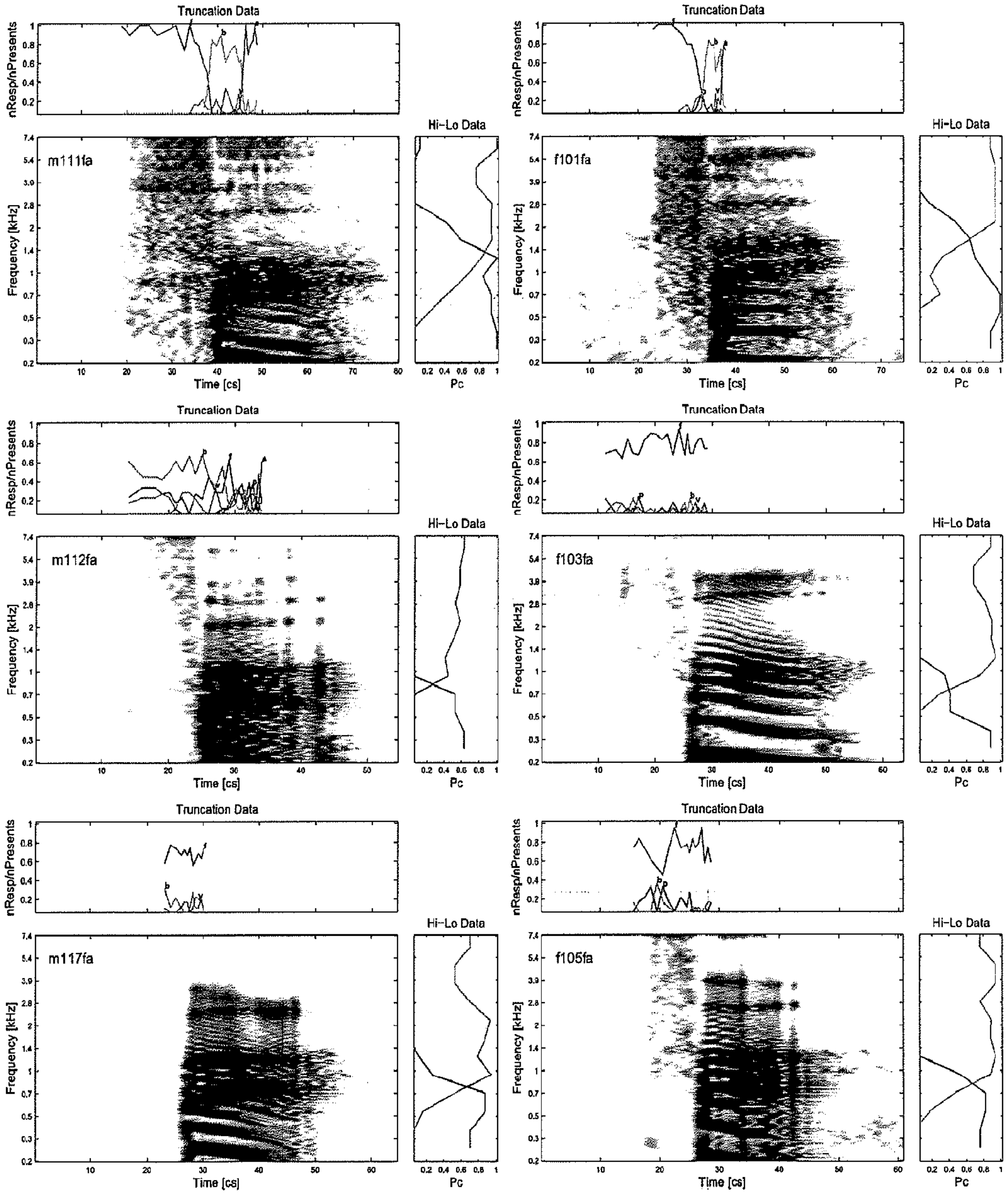
Figure 53:
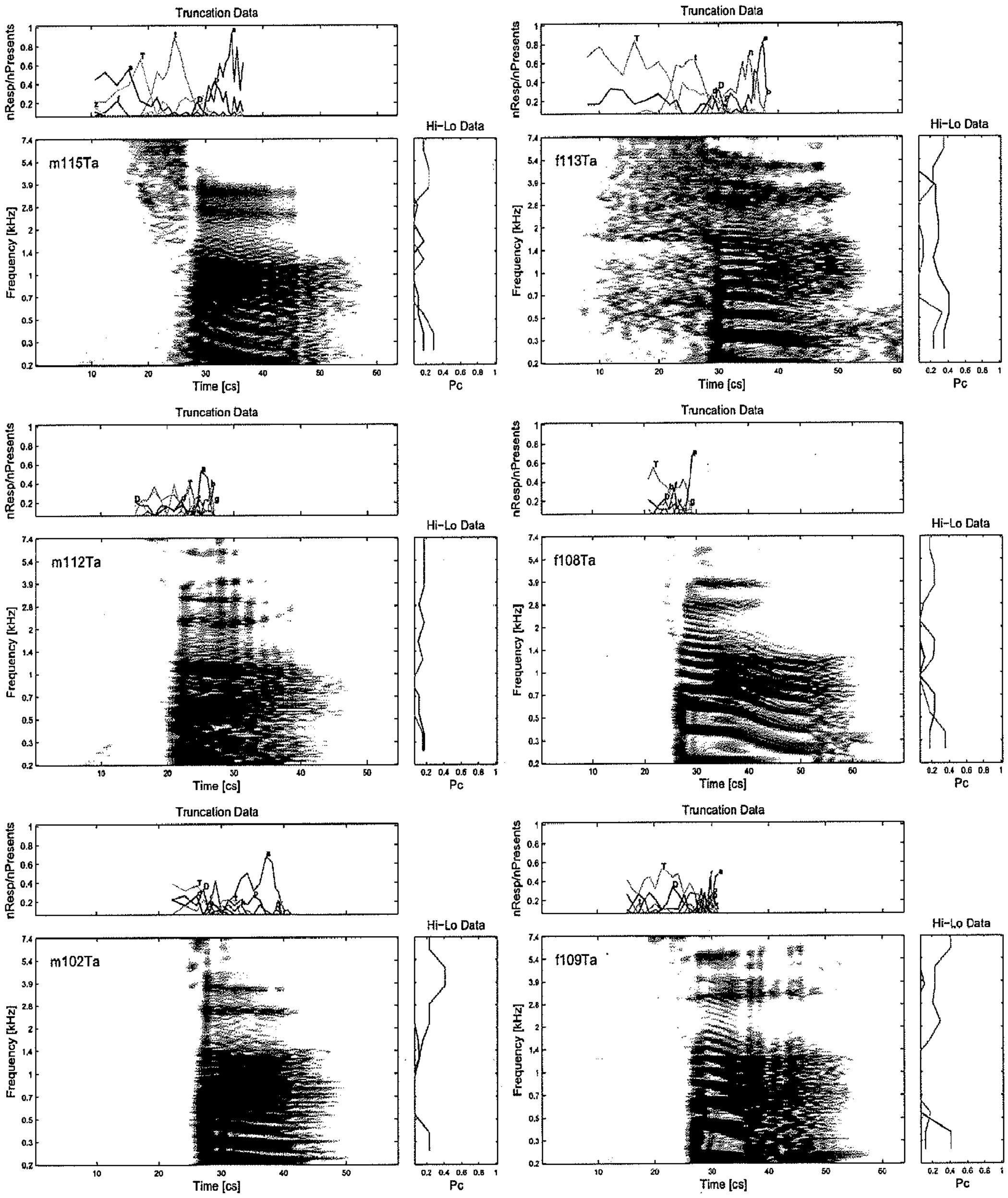
Figure 54:
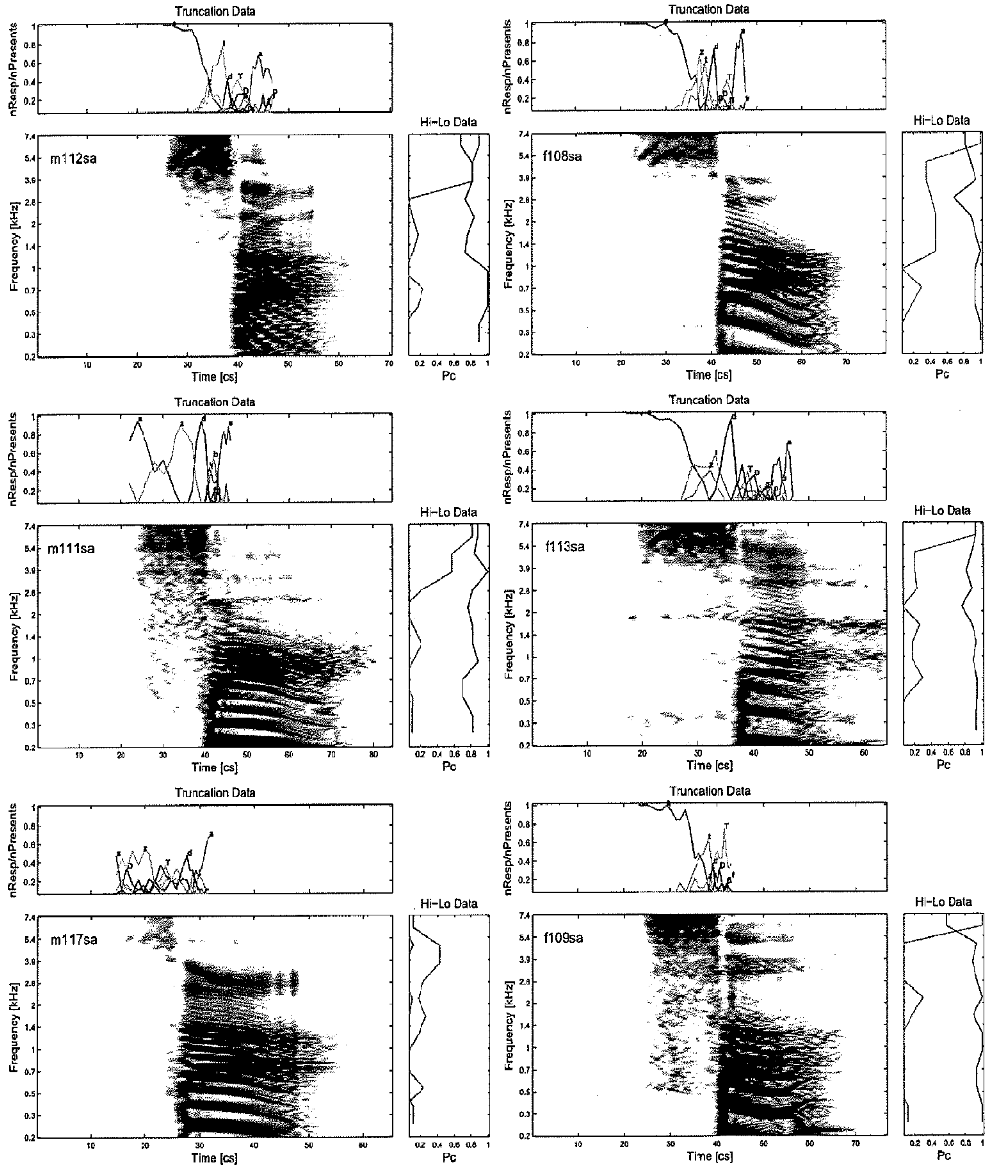
Figure 55:
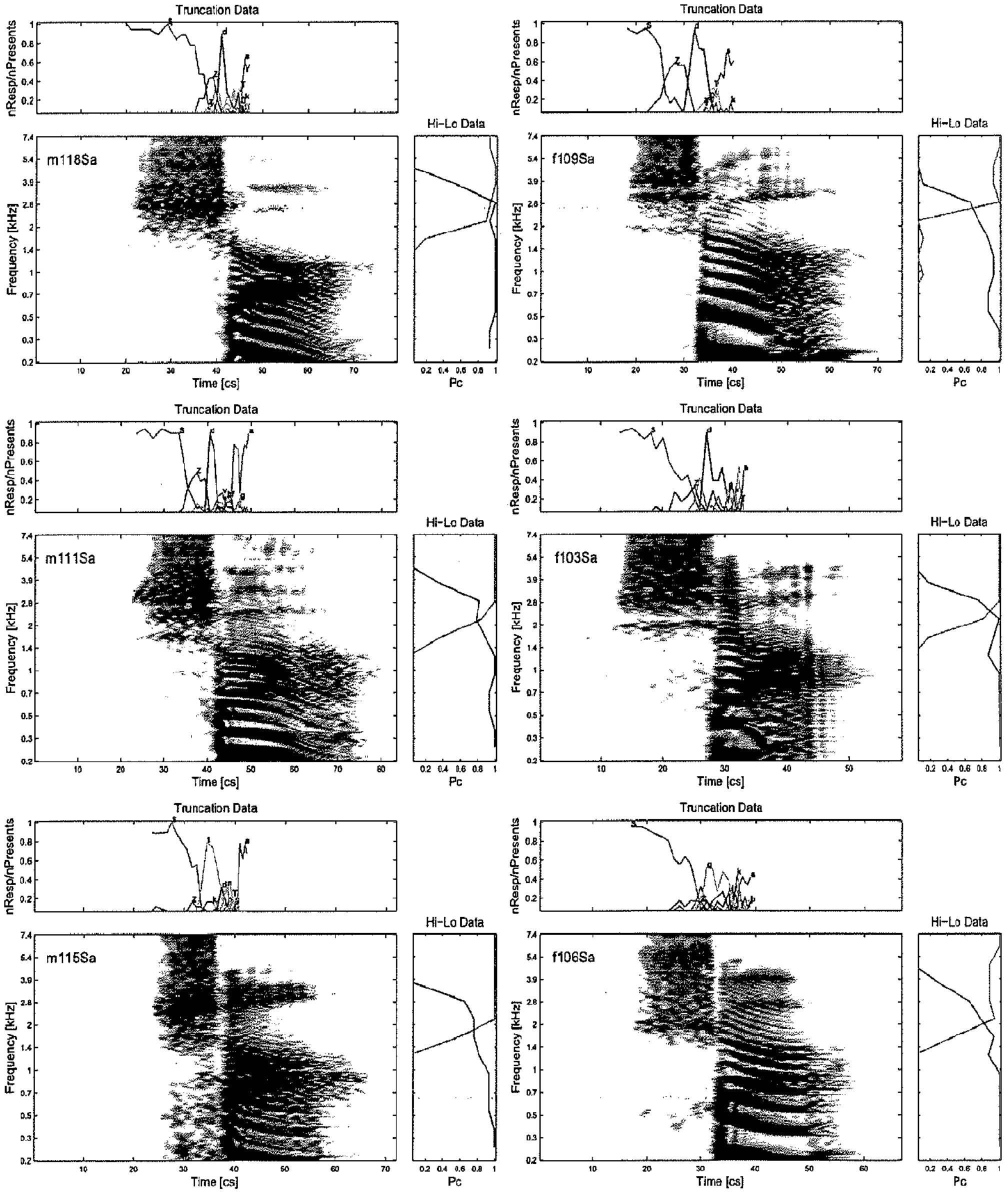
Figure 56:
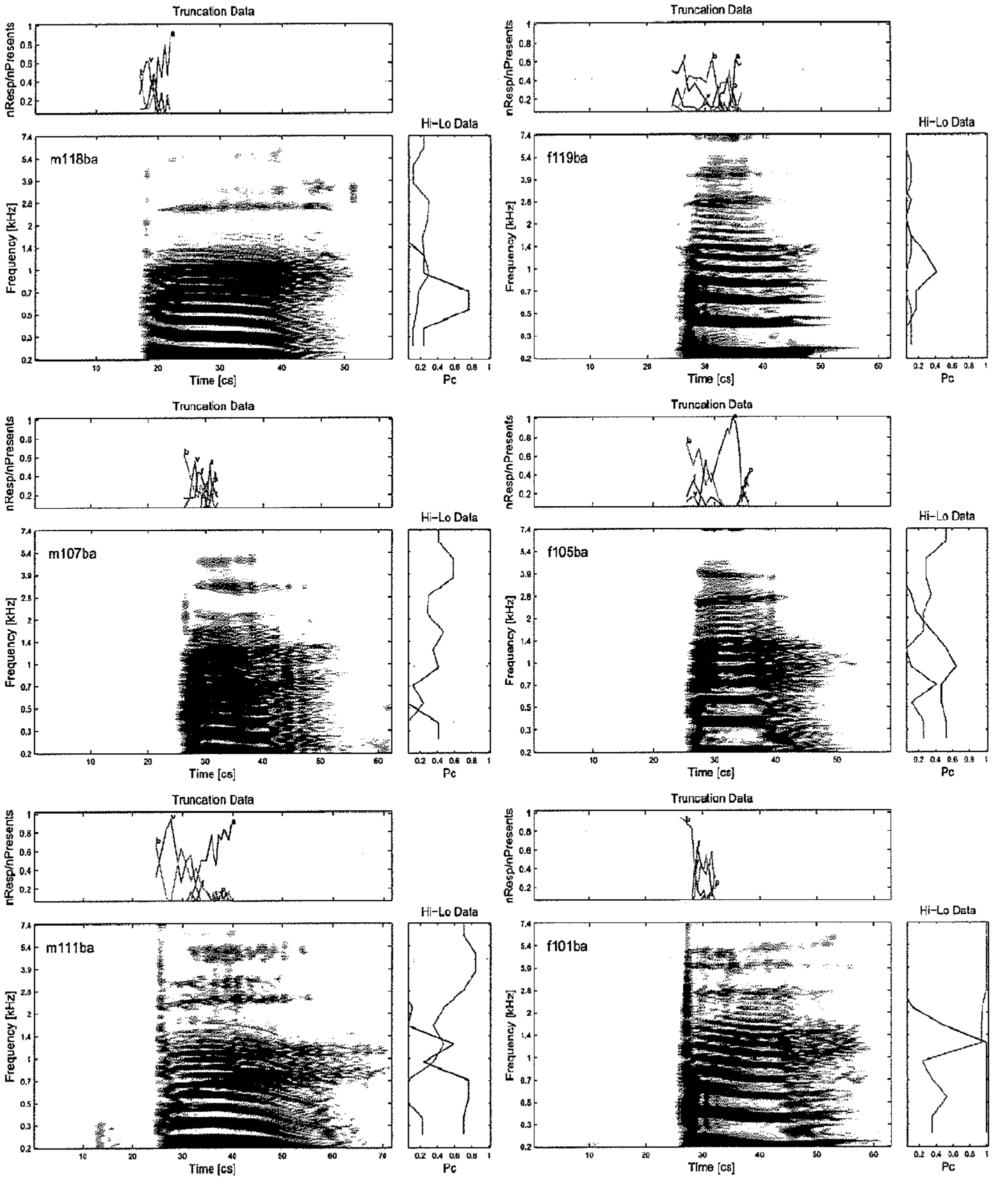
Figure 57:
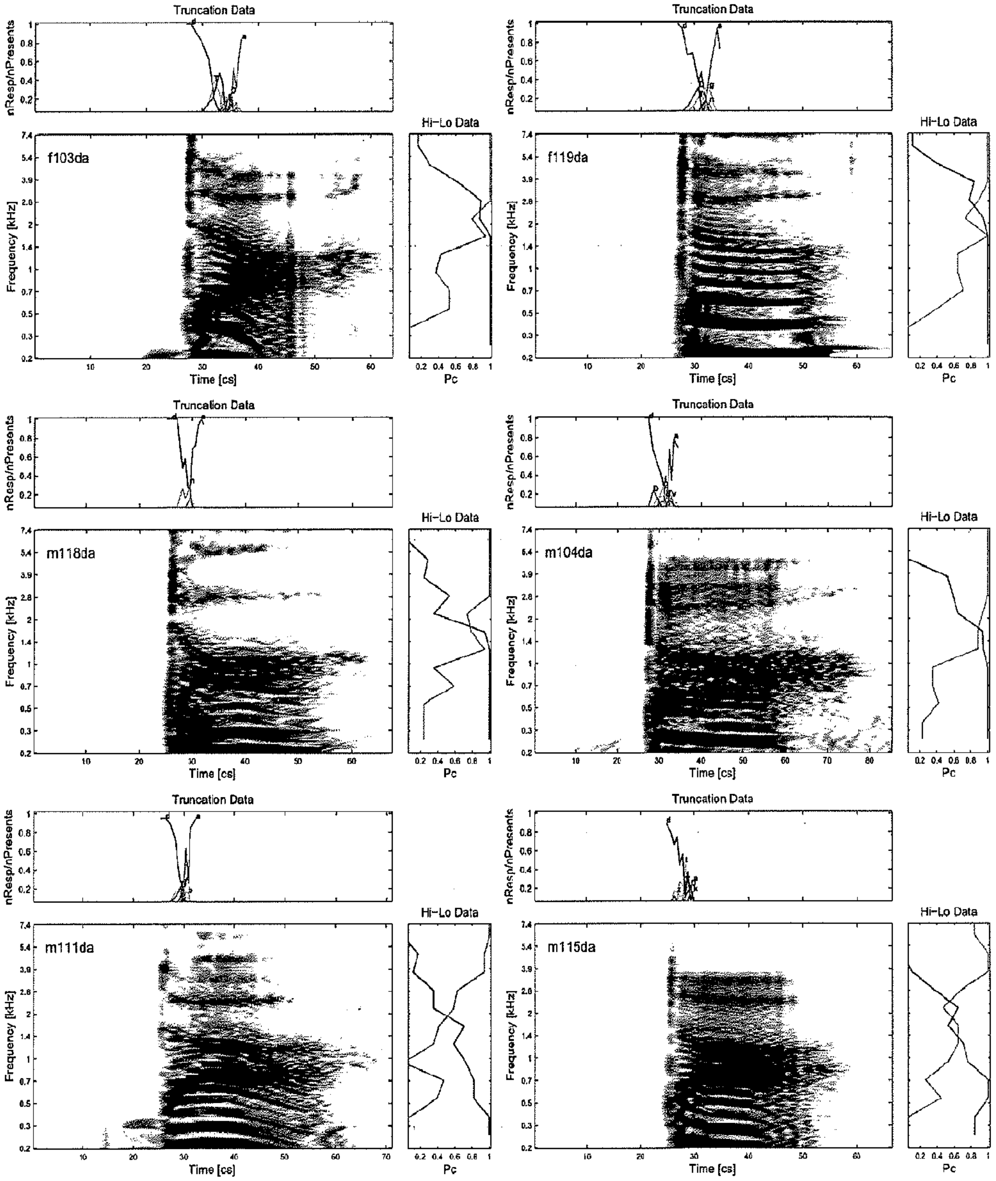
Figure 58:
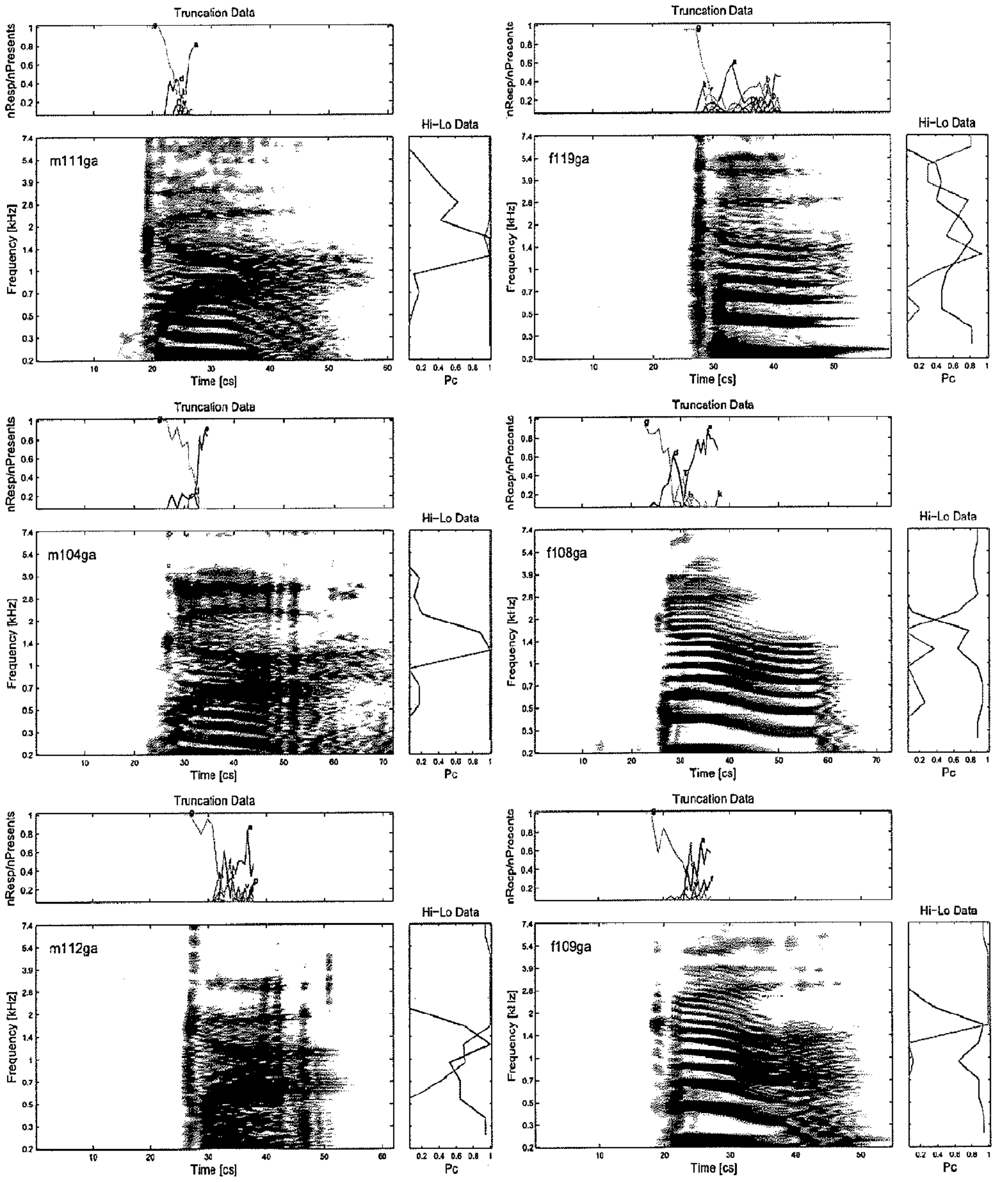
Figure 59:
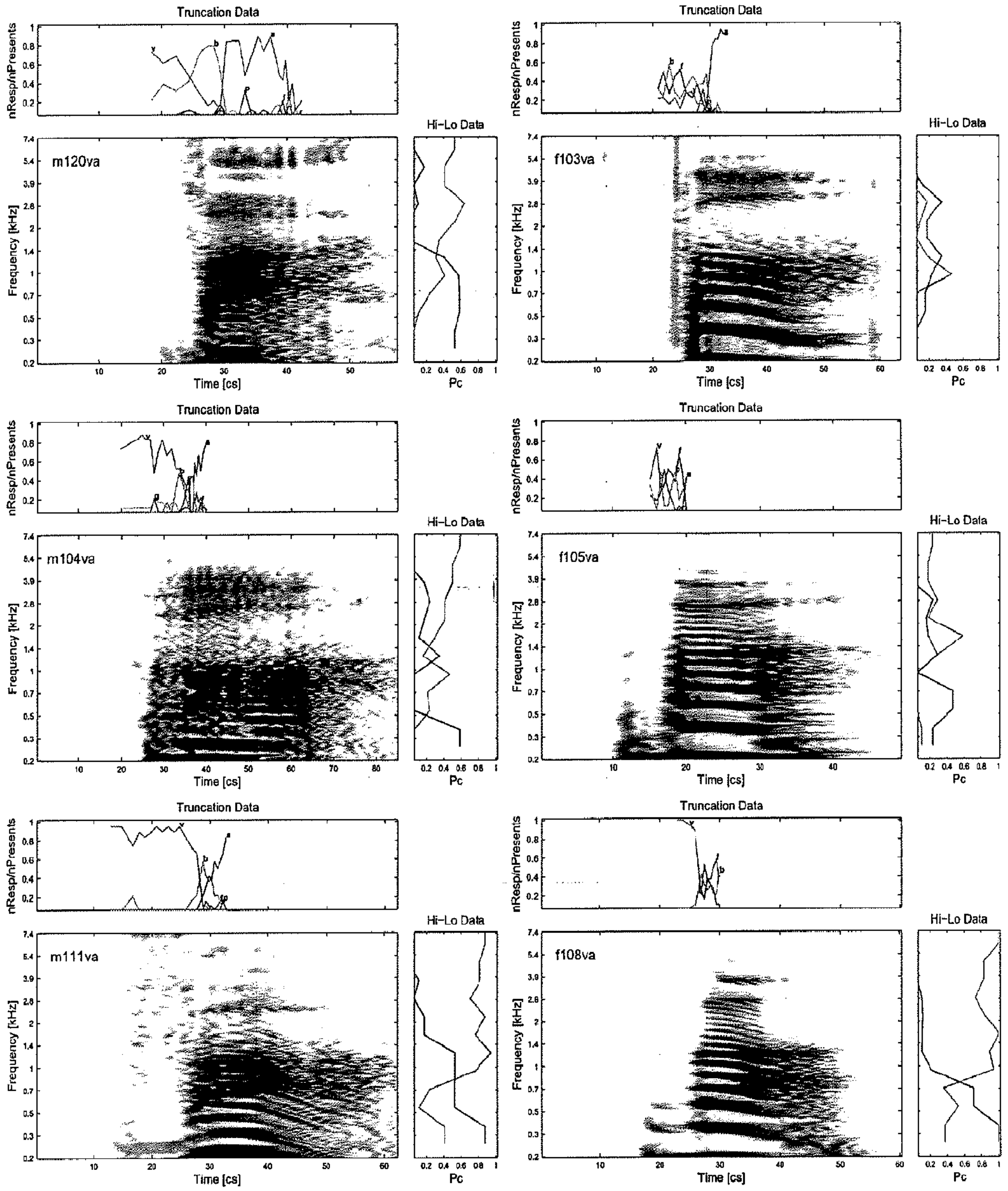
Figure 60:
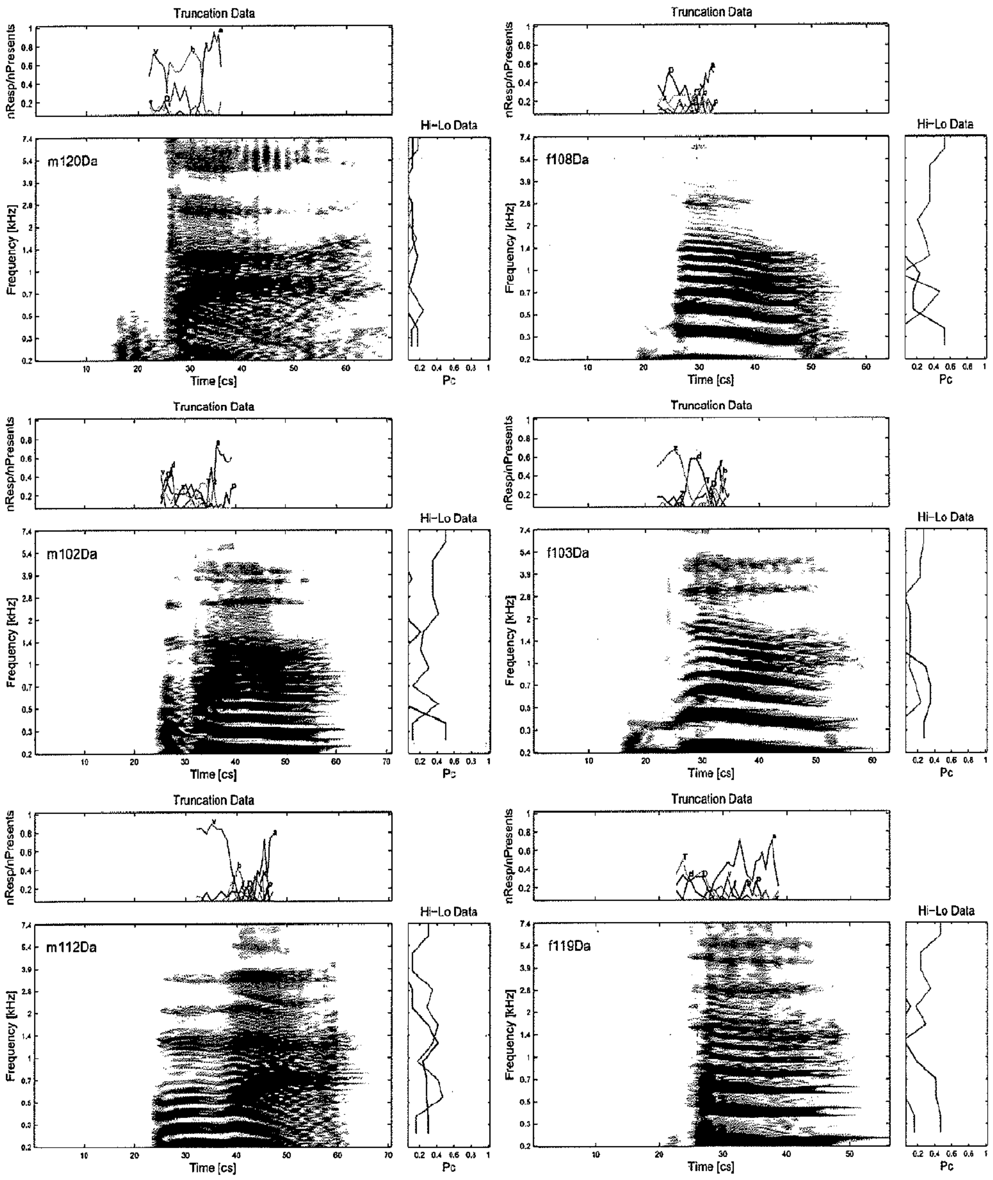
Figure 61:
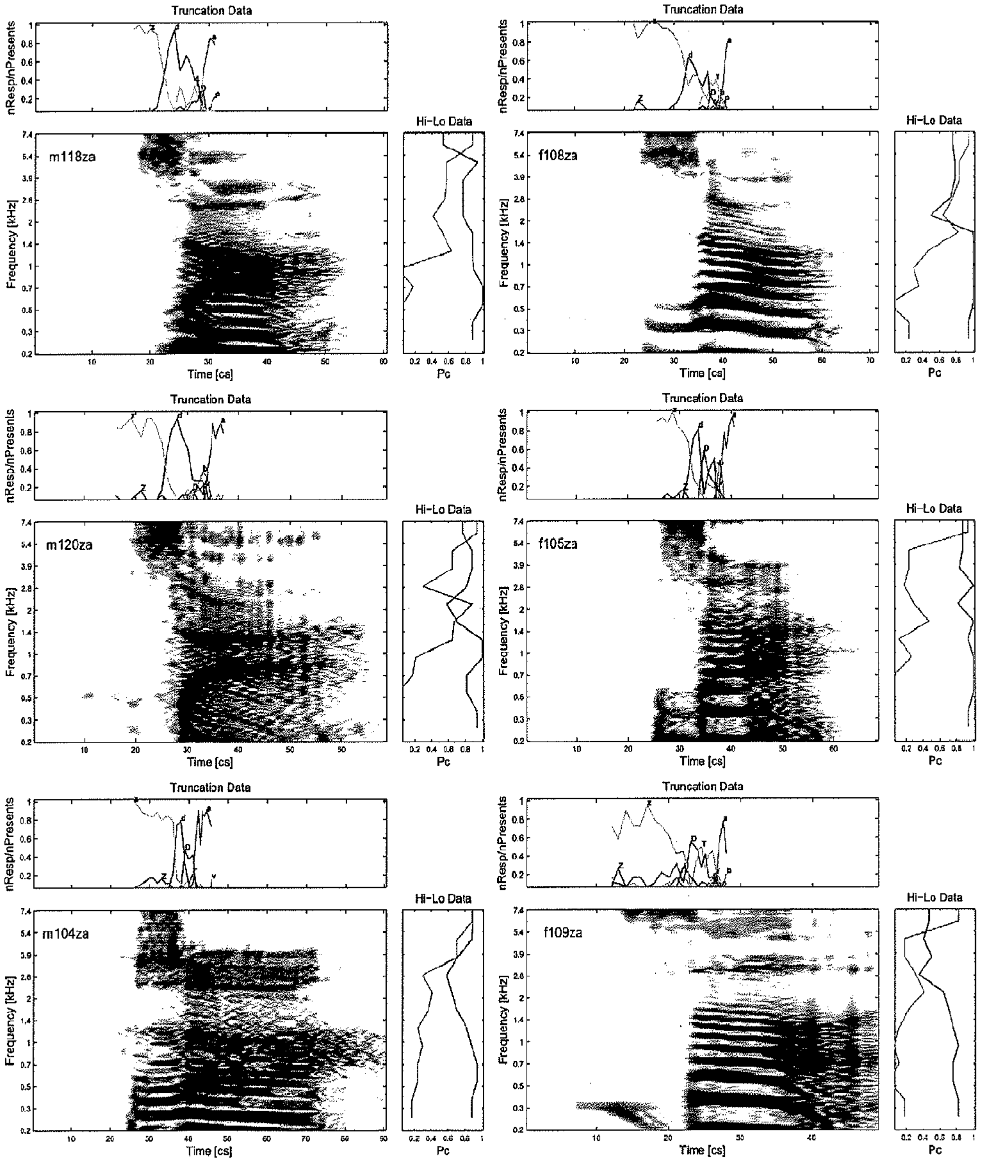
Figure 62:
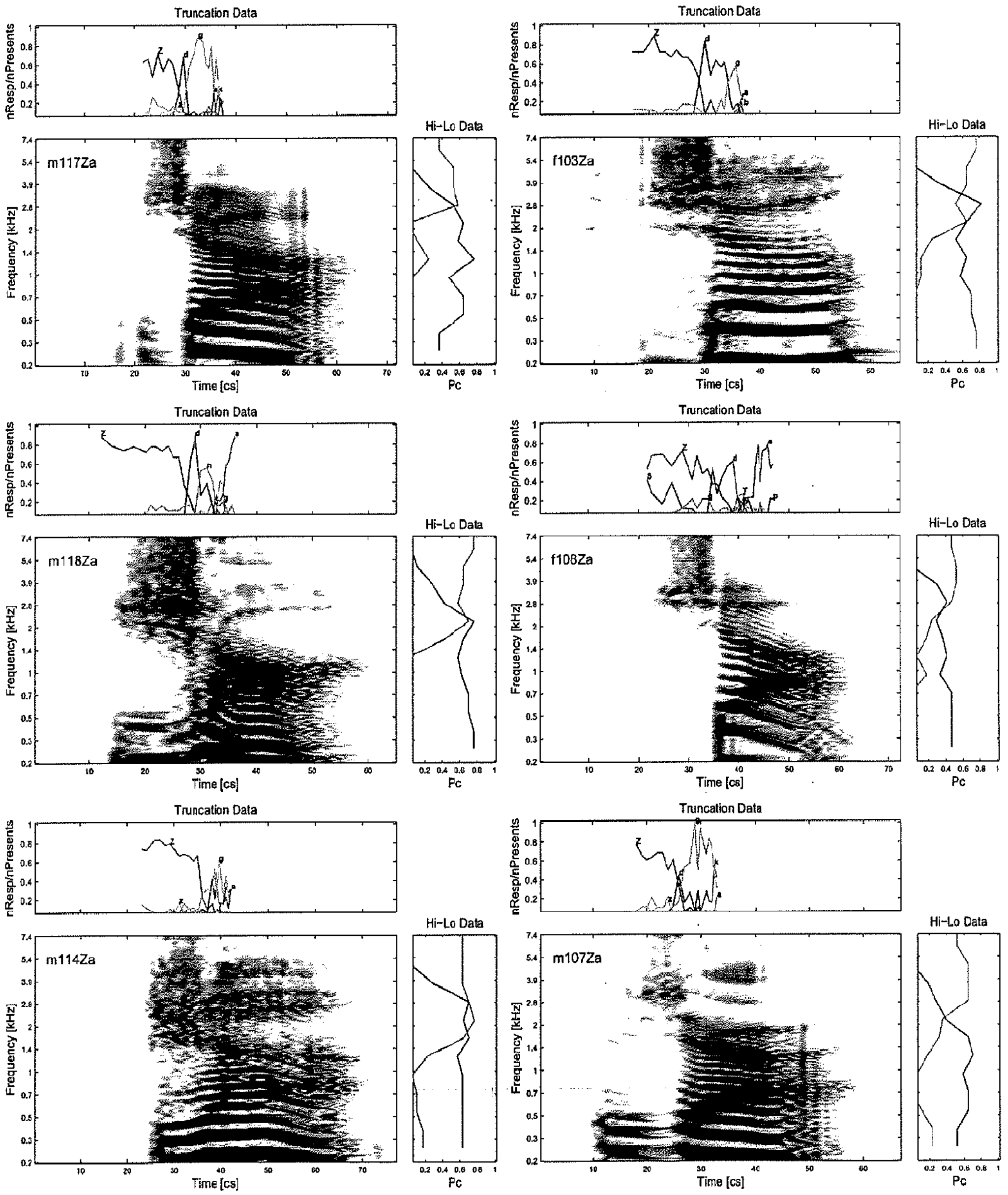
Figure 63:
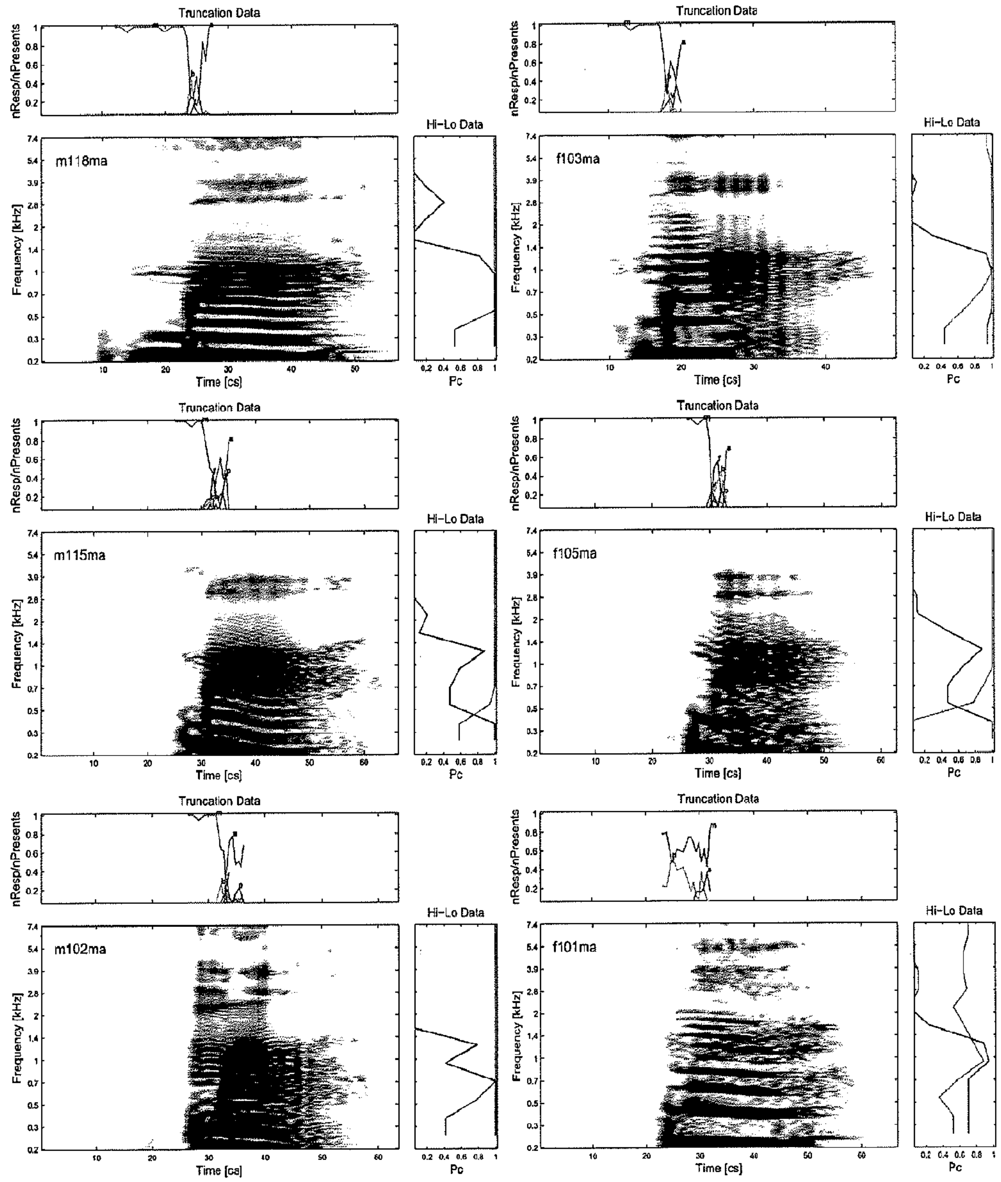
Figure 64:
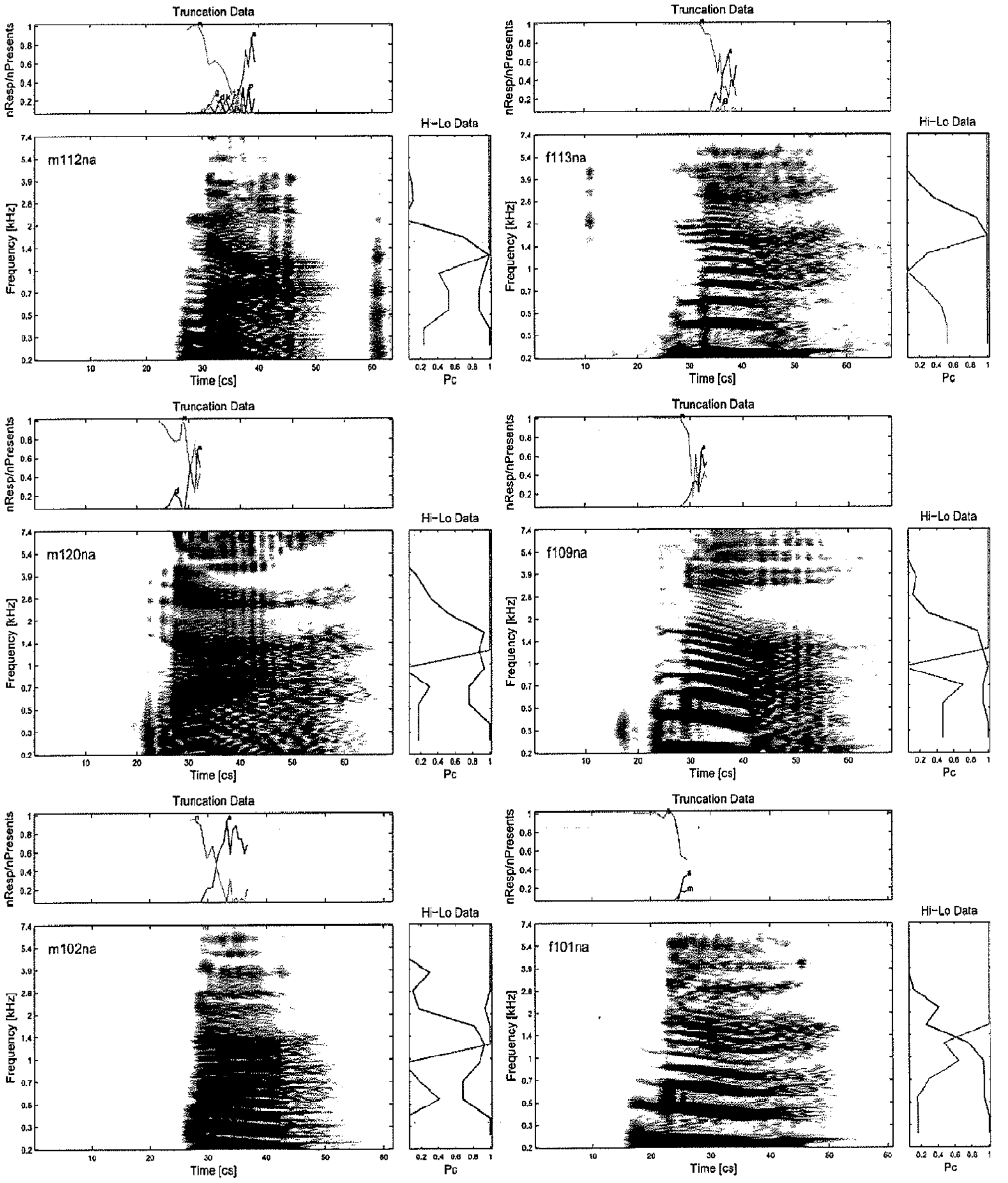

A schematic diagram of an example feature-based speech enhancement system according to an embodiment of the invention is shown in FIG. 48. It may include two main components, a feature detector 4810 and a speech synthesizer 4820. The feature detector may identify a feature in an utterance as previously described. For example, the feature detector may use time and frequency importance functions to identify a feature as previously described. The feature detector may then send the feature as an input for the following process on speech enhancement. The speech synthesizer may then boost the feature in the signal to generate a new signal that may have a better intelligibility for the listener.

According to an embodiment of the invention, a hearing aid or other device may incorporate the system shown in FIG. 48. In such a configuration, the system may enhance specific sounds for which a subject has difficulty. In some cases, the system may allow sounds for which the subject has no problem at all to pass through the system unmodified. In a specific embodiment, the system may be customized for a listener, such as where certain utterances or other aspects of the received signal are enhanced or otherwise manipulated to increase intelligibility according to the listener's specific hearing profile.

According to an embodiment of the invention, an Automatic Speech Recognition (ASR) system may be used to process speech sounds. Recent comparisons indicate the gap between the performance of an ASR system and the human recognition system is not overly large. According to Sroka and Braida (2005) ASR systems at +10 dB SNR have similar performance to that of HSR of normal hearing at +2 dB SNR. Thus, although an ASR system may not be perfectly equivalent to a person with normal hearing, it may outperform a person with moderate to serious hearing loss under similar conditions. In addition, an ASR system may have a confusion pattern that is different from that of the hearing impaired listeners. The sounds that are difficult for the hearing impaired may not be the same as sounds for which the ASR system has weak recognition. One solution to the problem is to engage an ASR system when has a high confidence regarding a sound it recognizes, and otherwise let the original signal through for further processing as previously described. For example, a high punishment level, such as proportional to the risk involved in the phoneme recognition, may be set in the ASR.

A device or system according to an embodiment of the invention, such as the devices and systems described with respect to FIGS. 11 and 48, may be implemented as or in conjunction with various devices, such as hearing aids, cochlear implants, telephones, portable electronic devices, automatic speech recognition devices, and other suitable devices. The devices, systems, and components described with respect to FIGS. 11 and 48 also may be used in conjunction or as components of each other. For example, the event detector 1150 and/or phone detector 1160 may be incorporated into or used in conjunction with the feature detector 4810. In other configurations, the speech enhancer 4820 may use data obtained from the system described with respect to FIG. 11 in addition to or instead of data received from the feature detector 4810. Other combinations and configurations will be readily apparent to one of skill in the art.

In some embodiments, it may be useful to have an accurate way to identify one or more features associated with speech sounds occurring in the speech. According to certain embodiments of the invention, features responsible for various speech sounds may be identified, isolated, and linked to the associated sounds using a multi-dimensional approach. As used herein, a "multi-dimensional" approach or analysis refers to an analysis of a speech sound or speech sound feature using more than one dimension, such as time, frequency, intensity, and the like. As a specific example, a multi-dimensional analysis of a speech sound may include an analysis of the location of a speech sound feature within the speech sound in time and frequency, or any other combination of dimensions. In some embodiments, each dimension may be associated with a particular modification made to the speech sound. For example, the location of a speech sound feature in time, frequency, and intensity may be determined in part by applying various truncation, filters, and white noise, respectively, to the speech sound. In some embodiments, the multi-dimensional approach may be applied to natural speech or natural speech recordings to isolate and identify the features related to a particular speech sound. For example, speech may be modified by adding noise of variable degrees, truncating a section of the recorded speech from the onset, performing high- and/or low-pass filtering of the speech using variable cutoff frequencies, or combinations thereof. For each modification of the speech, the identification of the sound by a large panel of listeners may be measured, and the results interpreted to determine where in time, frequency and at what signal to noise ratio (SNR) the speech sound has been masked, i.e., to what degree the changes affect the speech sound. Thus, embodiments of the invention allow for "triangulation" of the location of the speech sound features and the events, along the several dimensions.

According to a multi-dimensional approach, a speech sound may be characterized by multiple properties, including time, frequency and intensity. Event identification involves isolating the speech cues along the three dimensions. Prior work has used confusion tests of nonsense syllables to explore speech features. However, it has remained unclear how many speech cues could be extracted from real speech by these methods; in fact there is high skepticism within the speech research community as the general utility of such methods. In contrast, embodiments of the invention make use of multiple tests to identify and analyze sound features from natural speech. According to embodiments of the invention, to evaluate the acoustic cues along three dimensions, speech sounds are truncated in time, high/lowpass filtered, or masked with white noise and then presented to normal hearing (NH) listeners.

One method for determining the influence of an acoustic cue on perception of a speech sound is to analyze the effect of removing or masking the cue on the speech sound, to determine whether it is degraded and/or the recognition score of the is sound significantly altered. This type of analysis has been performed for the sound /t/, as described in "A method to identify noise-robust perceptual features: application for consonant /t/," J. Acoust. Soc. Am. 123(5), 2801-2814, and U.S. application Ser. No. 11/857,137, filed Sep. 18, 2007, the disclosure of each of which is incorporated by reference in its entirety. As described therein, it has been found that the /t/ event is due to an approximately 20 ms burst of energy, between 4-8 kHz. However, this method is not readily expandable to many other sounds.

Methods involved in analyzing speech sounds according to embodiments of the invention will now be described. Because multiple dimensions, most commonly three dimensions, may be used, techniques according to embodiments of the invention may be referred to as "multi-dimensional" or "three-dimensional (3D)" approaches, or as a "3D deep search."

To estimate the importance of individual speech perception events for sounds in addition to /t/, embodiments of the invention utilize multiple independent experiments for each consonant-vowel (CV) utterance. The first experiment determines the contribution of various time intervals, by truncating the consonant. Various time ranges may be used, for example multiple segments of 5, 10 or 20 ms per frame may be used, depending on the sound and its duration. The second experiment divides the fullband into multiple bands of equal length along the BM, and measures the score in different frequency bands, by using highpass-and/or lowpass-filtered speech as the stimuli. Based on the time-frequency coordinate of the event as identified in the previous experiments, a third experiment may be used to assess the strength of the speech event by masking the speech at various signal-to-noise ratios. To reduce the length of the experiments, it may be presumed that the three dimensions, i.e., time, frequency and intensity, are independent. The identified events also may be verified by software designed for the manipulation of acoustic cues, based on the short-time Fourier transform.

According to embodiments of the invention, after a speech sound has been analyzed to determine the effects of one or more features on the speech sound, spoken speech may be modified to improve the intelligibility or recognizability of the speech sound for a listener. For example, the spoken speech may be modified to increase or reduce the contribution of one or more features or other portions of the speech sound, thereby enhancing the speech sound. Such enhancements may be made using a variety of devices and arrangements, as will be discussed in further detail below.

Figure 65:
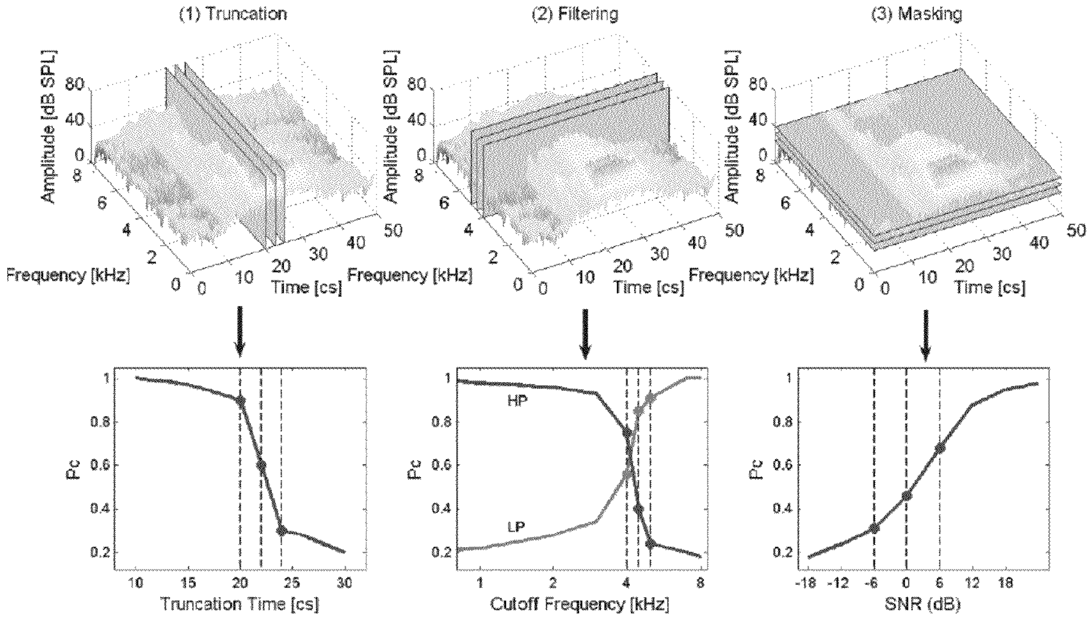
FIG. 65 shows an example application of a multi-dimensional approach to identify acoustic cues according to an embodiment of the invention.

FIG. 65 shows an example application of a 3D approach to identify acoustic cues according to an embodiment of the invention. To isolate the cue along the time, a speech sound may be truncated in time from the onset with various step sizes, such as 5, 10, and/or 20 ms, depending on the duration and type of consonant. To locate the cue along the frequency axis, a speech sound may be highpass and lowpass filtered before being presented to normal hearing listeners. To measure the strength of the cue, a speech sound may be masked by white noise of various signal-to-noise ratio (SNR). In the example shown in FIG. 65, the three plots on the top row illustrate how the speech sound is processed in each dimension. Typical correspondent recognition scores (Pc) are depicted in the plots on the bottom row. It will be understood that the specific waveforms and results shown in FIG. 65 are provided by way of example only, and embodiments of the invention may be applied in different combinations and to different sounds than shown.

In an embodiment, separate experiments or sound analysis procedures may be performed to analyze speech according to the three dimensions described with respect to FIG. 65: time-truncation (TR07), high/lowpass filtering (HL07) and "Miller-Nicely (2005)" noise masking (MN05).

TR07 evaluates the temporal property of the events. Truncation starts from the beginning of the utterance and stops at the end of the consonant. In an embodiment, truncation times may be manually chosen, for example so that the duration of the consonant is divided into non-overlapping consecutive intervals of 5, 10, or 20 ms. Other time frames may be used. An adaptive scheme may be applied to calculate the sample points, which may allow for more points to be assigned in cases where the speech changes rapidly, and fewer points where the speech is in a steady condition. In the example process performed, eight frames of 5 ms were allocated, followed by twelve frames of 10 ms, and as many 20 ms frames starting from the end of the consonant near the consonant-vowel transition, as needed, until the entire interval of the consonant was covered. To make the truncated speech sounds more natural, and to remove an possible onset truncation artifacts, white noise also may be applied to mask the speech stimuli, for example at an SNR of 12 dB.

HL07 allows for analysis of frequency properties of the sound events. A variety of filtering conditions may be used. For example, in one experimental process performed according to an embodiment of the invention, nineteen filtering conditions, including one full-band (250-8000 Hz), nine highpass and nine lowpass conditions were included. The cutoff frequencies were calculated using Greenwood function, so that the full-band frequency range was divided into 12 bands, each having an equal length along the basilar membrane. The highpass cutoff frequencies were 6185, 4775, 3678, 2826, 2164, 1649, 1250, 939, and 697 Hz, with an upper-limit of 8000 Hz. The lowpass cutoff frequencies were 3678, 2826, 2164, 1649, 1250, 939, 697, 509, and 363 Hz, with the lower-limit being fixed at 250 Hz. The highpass and lowpass filtering used the same cutoff frequencies over the middle range. As with TR07, white noise may be added, for example at a 12 dB SNR, to make the modified speech sounds more natural sounding.

MN05 assesses the strength of the event in terms of noise robust speech cues, under adverse conditions of high noise. In the performed experiment, besides the quiet condition, speech sounds were masked at eight different SNRs: −21, −18, −15, −12, −6, 0, 6, 12 dB, using white noise. Further details regarding the specific MN05 experiment as applied herein are provided in S. Phatak and J.B. Allen, J. B. "Consonant and vowel confusions in speech-weighted noise," J. Acoust. Soc. Am. 121(4), 2312-26 (2007), the disclosure of which is incorporated by reference in its entirety.

Various procedures may be applied to implement the analysis tools ("experiments") described above. A specific example of such procedures is described in further detail below. It will be understood that these procedures may be modified without departing from the scope of the invention, as will be readily understood by one of skill in the art.

In some embodiments, an AI-gram as known in the art may be used to analyze and illustrate understand how speech sounds are represented on the basilar membrane. This construction is a what-you-see-is-what-you-hear (WISIWYH) signal processing auditory model tool, to visualize audible speech components. The AI-gram estimates the speech audibility via Fletcher's Articulation Index (AI) model of speech perception. The AI-gram tool crudely simulates audibility using an auditory peripheral processing (a linear Fletcher-like critical band filter-bank). Further details regarding the construction of an AI-gram and use of the AI-gram tool are provided in M.S. Regnier et al., "A method to identify noise-robust perceptual features: application for consonant /t/," J. Acoust. Soc. Am. 123(5), 2801-2814 (2008), the disclosure of which is incorporated by reference in its entirety. A brief summary of the AI-gram is also provided below.

The results of TR07, HL07 and MN05 take the form of confusion patterns (CPs), which display the probabilities of all possible responses (the target and competing sounds), as a function of the experimental conditions, i.e., truncation time, cutoff frequency and signal -to-noise ratio. As used herein, $c_{x|y}$ denotes the probability of hearing consonant /x/ given consonant /y/. When the speech is truncated to time $t_n$ the score is denoted $c_{x|y}^{T}(t_n)$ . The score of the lowpass and highpass experiment at cutoff frequency $f_k$ is indicated as $c_{x|y}^{L/H}(f_{kn})$ . Finally the score of the masking experiment as a function of signal-to-noise ratio is denoted $c_{x|y}^{M}(SNR_k)$ .

Figure 66:
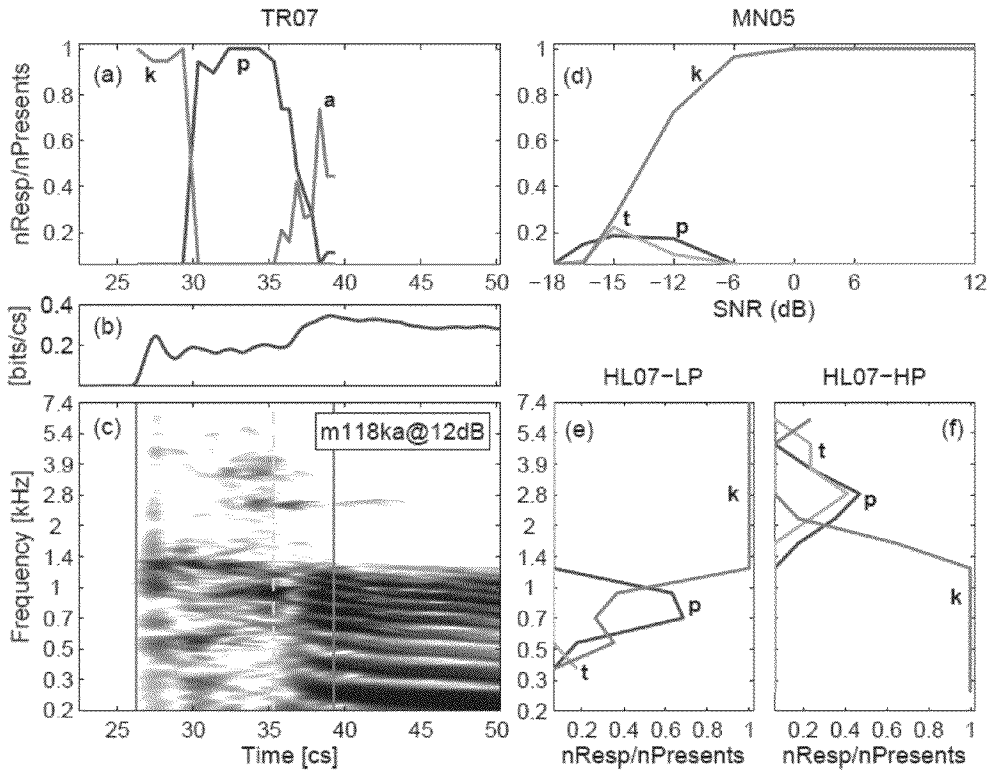
FIG. 66 shows the confusion patterns of /ka/ when produced by an individual talker according to an embodiment of the invention.

A specific example of a 3D method according to an embodiment of the invention will now be described, which shows how speech perception may be affected by events. FIG. 66 depicts the CPs of /ka/ produced by an individual talker "m118" (using utterance "m118*ka*"). The TR07 time truncation results are shown in panel (a), HL07 low-and highpass as functions of cutoff frequency in panels (e) and (f), respectively, and CP as a function of SNR as observed in MN05 in panel (d). The instantaneous AI $a_n \equiv a(t_n)$ at truncation time $t_n$ is shown in panel (b), and the AI-gram at 12 dB SNR in panel (c). To facilitate the integration of the three experiments, the Algram and the three scores are aligned in time ($t_n$ in centi-seconds (cs)) and frequency (along the cochlear place axis, but labeled in frequency), and thus depicted in a compact manner.

The CP of TR07 shows that the probability of hearing /ka/ is 100% for $t_n \leq 26$ cs, when little or no speech component has been removed. However, at around 29 cs, when the /ka/ burst has been almost completely or completely truncated, the score for /ka/ drops to 0% within a span of 1 cs. At this time (about 32-35 cs) only the transition region is heard, and 100% of the listeners report hearing a /pa/. After the transition region is truncated, listeners report hearing only the vowel /a/.

As shown in panels (e) and (f), a related conversion occurs in the lowpass and highpass experiment HL07 for /ka/, in which both the lowpass score $c_{k|k}^{L}$ and highpass score $c_{k|k}^{H}$ drop from 100% to less than about 10% at a cutoff frequency $f_k$ of about 1.4 kHz. In an embodiment, this frequency may be taken as the frequency location of the /ka/ cue. For the lowpass case, listeners reported a morphing from /ka/ to /pa/ with score $c_{p|k}^{L}$ reaching about 70% at about 0.7 kHz. For the highpass case, listeners reported a morphing of /ka/ to /ta/ at the $c_{t|k}^{H}=0.4$ (40%) level. The remaining confusion patterns are omitted for clarity.

As shown in panel (d), the MN05 masking data indicates a related confusion pattern. When the noise level increases from quiet to 0 dB SNR, the recognition score of /ka/ is about 1 (i.e., 100%), which usually signifies the presence of a robust event.

Figure 67:
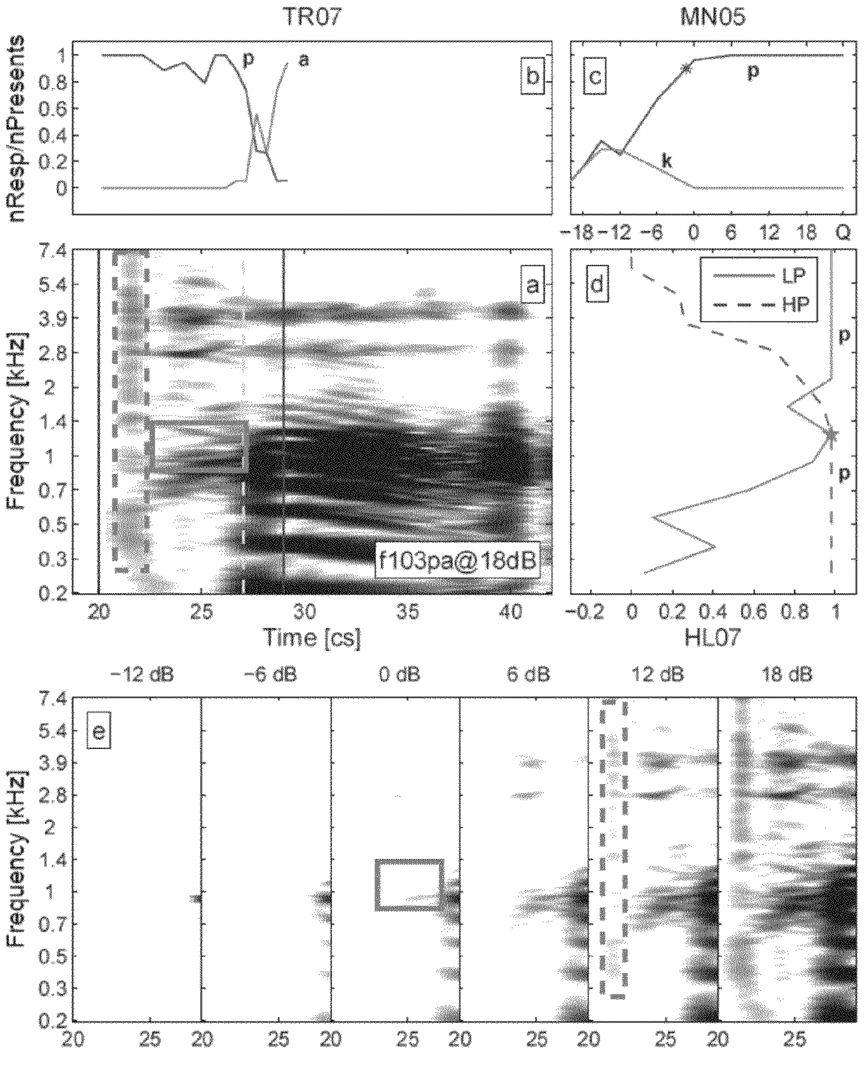
FIG. 67 shows an example of analysis of a sound using a multi-dimensional method according to an embodiment of the invention.

An example of identifying stop consonants by applying a 3D approach according to an embodiment of the invention will now be described. For convenience, the results from the three analysis procedures are arranged in a compact form as previously described. Referring to FIG. 67, for example, panel (a) shows the AI-gram of the speech sound at 18 dB SNR, upon which each event hypothesis is highlighted by a rectangular box. The middle vertical dashed line denotes the voice-onset time, while the two vertical solid lines on either side of the dashed line denote the starting and ending points for the TR07 time truncation process. Panel (b) shows the scores from TR07. Panel (d) shows the scores from HL07. Panel (c) shows the scores from experiment MN05. The CP functions are plotted as solid (lowpass) or dashed (highpass) curves, with competing sound scores with a single letter identifier next to each curve. The * in panel (c) indicates the SNR where the listeners begin to confuse the sound in MN05. The star in panel (d) indicates the intersection point of the highpass and lowpass scores measured in HL07. The six figures in panel (e) show partial AI-grams of the consonant region, delimited in panel (a) by the solid lines, at −12, −6, 0, 6, 12, 18 dB SNR. A box in any of the seven AI grams of panels (a) or (e) indicates a hypothetical event region, and for (e), indicates its visual threshold according to the AI-gram model. Similar results and analysis are presented for other sounds in further detail below, including the unvoiced stops /p/, /t/ and /k/, followed by vowel /a/ as in "father." For each consonant, six utterances were analyzed, discussed by the research group, and a representative example is presented.

FIG. 67 shows hypothetical events for /pa/ from talker f103 according to an embodiment of the invention. Panel (a) shows the AI-gram with a dashed vertical line showing the onset of voicing (sonorance), indicating the start of the vowel. The solid boxes indicate hypothetical sources of events. Panel (b) shows confusion patterns as a function of truncation time $t_n$. Panel (c) shows the CPs as a function of $SNR_k$. Panel (d) shows CPs as a function of cutoff frequency $f_k$. Panel (e) shows AI-grams of the consonant region defined by the solid vertical lines in panel (a), at −12, −6, 0, 6, 12, and 18 dB SNR. The wide band click becomes barely intelligible when the SNR is less than 12 dB. The $F_2$ transition remains audible at 0 dB SNR. The analysis illustrated in FIG. 3 for indicates that there may be two different events: 1) a formant transition at 1-1.4 kHz, which appears to be the dominant cue, maskable by white noise at 0 dB SNR; and 2) a wide band click running from 0.3-7.4 kHz, maskable by white noise at 12 dB SNR. Stop consonant /pa/ is traditionally characterized as having a wide band click which is seen in this /pa/ example, but not in five others studied. For most /pa/s, the wide band click diminishes into a low-frequency burst. The click does appear to contribute to the overall quality of /pa/ when it is present.

Time Analysis: Referring to panel (b), the truncated /p/ score $c_{p|p}^{T}(t_n)$ according to an embodiment is illustrated. The score begins at 100% but, begins to decrease slightly when the wide band click, which includes the low-frequency burst, is truncated at around 23 cs. The score drops to the chance level (1=16) only when the transition is removed at 27 cs. At this time subjects begin to report hearing the vowel /a/ alone. Thus, even though the wide band click contributes slightly to the perception of /pa/, the $F_2$ transition appears to play the main role.

Frequency Analysis: The lowpass and highpass scores, as depicted in panel (d) of FIG. 67, start at 100% at each end of the spectrum, and begin to drop near the intersection point, close to 1.3 kHz. This intersection (indicated by a star) appears to be a clear indicator of the center frequency of the dominant perceptual cue, which is the $F_2$ region running from 22 cs to 26 cs, as labeled by the truncation data in panel (b).

Amplitude analysis: Panel (c) of FIG. 67 shows the recognition score $c_{p|p}$ as a function of SNR. The score drops to 90% at 0 dB SNR ($SNR_{90}$ denoted by *), at the same time the /pa/→/ka/ confusion $c_{p|k}^{M}$ begins to increase. The six AI-grams of panel (e) show that the audible threshold for the $F_2$ transition is at 0 dB SNR, the same as the $SNR_{90}$ point in panel (c) where the listeners begin to lose the sound, giving credence to the energy of $F_2$ sticking out in front of the sonorant portion of the vowel, as the main cue for /pa/ event.

The 3D displays of other five /pa/s (not shown) are in basic agreement with that of FIG. 67, with the main difference being the existence of the wideband burst at 22 cs for f103, and slightly different highpass and lowpass intersection frequency, ranging from 0.7-1.4 kHz, for the other five sounds. The required duration of the $F_2$ energy before the onset of voicing was seen around 3-5 cs before the onset of voicing and this timing too, is very critical to the perception of /pa/. The existence of excitation of $F_3$ is evident in the AI-grams, but it does not appear to interfere with the identification of /pa/, unless $F_2$ has been removed by filtering (a minor effect for f103). Also /ta/ was identified in a few examples, as high as 40% when $F_2$ was masked.

Figure 68:
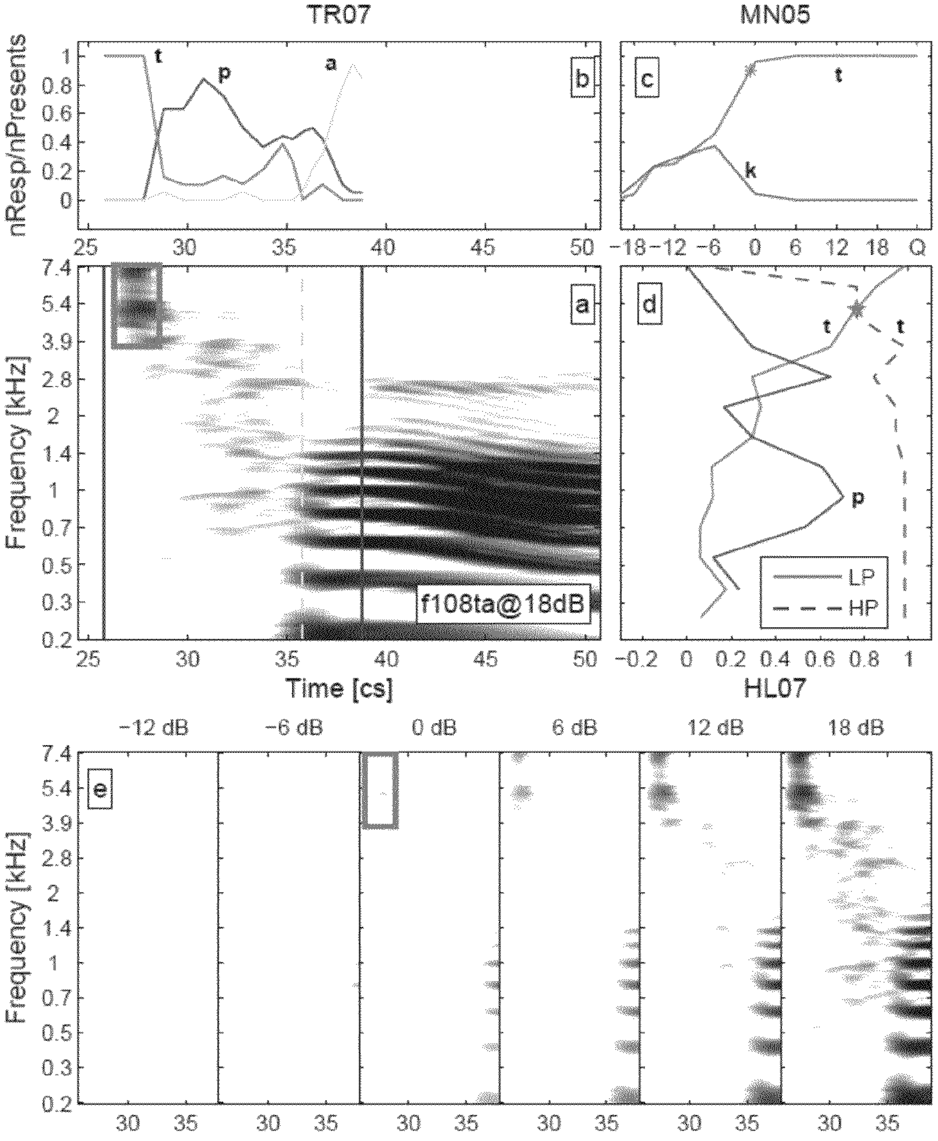
FIG. 68 shows an example analysis of /ta/ according to an embodiment of the invention.

FIG. 68 shows analysis of /ta/ from talker f105 according to an embodiment of the invention. Panel (a) shows the AI-gram with identified events highlighted by a rectangular box. Panels (b), (c), and (d) show CPs for the TR07, HL07 and MN05 procedures. Panel (e) shows AI-grams of the consonant part at −12, −6, 0, 6, 12, 18 dB SNR, respectively. The event becomes masked at 0 dB SNR. From FIG. 4, it can be seen that the /ta/ event for talker f105 is a short high-frequency burst above 4 kHz, 1.5 cs in duration and 5-7 cs prior to the vowel.

Time Analysis: In panel (b), the score for the truncated /t/ drops at 28 cs and remains at chance level for later truncations, suggesting that the high-frequency burst is critical for /ta/ perception. At around 29 cs when the burst has been completely truncated and the listeners can only listen to the transition region, listeners start reporting a /pa/. By 32 cs, the /pa/score climbs to 85%. These results agree with the results of /pa/ events as previously described. Once the transition region is also truncated, as shown by the dashed line at 36 cs in panel (a), subjects report only hearing the vowel, with the transition from 50% /pa/→/a/ occurring at about 37 cs.

Frequency Analysis: In panel (d), the intersection of the highpass and the lowpass perceptual scores (indicated by the star) is at around 5 kHz, showing the dominant cue to be the high-frequency burst. The lowpass CPs (solid curve) show that once the high frequency burst is removed, the /ta/ score $c_{f|t}^{L}$ drops dramatically. The off-diagonal lowpass CP data $c_{p|t}^{L}$ (solid curve labeled "p" at 1 kHz) indicates that confusion with /pa/ is very high once all the high frequency information is removed. This can be explained by reference to the results illustrated in FIG. 67, which show the significance of the $F_2$ transition around 1 kHz for /pa/ identification. Given only low-frequency bands, while /ta/ cannot be perceived, it can be guessed (chance typically plays a relatively important role when the set size is small). The best alternative in such cases seems to be a low frequency /pa/, as found from the previous results shown in FIG. 67. The highpass results agree with the view that /ta/ results from the high-frequency burst.

Amplitude Analysis: The /ta/ burst has an audible threshold of −1 dB SNR in white noise, defined as the SNR where the score drops to 90%, namely $SNR_{90}$ [labeled by a * in panel (c)]. When the /ta/ burst is masked at −6 dB SNR, subjects report /ka/ and /ta/ equally, with a reduced score around 30%. The AI-grams shown in panel (e) show that the high-frequency burst is lost between 0 dB and −6 dB, consistent with the results of FIG. 4 panel (c) that $SNR_{90}$=−1 dB SNR.

Based on this analysis, the event of /ta/ is verified to be a high-frequency burst above 4 kHz. The perception of /ta/ is dependent on the identified event which explains the sharp drop in scores when the high-frequency burst is masked. These results are therefore in complete agreement with the earlier, single-dimensional analysis of /t/ by Regnier and Allen (2008), as well as many of the conclusions from the 1950s Haskins Laboratories research.

Of the six /ta/ sounds, five morphed to /pa/ once the /ta/ burst was truncated (e.g., FIG. 68, panel (b)), while one morphed to /ka/ (m/112*ta*), with a relatively high 90% score. This same sound also became /ka/ rather than /pa/ following lowpass filtering below 2.8 kHz, with a 100% score. For this particular sound, it is seen that the /ta/ burst precedes the vowel only by around 2 cs, instead of the 5-7 cs which is the case for a normally articulated /ta/. This timing cue is especially important for the perception of /pa/ since the transition region and relative timing of this transition region is critical to /pa/ perception.

Figure 69:
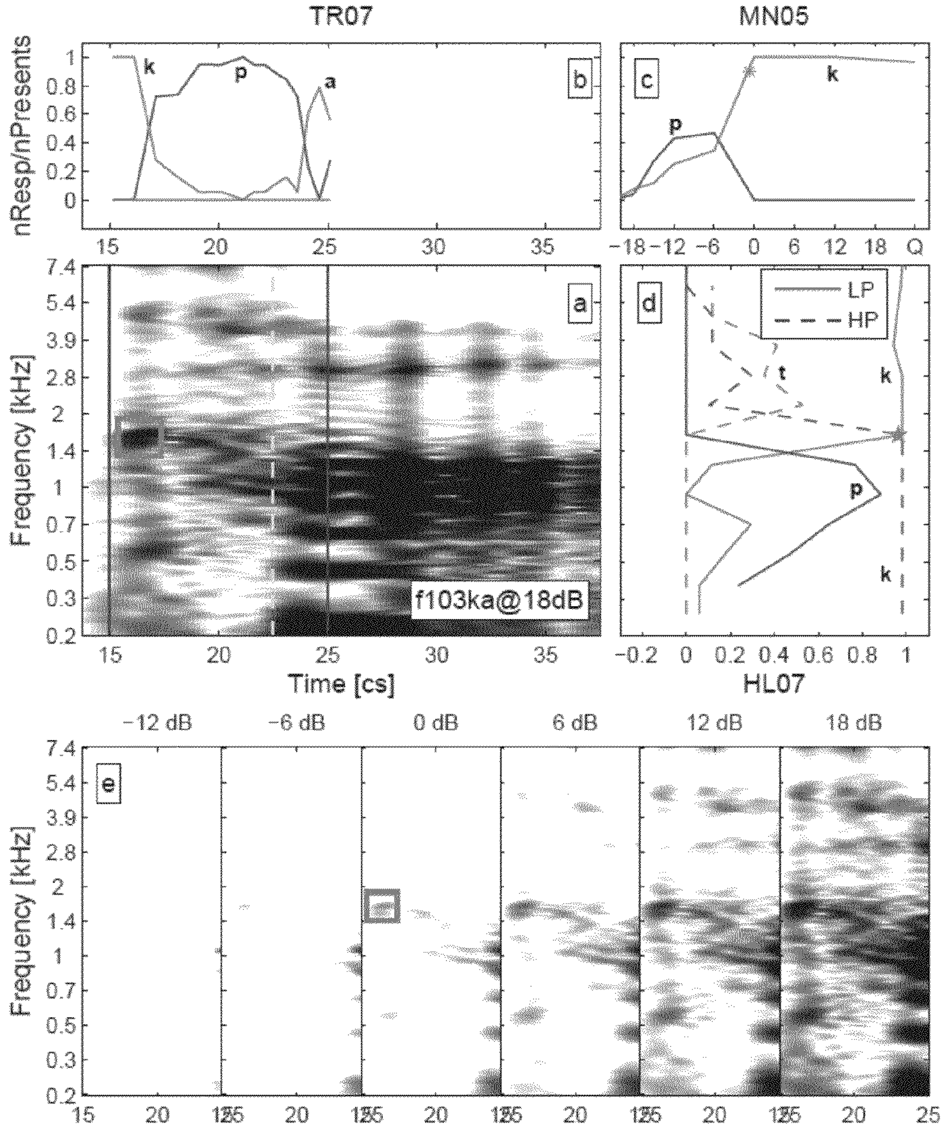

FIG. 69 shows an example analysis of /ka/ from talker f103 according to an embodiment of the invention. Panel (a) shows the AI-gram with identified events highlighted by rectangular boxes. Panels (b), (c), and (d) show the CPs for TR07, HL07 and MN05, respectively. Panel (e) shows AI-grams of the consonant part at −12, −6, 0, 6, 12, 18 dB SNR. The event remains audible at 0 dB SNR. As described in further detail below, analysis of FIG. 69 reveals that the event of /ka/ is a mid-frequency burst around 1.6 kHz, articulated 5-7 cs before the vowel, as highlighted by the rectangular boxes in panels (a) and (e).

Time Analysis: Panel (b) shows that once the mid-frequency burst is truncated at 16.5 cs, the recognition score $c_{k|k}^{T}$ rises from 100% to chance level within 1-2 cs. At the same time, most listeners begin to hear /pa/ with the score ($c_{p|k}^{T}$ rises to 100% at 22 cs, which agrees with other conclusions about the /pa/ feature as previously described. As seen in panel (a), there may be high-frequency (e.g., 3-8 kHz) bursts of energy, but usually not of sufficient amplitude to trigger /t/ responses. Since these /ta/-like bursts occur around the same time as the mid-frequency /ka/ feature, time truncation of the /ka/ burst results in the simultaneous truncation of these potential It/ cues. Thus truncation beyond 16.5 cs result in confusions with /p/, not /t/. Beyond 24 cs, subjects report only the vowel.

Frequency Analysis: As illustrated by panel (d) the highpass score $c_{k|k}^{H}$ and the lowpass score $c_{k|k}^{L}$ cross at 1.4 kHz. Both curves have a sharp decrease around the intersection point, suggesting that the perception of /ka/ is dominated by the mid-frequency burst as highlighted in panel (a). The highpass $c_{t|k}^{H}$, shown by the dashed curve of panel (d), indicates minor confusions with /ta/ (e.g., 40%) for $f_c$>2 kHz. This is in agreement with the conclusion about the /ta/ feature being a high-frequency burst. Similarly, the lowpass CP around 1 kHz shows strong confusions with /pa/ ($c_{p|k}{}^{L}$=90%), when the /ka/ burst is absent.

Amplitude Analysis: From the AI-grams shown in panel (e), the burst is identified as being just above its detection threshold at 0 dB SNR. Accordingly, the recognition score of /ka/ $c_{k|k}{}^{M}$ in panel (c) drops rapidly at 0 dB SNR. At −6 dB SNR the burst has been fully masked, with most listeners reporting /pa/ instead of /ka/.

Not all of the six sounds strongly morphed to /pa/ once the /ka/ burst was truncated, as is seen in FIGS. 66(*a*) and 69(*b*). Two out of six had no morphs, just remained a very weak /ka/ once the onset-burst was removed (m114*ka*, f119*ka*). These scores are consistent with guessing. It has been found that, when the burst of /ka/ or /ta/ is masked or removed, the auditory system can pick up residual transitions in the low-frequency, which would cause the sound to morph to /pa/. In speech perception tests, /pa, ta, ka/ commonly form a confusion group. This can be explained by the fact that the three sounds share the same type of event patterns, i.e., burst and $F_2$ transition. The relative timing for these three unvoiced sounds is nearly the same, with a major difference being in the center frequencies of the bursts, with the /pa/ cue in the low-frequency, /ka/ in the mid-frequency, and /ta/ in the high-frequency.

FIG. 70 shows an example analysis of /ba/ from talker f101 according to an embodiment of the invention. Panel (a) shows the AI-gram with identified events highlighted by rectangular boxes. Panels (b), (c), and (d) show CPs of TR07, HL07 and MN05, respectively. Panel (e) shows the AI-grams of the consonant part at −12, −6, 0, 6, 12, 18 dB SNR. The $F_2$ transition and wide band click become masked around 0 dB SNR, while the low-frequency burst remains audible at −6 dB SNR.

In some embodiments, the 3D method described herein may have a greater likelihood of success for sounds having high scores in quiet. Among the six /ba/ sounds used from the corpus, only the one illustrated in FIG. 70 (f111) had 100% scores at 12 dB SNR and above; thus, the /ba/ sound may be expected to be the most difficult and/or least accurate sound when analyzed using the 3D method. Based on the analysis of FIG. 70, it has been found that hypothetical features for /ba/ include: 1) a wide band click in the range of 0.3 kHz to 4.5 kHz; 2) a low-frequency around 0.4 kHz; and 3) a $F_2$ transition around 1.2 kHz.

Time Analysis: When the wide band click is completely truncated at $t_n$=28 cs, the /ba/ score $c_{b|b}{}^{T}$ as shown in panel (b) drops from 80% to chance level, at the same time the /ba/→/va/ confusion $c_{v|b}{}^{T}$ for and /ba/→/fa/ confusion $c_{f|b}{}^{T}$ increase relatively quickly, indicating that the wide band click is important for the distinguish of /ba/ from the two fricatives /va/ and /fa/. However, since the three events overlap on time axis, it may not be immediately apparent which event plays the major role.

Frequency Analysis: Panel (d) shows that the highpass score $c_{b|b}{}^{H}$ and lowpass score $c_{t|t}{}^{L}$ cross at 1.3 kHz, and both change fast within 1-2 kHz. According to an embodiment, this may indicate that the $F_2$ transition, centered around 1.3 kHz, is relatively important. Without the $F_2$ transition, most listeners guess /da/ instead of /ba/, as illustrated by the lowpass data for $f_c$<1 kHz. In addition, the small jump in the lowpass score $c_{b|b}{}^{L}$ around 0.4 kHz suggests that the low-frequency burst may also play a role in /ba/ perception.

Amplitude Analysis: From the AI-grams in panel (e), it can be seen that the $F_2$ transition and wide band click become masked by the noise somewhere below 0 dB SNR. Accordingly the listeners begin to have trouble identifying the /ba/ sound in the masking experiment around the same SNR, as represented by $SNR_{90}$ (*) in panel (c). When the wideband click is masked, the confusions with /va/ increase, and become equal to /ba/ at −12 dB SNR with a score of 40%.

There are the only three LDC /ba/ sounds out of 18 with 100% scores at and above 12 dB SNR, i.e., /ba/ from f101/ shown here and /ba/ from f109, which has a 20% /va/error rate for SNR −10 dB SNR. The remaining 18 /ba/ utterances have /va/ confusions between 5 and 20%, in quiet. The recordings in the LDC database may be responsible for these low scores, or the /ba/ may be inherently difficult. Low quality consonants with error rates greater than 20% were also observed in an LDC study described in S. Phatak and J.B. Allen, "Consonant and vowel confusions in speech-weighted noise," J. Acoust. Soc. Am. 121(4), 2312-26 (2007). In some embodiments these low starting (quiet) scores may present particular difficulty in identifying the /ba/ event with certainty. It is believed that a wide band burst which exists over a wide frequency range may allow for a relatively high quality, i.e., more readily-distinguishable, /ba/ sound. For example, a well defined 3 cs burst from 0.3- 8 kHz may provide a relatively strong percept of /ba/, which may likely be heard as /va/ or /fa/ if the burst is removed.

FIG. 71 shows an example analysis of /da/ from talker m118 according to an embodiment of the invention. Panel (a) shows the AI-gram with identified events highlighted by rectangular boxes. Panels (b), (c), and (d) show CPs of TR07, HL07 and MN05, respectively. Panel (e) shows AI-grams of the consonant part at −12, −6, 0, 6, 12, 18 dB SNR. The $F_2$ transition and the high-frequency burst remain audible at 0 and −6 dB SNR, respectively. Consonant /da/ is the voiced counterpart of /ta/. It has been found to be characterized by a high-frequency burst above 4 kHz and a $F_2$ transition near 1.5 kHz, as shown in panels (a) and (e).

Time Analysis: As shown in panel (b), truncation of the high-frequency burst leads to a drop in the score of $c_{d|d}{}^{T}$from 100% at 27 cs to about 70% at 27.5 cs. The recognition score continues to decrease until the $F_2$ transition is removed completely at 30 cs, at which point the subjects report only hearing vowel /a/. The truncation data indicate that both the high-frequency burst and F2 transition are important for /da/ identification.

Frequency Analysis: The lowpass score $c_{d|d}{}^{L}$ and highpass score $c_{d|d}{}^{H}$ cross at 1.7 kHz. In general, it has been found that subjects need to hear both the $F_2$ transition and the high-frequency burst to get a full score of 100%, indicating that both events contribute to a high quality /da/. Lack of the burst usually leads to the /da/→/ga/ confusion, as shown by the lowpass confusion of $c_{g|d}{}^{L}$=30% at $f_c$=2 kHz, as shown by the solid curve labeled "g" in panel (d).

Amplitude Analysis: As illustrated by the AI-grams shown in panel (e), the $F_2$ transition becomes masked by noise at 0 dB SNR. Accordingly, the /da/ score $c_{d|d}{}^{M}$ in panel (c) drops relatively quickly at the same SNR. When the remnant of the high-frequency burst is gone at −6 dB SNR, the /da/ score $c^{d|dM}$ decreases even faster, until $c_{d|d}{}^{M}$=$c_{m|d}{}^{M}$ at −10 dB SNR, namely the /d/ and /m/ scores are equal.

Two other /da/ sounds (f103, f119) showed a dip where the lowpass score decreases abnormally as the cutoff frequency increases, similar to that seen for /da/ of m118 (i.e., 1.2-2.8 kHz). Two showed larger gaps between the lowpass score $c_{d|d}{}^{L}$ and highpass score $c_{d|d}{}^{H}$. The sixth /da/ exhibited a very wide-band burst going down to 1.4 kHz. In this case the lowpass filter did not reduce the score until it reached this frequency. For this example the cutoff frequencies for the high and lowpass filtering were such that there was a clear crossover frequency having both scores at 100%, at 1.4 kHz.

These results suggest that some of the /da/s are much more robust to noise than others. For example, the $SNR_{90}$, defined as the SNR where the listeners begin to lose the sound (Pc=0.90), is −6 dB for /da/-m104, and +12 dB for /da/-m111. The variability over the six utterances is notable, but consistent with the conclusion that both the burst and the $F_2$ transition need to be heard.

FIG. 72 shows an example analysis of /ga/ from talker m111 according to an embodiment of the invention. Panel (a) shows the AI-gram with identified events highlighted by rectangular boxes. Panels (b), (c), and (d) show the CPs of TR07, HL07 and MN05, respectively. Panel (e) shows AI-grams of the consonant part at −12, −6, 0, 6, 12, 18 dB SNR. The $F_2$ transition is barely intelligible at 0 dB SNR, while the mid-frequency burst remains audible at −6 dB SNR. The events of /ga/ include a mid-frequency burst from 1.4- 2 kHz, followed by a $F_2$ transition between 1-2 kHz, as highlighted with boxes in panel (a).

Time Analysis: Referring to panel (b), the recognition score of /ga/ $c_{g|g}^{T}$ starts to drop when the midfrequency burst is truncated beyond 22 cs. At the same time the /ga/→/da/ confusion appears, with $c_{d|g}^{T}$=40% at 23 cs. From 23-25 cs the probabilities of hearing /ba/ and /da/ are equal. This relatively low-grade confusion may be caused by similar $F_2$ transition patterns in the two sounds. Beyond 26 cs, where both events have been removed, subjects only hear the vowel /a/.

Frequency Analysis: Referring to panel (d), the highpass (dashed) score and lowpass (solid) score fully overlap at the frequency of 1.6 kHz, where both show a sharp decrease of more than 60%, which is consistent with /ga/ event results found in embodiments of the invention. There are minor /ba/ confusion $c_{b|g}^{L}$=20% at 0.8 kHz and /da/ confusion $c_{d|g}^{H}$=25% at 2 kHz. This may result from /ba/, /da/ and /ga/ all having the same or similar types of events, i.e., bursts and transitions, allowing for guessing within the confusion group given a burst onset coincident with voicing.

Amplitude Analysis: Based on the AI-grams in panel (e), the $F_2$ transition is masked by 0 dB SNR, corresponding to the turning point of $c_{g|g}^{M}$ labeled by a * in panel (c). As the mid-frequency burst gets masked at −6 dB SNR, /ga/ becomes confused with /da/.

All six /ga/ sounds have well defined bursts between 1.4 and 2 kHz with well correlated event detection threshold as predicted by AI-grams in panel (e), versus $SNR_{90}$ [* in panel (c)], the turning point of recognition score where the listeners begin to lose the sound. Most of the /ga/s (m111, f119, m104, m112) have a perfect score of $c_{g|g}^{M}$=100% at 0 dB SNR. The other two /ga/s (f109, f108) are relatively weaker, their $SNR_{90}$ are close to 6 dB and 12 dB respectively.

According to an embodiment of the invention, it has been found that the robustness of consonant sound may be determined mainly by the strength of the dominant cue. In the sound analysis presented herein, it is common to see that the recognition score of a speech sound remains unchanged as the masking noise increases from a low intensity, then drops within 6 dB when the noise reaches a certain level at which point the dominant cue becomes barely intelligible. In "A method to identify noise-robust perceptual features: application for consonant /t/," J. Acoust. Soc. Am. 123(5), 2801-2814 (2008), M. S. Regnier and J. B. Allen reported that the threshold of speech perception with the probability of correctness being equal to 90% ($SNR_{90}$) is proportional to the threshold of the /t/ burst, using a Fletcher critical band measure (the AI-gram). Embodiments of the invention identify a related rule for the remaining five stop consonants.

FIG. 73 depicts the scatter-plot of $SNR_{90}$ versus the threshold of audibility for the dominant cue according to embodiments of the invention. For a particular sound (each point on the plot), the $SNR_{90}$ is interpolated from the PI function, while the threshold of audibility for the dominant cue is estimated from the 36 AI-gram plots shown in panel (e) of FIGS. 68-72. The two thresholds show a relatively strong correlation, indicating that the recognition of each stop consonants is mainly dependent on the audibility of the dominant cues. Speech sounds with stronger cues are easier to hear in noise than weaker cues because it takes more noise to mask them. When the dominant cue (typically the burst) becomes masked by noise, the target sounds are easily confused with other consonants. In some cases it has been found that the masking of an individual cue is typically over about a 6 dB range, and not more, i.e., it appears to be an "all or nothing" detection task. Thus, embodiments of the invention suggest that it is the spread of the event threshold that is large, not the masking of a single cue.

A significant characteristic of natural speech is the large variability of the acoustic cues across the speakers. Typically this variability is characterized by using the spectrogram.

Embodiments of the invention as applied in the analysis presented above indicate that key parameters are the timing of the stop burst, relative to the sonorant onset of the vowel (i.e., the center frequency of the burst peak and the time difference between the burst and voicing onset). These variables are depicted in FIG. 74 for the 36 utterances. The figure shows that the burst times and frequencies for stop consonants are well separated across the different talkers.

Based on the results achieved by applying an embodiment of the invention as previously described, it is possible to construct a description of acoustic features that define stop consonant events. A summary of each stop consonant will now be provided.

Unvoiced stop /pa/: As the lips abruptly release, they are used to excite primarily the $F_2$ formant relative to the others (e.g., $F_3$). This resonance is allowed to ring for approximately 5-20 cs before the onset of voicing (sonorance) with a typical value of 10 cs. For the vowel /a/, this resonance is between 0.7-1.4 kHz. A poor excitation of $F_2$ leads to a weak perception of /pa/. Truncation of the resonance does not totally destroy the /p/ event until it is very short in duration (e.g., not more than about 2 cs). A wideband burst is sometimes associated with the excitation of $F_2$, but is not necessarily audible to the listener or visible in the AI-grams. Of the six example /pa/ sounds, only f103 showed this wideband burst. When the wideband burst was truncated, the score dropped from 100% to just above 90%.

Unvoiced stop /ta/: The release of the tongue from its starting place behind the teeth mainly excites a short duration (1-2 cs) burst of energy at high frequencies (at least about 4 kHz). This burst typically is followed by the sonorance of the vowel about 5 cs later. The case of /ta/ has been studied by Regnier and Allen as previously described, and the results of the present study are in good agreement. All but one of the /ta/ examples morphed to /pa/, with that one morphing to /ka/, following low pass filtering below 2 kHz, with a maximum /pa/ morph of close to 100%, when the filter cutoff was near 1 kHz.

Unvoiced stop /ka/: The release for /k/ comes from the soft-pallet, but like It/, is represented with a very short duration high energy burst near $F_2$, typically 10 cs before the onset of sonorance (vowel). In our six examples there is almost no variability in this duration. In many examples the $F_2$ resonance could be seen following the burst, but at reduced energy relative to the actual burst. In some of these cases, the frequency of $F_2$ could be seen to change following the initial burst. This seems to be a random variation and is believed to be relatively unimportant since several /ka/ examples showed no trace of $F_2$ excitation. Five of the six /ka/sounds morphed into /pa/ when lowpass filtered to 1 kHz. The sixth morphed into /fa/, with a score around 80%.

Voiced stop /ba/: Only two of the six /ba/ sounds had score above 90% in quiet (f101 and f111). Based on the 3D analysis of these two /ba/ sounds performed according to an embodiment of the invention, it appears that the main source of the event is the wide band burst release itself rather than the $F_2$ formant excitation as in the case of /pa/. This burst can excite all the formants, but since the sonorance starts within a few cs, it seems difficult to separate the excitation due to the lip excitation and that due to the glottis. The four sounds with low scores had no visible onset burst, and all have scores below 90% in quiet. Consonant /ba-f111/ has 20% confusion with /va/ in quiet, and had only a weak burst, with a 90% score above 12 dB SNR. Consonant /ba-f101/ has a 100% score in quiet and is the only /b/ with a well developed burst, as shown in FIG. 70.

Voiced stop /da/: It has been found that the /da/ consonant shares many properties in common with /ta/ other than its onset timing since it comes on with the sonorance of the vowel. The range of the burst frequencies tends to be lower than with /ta/, and in one example (m104), the lower frequency went down to 1.4 kHz. The low burst frequency was used by the subjects in identifying /da/ in this one example, in the lowpass filtering experiment. However, in all cases the energy of the burst always included 4 kHz. The large range seems significant, going from 1.4-8 kHz. Thus, while release of air off the roof of the mouth may be used to excite the $F_2$ or $F_3$ formants to produce the burst, several examples showed a wide band burst seemingly unaffected by the formant frequencies.

Voiced stop /ga/: In the six examples described herein, the /ga/ consonant was defined by a burst that is compact in both frequency and time, and very well controlled in frequency, always being between 1.4-2 kHz. In 5 out of 6 cases, the burst is associated with both $F_2$ and $F_3$, which can clearly be seen to ring following the burst. Such resonance was not seen with /da/.

The previous discussion referred to application of embodiments of the invention to analyze consonant stops. In some embodiments, fricatives also may be analyzed using the 3D method. Generally, fricatives are sounds produced by an incoherent noise excitation of the vocal tract. This noise is generated by turbulent air flow at some point of constriction. For air flow through a constriction to produce turbulence, the Reynolds number must be at least about 1800. Since the Reynolds number is a function of air particle velocity, the density and viscosity of the air, and the smallest cross-sectional width of the construction, to generate a fricative a talker must position the tongue or lips to create a constriction width of about 2-3 mm and allow air pressure to build behind the constriction to create the necessary turbulence. Fricatives may be voiced, like the consonants /v, δ, z, ζ/ or unvoiced, like the consonants /f, θ, s, ʃ/

FIG. 75 shows an example analysis of the /fa/ sound according to an embodiment of the invention. The dominant perceptual cue is between 1 kHz to 2.8 kHz around 60 ms before the vocalic portion. The frequency importance function exhibits a peak around 2.4 kHz. For lowpass cutoff frequencies of greater than around 1.2 kHz, the score rises steadily. In the highpass experiment, cutoff frequencies lower 2.8 kHz lead to a steady increase in score and the score reaches relatively high values once the cutoff frequency is around 700 Hz. This suggests that the dominant cue is in the range of 1-2.8kHz. The time importance function is seen to have a peak around 20 ms before the vowel articulation. The dominant cue may thus be isolated as shown in FIG. 75. To verify using the event strength function, one can see that the event strength function has a peak at 0 dB SNR. The AI grams show that the cue is considerably weakened if further noise is added, and the event strength function goes to chance at −6dB.

FIG. 76 shows an example analysis of the /θa/ sound according to an embodiment of the invention. As illustrated, the frequency importance function does not have a strong peak. The time importance function also has a relatively small peak at the onset of the consonant. For this speech sound, the score does not go much above 0.4 for any of the performed analysis. Moreover, even the event strength function remains very close to chance even at high SNR values. The confusion plots show that θ does not have a fixed confusion group; rather, it may be confused with a large number of other speech sounds and there with no fixed pattern for the confusions. Thus, it may be concluded that θ does not have a compact dominant cue.

FIG. 77 shows an example analysis of the /sa/ sound according to an embodiment of the invention. The dominant perceptual cue of /sa/ is seen to be between 4 to 7.5 kHz and spans about 100 ms before the vowel is articulated. This cue is seen to be robust to white noise of around 0 dB SNR. The frequency importance function has two peaks close to each other in the range of about 3.9-7.4 kHz. The low pass experiment data indicate that after the cutoff frequency goes above around 3 kHz the score steadily rises to 0.9 at about 7.4 kHz. For the high pass filtering, there is a steady rise in score as the cutoff frequency goes below 7.4 kHz to almost 0.9 at about 4 kHz. In both cases, the change in score is relatively abrupt, which may signify that the feature is well defined in frequency. Referring to the truncation data, the time importance function is seen to have a peak around 100 ms before the vowel is articulated. The highlighted region thus may show the dominant perceptual cue for the consonant /s/. The event strength function also shows a peak at 0 dB, which may indicate that the strength of the cue begins decreasing at values of SNR below 0 dB. The AI-grams thus verify that the highlighted region likely is the perceptual cue.

FIG. 78 shows an example analysis of the /ʃa/ sound according to an embodiment of the invention. The dominant perceptual cue is between 2 kHz to 4 kHz, spanning around 100 ms before the vowel. The frequency importance function has a peak in the 2-4 kHz range. The low pass data increases as the low pass cutoff frequency goes above around 2 kHz. In the case of the high pass data, for cutoff frequencies above around 4 kHz, the score remains at chance levels. When the cutoff frequencies go below that level, the score increases significantly and reach their peak when the cutoff frequency goes below about 2 kHz. These results suggest that the /ʃ/perceptual feature lies in the range of 2-4 kHz. The time importance function also shows a peak about 100 ms before the vowel is articulated. The event strength function verifies that the feature cue strength decreased for values of SNR less than about −6 dB, which is where the perceptual cue is weakened considerably as shown by the bottom panels of FIG. 78.

Among the above mentioned fricative speech sounds, the feature regions generally are found around and above 2 kHz, and span for a considerable duration before the vowel is articulated. In the case of /sa/ and /ʃa/, the events of both sounds begin at about the same time, although the burst for /ʃa/ is slightly lower in frequency than /sa/. This suggests that eliminating the burst at that frequency in the case of /ʃ/ should give rise to the sound /s/.

Although a distinct feature for /θ/ may not be apparent, when masking is applied either of these four sounds, they are confused with each other. Masking by white noise, in particular, can cause these confusions, because the white noise may act as a low pass filter on sounds that have relatively high frequency cues, which may alter the cues of the masked sounds and result in confusions between /f/, /θ/, /s/, and /ʃ/.

FIG. 79 shows an example analysis of the sound /ða/ according to an embodiment of the invention. Within the database of sounds, analyses according to embodiments of the invention indicate that seen that /θa/ and /ða/ have relatively low perception scores even at high SNRs. In the course of the highpass, lowpass, and truncation procedures, the highest scores for these two sounds are about 0.4-0.5 on average. These two sounds are characterized by a wide band noise burst at the onset of the consonant and, therefore, chances of confusions or alterations may be maximized in the case of these sounds. Thus, it may be difficult or require further processing or analysis to identify feature regions for /θ/ and /ð/. As previously described with respect to /θ/, /ð/ has a large number of confusions with several different sounds, indicating that it may not have a strong compact perceptual cue.

FIG. 80 shows an example analysis of the sound /va/ according to an embodiment of the invention. The /v/ feature is seen to be between about 0.5 kHz to 1.5 kHz, and most appears in the transition as highlighted in the mid-left panel of FIG. 15. The frequency importance function has a peak in the range of about 500 Hz to 1.5 kHz, and the time importance function also has a peak at the transition region as shown in the top-left panel. The frequency importance function also has a peak at around 2 kHz due to confusion with /ba/. The feature can be verified by looking at the event strength function which steadily drops from 18 dB SNR and touches chance performance at around −6 dB SNR. At −6 dB, the perceptual cue is almost removed and at this point the event strength function is very close to chance.

FIG. 81 shows an example analysis of /za/ according to an embodiment of the invention. The /za/ feature appears between about 3 kHz to 7.5 kHz and spans about 50-70 ms before the vowel is articulated as highlighted in the mid-left panel. This feature is seen to be robust to white noise of −6 dB SNR. The frequency importance function shows a clear peak at around 5.6 kHz. The low pass score rises after cutoff frequencies reach around 2.8 kHz. The high pass score is relatively constant after about 4 kHz. A brief decrease in the score indicates an interfering cue of /ʒ/. The time importance function has a peak around 70 ms before the vowel is articulated as shown in the top-left panel. For verification, the event strength function decreases at about −6 dB which is also where the dominant perceptual cue is weaker.

FIG. 82 shows an example analysis of /ʒ/ according to an embodiment of the invention. The /ʒa/ perceptual cue occurs between about 1.5 kHz to 4 kHz, spanning about 50-70 ms before the vowel is articulated. This cue is robust to white noise of 0 dB SNR. The frequency importance function has a peak at about 2 kHz. The low pass data increases after cutoff frequencies of around 1.2 kHz, showing that the perceptual cue is present in frequencies higher than 1.2 kHz. The high pass score reaches 1 after cutoff frequencies of about 1.4 kHz. The time importance function peaks around 50-70 ms before the vowel is articulated, which is where the perceptual cue is seen to be present. The event strength function confirms this result with a distinct peak at 0 dB, which is where the perceptual cue starts losing strength.

In the case of the voiced fricatives, it is noticed that /f/ and /θ/ are not prominent in the confusion group of /f/, /θ/, /ʃ/, and /f/ primarily as /f/ has stronger confusions with the voiced consonant /b/ and unvoiced fricative /v/ and /θ/has no consistent patterns as far as confusions with other consonants is concerned. Similarly for the unvoiced fricatives, /v/ and /ð/are not prominent in the confusion group as /v/ is often confused with /b/, and /f/ and /ð/ show no consistent confusions.

Embodiments of the invention also may be applied to nasal sounds, i.e., those for which the nasal tract provides the main sound transmission channel. A complete closure is made toward the front of the vocal tract, either by the lips, by the tongue at the gum ridge or by tongue at the hard or soft palate and the velum is opened wide. As may be expected, most of the sound radiation takes place at the nostrils. The nasal consonants described herein include /m/ and /n/.

FIG. 83 shows an example analysis of the /ma/ sound according to an embodiment of the invention. The perceptual cues of /ma/ include the nasal murmur around 100 ms before the vowel is articulated and a transition region between about 500 Hz to 1.5 kHz as highlighted in the mid-left panel. The frequency importance function has a peak at around 0.6 kHz. The low pass score steadily increases as the cutoff frequency is increased above 0.3 kHz and by around 0.6 kHz, the score reaches 1. With the high pass experiment, a sudden decrease in score is seen at cutoff frequencies between about 1.4 kHz to 2 kHz. A further decrease in the cutoff frequency leads to increasing scores again which reach 1 at around 1 kHz. The time importance function also shows a peak at around the transition region of the consonant and the vowel. Thus, the highlighted region in the mid-left panel is the /ma/ perceptual cue. It can be observed that the formant transition with regard to the second formant practically plays no role in perception for /ma/. Moreover, as there is a low frequency voice bar present in all voiced sounds which is a specific characteristic, a low frequency nasal murmur may be seen for the nasal sounds as well. This nasal murmur however, may not coincide with the onset of the consonant as in the case of the voice bar. On the other hand, it is seen to precede the onset of consonant.

FIG. 84 shows an example analysis of the /na/ sound according to an embodiment of the invention. The perceptual cues include a low frequency nasal murmur about 80-100 ms before the vowel and a $F_2$ transition around 1.5 kHz. In the low pass filtering experiment, the score remains about at chance up to about 0.4 kHz, after which it steadily increases. An intermittent peak is seen in the score at about 0.5-1 kHz. In the high pass data, the scores reach a high score after about a 1.4 kHz cutoff frequency. Much like /m/, the time importance function for /n/ has a peak around the transition region. Combining this information with the truncation data, the feature can be narrowed down as highlighted. For the nasal /na/ the $F_2$ formant transitions are much more prominent. This feature may distinguish between the two nasals. Consistent with this conclusion, the /na/ sound has a nasal murmur as discussed for /ma/. The low pass data shows that when the low pass cutoff frequencies are such that the nasal murmur can be heard but the listener cannot listen to the transition, the score climbs from chance to around 0.5. This is because once the nasal murmur is heard, the sound can be categorized as being nasal and the listener may conclude that the sound is either /ma/ or /na/. Once the transition is also heard, it may be easier to distinguish which of these nasal sounds one is listening to. This may explain the score increase to 1 after the transition is heard. The event strength function indicates that the nasal murmur is a much more robust cue for the nasal sounds since it is seen to be present at SNRs as low as −12 dB. The event strength function also has a peak at around −6 dB SNR, which is where the /ma/ perceptual cue weakens until it is almost completely removed at about −12 dB.

FIG. 85 shows a summary of events relating to initial consonants preceding /a/ as identified by analysis procedures according to embodiments of the invention. The stop consonants are defined by a short duration burst (e.g., about 2 cs), characterized by its center frequency (high, medium and wide band), and the delay to the onset of voicing. This delay, between the burst and the onset of sonorance, is a second parameter called "voiced/unvoiced." The fricatives (/v/ being an exception) are characterized by an onset of wide-band noise created by the turbulent airflow through lips and teeth. According to an embodiment, duration and frequency range are identified as two important parameters of the events. A voiced fricative usually has a considerably shorter duration than its unvoiced counterpart /θ/ and /δ/ are not included in the schematic drawing because no stable events have been found for these two sounds. The two nasals /m/ and /n/ share a common feature of nasal murmur in the low frequency. As a bilabial consonant, /m/ has a formant transition similar to /b/, while /n/ has a formant transition close to /g/ and /d/.

Sound events as identified according to embodiments of the invention may implicate information about how speech is decoded in the human auditory system. If the process of speech communication is modeled in the framework of information theory, the source of the communication system is a sequence of phoneme symbols, encoded by acoustic cues. At the receiver's side, perceptual cues (events), the representation of acoustic cues on the basilar membrane, are the input to the speech perception center in the human brain. In general, the performance of a communication system is largely dependent on the code of the symbols to be transmitted. The larger the distances between the symbols, the less likely the receiver is prone to make mistakes. This principle applies to the case of human speech perception as well. For example, as previously described /pa, ta, ka/ all have a burst and a transition, the major difference being the position of the burst for each sound. If the burst is missing or masked, most listeners will not be able to distinguish among the sounds. As another example, the two consonants /ba/ and /va/ traditionally are attributed to two different confusion groups according to their articulatory or distinctive features. However, based on analysis according to an embodiment of the invention, it has been shown that consonants with similar events tend to form a confusion group. Therefore, /ba/ and /va/ may be highly confusable to each other simply because they share a common event in the same area. This indicates that events, rather than articulatory or distinctive features, provide the basic units for speech perception.

In addition, as shown by analysis according to embodiments of the invention, the robustness of the consonants may be determined by the strength of the events. For example, the voice bar is usually strong enough to be audible at −18 dB SNR. As a consequence, the voiced and unvoiced sounds are seldom mixed with each other. Among the sixteen consonants, the two nasals, /ma/ and /na/, distinguished from other consonants by the strong event of nasal murmur in the low frequency, are the most robust. Normal hearing people can hear the two sounds without any degradation at −6 dB SNR. Next, the bursts of the stop consonants /ta, ka, da, ga/ are usually strong enough for the listeners to hear with an accuracy of about 90% at 0 dB SNR (sometimes −6 dB SNR). Then the fricatives /sa, Sa, za, Za/, represented by some noise bars, varied in bandwidth or duration, are normally strong enough to resist the white noise of 0 dB SNR. Due to the lack of strong dominant cues and the similarity between the events, /ba, va, fa/ may be highly confusable with each other. The recognition score is close to 90% under quiet condition, then gradually drops to less than 60% at 0 dB SNR. The least robust consonants are /Da/ and /Ta/. Both have an average recognition score of less than about 60% at 12dB SNR. Without any dominant cues, they are easily confused with many other consonants. For a particular consonant, it is common to see that utterances from some of the talkers are more intelligible than those from the other. According to embodiments of the invention, this also may be explained by the strength of the events. In general, utterances with stronger events are easier to hear than the ones with weaker events, especially when there is noise.

In some embodiments, it may be found that speech sounds contain acoustic cues that are conflicting with each other. For example, f103*ka* contains two bursts in the high- and low-frequency ranges in addition to the mid-frequency /ka/ burst, which greatly increase the probability of perceiving the sound as /ta/ and /pa/ respectively. This is illustrated in panel (d) of FIG. 69. This type of misleading onset may be referred to as an interfering cue.

As previously described, once sound features are identified for one or more sounds, spoken or recorded speech may be enhanced to improve intelligibility of the sounds. Referring back to FIG. 48, the feature detector 4810 may identify a feature in an utterance and provide the feature or information about the feature and the noisy speech as an input to the speech enhancer. The feature detector 4810 may use some or all of the methods described herein to identify a sound, or may use stored 3D results for one or more sounds to identify the sounds in spoken speech. For example, the feature detector may store information about one or more sounds and/or confusion groups, and use the stored information to identify those sounds in spoken speech.

Examples provided herein are merely illustrative and are not meant to be an exhaustive list of all possible embodiments, applications, or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the relevant arts or fields are intended to be within the scope of the appended claims. As a specific example, one of skill in the art will understand that any appropriate acoustic transducer may be used instead of or in conjunction with a microphone. As another example, various special-purpose and/or general-purpose processors may be used to implement the methods described herein, as will be understood by one of skill in the art.

The disclosures of all references and publications cited above are expressly incorporated by reference in their entireties to the same extent as if each were incorporated by reference individually.

What is claimed is:

1. A method for enhancing a speech sound, said method comprising:

identifying a first consonant-vowel (CV) speech sound from among a plurality of CV sounds;

identifying a second CV speech sound, that is different than the first CV speech sound, from among the plurality of CV sounds;

locating a first feature within the first speech sound, the first feature at least partially encoding the first speech sound, wherein the first feature includes a first time value and a first frequency value that together locate the first feature within the first speech sound;

locating a second feature within the second speech sound, the second feature at least partially encoding the second speech sound, wherein the second feature includes a second time value and a second frequency value that together locate the second feature within the second speech sound and that are different than the first time value and the first frequency value, respectively;

in an electronic device, increasing, based at least in part on the first time value and based at least in part on the first frequency value, the contribution of the first feature to the first speech sound; and in the electronic device, increasing, based at least in part on the second time value and based at least in part on the second frequency value, the contribution of the second feature to the second speech sound.

2. The method of claim 1, said step of locating said first feature further comprising:

generating an importance function for the first speech sound; and identifying, based on a portion of the importance function, a time at which said first feature occurs in said first speech sound, wherein the portion of the importance function corresponds to the first feature.

3. The method of claim 2, wherein the importance function is at least one of a frequency importance function and a time importance function.

4. The method of claim 1, said step of locating said first feature in the first speech sound further comprising:

isolating, within at least one of a certain time range and a certain frequency range, a section of a reference speech sound, wherein the section of the reference speech sound corresponds to one of the first speech sound or the second speech sound based on a degree of recognition among a plurality of listeners to the isolated section, constructing an importance function describing a contribution of the isolated section to recognition of one of the first speech sound and the second speech sound; and using the importance function to identify the first feature as encoding the first speech sound or to identify the second feature as encoding the second speech sound.

5. The method of claim 4, wherein the importance function is at least one of a time importance function and a frequency importance function.

6. The method of claim 1, said step of locating the first feature in the first speech sound further comprising:

iteratively truncating the first speech sound to identify a time at which the first feature occurs in the first speech sound;

applying at least one frequency filter to identify a frequency range in which the first feature occurs in the first speech sound;

masking the first speech sound to identify a relative intensity at which the first feature occurs in the first speech sound; and using at least two of the identified time, the identified frequency range, and the identified intensity, to locate the first feature within the first speech sound.

7. The method of claim 1, wherein each of the first speech sound and the second speech sound comprises at least one of /pa, ta, ka, ba, da, ga, fa, θa, sa, ʃa, ða, va, ca/.

8. The method of claim 6, said step of iteratively truncating the first speech sound further comprising:

iteratively truncating the first speech sound at a plurality of step sizes from an onset of the first speech sound;

measuring listener recognition after each truncation; and upon finding a truncation step size at which the first speech sound is not distinguishable by the listener, identifying the found step size as indicating the location, in time, of the first sound feature.

9. A system for enhancing a speech sound, said system comprising:

a feature detector configured to:

identify a first consonant-vowel (CV) speech sound from among a plurality of CV sounds;

identify a second CV speech sound, that is different than the first CV speech sound, from among the plurality of CV sounds;

locate, in a speech signal, a first feature that at least partially encodes the first speech sound, wherein the first feature includes a first time value and a first frequency value that together locate the first feature within the first speech sound;

locate a second feature within the second speech sound, the second feature at least partially encoding the second speech sound, wherein the second feature includes a second time value and a second frequency value that together locate the second feature within the second speech sound and that are different than the first time value and the first frequency value, respectively;

a speech enhancer configured to enhance said speech signal by modifying, based on the first time value and the first frequency value, a contribution of the first feature to the first speech sound, and modifying, based on the second time value and the second frequency value, a contribution of the second feature to the second speech sound based on the second time value and the second frequency value; and an output to provide the enhanced speech signal to a listener.

10. The system of claim 9, wherein modifying the contribution of the first feature to the first speech sound comprises increasing the contribution of the first feature.

11. The system of claim 10, wherein said feature detector is further configured to locate another feature in the first speech sound, and the speech enhancer is further configured to enhance the speech signal by decreasing the contribution of the another feature to the first speech sound, wherein the another feature interferes with recognition of the first speech sound.

12. The system of claim 9, wherein the speech enhancer is configured to enhance, based on a hearing profile of the listener, the speech signal based on a hearing profile of the listener.

13. The system of claim 9, wherein the feature detector is configured to identify, based on a hearing profile of the listener, the first feature based on a hearing profile of the listener.

14. The system of claim 9, said system being implemented in at least one of an automatic speech recognition device, a cochlear implant, a portable electronic device, and a hearing aid.

15. The system of claim 9, said feature detector storing speech feature data generated by a method comprising:

iteratively truncating the first speech sound to identify a time at which the first feature occurs in the first speech sound;

applying at least one frequency filter to identify a frequency range in which the first feature occurs in the first speech sound;

masking the first speech sound to identify a relative intensity at which the first feature occurs in the first speech sound; and using at least two of the identified time, the identified frequency range, and the identified intensity, to locate the first feature within the first speech sound.

16. The system of claim 9, wherein each of the first speech sound and the second speech sound comprises at least one of /pa, ta, ka, ba, da, ga, fa, θa, sa, ʃa, δa, va, ca/.

17. A method comprising:

isolating, in time, a section of a speech sound, wherein the speech sound is within a certain frequency range;

measuring recognition, by a plurality of listeners, of the isolated section of the speech sound based on a degree of recognition among the plurality of listeners, constructing a time importance function and a frequency importance function that describe a contribution of the time-isolated section to recognition of the speech sound; and in an electronic device, identifying the speech sound from among a plurality of speech sounds, and, based at least in part on the identification of the identified speech sound, using the time importance function and the frequency importance function to identify a first feature that encodes the identified speech sound, wherein the first feature includes a first time value; and in the electronic device, modifying, based on the first time value, the identified speech sound to increase a contribution of said first feature to the identified speech sound, wherein the plurality of speech sounds comprises /pa, ta, ka, ba, da, ga, fa, θa, sa, ʃa, δa, va, ca/.

18. The method of claim 17 further comprising the steps of:

isolating a second section of the identified speech sound within a certain time range;

measuring recognition, by the plurality of listeners, of the second isolated section of the identified speech sound based on a degree of recognition among the plurality of listeners, constructing a second time importance function that describes a contribution of the second section to recognition of the identified speech sound; and in the electronic device, using the second time importance function to identify a second feature that encodes the identified speech sound.

19. The method of claim 18 further comprising:

in the electronic device, modifying said speech sound to decrease a contribution of said second feature to the speech sound.

20. A system for phone detection, the system comprising:

an acoustic transducer configured to receive a speech signal, wherein the speech signal is generated in an acoustic domain a feature detector configured to receive the speech signal and to generate a feature signal indicating a temporal location, wherein the temporal location is in the speech signal and is where a speech sound feature occurs; and a phone detector configured to receive the feature signal and, based on the feature signal, identify, in the acoustic domain, a consonant-vowel (CV) speech sound included in the speech signal, wherein the CV speech sound is identified, by the system, from among a set of CV speech sounds comprising the identified CV speech sound and a plurality of other CV speech sounds, wherein the identified CV speech sound has at least one of a time value and a frequency value, and wherein each of the plurality of other CV speech sounds has a time value or a frequency value which is different than that of the identified CV speech sound wherein the plurality of CV speech sounds comprise /pa, ta, ka, ba, da, ga, fa, θa, sa, ʃa, δa, va, ca/.

21. The system of claim 20, further comprising:

a speech enhancer configured to receive the feature signal and, based on the temporal location of the speech sound feature, modify a contribution of the speech sound feature to the speech signal received by said feature detector.

22. The system of claim 21, said speech enhancer configured to modify the contribution of the speech sound feature to the speech signal by increasing the contribution of the speech sound feature to the speech signal.

23. The system of claim 21, said speech enhancer configured to modify the contribution of the speech sound feature to the speech signal by decreasing the contribution of the speech sound feature to the speech signal.

24. The system of claim 20, said system being implemented in at least one of a cochlear implant, a portable electronic device, an automatic speech recognition device, and a hearing aid.

25. The system of claim 20, wherein the location of the speech sound feature is defined by feature location data generated by an analysis of at least two dimensions of the identified speech sound, the at least two dimensions including at least two of time, frequency, and intensity.

* * * * *